(12) United States Patent
Lappas et al.

(10) Patent No.: US 12,070,907 B2
(45) Date of Patent: Aug. 27, 2024

(54) THREE-DIMENSIONAL OBJECTS AND THEIR FORMATION

(71) Applicant: Velo3D, Inc., Fremont, CA (US)

(72) Inventors: Tasso Lappas, Pasadena, CA (US); Evgeni Levin, Rehovot (IL); Benyamin Buller, Cupertino, CA (US)

(73) Assignee: Velo3D, Freemont, CA (US)

( * ) Notice: Subject to any disclaimer, the term of this patent is extended or adjusted under 35 U.S.C. 154(b) by 0 days.

(21) Appl. No.: 18/209,603

(22) Filed: Jun. 14, 2023

(65) Prior Publication Data

US 2024/0042698 A1 Feb. 8, 2024

Related U.S. Application Data

(63) Continuation of application No. 18/108,059, filed on Feb. 10, 2023, now abandoned, which is a
(Continued)

(51) Int. Cl.
*B29C 64/393* (2017.01)
*B22F 10/80* (2021.01)
(Continued)

(52) U.S. Cl.
CPC ............ *B29C 64/393* (2017.08); *B22F 10/80* (2021.01); *B22F 12/90* (2021.01); *B28B 17/0081* (2013.01); *B29C 64/10* (2017.08); *B33Y 10/00* (2014.12); *B33Y 30/00* (2014.12); *B33Y 50/02* (2014.12); *G05B 19/4099* (2013.01);
(Continued)

(58) Field of Classification Search
CPC ...... G05B 19/4099; G05B 2219/35134; G05B 2219/49007; B33Y 30/00; B33Y 10/00; B33Y 50/02; G06N 99/005; B22F 3/1055; B22F 2003/1057
See application file for complete search history.

(56) References Cited

U.S. PATENT DOCUMENTS 430,047 A  6/1890  Tylee
1,003,518 A  9/1911  Schiller
(Continued)

FOREIGN PATENT DOCUMENTS

CN  1057034 C  10/2000
CN  1476362  2/2004
(Continued)

OTHER PUBLICATIONS

Salvati, E., et al., (An Investigation of Residual Stress Gradient Effects in FIB-DIC Micro-Ring-Core Analysis. Proc IMCECS, 2015. 2) (Year: 2015).*
(Continued)

*Primary Examiner* — Shon G Foley
(74) *Attorney, Agent, or Firm* — Foley & Lardner LLP

(57) ABSTRACT

The present disclosure provides three-dimensional (3D) methods, apparatuses, software (e.g., non-transitory computer readable medium), and systems for the formation of at least one desired 3D object; comprising use of a geometric model, a physics based model, one or more markers, one or more modes, or any combination thereof. The disclosure provides reduction of deformation that may be caused by the forming process of the 3D object.

20 Claims, 33 Drawing Sheets

Related U.S. Application Data continuation of application No. 17/972,641, filed on Oct. 25, 2022, now abandoned, which is a continuation of application No. 17/858,209, filed on Jul. 6, 2022, now abandoned, which is a continuation of application No. 17/708,397, filed on Mar. 30, 2022, now abandoned, which is a continuation of application No. 17/552,788, filed on Dec. 16, 2021, now abandoned, which is a continuation of application No. 17/466,158, filed on Sep. 3, 2021, now abandoned, which is a continuation of application No. 17/322,142, filed on May 17, 2021, now abandoned, which is a continuation of application No. 17/165,289, filed on Feb. 2, 2021, now abandoned, which is a continuation of application No. 17/071,082, filed on Oct. 15, 2020, now abandoned, which is a continuation of application No. 16/917,933, filed on Jul. 1, 2020, now abandoned, which is a continuation of application No. 16/825,696, filed on Mar. 20, 2020, now abandoned, which is a continuation of application No. 16/686,045, filed on Nov. 15, 2019, now abandoned, which is a continuation of application No. 15/719,229, filed on Sep. 28, 2017, now abandoned.

(60) Provisional application No. 62/402,634, filed on Sep. 30, 2016.

(51) Int. Cl.
*B22F 12/90* (2021.01)
*B28B 17/00* (2006.01)
*B29C 64/10* (2017.01)
*B33Y 10/00* (2015.01)
*B33Y 30/00* (2015.01)
*B33Y 50/02* (2015.01)
*G05B 19/4099* (2006.01)
*G06F 30/10* (2020.01)
*G06F 30/20* (2020.01)
*G06T 19/00* (2011.01)
*G06T 19/20* (2011.01)
*B22F 10/25* (2021.01)
*B22F 10/28* (2021.01)
*B22F 10/31* (2021.01)
*B22F 10/36* (2021.01)
*B22F 10/366* (2021.01)
*B22F 10/64* (2021.01)
*B22F 10/66* (2021.01)
*B22F 10/85* (2021.01)
*B22F 12/41* (2021.01)
*B28B 1/00* (2006.01)
*G06F 30/00* (2020.01)
*G06F 113/10* (2020.01)
*G06N 20/00* (2019.01)

(52) U.S. Cl.
CPC .............. *G06F 30/10* (2020.01); *G06F 30/20* (2020.01); *G06T 19/00* (2013.01); *G06T 19/20* (2013.01); *B22F 10/25* (2021.01); *B22F 10/28* (2021.01); *B22F 10/31* (2021.01); *B22F 10/36* (2021.01); *B22F 10/366* (2021.01); *B22F 10/64* (2021.01); *B22F 10/66* (2021.01); *B22F 10/85* (2021.01); *B22F 12/41* (2021.01); *B28B 1/001* (2013.01); *G05B 2219/35134* (2013.01); *G05B 2219/49007* (2013.01); *G06F 30/00* (2020.01); *G06F 2113/10* (2020.01); *G06N 20/00* (2019.01); *G06T 2219/2021* (2013.01); *Y02P 10/25* (2015.11)

(56) References Cited

U.S. PATENT DOCUMENTS

| | | |
|---|---|---|
| 1,003,530 A | 9/1911 | Smith |
| 1,011,223 A | 12/1911 | Messick |
| 1,025,233 A | 5/1912 | Austin |
| 1,025,904 A | 5/1912 | Earhart |
| 1,028,660 A | 6/1912 | Barber |
| D229,000 S | 11/1973 | O'Neil |
| 3,790,787 A | 2/1974 | Geller |
| 3,849,003 A | 11/1974 | Velzel |
| 3,864,809 A | 2/1975 | Donachie |
| 4,019,066 A | 4/1977 | Lucas |
| 4,177,087 A | 12/1979 | Hills |
| 4,300,474 A | 11/1981 | Livsey |
| 4,323,756 A | 4/1982 | Brown |
| 4,359,622 A | 11/1982 | Dostoomian |
| D296,286 S | 6/1988 | Fees |
| 4,823,158 A | 4/1989 | Casey |
| 4,845,356 A | 7/1989 | Baker |
| 4,863,538 A | 9/1989 | Deckard |
| 4,927,582 A | 5/1990 | Bryson |
| 4,938,816 A | 7/1990 | Beaman |
| 4,961,154 A | 10/1990 | Pomerantz |
| 4,962,988 A | 10/1990 | Swann |
| 5,088,047 A | 2/1992 | Bynum |
| 5,106,010 A | 4/1992 | Stueber |
| 5,127,037 A | 6/1992 | Bynum |
| 5,155,321 A | 10/1992 | Grube |
| 5,156,697 A | 10/1992 | Bourell |
| 5,162,660 A | 11/1992 | Popil |
| 5,202,837 A | 4/1993 | Coe |
| 5,203,944 A | 4/1993 | Prinz |
| 5,204,055 A | 4/1993 | Sachs |
| 5,208,431 A | 5/1993 | Uchiyama |
| 5,223,781 A | 6/1993 | Criswell |
| 5,252,264 A | 10/1993 | Forderhase |
| 5,255,057 A | 10/1993 | Stelter |
| 5,286,573 A | 2/1994 | Prinz |
| 5,296,062 A | 3/1994 | Bourell |
| 5,303,141 A | 4/1994 | Batchelder |
| 5,325,516 A | 6/1994 | Blomgren |
| 5,342,919 A | 8/1994 | Dickens, Jr. |
| 5,352,405 A | 10/1994 | Beaman |
| 5,354,414 A | 10/1994 | Feygin |
| 5,386,427 A | 1/1995 | Zayhowski |
| 5,387,380 A | 2/1995 | Cima |
| 5,393,482 A | 2/1995 | Benda |
| 5,396,333 A | 3/1995 | Aleshin |
| 5,424,834 A | 6/1995 | Akedo |
| 5,430,666 A | 7/1995 | Deangelis |
| 5,460,758 A | 10/1995 | Langer |
| 5,508,489 A | 4/1996 | Benda |
| 5,527,019 A | 6/1996 | Schwarz |
| 5,527,877 A | 6/1996 | Dickens, Jr. |
| 5,530,221 A | 6/1996 | Benda |
| 5,534,104 A | 7/1996 | Langer |
| 5,536,467 A | 7/1996 | Reichle |
| 5,554,837 A | 9/1996 | Goodwater |
| 5,582,876 A | 12/1996 | Langer |
| 5,593,531 A | 1/1997 | Penn |
| 5,594,652 A | 1/1997 | Penn |
| 5,601,737 A | 2/1997 | Asahi |
| 5,615,013 A | 3/1997 | Rueb |
| 5,640,667 A | 6/1997 | Freitag |
| 5,647,931 A | 7/1997 | Retallick |
| 5,648,450 A | 7/1997 | Dickens, Jr. |
| 5,658,412 A | 8/1997 | Retallick |
| 5,665,401 A | 9/1997 | Serbin |
| 5,730,925 A | 3/1998 | Mattes |
| 5,733,497 A | 3/1998 | McAlea |
| 5,745,834 A | 4/1998 | Bampton |
| 5,749,041 A | 5/1998 | Lakshminarayan |
| 5,753,171 A | 5/1998 | Serbin |
| 5,753,274 A | 5/1998 | Wilkening |
| 5,764,874 A | 6/1998 | White |
| 5,786,562 A | 7/1998 | Larson |
| 5,800,579 A | 9/1998 | Billingsley |

(56) References Cited

U.S. PATENT DOCUMENTS

| | | |
|---|---|---|
| 5,818,718 A | 10/1998 | Thomas |
| 5,821,475 A | 10/1998 | Morehead |
| 5,824,259 A | 10/1998 | Allanic |
| 5,832,415 A | 11/1998 | Wilkening |
| 5,859,786 A | 1/1999 | Klein |
| 5,876,550 A | 3/1999 | Feygin |
| 5,876,767 A | 3/1999 | Mattes |
| 5,904,890 A | 5/1999 | Lohner |
| 5,908,569 A | 6/1999 | Wilkening |
| 5,932,059 A | 8/1999 | Langer |
| 5,951,864 A | 9/1999 | Hazrati |
| 6,024,792 A | 2/2000 | Kurz |
| 6,042,774 A | 3/2000 | Wilkening |
| 6,066,285 A | 5/2000 | Kumar |
| 6,085,122 A | 7/2000 | Manning |
| 6,106,659 A | 8/2000 | Spence |
| 6,126,276 A | 10/2000 | Davis |
| 6,136,257 A | 10/2000 | Graf |
| 6,138,892 A | 10/2000 | Kim |
| 6,143,378 A | 11/2000 | Harwell |
| 6,151,345 A | 11/2000 | Gray |
| 6,169,605 B1 | 1/2001 | Penn |
| 6,175,422 B1 | 1/2001 | Penn |
| 6,206,672 B1 | 3/2001 | Grenda |
| 6,207,097 B1 | 3/2001 | Iverson |
| 6,215,093 B1 | 4/2001 | Meiners |
| 6,251,488 B1 | 6/2001 | Miller |
| 6,261,077 B1 | 7/2001 | Bishop |
| 6,268,584 B1 | 7/2001 | Keicher |
| 6,336,480 B2 | 1/2002 | Gaylo |
| 6,337,459 B1 | 1/2002 | Terwijn |
| 6,341,042 B1 | 1/2002 | Matsunaka |
| 6,376,148 B1 | 4/2002 | Liu |
| 6,391,251 B1 | 5/2002 | Keicher |
| 6,401,001 B1 | 6/2002 | Jang |
| 6,483,596 B1 | 11/2002 | Philippi |
| 6,492,651 B2 | 12/2002 | Kerekes |
| 6,531,036 B1 | 3/2003 | Leitgeb |
| 6,531,086 B1 | 3/2003 | Larsson |
| 6,554,600 B1 | 4/2003 | Hofmann |
| 6,583,379 B1 | 6/2003 | Meiners |
| 6,621,039 B2 | 9/2003 | Wang |
| 6,636,676 B1 | 10/2003 | Renn |
| 6,656,409 B1 | 12/2003 | Keicher |
| 6,656,410 B2 | 12/2003 | Hull |
| 6,672,343 B1 | 1/2004 | Perret |
| 6,682,688 B1 | 1/2004 | Higashi |
| 6,688,886 B2 | 2/2004 | Hughes |
| 6,722,872 B1 | 4/2004 | Swanson |
| 6,767,499 B1 | 7/2004 | Hory |
| 6,811,744 B2 | 11/2004 | Keicher |
| 6,814,823 B1 | 11/2004 | White |
| 6,815,636 B2 | 11/2004 | Chung |
| 6,823,124 B1 | 11/2004 | Renn |
| 6,824,714 B1 | 11/2004 | Tuerck et al. |
| 6,861,613 B1 | 3/2005 | Meiners |
| 6,905,645 B2 | 6/2005 | Iskra |
| 6,930,278 B1 | 8/2005 | Chung |
| 6,932,935 B1 | 8/2005 | Oberhofer |
| 6,945,638 B2 | 9/2005 | Teung |
| 6,949,216 B2 | 9/2005 | Brice |
| 6,955,023 B2 | 10/2005 | Rotheroe |
| 6,963,338 B1 | 11/2005 | Bachelder |
| 6,986,654 B2 | 1/2006 | Imiolek |
| 6,989,115 B2 | 1/2006 | Russell |
| 6,994,894 B2 | 2/2006 | Hofmeister |
| 6,998,568 B2 | 2/2006 | Brehm |
| 7,002,754 B2 | 2/2006 | Baer |
| 7,008,209 B2 | 3/2006 | Iskra |
| 7,027,887 B2 | 4/2006 | Gaylo |
| 7,045,015 B2 | 5/2006 | Renn |
| 7,047,098 B2 | 5/2006 | Lindemann |
| 7,073,442 B2 | 7/2006 | Fedor |
| 7,084,370 B2 | 8/2006 | Hagemeister |
| 7,107,118 B2 | 9/2006 | Orozco |
| 7,108,894 B2 | 9/2006 | Renn |
| 7,149,596 B2 | 12/2006 | Berger |
| 7,153,463 B2 | 12/2006 | Leuterer |
| 7,229,272 B2 | 6/2007 | Leuterer |
| 7,241,415 B2 | 7/2007 | Khoshnevis |
| 7,261,542 B2 | 8/2007 | Hickerson |
| 7,261,550 B2 | 8/2007 | Herzog |
| 7,270,844 B2 | 9/2007 | Renn |
| 7,294,366 B2 | 11/2007 | Renn |
| 7,296,599 B2 | 11/2007 | Cox |
| 7,326,377 B2 | 2/2008 | Adams |
| 7,357,629 B2 | 4/2008 | Weiskopf |
| 7,419,632 B2 | 9/2008 | Keller |
| 7,435,368 B2 | 10/2008 | Davidson |
| 7,452,500 B2 | 11/2008 | Uckelmann |
| 7,454,262 B2 | 11/2008 | Larsson |
| 7,485,345 B2 | 2/2009 | Renn |
| 7,515,986 B2 | 4/2009 | Huskamp |
| 7,521,652 B2 | 4/2009 | Chung |
| 7,537,722 B2 | 5/2009 | Andersson |
| 7,540,738 B2 | 6/2009 | Larsson |
| 7,604,768 B2 | 10/2009 | Kritchman |
| 7,615,179 B2 | 11/2009 | Dumond |
| 7,628,600 B2 | 12/2009 | Perret |
| 7,635,825 B2 | 12/2009 | Larsson |
| 7,639,267 B1 | 12/2009 | Desimone |
| 7,658,163 B2 | 2/2010 | Renn |
| 7,661,948 B2 | 2/2010 | Perret |
| 7,665,979 B2 | 2/2010 | Heugel |
| 7,674,107 B2 | 3/2010 | Perret |
| 7,674,671 B2 | 3/2010 | Renn |
| 7,686,605 B2 | 3/2010 | Perret |
| 7,704,432 B2 | 4/2010 | Dumond |
| 7,704,565 B2 | 4/2010 | Slaughter |
| 7,713,048 B2 | 5/2010 | Perret |
| 7,713,454 B2 | 5/2010 | Larsson |
| 7,740,683 B2 | 6/2010 | Thorsson |
| 7,741,578 B2 | 6/2010 | Adams |
| 7,789,037 B2 | 9/2010 | Teulet |
| 7,799,253 B2 | 9/2010 | Hoechsmann |
| 7,814,441 B2 | 10/2010 | Bae |
| 7,820,241 B2 | 10/2010 | Perret |
| 7,833,465 B2 | 11/2010 | Larsson |
| 7,837,458 B2 | 11/2010 | Perret |
| 7,847,212 B2 | 12/2010 | Renz |
| 7,850,885 B2 | 12/2010 | Philippi |
| 7,863,544 B2 | 1/2011 | Serruys |
| 7,871,551 B2 | 1/2011 | Wallgren |
| 7,879,394 B1 | 2/2011 | Keicher |
| 7,891,095 B2 | 2/2011 | Jonsson |
| 7,901,604 B2 | 3/2011 | Oberhofer |
| 7,931,462 B2 | 4/2011 | Mattes |
| 7,936,352 B2 | 5/2011 | Baran |
| 7,938,079 B2 | 5/2011 | King |
| 7,938,341 B2 | 5/2011 | King |
| 7,946,840 B2 | 5/2011 | Perret |
| 7,976,302 B2 | 7/2011 | Halder |
| 7,987,813 B2 | 8/2011 | Renn |
| 7,991,465 B2 | 8/2011 | Bartic |
| 8,025,831 B2 | 9/2011 | Kong |
| 8,031,384 B2 | 10/2011 | Perret |
| 8,034,279 B2 | 10/2011 | Dimter |
| 8,048,359 B2 | 11/2011 | Wang |
| 8,073,315 B2 | 12/2011 | Philippi |
| 8,075,814 B2 | 12/2011 | Fruth |
| 8,083,513 B2 | 12/2011 | Montero-Escuder |
| 8,110,247 B2 | 2/2012 | Renn |
| 8,124,192 B2 | 2/2012 | Paasche |
| 8,132,744 B2 | 3/2012 | Renn |
| 8,137,739 B2 | 3/2012 | Philippi |
| 8,172,562 B2 | 5/2012 | Mattes |
| 8,186,414 B2 | 5/2012 | Furlong |
| 8,186,990 B2 | 5/2012 | Perret |
| 8,187,521 B2 | 5/2012 | Larsson |
| 8,187,522 B2 | 5/2012 | Higashi |
| 8,249,480 B2 | 8/2012 | Aslam |
| 8,260,447 B2 | 9/2012 | Mattes |
| 8,272,579 B2 | 9/2012 | King |
| 8,299,208 B2 | 10/2012 | Frank |

(56) References Cited

U.S. PATENT DOCUMENTS

| | | |
|---|---|---|
| 8,303,886 B2 | 11/2012 | Philippi |
| 8,308,466 B2 | 11/2012 | Ackelid |
| 8,313,087 B2 | 11/2012 | Hesse |
| 8,317,508 B2 | 11/2012 | Bokodi |
| 8,366,432 B2 | 2/2013 | Perret |
| 8,414,281 B2 | 4/2013 | Schleiss |
| 8,455,051 B2 | 6/2013 | Renn |
| 8,488,994 B2 | 7/2013 | Hanson |
| 8,501,075 B2 | 8/2013 | Philippi |
| 8,502,107 B2 | 8/2013 | Uckelmann |
| 8,524,142 B2 | 9/2013 | Uckelmann |
| 8,525,071 B2 | 9/2013 | Leuterer |
| 8,543,361 B2 | 9/2013 | Chen |
| 8,556,981 B2 | 10/2013 | Jones |
| 8,570,534 B1 | 10/2013 | Loewgren |
| 8,590,157 B2 | 11/2013 | Kruth |
| 8,640,975 B2 | 2/2014 | King |
| 8,658,078 B2 | 2/2014 | Weidinger |
| 8,663,539 B1 | 3/2014 | Kolodziejska |
| 8,705,144 B2 | 4/2014 | Gullentops |
| 8,710,144 B2 | 4/2014 | Hesse |
| 8,728,387 B2 | 5/2014 | Jones |
| 8,734,694 B2 | 5/2014 | Perret |
| 8,753,105 B2 | 6/2014 | Scott |
| 8,784,720 B2 | 7/2014 | Oberhofer |
| 8,784,721 B2 | 7/2014 | Philippi |
| 8,794,263 B2 | 8/2014 | Scott |
| 8,796,146 B2 | 8/2014 | Renn |
| 8,803,073 B2 | 8/2014 | Philippi |
| 8,845,319 B2 | 9/2014 | Oberhofer |
| 8,884,186 B2 | 11/2014 | Uckelmann |
| 8,887,658 B2 | 11/2014 | Essien |
| 8,895,893 B2 | 11/2014 | Perret |
| 8,906,216 B2 | 12/2014 | Detor |
| 8,915,620 B2 | 12/2014 | Vaes |
| 8,945,456 B2 | 2/2015 | Zenere |
| 8,967,990 B2 | 3/2015 | Weidinger |
| 8,968,625 B2 | 3/2015 | Tan |
| 8,994,592 B2 | 3/2015 | Scott |
| 9,011,982 B2 | 4/2015 | Muller |
| 9,037,068 B2 | 5/2015 | Kojima |
| 9,064,671 B2 | 6/2015 | Ljungblad |
| 9,073,265 B2 | 7/2015 | Snis |
| 9,079,248 B2 | 7/2015 | Ackelid |
| 9,114,478 B2 | 8/2015 | Scott |
| 9,114,652 B1 | 8/2015 | Wayman |
| 9,117,039 B1 | 8/2015 | Mosterman |
| 9,126,167 B2 | 9/2015 | Ljungblad |
| 9,162,393 B2 | 10/2015 | Ackelid |
| 9,162,394 B2 | 10/2015 | Ackelid |
| 9,192,054 B2 | 11/2015 | King |
| 9,205,691 B1 | 12/2015 | Jones |
| 9,221,100 B2 | 12/2015 | Schwarze |
| 9,233,507 B2 | 1/2016 | Bibas |
| 9,254,535 B2 | 2/2016 | Buller |
| 9,272,369 B2 | 3/2016 | Bruck |
| 9,308,583 B2 | 4/2016 | El-Dasher |
| 9,314,972 B2 | 4/2016 | Green |
| 9,327,450 B2 | 5/2016 | Hein |
| 9,327,451 B2 | 5/2016 | Teulet |
| 9,346,127 B2 | 5/2016 | Buller |
| 9,366,422 B2 | 6/2016 | McClure |
| 9,380,304 B1 | 6/2016 | Chang |
| 9,399,256 B2 | 7/2016 | Buller |
| 9,403,235 B2 | 8/2016 | Buller |
| 9,415,443 B2 | 8/2016 | Ljungblad |
| 9,486,878 B2 | 11/2016 | Buller |
| 9,498,921 B2 | 11/2016 | Patrick |
| 9,505,057 B2 | 11/2016 | Nordkvist |
| D774,326 S | 12/2016 | Chang |
| 9,522,426 B2 | 12/2016 | Das |
| 9,527,246 B2 | 12/2016 | Wiesner |
| 9,533,452 B2 | 1/2017 | Guenster |
| 9,550,207 B2 | 1/2017 | Ackelid |
| 9,573,193 B2 | 2/2017 | Buller |
| 9,573,225 B2 | 2/2017 | Buller |
| 9,586,285 B2 | 3/2017 | Abe |
| 9,586,290 B2 | 3/2017 | Buller |
| 9,592,554 B2 | 3/2017 | Abe |
| 9,662,840 B1 | 5/2017 | Buller |
| 9,676,145 B2 | 6/2017 | Buller |
| 9,700,908 B2 | 7/2017 | Baker |
| 9,757,760 B2 | 9/2017 | Halder |
| 9,821,411 B2 | 11/2017 | Buller |
| 9,827,717 B2 | 11/2017 | Huang |
| 9,835,568 B2 | 12/2017 | Woods |
| 9,886,526 B2 | 2/2018 | Huang |
| 9,919,360 B2 | 3/2018 | Buller |
| 9,919,476 B2 | 3/2018 | Paternoster |
| 9,931,697 B2 | 4/2018 | Levin |
| 9,962,767 B2 | 5/2018 | Buller |
| 10,022,915 B2 | 7/2018 | Bostick |
| 10,035,188 B2 | 7/2018 | Weilhammer |
| 10,035,304 B2 | 7/2018 | Reinarz |
| 10,058,920 B2 | 8/2018 | Buller |
| 10,065,270 B2 | 9/2018 | Buller |
| 10,071,422 B2 | 9/2018 | Buller |
| 10,093,123 B2 | 10/2018 | Schwarze |
| 10,112,236 B2 | 10/2018 | Schlick |
| 10,144,062 B2 | 12/2018 | Bayer |
| 10,144,176 B1 | 12/2018 | Buller |
| 10,183,330 B2 | 1/2019 | Buller |
| 10,195,693 B2 | 2/2019 | Buller |
| 10,207,454 B2 | 2/2019 | Buller |
| 10,252,335 B2 | 4/2019 | Buller |
| 10,252,336 B2 | 4/2019 | Buller |
| 10,259,044 B2 | 4/2019 | Buller |
| 10,272,525 B1 | 4/2019 | Buller |
| 10,286,452 B2 | 5/2019 | Buller |
| 10,286,603 B2 | 5/2019 | Buller |
| 10,315,252 B2 | 6/2019 | Symeonidis |
| 10,357,829 B2 | 7/2019 | Spink |
| 10,357,957 B2 | 7/2019 | Buller |
| 10,369,629 B2 | 8/2019 | Symeonidis |
| 10,434,573 B2 | 10/2019 | Buller |
| 10,442,003 B2 | 10/2019 | Symeonidis |
| 10,449,696 B2 | 10/2019 | Elgar |
| 10,493,564 B2 | 12/2019 | Buller |
| 10,507,549 B2 | 12/2019 | Buller |
| 10,583,482 B2 | 3/2020 | Heugel |
| 10,611,092 B2 | 4/2020 | Buller |
| 10,625,374 B2 | 4/2020 | Schwarze |
| 10,661,341 B2 | 5/2020 | Romano |
| 10,688,722 B2 | 6/2020 | Buller |
| 10,723,070 B2 | 7/2020 | Herzog |
| 10,888,925 B2 | 1/2021 | Symeonidis |
| D911,065 S | 2/2021 | Borodchuk |
| 11,186,034 B2 | 11/2021 | Vial |
| 2001/0014403 A1 | 8/2001 | Brown |
| 2001/0017085 A1 | 8/2001 | Kubo |
| 2002/0017509 A1 | 2/2002 | Ishide |
| 2002/0020945 A1 | 2/2002 | Cho |
| 2002/0041818 A1 | 4/2002 | Abe |
| 2002/0079601 A1 | 6/2002 | Russell |
| 2002/0090410 A1 | 7/2002 | Tochimoto |
| 2002/0104973 A1 | 8/2002 | Kerekes |
| 2002/0129485 A1 | 9/2002 | Mok |
| 2002/0145213 A1 | 10/2002 | Liu |
| 2002/0152002 A1 | 10/2002 | Lindemann |
| 2002/0158054 A1 | 10/2002 | Manetsberger |
| 2002/0195747 A1 | 12/2002 | Hull |
| 2003/0106378 A1 | 6/2003 | Giannakopoulos |
| 2003/0201255 A1 | 10/2003 | Manetsberger |
| 2003/0222066 A1 | 12/2003 | Low |
| 2003/0232512 A1 | 12/2003 | Dickinson |
| 2004/0003738 A1 | 1/2004 | Imiolek |
| 2004/0003741 A1 | 1/2004 | Iskra |
| 2004/0004303 A1 | 1/2004 | Iskra |
| 2004/0004653 A1 | 1/2004 | Pryor |
| 2004/0005182 A1 | 1/2004 | Gaylo |
| 2004/0026807 A1 | 2/2004 | Andersson |
| 2004/0045941 A1 | 3/2004 | Herzog |
| 2004/0056022 A1 | 3/2004 | Meiners |
| 2004/0061260 A1 | 4/2004 | Heugel |

(56) References Cited

U.S. PATENT DOCUMENTS

| | | |
|---|---|---|
| 2004/0084814 A1 | 5/2004 | Boyd |
| 2004/0094728 A1 | 5/2004 | Herzog |
| 2004/0099996 A1 | 5/2004 | Herzog |
| 2004/0118309 A1 | 6/2004 | Fedor |
| 2004/0121257 A1 | 6/2004 | Kaminsky |
| 2004/0173946 A1 | 9/2004 | Pfeifer |
| 2004/0179808 A1 | 9/2004 | Renn |
| 2004/0197493 A1 | 10/2004 | Renn |
| 2004/0200816 A1 | 10/2004 | Chung |
| 2004/0204785 A1 | 10/2004 | Richardson |
| 2004/0217095 A1 | 11/2004 | Herzog |
| 2004/0222549 A1 | 11/2004 | Sano |
| 2004/0228004 A1 | 11/2004 | Sercel |
| 2004/0262261 A1 | 12/2004 | Fink |
| 2005/0011631 A1 | 1/2005 | Hong |
| 2005/0035285 A1 | 2/2005 | Tan |
| 2005/0116391 A1 | 6/2005 | Lindemann |
| 2005/0133527 A1 | 6/2005 | Dullea |
| 2005/0142024 A1 | 6/2005 | Herzog |
| 2005/0156991 A1 | 7/2005 | Renn |
| 2005/0163917 A1 | 7/2005 | Renn |
| 2005/0186716 A1 | 8/2005 | Kasumi |
| 2005/0207901 A1 | 9/2005 | Klobucar |
| 2005/0258570 A1 | 11/2005 | Kong |
| 2005/0278933 A1 | 12/2005 | Macke, Jr. |
| 2005/0287031 A1 | 12/2005 | Macke, Jr. |
| 2006/0000814 A1 | 1/2006 | Gu |
| 2006/0003095 A1 | 1/2006 | Bullen |
| 2006/0019232 A1 | 1/2006 | Fischer |
| 2006/0054079 A1 | 3/2006 | Withey |
| 2006/0111807 A1 | 5/2006 | Gothait |
| 2006/0118532 A1 | 6/2006 | Chung |
| 2006/0156978 A1 | 7/2006 | Lipson |
| 2006/0180300 A1 | 8/2006 | Lenehan |
| 2006/0181700 A1 | 8/2006 | Andrews |
| 2006/0187326 A1 | 8/2006 | Spencer |
| 2006/0192322 A1 | 8/2006 | Abe |
| 2006/0208396 A1 | 9/2006 | Abe |
| 2006/0211158 A1 | 9/2006 | Arai |
| 2006/0214335 A1 | 9/2006 | Cox |
| 2006/0228248 A1 | 10/2006 | Larsson |
| 2006/0228897 A1 | 10/2006 | Timans |
| 2006/0249485 A1 | 11/2006 | Partanen |
| 2006/0280866 A1 | 12/2006 | Marquez |
| 2007/0001342 A1 | 1/2007 | Oberhofer |
| 2007/0003656 A1 | 1/2007 | Labossiere |
| 2007/0019028 A1 | 1/2007 | Renn |
| 2007/0023977 A1 | 2/2007 | Braun |
| 2007/0035069 A1 | 2/2007 | Wust |
| 2007/0051704 A1 | 3/2007 | Husmann |
| 2007/0052836 A1 | 3/2007 | Yamada |
| 2007/0057412 A1 | 3/2007 | Weiskopf |
| 2007/0122562 A1 | 5/2007 | Adams |
| 2007/0142914 A1 | 6/2007 | Jones |
| 2007/0154634 A1 | 7/2007 | Renn |
| 2007/0175875 A1 | 8/2007 | Uckelmann |
| 2007/0176312 A1 | 8/2007 | Clark |
| 2007/0183918 A1 | 8/2007 | Monsheimer |
| 2007/0196561 A1 | 8/2007 | Philippi |
| 2007/0241482 A1 | 10/2007 | Giller |
| 2007/0290409 A1 | 12/2007 | Brice |
| 2008/0006334 A1 | 1/2008 | Davidson |
| 2008/0013299 A1 | 1/2008 | Renn |
| 2008/0014457 A1 | 1/2008 | Gennaro |
| 2008/0026338 A1 | 1/2008 | Cinader |
| 2008/0060330 A1 | 3/2008 | Davidson |
| 2008/0131540 A1 | 6/2008 | Perret |
| 2008/0138515 A1 | 6/2008 | Williams |
| 2008/0151951 A1 | 6/2008 | Elliott |
| 2008/0204748 A1 | 8/2008 | Nomaru |
| 2008/0206460 A1 | 8/2008 | Rhoades |
| 2008/0208268 A1 | 8/2008 | Bartic |
| 2008/0257867 A1 | 10/2008 | Malshe |
| 2009/0004380 A1 | 1/2009 | Hochsmann |
| 2009/0017220 A1 | 1/2009 | Muller |
| 2009/0025638 A1 | 1/2009 | Inoue |
| 2009/0035411 A1 | 2/2009 | Seibert |
| 2009/0039570 A1 | 2/2009 | Clark |
| 2009/0042050 A1 | 2/2009 | Matteazzi |
| 2009/0045553 A1 | 2/2009 | Weidinger |
| 2009/0047165 A1 | 2/2009 | Syvanen |
| 2009/0059235 A1 | 3/2009 | Qu |
| 2009/0061077 A1 | 3/2009 | King |
| 2009/0069301 A1 | 3/2009 | Milburn |
| 2009/0090298 A1 | 4/2009 | King |
| 2009/0114151 A1 | 5/2009 | Renn |
| 2009/0152771 A1 | 6/2009 | Philippi |
| 2009/0185178 A1 | 7/2009 | Miyoshi |
| 2009/0206065 A1 | 8/2009 | Kruth |
| 2009/0206522 A1 | 8/2009 | Hein |
| 2009/0257672 A1 | 10/2009 | Sullender |
| 2009/0314391 A1 | 12/2009 | Crump |
| 2010/0004454 A1 | 1/2010 | Fukuzumi |
| 2010/0006228 A1 | 1/2010 | Abe |
| 2010/0044547 A1 | 2/2010 | Higashi |
| 2010/0125356 A1 | 5/2010 | Shkolnik |
| 2010/0138028 A1 | 6/2010 | Tasker |
| 2010/0140550 A1 | 6/2010 | Keller |
| 2010/0163405 A1 | 7/2010 | Ackelid |
| 2010/0173096 A1 | 7/2010 | Kritchman |
| 2010/0174392 A1 | 7/2010 | Fink |
| 2010/0215856 A1 | 8/2010 | Kritchman |
| 2010/0233012 A1 | 9/2010 | Higashi |
| 2010/0242843 A1 | 9/2010 | Peretti |
| 2010/0305743 A1 | 12/2010 | Larsson |
| 2010/0323050 A1 | 12/2010 | Kumagai |
| 2011/0029093 A1 | 2/2011 | Bojarski |
| 2011/0042031 A1 | 2/2011 | Furlong |
| 2011/0046916 A1 | 2/2011 | Yu |
| 2011/0052927 A1 | 3/2011 | Martinoni |
| 2011/0061591 A1 | 3/2011 | Stecker |
| 2011/0106290 A1 | 5/2011 | Hovel |
| 2011/0123383 A1 | 5/2011 | Fuwa |
| 2011/0133367 A1 | 6/2011 | Weidinger |
| 2011/0135840 A1 | 6/2011 | Doye |
| 2011/0165339 A1 | 7/2011 | Skoglund |
| 2011/0165340 A1 | 7/2011 | Baumann |
| 2011/0168091 A1 | 7/2011 | Baumann |
| 2011/0187713 A1 | 8/2011 | Pershing |
| 2011/0190904 A1 | 8/2011 | Lechmann |
| 2011/0221100 A1 | 9/2011 | Wesselky |
| 2011/0223349 A1 | 9/2011 | Scott |
| 2011/0259862 A1 | 10/2011 | Scott |
| 2011/0278773 A1 | 11/2011 | Bokodi |
| 2011/0287185 A1 | 11/2011 | Felstead |
| 2011/0291331 A1 | 12/2011 | Scott |
| 2011/0293771 A1 | 12/2011 | Oberhofer |
| 2012/0000893 A1 | 1/2012 | Broude |
| 2012/0010741 A1 | 1/2012 | Hull |
| 2012/0013256 A1 | 1/2012 | McDermott |
| 2012/0013710 A1 | 1/2012 | Ehrlich |
| 2012/0052145 A1 | 3/2012 | Chen |
| 2012/0090734 A1 | 4/2012 | Heinlein |
| 2012/0100031 A1 | 4/2012 | Ljungblad |
| 2012/0106150 A1 | 5/2012 | Vaes |
| 2012/0107496 A1 | 5/2012 | Thoma |
| 2012/0119399 A1 | 5/2012 | Fruth |
| 2012/0126457 A1 | 5/2012 | Abe |
| 2012/0130525 A1 | 5/2012 | Tsai |
| 2012/0133928 A1 | 5/2012 | Urano |
| 2012/0134386 A1 | 5/2012 | Bender |
| 2012/0139166 A1 | 6/2012 | Abe |
| 2012/0139167 A1 | 6/2012 | Fruth |
| 2012/0145806 A1 | 6/2012 | Yang |
| 2012/0155606 A1 | 6/2012 | Simon |
| 2012/0164322 A1 | 6/2012 | Teulet |
| 2012/0186779 A1 | 7/2012 | Tan |
| 2012/0203365 A1 | 8/2012 | Hummeler |
| 2012/0211926 A1 | 8/2012 | Larsson |
| 2012/0213615 A1 | 8/2012 | Sakaue |
| 2012/0223059 A1 | 9/2012 | Ackelid |
| 2012/0228492 A1 | 9/2012 | Franzen |
| 2012/0228807 A1 | 9/2012 | Teulet |
| 2012/0231175 A1 | 9/2012 | Tan |

(56) References Cited

U.S. PATENT DOCUMENTS

| | | |
|---|---|---|
| 2012/0231576 A1 | 9/2012 | King |
| 2012/0234671 A1 | 9/2012 | Ackelid |
| 2012/0235548 A1 | 9/2012 | Cordes |
| 2012/0251378 A1 | 10/2012 | Abe |
| 2012/0267347 A1 | 10/2012 | Arjakine |
| 2012/0308781 A1 | 12/2012 | Abe |
| 2012/0318777 A1 | 12/2012 | Kwok |
| 2013/0016400 A1 | 1/2013 | Yamashita |
| 2013/0064706 A1 | 3/2013 | Schwarze |
| 2013/0080866 A1 | 3/2013 | Ogilvie |
| 2013/0089642 A1 | 4/2013 | Lipson |
| 2013/0093866 A1 | 4/2013 | Ohlhues |
| 2013/0101746 A1 | 4/2013 | Keremes |
| 2013/0112366 A1 | 5/2013 | Mottin |
| 2013/0112672 A1 | 5/2013 | Keremes |
| 2013/0134637 A1 | 5/2013 | Wiesner |
| 2013/0162643 A1 | 6/2013 | Cardle |
| 2013/0168902 A1 | 7/2013 | Herzog |
| 2013/0171019 A1 | 7/2013 | Gessler |
| 2013/0180959 A1 | 7/2013 | Weston |
| 2013/0186558 A1 | 7/2013 | Comb |
| 2013/0218531 A1 | 8/2013 | Deichmann |
| 2013/0228302 A1 | 9/2013 | Rickenbacher |
| 2013/0256953 A1 | 10/2013 | Teulet |
| 2013/0270750 A1 | 10/2013 | Green |
| 2013/0272746 A1 | 10/2013 | Hanson |
| 2013/0277891 A1 | 10/2013 | Teulet |
| 2013/0280547 A1 | 10/2013 | Brandl |
| 2013/0287933 A1 | 10/2013 | Kaiser |
| 2013/0300035 A1 | 11/2013 | Snis |
| 2013/0300286 A1 | 11/2013 | Ljungblad |
| 2013/0312928 A1 | 11/2013 | Mercelis |
| 2013/0329098 A1 | 12/2013 | Lim |
| 2013/0330470 A1 | 12/2013 | Gersch |
| 2013/0341313 A1 | 12/2013 | Himmelsbach |
| 2014/0000836 A1 | 1/2014 | Xu |
| 2014/0034626 A1 | 2/2014 | Illston |
| 2014/0035182 A1 | 2/2014 | Boyer |
| 2014/0049779 A1 | 2/2014 | Tin |
| 2014/0049964 A1 | 2/2014 | McClure |
| 2014/0065194 A1 | 3/2014 | Yoo |
| 2014/0086654 A1 | 3/2014 | Kojima |
| 2014/0086780 A1 | 3/2014 | Miller |
| 2014/0123458 A1 | 5/2014 | Fearon |
| 2014/0147328 A1 | 5/2014 | Abe |
| 2014/0150992 A1 | 6/2014 | Koontz |
| 2014/0154088 A1 | 6/2014 | Etter |
| 2014/0157579 A1 | 6/2014 | Chhabra |
| 2014/0163717 A1 | 6/2014 | Das |
| 2014/0176127 A1 | 6/2014 | Kogej |
| 2014/0241615 A1 | 8/2014 | Shroff |
| 2014/0246809 A1 | 9/2014 | Hofmann |
| 2014/0251481 A1 | 9/2014 | Kroll |
| 2014/0252687 A1 | 9/2014 | El-Dasher |
| 2014/0265045 A1 | 9/2014 | Cullen |
| 2014/0271221 A1 | 9/2014 | Soucy |
| 2014/0271328 A1 | 9/2014 | Burris |
| 2014/0271965 A1 | 9/2014 | Ferrar |
| 2014/0287080 A1 | 9/2014 | Scott |
| 2014/0288890 A1 | 9/2014 | Khainson |
| 2014/0301883 A1 | 10/2014 | Wiesner |
| 2014/0302187 A1 | 10/2014 | Pawlikowski |
| 2014/0314609 A1 | 10/2014 | Ljungblad |
| 2014/0314964 A1 | 10/2014 | Ackelid |
| 2014/0329953 A1 | 11/2014 | Paternoster |
| 2014/0332507 A1 | 11/2014 | Fockele |
| 2014/0335313 A1 | 11/2014 | Chou |
| 2014/0348691 A1 | 11/2014 | Ljungblad |
| 2014/0348692 A1 | 11/2014 | Bessac |
| 2014/0348969 A1 | 11/2014 | Scott |
| 2014/0361464 A1 | 12/2014 | Holcomb |
| 2014/0363585 A1 | 12/2014 | Pialot |
| 2014/0370323 A1 | 12/2014 | Ackelid |
| 2014/0374935 A1 | 12/2014 | Flitsch |
| 2014/0377117 A1 | 12/2014 | Herrmann |
| 2015/0004046 A1 | 1/2015 | Graham |
| 2015/0014281 A1 | 1/2015 | Trimmer |
| 2015/0017013 A1 | 1/2015 | Tozzi |
| 2015/0021815 A1 | 1/2015 | Albrecht |
| 2015/0021832 A1 | 1/2015 | Yerazunis |
| 2015/0034606 A1 | 2/2015 | Blackmore |
| 2015/0035206 A1 | 2/2015 | Maggiore |
| 2015/0037599 A1 | 2/2015 | Blackmore |
| 2015/0048528 A1 | 2/2015 | Barton |
| 2015/0049082 A1 | 2/2015 | Coffey |
| 2015/0050463 A1 | 2/2015 | Nakano |
| 2015/0054191 A1 | 2/2015 | Ljungblad |
| 2015/0060042 A1 | 3/2015 | Shilpiekandula |
| 2015/0061170 A1 | 3/2015 | Engel |
| 2015/0061195 A1 | 3/2015 | Defelice |
| 2015/0064047 A1 | 3/2015 | Hyde |
| 2015/0064048 A1 | 3/2015 | Bessac |
| 2015/0071809 A1 | 3/2015 | Nordkvist |
| 2015/0076739 A1 | 3/2015 | Batchelder |
| 2015/0084240 A1 | 3/2015 | Shuck |
| 2015/0088295 A1 | 3/2015 | Hellestam |
| 2015/0090074 A1 | 4/2015 | Etter |
| 2015/0091200 A1 | 4/2015 | Mech |
| 2015/0093720 A1 | 4/2015 | Beeby |
| 2015/0097307 A1 | 4/2015 | Batchelder |
| 2015/0097308 A1 | 4/2015 | Batchelder |
| 2015/0110910 A1 | 4/2015 | Hartmann |
| 2015/0115490 A1 | 4/2015 | Reinarz |
| 2015/0139849 A1 | 5/2015 | Pialot, Jr. |
| 2015/0142153 A1 | 5/2015 | Chun |
| 2015/0145169 A1 | 5/2015 | Liu |
| 2015/0145177 A1 | 5/2015 | El-Siblani |
| 2015/0158249 A1 | 6/2015 | Goto |
| 2015/0165525 A1 | 6/2015 | Daniel |
| 2015/0165545 A1 | 6/2015 | Goehler |
| 2015/0165681 A1 | 6/2015 | Fish |
| 2015/0165683 A1 | 6/2015 | Cheverton |
| 2015/0165684 A1 | 6/2015 | Deane |
| 2015/0174658 A1 | 6/2015 | Ljungblad |
| 2015/0174822 A1 | 6/2015 | Huang |
| 2015/0177158 A1 | 6/2015 | Cheverton |
| 2015/0178286 A1 | 6/2015 | Dhollander |
| 2015/0185454 A1 | 7/2015 | Kalkbrenner |
| 2015/0197060 A1 | 7/2015 | Carr |
| 2015/0198052 A1 | 7/2015 | Pavlov |
| 2015/0210013 A1 | 7/2015 | Teulet |
| 2015/0246485 A1 | 9/2015 | Guenster |
| 2015/0251355 A1 | 9/2015 | Rehme |
| 2015/0258609 A1 | 9/2015 | Teulet |
| 2015/0268099 A1 | 9/2015 | Craig |
| 2015/0283610 A1 | 10/2015 | Ljungblad |
| 2015/0283611 A1 | 10/2015 | Takezawa |
| 2015/0283613 A1 | 10/2015 | Backlund |
| 2015/0283761 A1 | 10/2015 | Maeda |
| 2015/0298211 A1 | 10/2015 | Abe |
| 2015/0298397 A1 | 10/2015 | Chen |
| 2015/0306667 A1 | 10/2015 | Yao |
| 2015/0306820 A1 | 10/2015 | Colin |
| 2015/0321422 A1 | 11/2015 | Boyer |
| 2015/0328839 A1 | 11/2015 | Willis |
| 2015/0331402 A1 | 11/2015 | Lin |
| 2015/0336330 A1 | 11/2015 | Herzog |
| 2015/0367415 A1 | 12/2015 | Buller |
| 2015/0367418 A1 | 12/2015 | Buller |
| 2015/0367453 A1 | 12/2015 | Herzog |
| 2015/0367574 A1 | 12/2015 | Araie |
| 2015/0375456 A1 | 12/2015 | Cheverton |
| 2016/0001401 A1 | 1/2016 | Dimter |
| 2016/0022336 A1 | 1/2016 | Bateman |
| 2016/0026337 A1 | 1/2016 | Wassvik |
| 2016/0026889 A1 | 1/2016 | Parkhomenko |
| 2016/0052057 A1 | 2/2016 | Xu |
| 2016/0052212 A1 | 2/2016 | Schmidt |
| 2016/0054115 A1 | 2/2016 | Snis |
| 2016/0054121 A1 | 2/2016 | Snis |
| 2016/0059310 A1 | 3/2016 | Junker |
| 2016/0059352 A1 | 3/2016 | Sparks |
| 2016/0067740 A1 | 3/2016 | Voris |
| 2016/0067778 A1 | 3/2016 | Liu |

(56) References Cited

U.S. PATENT DOCUMENTS

| | | |
|---|---|---|
| 2016/0067779 A1 | 3/2016 | Dautova |
| 2016/0082666 A1 | 3/2016 | De Pena |
| 2016/0082668 A1 | 3/2016 | Perret |
| 2016/0090848 A1 | 3/2016 | Engeli |
| 2016/0107263 A1 | 4/2016 | Koerber |
| 2016/0114431 A1 | 4/2016 | Cheverton |
| 2016/0114432 A1 | 4/2016 | Ferrar |
| 2016/0114531 A1 | 4/2016 | Chuang |
| 2016/0114535 A1 | 4/2016 | Kritchman |
| 2016/0121548 A1 | 5/2016 | Nauka |
| 2016/0129502 A1 | 5/2016 | Varetti |
| 2016/0129631 A1 | 5/2016 | Chen |
| 2016/0136730 A1 | 5/2016 | McMurtry |
| 2016/0136896 A1 | 5/2016 | Wighton |
| 2016/0144574 A1 | 5/2016 | Eilken |
| 2016/0151833 A1 | 6/2016 | Tsao |
| 2016/0151860 A1 | 6/2016 | Engeli |
| 2016/0154906 A1 | 6/2016 | Schmidt |
| 2016/0159010 A1 | 6/2016 | Perez |
| 2016/0179064 A1 | 6/2016 | Arthur |
| 2016/0184891 A1 | 6/2016 | Mironets |
| 2016/0185048 A1 | 6/2016 | Dave |
| 2016/0187272 A1 | 6/2016 | Ishii |
| 2016/0193696 A1 | 7/2016 | McFarland |
| 2016/0193785 A1 | 7/2016 | Bell |
| 2016/0193790 A1 | 7/2016 | Shuck |
| 2016/0207109 A1 | 7/2016 | Buller |
| 2016/0214175 A1 | 7/2016 | Nordstrom |
| 2016/0221264 A1 | 8/2016 | Doherty |
| 2016/0228987 A1 | 8/2016 | Baudimont |
| 2016/0236279 A1 | 8/2016 | Ashton |
| 2016/0236414 A1 | 8/2016 | Reese |
| 2016/0236419 A1 | 8/2016 | Griffin |
| 2016/0241885 A1 | 8/2016 | Ström |
| 2016/0246908 A1 | 8/2016 | Komzsik |
| 2016/0250717 A1 | 9/2016 | Kruger |
| 2016/0258045 A1 | 9/2016 | Carter, Jr. |
| 2016/0271698 A1 | 9/2016 | Schmidt |
| 2016/0271884 A1 | 9/2016 | Herzog |
| 2016/0271885 A1 | 9/2016 | Shi |
| 2016/0279706 A1 | 9/2016 | Domrose |
| 2016/0279707 A1 | 9/2016 | Mattes |
| 2016/0284123 A1 | 9/2016 | Hare |
| 2016/0288254 A1 | 10/2016 | Pettit |
| 2016/0297006 A1 | 10/2016 | Buller |
| 2016/0297007 A1 | 10/2016 | Buller |
| 2016/0299996 A1 | 10/2016 | Huang |
| 2016/0300356 A1 | 10/2016 | Kitamura |
| 2016/0303687 A1 | 10/2016 | Ljungblad |
| 2016/0311025 A1 | 10/2016 | Kaneko |
| 2016/0318129 A1 | 11/2016 | Hu |
| 2016/0320236 A1 | 11/2016 | Fortin |
| 2016/0320771 A1 | 11/2016 | Huang |
| 2016/0321384 A1 | 11/2016 | Pal |
| 2016/0326880 A1 | 11/2016 | Slavens |
| 2016/0332384 A1 | 11/2016 | De Pena |
| 2016/0339639 A1 | 11/2016 | Chivel |
| 2016/0361874 A1 | 12/2016 | Park |
| 2017/0001371 A1 | 1/2017 | Sobue |
| 2017/0001379 A1 | 1/2017 | Long |
| 2017/0008126 A1 | 1/2017 | Long |
| 2017/0008776 A1 | 1/2017 | Zemmouri |
| 2017/0014902 A1 | 1/2017 | Tanaka |
| 2017/0015066 A1 | 1/2017 | Herrmann |
| 2017/0021420 A1 | 1/2017 | Buller |
| 2017/0021455 A1 | 1/2017 | Dallarosa |
| 2017/0036404 A1 | 2/2017 | Rengers |
| 2017/0056975 A1 | 3/2017 | Carter |
| 2017/0066052 A1 | 3/2017 | Abe |
| 2017/0066084 A1 | 3/2017 | Ladewig |
| 2017/0087769 A1 | 3/2017 | Lancaster-Larocque |
| 2017/0090461 A1* | 3/2017 | Chong ................ B33Y 50/00 |
| 2017/0100885 A1 | 4/2017 | Desimone |
| 2017/0102689 A1 | 4/2017 | Khajepour |
| 2017/0106603 A1 | 4/2017 | Pobihun |
| 2017/0123222 A1 | 5/2017 | Demuth |
| 2017/0136574 A1 | 5/2017 | Zenzinger |
| 2017/0136703 A1 | 5/2017 | Hayes |
| 2017/0144248 A1 | 5/2017 | Yoshimura |
| 2017/0144374 A1 | 5/2017 | Ono |
| 2017/0144874 A1 | 5/2017 | Huebinger |
| 2017/0145586 A1 | 5/2017 | Xiao |
| 2017/0157704 A1 | 6/2017 | Ladewig |
| 2017/0157845 A1 | 6/2017 | Bihari |
| 2017/0165792 A1 | 6/2017 | Buller |
| 2017/0173883 A1 | 6/2017 | Gray |
| 2017/0176979 A1 | 6/2017 | Lalish |
| 2017/0216917 A1 | 8/2017 | Zhang |
| 2017/0225198 A1 | 8/2017 | Nevarez |
| 2017/0227408 A1 | 8/2017 | Helvajian |
| 2017/0232515 A1 | 8/2017 | Demuth |
| 2017/0239720 A1 | 8/2017 | Levin |
| 2017/0246810 A1 | 8/2017 | Gold |
| 2017/0252975 A1 | 9/2017 | Park |
| 2017/0259337 A1 | 9/2017 | Furukawa |
| 2017/0259502 A1 | 9/2017 | Chapiro |
| 2017/0259504 A1 | 9/2017 | Lin |
| 2017/0266878 A1 | 9/2017 | Furukawa |
| 2017/0266887 A1 | 9/2017 | Roviaro |
| 2017/0274589 A1 | 9/2017 | Wu |
| 2017/0282245 A1 | 10/2017 | Yasuda |
| 2017/0282294 A1 | 10/2017 | Uchida |
| 2017/0291372 A1 | 10/2017 | Milshtein |
| 2017/0297110 A1 | 10/2017 | Echigo |
| 2017/0305140 A1 | 10/2017 | Wüst |
| 2017/0320265 A1 | 11/2017 | Baumann |
| 2017/0333994 A1 | 11/2017 | Schmitt |
| 2017/0341143 A1 | 11/2017 | Abe |
| 2017/0341299 A1 | 11/2017 | Kniola |
| 2017/0341307 A1 | 11/2017 | Vilajosana |
| 2017/0348771 A1 | 12/2017 | Kawada |
| 2017/0368753 A1 | 12/2017 | Yang |
| 2018/0015670 A1 | 1/2018 | Gu |
| 2018/0021855 A1 | 1/2018 | De Lajudie |
| 2018/0029126 A1 | 2/2018 | Ng |
| 2018/0029298 A1 | 2/2018 | Takaya |
| 2018/0056392 A1 | 3/2018 | Ichijo |
| 2018/0093373 A1 | 4/2018 | Niederberger |
| 2018/0093416 A1 | 4/2018 | Prexler |
| 2018/0099454 A1 | 4/2018 | Hümmeler |
| 2018/0104892 A1 | 4/2018 | Herzog |
| 2018/0111198 A1 | 4/2018 | Vitanov |
| 2018/0111320 A1* | 4/2018 | Zhao ................ B29C 64/393 |
| 2018/0117845 A1 | 5/2018 | Buller |
| 2018/0126629 A1 | 5/2018 | Staal |
| 2018/0133635 A1 | 5/2018 | Hofmann |
| 2018/0133801 A1 | 5/2018 | Buller |
| 2018/0133975 A1 | 5/2018 | Zhao |
| 2018/0178286 A1 | 6/2018 | Martin |
| 2018/0178292 A1 | 6/2018 | Berggren |
| 2018/0185893 A1 | 7/2018 | Vincent |
| 2018/0185915 A1 | 7/2018 | Beauchamp |
| 2018/0185961 A1 | 7/2018 | Meidani |
| 2018/0186079 A1 | 7/2018 | Vilajosana |
| 2018/0186082 A1 | 7/2018 | Randhawa |
| 2018/0207721 A1 | 7/2018 | Schlick |
| 2018/0207722 A1 | 7/2018 | Feldmann |
| 2018/0221948 A1 | 8/2018 | Rowland |
| 2018/0236550 A1 | 8/2018 | Herzog |
| 2018/0236714 A1 | 8/2018 | Thelakkadan |
| 2018/0244034 A1 | 8/2018 | Sutcliffe |
| 2018/0250745 A1 | 9/2018 | Spink |
| 2018/0250775 A1 | 9/2018 | Spink |
| 2018/0281067 A1 | 10/2018 | Small |
| 2018/0281237 A1 | 10/2018 | Frechman |
| 2018/0297114 A1 | 10/2018 | Preston |
| 2018/0318928 A1 | 11/2018 | Christiansen |
| 2018/0361509 A1 | 12/2018 | Reznik |
| 2019/0022927 A1 | 1/2019 | Vial |
| 2019/0022944 A1 | 1/2019 | Döhler |
| 2019/0118286 A1 | 4/2019 | Sugatani |
| 2019/0230248 A1 | 7/2019 | Mizes |
| 2019/0366638 A1 | 12/2019 | Buller |
| 2020/0004255 A1 | 1/2020 | Mohammadiha |

(56) References Cited

U.S. PATENT DOCUMENTS

| | | |
|---|---|---|
| 2020/0139631 A1 | 5/2020 | Buller |
| 2022/0379381 A1 | 12/2022 | Buller |
| 2024/0017355 A1 | 1/2024 | Buller |
| 2024/0018626 A1 | 1/2024 | Buller |
| 2024/0042698 A1 | 2/2024 | Lappas |
| 2024/0051231 A1 | 2/2024 | Buller |

FOREIGN PATENT DOCUMENTS

| | | |
|---|---|---|
| CN | 1648802 A | 8/2005 |
| CN | 101835554 A | 9/2010 |
| CN | 102066072 | 5/2011 |
| CN | 102076456 A | 5/2011 |
| CN | 102549178 | 7/2012 |
| CN | 102695476 A | 9/2012 |
| CN | 10334.1625 A | 10/2013 |
| CN | 103392153 A | 11/2013 |
| CN | 103561891 A | 2/2014 |
| CN | 103611934 A | 3/2014 |
| CN | 103612393 A | 3/2014 |
| CN | 103629198 A | 3/2014 |
| CN | 103676588 A | 3/2014 |
| CN | 103785835 | 5/2014 |
| CN | 203635913 U | 6/2014 |
| CN | 103917348 A | 7/2014 |
| CN | 103990798 | 8/2014 |
| CN | 104260347 | 1/2015 |
| CN | 104260357 | 1/2015 |
| CN | 204136439 | 2/2015 |
| CN | 104589647 | 5/2015 |
| CN | 204842978 | 12/2015 |
| CN | 105383059 | 3/2016 |
| CN | 105904729 A | 8/2016 |
| CN | 105921747 A | 9/2016 |
| CN | 106077625 | 11/2016 |
| CN | 106735196 | 5/2017 |
| CN | 206316377 | 7/2017 |
| CN | 206501429 | 9/2017 |
| CN | 206578297 | 10/2017 |
| CN | 107340027 | 11/2017 |
| CN | 107891148 | 4/2018 |
| CN | 108422661 | 8/2018 |
| CN | 108422667 | 8/2018 |
| CN | 108453255 | 8/2018 |
| CN | 108746620 | 11/2018 |
| CN | 108940841 | 12/2018 |
| CN | 208646058 | 3/2019 |
| CN | 110548872 | 12/2019 |
| CN | 210211384 | 3/2020 |
| CN | 212945269 | 4/2021 |
| CN | 113634770 | 11/2021 |
| CN | 214774026 | 11/2021 |
| DE | 4300478 C1 | 8/1994 |
| DE | 19649865 C1 | 2/1998 |
| DE | 19939616 A1 | 3/2001 |
| DE | 102004061836 A1 | 7/2006 |
| DE | 102007029142 A1 | 1/2009 |
| DE | 102004057866 B4 | 6/2010 |
| DE | 102008051478 A1 | 6/2010 |
| DE | 102009015130 A1 | 10/2010 |
| DE | 102009036153 A1 | 2/2011 |
| DE | 102009043317 | 3/2011 |
| DE | 102009051479 | 5/2011 |
| DE | 102010048335 A1 | 4/2012 |
| DE | 102011112581 A1 | 3/2013 |
| DE | 202013009787 U1 | 12/2013 |
| DE | 102013208651 | 11/2014 |
| DE | 102013223411 | 5/2015 |
| DE | 102014000022 | 7/2015 |
| DE | 102014204528 | 9/2015 |
| DE | 102014010932 | 1/2016 |
| DE | 102015005780 A1 | 12/2016 |
| DE | 102015211538 A1 | 12/2016 |
| DE | 102015216402 | 3/2017 |
| DE | 102016225124 | 6/2017 |
| DE | 102016013041 | 5/2018 |
| EP | 0296818 B1 | 4/1993 |
| EP | 0690780 | 1/1996 |
| EP | 0861927 | 9/1998 |
| EP | 1151849 A1 | 11/2001 |
| EP | 1348781 | 10/2003 |
| EP | 1424158 | 6/2004 |
| EP | 1466718 A2 | 10/2004 |
| EP | 1775104 | 4/2007 |
| EP | 1793979 | 6/2007 |
| EP | 1622086 B1 | 9/2008 |
| EP | 1992709 A1 | 11/2008 |
| EP | 2277687 A1 | 1/2011 |
| EP | 2335848 | 6/2011 |
| EP | 2361704 A1 | 8/2011 |
| EP | 2515282 | 10/2012 |
| EP | 2522446 | 11/2012 |
| EP | 2583773 A2 | 4/2013 |
| EP | 2620241 A1 | 7/2013 |
| EP | 2774703 A1 | 9/2014 |
| EP | 2789413 A1 | 10/2014 |
| EP | 2832473 | 2/2015 |
| EP | 2832474 A1 | 2/2015 |
| EP | 2873751 A1 | 5/2015 |
| EP | 3127635 A1 | 2/2017 |
| EP | 3165303 A1 | 5/2017 |
| EP | 3208077 A1 | 8/2017 |
| EP | 3263316 A1 | 1/2018 |
| EP | 3428585 | 1/2019 |
| EP | 3263316 B1 | 2/2019 |
| EP | 3441213 | 2/2019 |
| EP | 3237177 | 5/2019 |
| EP | 2992942 A1 | 6/2019 |
| EP | 3650204 A1 | 5/2020 |
| EP | 3822001 | 5/2021 |
| EP | 3939738 | 1/2022 |
| GB | 1018656 A | 1/1966 |
| GB | 2515287 A | 12/2014 |
| JP | S6237109 | 2/1987 |
| JP | S6261617 | 3/1987 |
| JP | H06503764 | 4/1994 |
| JP | 2001009921 A | 1/2001 |
| JP | 2001277368 A | 10/2001 |
| JP | 2001334581 | 12/2001 |
| JP | 2002332504 | 11/2002 |
| JP | 2003502184 A | 1/2003 |
| JP | 2003245981 A | 9/2003 |
| JP | 2004143581 A | 5/2004 |
| JP | 2005335203 A | 12/2005 |
| JP | 2006150977 A | 6/2006 |
| JP | 2007111989 | 5/2007 |
| JP | 2007536130 A | 12/2007 |
| JP | 2008291318 A | 12/2008 |
| JP | 2008302607 A | 12/2008 |
| JP | 2009001900 A | 1/2009 |
| JP | 2009512579 A | 3/2009 |
| JP | 2012502178 A | 1/2012 |
| JP | 2012213971 A | 11/2012 |
| JP | 2014227587 A | 12/2014 |
| JP | 2016502603 | 1/2016 |
| JP | 2016540109 | 12/2016 |
| JP | 2017137563 A | 8/2017 |
| KR | 20160059726 A | 5/2016 |
| KR | 20160076708 A | 7/2016 |
| KR | 20180043855 | 4/2018 |
| KR | 20190028366 | 3/2019 |
| NO | 317085 B1 | 8/2004 |
| RU | 2524467 | 7/2014 |
| SE | 524467 C2 | 8/2004 |
| TW | 201634234 | 10/2016 |
| WO | 9208592 A1 | 5/1992 |
| WO | 9211577 | 7/1992 |
| WO | 9511100 A1 | 4/1995 |
| WO | 9511101 | 4/1995 |
| WO | 9529387 | 11/1995 |
| WO | 9711837 A1 | 4/1997 |
| WO | 9828124 A2 | 7/1998 |
| WO | 9933641 A1 | 7/1999 |
| WO | 0102160 A1 | 1/2001 |

(56) References Cited

FOREIGN PATENT DOCUMENTS

| | | |
|---|---|---|
| WO | 0177988 A2 | 10/2001 |
| WO | 2004005014 A2 | 1/2004 |
| WO | 2004037469 A1 | 5/2004 |
| WO | 2004039531 | 5/2004 |
| WO | 2005099635 | 10/2005 |
| WO | 2006066939 A1 | 6/2006 |
| WO | 2008028443 A2 | 3/2008 |
| WO | 2008049384 A1 | 5/2008 |
| WO | 2008064620 A1 | 6/2008 |
| WO | 2008067496 A2 | 6/2008 |
| WO | 2008074287 A1 | 6/2008 |
| WO | 2008096105 A1 | 8/2008 |
| WO | 2008128502 A2 | 10/2008 |
| WO | 2009015619 A2 | 2/2009 |
| WO | 2009096750 A2 | 8/2009 |
| WO | 2010026396 A2 | 3/2010 |
| WO | 2010027317 | 3/2010 |
| WO | 2010115588 | 10/2010 |
| WO | 2011020912 | 2/2011 |
| WO | 2011036087 | 3/2011 |
| WO | 2011066989 | 6/2011 |
| WO | 2013092997 | 6/2013 |
| WO | 2013113372 | 8/2013 |
| WO | 2013160188 A1 | 10/2013 |
| WO | 2013167903 A1 | 11/2013 |
| WO | 2013178825 A2 | 12/2013 |
| WO | 2013179017 A1 | 12/2013 |
| WO | 2013189473 A1 | 12/2013 |
| WO | 2014023657 A1 | 2/2014 |
| WO | 2014042970 A1 | 3/2014 |
| WO | 2014044589 A1 | 3/2014 |
| WO | 2014049159 A1 | 4/2014 |
| WO | 2014083292 A1 | 6/2014 |
| WO | 2014118783 A1 | 8/2014 |
| WO | 2014120991 A1 | 8/2014 |
| WO | 2014135136 A1 | 9/2014 |
| WO | 2014144255 A2 | 9/2014 |
| WO | 2014144360 A2 | 9/2014 |
| WO | 2014144482 A1 | 9/2014 |
| WO | 2014144630 A1 | 9/2014 |
| WO | 2014176536 | 10/2014 |
| WO | 2014193406 A1 | 12/2014 |
| WO | 2015020939 | 2/2015 |
| WO | 2015023612 A2 | 2/2015 |
| WO | 2015025171 A2 | 2/2015 |
| WO | 2015034362 | 3/2015 |
| WO | 2015040433 A2 | 3/2015 |
| WO | 2015051915 A1 | 4/2015 |
| WO | 2015053946 A1 | 4/2015 |
| WO | 2015077077 | 5/2015 |
| WO | 2015082677 A1 | 6/2015 |
| WO | 2015106836 | 7/2015 |
| WO | 2015151865 | 10/2015 |
| WO | 2015173355 | 11/2015 |
| WO | 2015176709 A1 | 11/2015 |
| WO | 2015183796 | 12/2015 |
| WO | 2015196149 A1 | 12/2015 |
| WO | 2016022336 | 2/2016 |
| WO | 2016026852 A1 | 2/2016 |
| WO | 2016026853 A1 | 2/2016 |
| WO | 2016049621 | 3/2016 |
| WO | 2016055523 A1 | 4/2016 |
| WO | 2016075025 A1 | 5/2016 |
| WO | 2016075026 A1 | 5/2016 |
| WO | 2016077250 | 5/2016 |
| WO | 2016079494 A2 | 5/2016 |
| WO | 2016094827 A1 | 6/2016 |
| WO | 2016113253 A1 | 7/2016 |
| WO | 2016169768 A1 | 10/2016 |
| WO | 2016196223 A1 | 12/2016 |
| WO | 2016196382 A1 | 12/2016 |
| WO | 2017011456 A1 | 1/2017 |
| WO | 2017015217 A2 | 1/2017 |
| WO | 2017039858 | 3/2017 |
| WO | 2017040675 | 3/2017 |
| WO | 2017054842 | 4/2017 |
| WO | 2017079091 | 5/2017 |
| WO | 2017100695 | 6/2017 |
| WO | 2017118569 | 7/2017 |
| WO | 2017118806 | 7/2017 |
| WO | 2017143077 A1 | 8/2017 |
| WO | 2017179001 A1 | 10/2017 |
| WO | 2017189982 | 11/2017 |
| WO | 2017196344 | 11/2017 |
| WO | 2017201120 | 11/2017 |
| WO | 2018005439 A1 | 1/2018 |
| WO | 2018064349 A1 | 4/2018 |
| WO | 2018075741 A1 | 4/2018 |
| WO | 2018106586 A1 | 6/2018 |
| WO | 2018128695 A2 | 7/2018 |
| WO | 2018129089 A1 | 7/2018 |
| WO | 2018160807 A1 | 9/2018 |
| WO | 2018183396 | 10/2018 |
| WO | 2018202305 | 11/2018 |
| WO | 2018202307 | 11/2018 |
| WO | 2018231664 | 12/2018 |
| WO | 2019057523 | 3/2019 |
| WO | 2019076705 | 4/2019 |
| WO | 2019086231 | 5/2019 |
| WO | 2019173000 A1 | 9/2019 |
| WO | 2019195062 A1 | 10/2019 |
| WO | 2019205181 | 10/2019 |
| WO | 2019209310 | 10/2019 |
| WO | 2019212520 | 11/2019 |
| WO | 2020006468 | 1/2020 |
| WO | 2020033124 | 2/2020 |
| WO | 2020083531 | 4/2020 |
| WO | 2020146416 A2 | 7/2020 |
| WO | 2021021469 | 2/2021 |
| WO | 2021061118 | 4/2021 |
| WO | 2021092646 | 5/2021 |

OTHER PUBLICATIONS

SLM Solutions, NXG XII 600 Digital Launch—YouTube, published Mar. 11, 2021, URL: https://www.youtube.com/watch?v=cPckZZTO1fc.
SLM Solutions, NXG XII 600 Digital Launch—YouTube, published Jun. 23, 2021, URL: https://freefloat.slm-solutions.com/.
SLM Solutions, NXG XII 600, publication date Oct. 15, 2020, URL: https://www.slm-pushing-the-limits.com/.
SLM Solutions, SLM 280 2.0, Google shows that it was first cached Nov. 14, 2016, https://www.slm-solutions.com/products-and-solutions/machines/slm-280/, 7 pages.
SLM®—Selective Laser Melting Technology—The Elements (english)—YouTube, published Nov. 23, 2017, URL: https://www.youtube.com/watch?v=R5WCyafMPLs.
Sloan, Jeff. Tidal turbine blade toughened for turbulent sea salt, CompositesWorld (Nov. 30, 2012). Retrieved web page archived Jan. 16, 2013. Retrieved on Apr. 9, 2020 from https://web.archive.org/web/20130116115034/ https ://www. compositesworld.com/articles/tidal-turbine-blade-toughened-for-turbulent-salt-sea. 7 pages.
Spears, et al. In-process sensing in selective laser melting (SLM) additive manufacturing. Integrating Materials and Manufacturing Innovation. Feb. 11, 2016; 5:2. DOI: 10.1186/S40192-016-0045-4. 25 pages.
State Intellectual Property Office of P.R. China , First Office Action , SLM Solutions GmbH, CN201380073909.3 , dated Mar. 28, 2016 , see English Translation Attached.
Strano, et al. A new approach to the design and optimisation of support structures in additive manufacturing. Int J Adv Manuf Technol (2013) 66:1247-1254, DOI 10.1007/s00170-012-4403-x. Published online: Aug. 2, 2012.
Stratasys. Direct Manufacturing. Direct Metal Laser Sintering (DMLS). Published Oct. 11, 2013. https://www.stratasysdirect.com/resources/direct-metal-laser-sintering-dmls/ 7 pages.
Symeonidis, Kimon. The Controlled Diffusion Solidification Process: Fundamentals and Principles. Ph.D. Thesis. Worcester Polytechnic Institute. Apr. 2009. 137 pages.

(56) References Cited

OTHER PUBLICATIONS

Thijs et al., "Fine-structured aluminium products with controllable texture by selective laser melting of pre-alloyed AlSi10Mg powder", Acta Materialia 61, (2013), pp. 1809-1819.
Thijs et al., "Strong morphological and crystallographic texture and resulting yield strength anisotrophy in selective laser melted tantalum", ScienceDirect, Acta Materialia 61, (2013), pp. 4657-4668.
Third Party Observations concerning the International Application PCT/US2020/042596, published as WO 2021/021469, dated Nov. 19, 2021. 20 pages.
Third Party Observations concerning the International Application PCT/US2021/035350, published as WO 2021/247640, dated Dec. 8, 2022. 6 pages.
Thorlabs, Inc. Fiber Optic Reflection/Backscatter Probe Bundles. Web. Copyright 1999-2018. Printed Mar. 28, 2018. 5 pages. URL:< https://www.thorlabs.com/newgrouppage9.cfm?objectgroup_id= 7794>.
Van Der Eijk, et al. Metal printing process: development of a new rapid manufacturing process for metal parts. Proceedings of the World PM 2004 conference held in Vienna. Oct. 17-21, 2004. 5 pages.
Wang et al. Effects of thermal cycles on the microstructure evolution of Inconel 718 during selective laser melting process. Additive Manufacturing. vol. 18, Dec. 2017, pp. 1-14.
Wang, et al. Research on the fabricating quality optimization of the overhanging surface in SLM process. Int J Adv Manuf Technol (2013) 65:1471-1484, DOI 10.1007/s00170-012-4271-4. Published online: Jun. 16, 2012.
Wilkes, et al. Emerald Artide: Additive manufacturing of Zr02—Al203 ceramic components by selective laser melting. Rapid Prototyping Journal, vol. 19, Issue 1, Aug. 7, 2012. 13 pages.
Wohlfart, Michael. Can you Build a 100 mm Support-free Horizontal Disk? Linkedin. Web article. Published Mar. 11, 2019. 14 pages. URL: https://www.linkedin.com/pulse/can-you-build-100-mm-support-free-horizontal-disk-michael-wohlfart/>.
Wright, "Process Engineering and Metallurgry", Wire Technology, (2011), Ch. 19, Elsevier, pp. 279-283.
Xiao, et al. Numerical Simulation of Direct Metal Laser Sintering of Single-Component Powder on Top of Sintered Layers. Journal of Manufacturing Science and Engineering. vol. 130, Aug. 2008.10 pages.
Xu et al. In situ tailoring microstructure in additively manufactured Ti—-6Al—4V for superior mechanical performance. Acta Materialia. vol. 125, Feb. 15, 2017, pp. 390-400.
Yasa et al., "Microstuctural investigation of Selective Laser Melting 316L stainless steel parts exposed to laser re-melting", Procedia Engineering, 2011, vol. 19, pp. 389-395.
Yin, "Accurately quantifying process-relevant powder properties for AMPM applications", Freeman Technology. May 2014. 39 pages.
Meiners, Dissertation, Direct selective laser sintering of one-component metallic materials, 1999. 266 pages.
Meiners. Direktes Selektives Laser Sintemn einkomponentiger metallischer Werkstoffe. Dissertation. Abstract Only (1999). Wth English translation.
Mercelis. Residual stresses in selective laser sintering and selective laser melting. Rapid Prototyping Journal, vol. 12, Issue 5, pp. 254-265 (2006).
Merriam-Webster definition "atmosphere", retrieved from the internet Feb. 28, 2023.
Merriam-Webster dictionary definition of "Active", at https://www.merriam-webster.com/dictionary/active (2022).
Merriam-Webster dictionary definition of "Passive", at https://www.merriam-webster.com/dictionary/passive?pronunciation&lang=en_us&dir=p&file=passiv03 first (2022).
Merriam-Webster. Definition of "reservoir". Retrieved Dec. 21, 2017. 13 pages. URL:<https://merriam-webster.com/dictionary/reservoir>.
Mertens, et al. Optimization fo scan strategies in selective laser melting of aluminum parts with downfacing areas. Journal of Manufacturing Science and Technology. Dec. 2014; 136:061012-1-7.
Morgan, et al. Experimental investigation of nanosecond pulsed Nd:YAG laser re-melted pre-placed powder beds: Rapid Prototyping Journal, Aug. 1, 2001, vol. 7 Issue: 3, pp. 159-172, doi: 10.1108/13552540110395565.
Moridi, et al. Cold spray coating: review of material systems and future perspectives. Surface engineering. Jun. 2014; 36(6):369-395.
Mumtaz, et al. A method to eliminate anchors/supports from directly laser melted metal powder bed processes. Additive Manufacturing Research Group, Wolfson School of Mechanical Engineering, Loughborough University. Reviewed Aug. 17, 2011. 10 pages.
Murr et al., "Characterization of titanium aluminide alloy components fabricated by additive manufacturing using electron beam melting", ScienceDirect, Acta Materialia 58, (2010), vol. 58, pp. 1887-1894.
Murr et al., "Metal Fabrication by Additive Manufacturing Using Laser and Electron Beam Melting Technologies", ScienceDirect, J. Materials Science Technology, (2012), vol. 28, No. 1, pp. 1-14.
Netfabb-Professional 5.2, User Manual, Netfabb GmbH 2014, Version: Jul. 29, 2014, Chapter 6: sections 6.1, 6.3, Chapter 7: section 7.7, Chapter 9: section 9.6. 237 pages.
Niendorf et al., "Functionally Graded Alloys Obtained by Additive Manufacturing", Advanced Engineering Materials, (2014), vol. 16, No. 7, pp. 857-861.
Niendorf et al., "Highly Anisotropic Steel Processed by Selective Laser Melting", Metallurgical and Materials Transactions 44B, (2013), pp. 794-796.
Niendorf et al., "Labeling additively manufactured parts by micro structural gradation-advanced copy-proof design" submitted to Rapid Prototyping Journal, (2014), pp. 630-635.
Niendorf et al., "Lattice Sturctures Manufactured by SLM: On the Effect of Geometrical Dimensions on Microstructure Evolution During Processing", Metalurgical and Materials Transactions 45B, (2014), pp. 1181-1185.
Niendorf et al., "Steel showing twinning-induced plasticity processed by selective laser melting—An additively manufactured high performance material", Matererials Characterization 85, (2013), 57.
Niendorf et al., "The Deformation Behavior of Functionally Graded TWIP Steel under Monotonic Loading at Ambient Temperature", Material Res. Lett., 2013, vol. 1, No. 2, 96-101.
Niendorf et al., "Monitoring the fatigue-induced damage evolution in ultrafine-grained interstitial-free steel utilizing digital image correlation", ScienceDirect, Materials Science Engineering A 517, (2009), pp. 225-234.
Office Action (Non Final Rejection) dated Feb. 14, 2024 for U.S. Appl. No. 18/135,829 (pp. 1-36).
Office Action (Non-Final Rejection) for U.S. Appl. No. 17/849,866, dated Oct. 25, 2023.
Office Action (Non-Final Rejection) dated Apr. 3, 2024 for U.S. Appl. No. 17/876,797 (pp. 1-10).
Office Action (Non-Final Rejection) for U.S. Appl. No. 18/209,603, dated Jan. 5, 2024.
Office Action (Restriction Requirement), dated Feb. 22, 2024, U.S. Appl. No. 18/207,206.
Office Action (Restriction Requirement), dated Jan. 9, 2024, U.S. Appl. No. 18/207,199.
Office Action (Restriction Requirement), dated May 25, 2023, U.S. Appl. No. 17/849,866.
Optomec. LENS 850R 3D Printer for Structual Metals. Optomec. YouTube—Web. Published on Jun. 3, 2012. 3 pages. URL:< https://www.youtube.com/watch?v=mkUVURLkxS4>.
Over, "Generative Fertigung von Bauteilen aus Werkzeugstahl X38CrMoV5-1 , und titan TiA16V4 mit Selective Laser Melting", PhD Thesis, RWTH Aachen, 74 pages, date of Oral Examination Jun. 18, 2003), see partial English translation.
Papadakis, et al. Numerical computation of component shape distortion manufactured by selective laser melting. Procedia CIRP. Aug. 2014; 18:90-95.

(56) References Cited

OTHER PUBLICATIONS

Peng et al. Fast prediction of thermal distortion in metal powder bed fusion additive manufacturing: Part 1, a thermal circuit network model. Additive Manufacturing; vol. 22, Aug. 2018, pp. 852-868.
Peng et al. Fast prediction of thermal distortion in metal powder bed fusion additive manufacturing: Part 2, a quasi-static thermomechanical model. Additive Manufacturing; vol. 22, Aug. 2018, pp. 869-882.
Proto Labs. Direct Metal Laser Sintering (DMLS). Published Sep. 10, 2014. https://www.protolabs.com/additive-manufacturing/direct-metal-laser-sintering, 2 pages.
Rehme, "Cellular Design for Laser Freeform Fabrication", PhD Thesis, Hamburg University of Technology, CuvillierVerlag, Goettingen, (2009), pp. 1-273.
Renishaw, "RenAM 500 metal additive manufacturing (3D printing) systems", Google shows that it was first cached Nov. 17, 2021, https://www.renishaw.com/en/renam-500-metal-additive-manufacturing-3d-printing-systems--37011, 9 pages.
Rhinehart, R.R. §2.13 Control Theory: Mode-Based Control, in Bela G. Liptak, Instrument Engineers' Handbook, vol. 2: Process Control and Optimization, 209-213. CRC Press; 4 editior (Sep. 29, 2005).ISBN-13: 978-0849310812.
Riecker, et al. 3D multi-material metal printing of delicate structures. EuroPM 2014—AM Technologies, http://www.ifam.fraunhofer.de/content/dam/ifam/de/documents/dd/Publikationen/2014/Euro_PM_2014_Riecker_3D%20Multi-Material_Metal_Printing_of_Delicate_Structures_EPMA.pdf (accessed on Jun. 29, 2015). 6 pages.
RP Photonics Consulting GmbH. Definition of "Optical Intensity". Encyclopedia of Laser Physics and Technology. Jun. 2012. 3 pages. URL:< https://www.rp-photonics.com/optical_intensity.html>.
Ryan et al. Fabrication methods of porous metals for use in orthopaedic applications. Biomaterials. May 2006; vol. 27, Issue 13, pp. 2651-2670.
Sandvik Materials Technology website. Accessed Nov. 14, 2014. http://www.smt.sandvik.com/en/products/metal-powder/additive-manufacturing/. 2 pages.
Saunders, Marc. Real-time AM monitoring opens up new process control opportunities. Web: Linkedin. Published on Jan. 3, 2018. 12 pages. URL:< https://www.linkedin.com/pulse/real-time-am-monitoring-opens-new-process-control-marc-saunders/>.
Schott, "TIE-19 Temperature Coefficient of the Refractive Index", Technical Information: Advanced Optics, Schott AG. Jul. 2016. 10 pages.
Schott, "TIE-19 Temperature Coefficient of the Refractive Index", Technical Information: Advanced Optics, SCHOTT North America, Inc. Jul. 2008. 12 pages.
Scime et al. Anomaly detection and classification in a laser powder bed additive manufacturing process using a trained computer vision algorithm. Additive Manufacturing. vol. 19, Jan. 2018, pp. 114-126.
Selective Laser Sintering (SLS) Process at Loughborough University. Published May 4, 2015. 2 pages. https://www.youtube.com/watch?v=oO77VKDB89I.
Shen et al. An analytical model for estimating deformation in laser forming. Computational Materials Science, 37, Oct. 2006, pp. 593-598.
Shen et al. Modelling of laser forming—An review. Computational Materials Science 46, Oct. 2009, pp. 834-840.
SLM Solutions GmbH, Operating Manual, Selective Laser Melting System, SLM 125, 2015.
SLM Solutions, Bugatti Chiron Titanium brake caliper 3D printed on SLM Solutions—YouTube, published Feb. 8, 2018, URL: https://www.youtube.com/watch?v=SRA5CFLYKUQ.
Geiger, et al. The Mechanisms of Laser Forming. Annals of the CIRP, vol. 42, Jan. 1993, pp. 301-304.
Ghosh, et al. Selective Laser Sintering: A Case Study of Tungsten Carbide and Cobalt Powder Sintering by Pulsed Nd:YAG Laser. Lasers Based Manufacturing, Dec. 2014, pp. 441-458.
Gibson et al., "Additive Manufacturing Technologies", Third Edition, Springer, 2021, Abstract, 7pages.
Gibson, et al., " Additive Manufacturing Technologies", Rapid Prototyping to Direct Digital Manufacturing, Springer 2010, Chapter 5, 103-142. ISBN978-1-4419-1119-3 (Print978-1-4419-1120-9 (Online). Published: Dec. 14, 2009.
Gibson, et al., Additive Manufacturing Technologies, Springer 2010, ISBN978-1-4419-1119-3, Published Dec. 2009, pp. 27-31, 98-99, pp. 1-234.
Gibson, et al., Additive Manufacturing Technologies, Springer 2010, ISBN978-1-4419-1119-3, Published Dec. 2009264-267, 295, 382-383, pp. 235-459.
Gibson, et al., "Additive Manufacturing Technologies", Springer 2015, Chapter 5, pp. 107-145. ISBN 978-1-4939-2113-3 (978-1-4939-2112-6; 978-1-4939-2113-3); DOI 10.1007/978-1-4939-2113-3. Published: Nov. 27, 2014.
Glowforge 3D Laser Printer. Glowforge. https://glowforge.com/products. Sub-page first cached May 15, 2019. 17 pages.
Gordon et al. Single-pixel phase-corrected fiber bundle endomicroscopy with lensless focussing capability. J Lightwave Technol. Author manuscript; available in PMC Jun. 6, 2016. Published in final edited form as: J Lightwave Technol. Aug. 15, 2015; 33(16): 3419-3425.
Gorny et al., "In situ characterization of the deformation and failure behavior of non-stochastic porous structures processed by selective laser melting", ScienceDirect, Materials Science and Engineering A 528, (2011), pp. 7962-7967.
Gu et al., "Laser Additive manufacturing of metallic components: materials, processes and mechanisms", International Materials Reviews, (2012), vol. 57(3), pp. 133-164.
Hauser, et al. Further Developments in Process Mapping and modelling in direct metal selective laser melting. Aug. 2004, 15th solid Free Form Fabrication Proceedings. Austin, Texas, pp. 448-459.
Hu et al. Experimental and numerical modeling of buckling instability of laser sheet forming. International Journal of Machine Tools & Manufacture, 42, Oct. 2002, pp. 1427-1439.
Hu, et al. Computer simulation and experimental investigation of sheet metal bending using laser beam scanning. International Journal of Machine Tools and Manufacture, 41, Mar. 2001, pp. 589-607.
Hubbard, ed. The Handbook of Surface Imaging and Visualization, cover sheets and pp. 39-40, CRC Press (1995).
Hunt, "Steady State Columnar and Equiaxed Growth of Dendrites and Eutectic," Materials Science and Engineering , 65 ( 1984 ) pp. 75-83, ( 9 pages).
Hussein. The development of Lightweight Cellular Structures for Metal Additive Manufacturing. Nov. 2013, thesis of University of Exeter, pp. 1-228.
Iischner et al., English translated title "Properties, processes, technologies", Materials Science and Manufacturing Engineering, (2010), Chapter 7, pp. 127-164, URL: https://link.springer.com/chapter/10.1007/978-3-642-01734-6_7.
integrativemodeling.org. IMP, the Integrative Modeling Platform. Web. Published Jul. 26, 2013.1 page. URL: < https://integrativemodeling.org/>.
International Search Report and Written Opinion dated Apr. 11, 2016 for Interational PCT Patent Application No. PCT/US2015/065297.
International Search Report and Written Opinion dated Jan. 16, 2017 for International PCT Patent Application No. PCT/US2016/059781.
International Search Report and Written Opinion dated Jan. 9, 2018 for International PCT Patent Application No. PCT/US2017/054043.
International Search Report and Written Opinion dated May 18, 2017 for International PCT Patent Application No. PCT/US2017/018191.
International Search Report and Written Opinion dated Sep. 19, 2016 for PCT Application No. PCT/US2016/034857.
IUPAC. "Inert gas". IUPAC Compendium of Chemical Terminology. Published Feb. 24, 2014.< http://goldbook.iupac.Org/html/I/I03027.html. 1 page.
Kanagarajah et al., "Inconel 939 processed by selective laser melting: Effect of microstructure and temperature on the mechanical properties under static and cyclic loading", Material Science Engineering, 2013, A588, 188-195.

(56) References Cited

OTHER PUBLICATIONS

Kannatey-Asibu JR, Elijah. Principles of laser materials processing. John Wiley & Sons, 2009, Chapter 10, pp. 231-405. Published: Apr. 20, 2009.

Kannatey-Asibu JR, Elijah. Principles of laser materials processing. John Wiley & Sons, 2009, Chapter 16, pp. 502-668. Published: Apr. 20, 2009.

Kant et al. An integrated FEM-ANN model for laser bending process with inverse estimation of absorptivity. Mechanics of Advanced Materials and Modern Processes. Dec. 2015, vol. 1, No. 6, 12 pages.

Kopeliovich, Dmitri. Electropolishing. SubsTech: Substances & Technologies. Web Article. Dec. 14, 2013. Printed Jan. 13, 2019. 5 pages. URL:< http://www.substech.com/dokuwiki/doku.php?id=electropolishing.

Kruth, et al. Feedback control of selective laser melting. Proceedings of the 3rd International Conference on Advanced Research in Virtual and Rapid Prototyping, Leiria, Portugal, Sep. 2007. 521-527.

Kruth, et al. Selective laser melting of iron-based power. Journal of Materials Processing Technology. Nov. 2004; 149:616-622.

Kumar, et al. Designing and slicing heterogenous components for rapid prototyping. Department of Mechanical Engineering, University of Florida. Aug. 2000; 428-436.

Kumar, et al. Electrophotographic Layered Manufacturing. J. Manuf. Sci. Eng 126(3), 571-576 (Sep. 7, 2004) (6 pages) doi:10.1115/1.1765146.

Kumar, et al. Electrophotographic powder deposition for freeform fabrication. Department of Mechanical Engineering, University of Florida. Aug. 1999; 647-654.

Kumar, et al. Electrophotographic printing of part and binder powders. Rapid Prototyping Journal. Jul. 2004; 10(1) 7-13.

Kumar, et al. Layered Manufacturing by Electrophotographic Printing. ASME 2003 International Design Engineering Technical Conferences and Computers and Information in Engineering Conference. vol. 2: 29th Design Automation Conference, Parts A and B. Chicago, Illinois, USA, Sep. 2-6, 2003. Paper No. DETC2003/DAC-48724, pp. 205-211; 7 pages.

Kumar, et al. Solid freeform fabrication by electrophotographic printing. Department of Mechanical and Aerospace Engineering, University of Florida. Aug. 2003; 39-49.

Kumar. Development of an electrophotographic-based layered manufacturing test bed. Project proposal. Department of Mechanical Engineering, University of Florida. 2009. http://www.cis.rit.edu/microgrants/2008/Esterman_proposal.pdf (accessed on Jun. 29, 2015). 4 pages.

Kumar. Powder deposition and sintering for a two-powder approach to solid freeform fabrication. Department of Mechanical Engineering, University of Florida. Aug. 1998; 169-173.

Laser Engineered Net Shaping (LENS) 850-R system overview. System features and example application video clips. Published Jun. 3, 2012. https://www.youtube.com/watch?v=mkUVURLkxS4. 2 pages.

Leirvag. Additive Manufacturing for Large Products. Feb. 2013, thesis. Norwegian University of Science and Technology. 76 pages.

Leuders et al., "On the mechanical behavior of titanium alloy TiAl6V4 manufactured by selective laser melting: Fatigue resistance and crack growth performance", ScienceDirect, International Journal of Fatigue 48, (2013), pp. 300-307.

Levy et al., "Rapid Manufacturing and Rapid Tooling With Layer Manufacturing (LM) Technologies, State of the Art and Future Perspectives", Annual Manufacturing Technology, (2003), vol. 52, pp. 589-609.

Liu et al., "The effect of laser scanning path on microstructures and mechanical properties of laser solid formed nickel-base superalloy Inconel 718", ScienceDirect, Journal of Alloys and Compounds 509, (2011), pp. 4505-4509.

Lu et al. Chapter 6: Metal-Based System via Laser Melting. Laser-Induced Materials and Processes for Rapid Prototyping. Kluwer Acad. Publ., USA, pp. 143-186 (2001).

Lyckfeldt. Powder rheology of steel powders for additive manufacturing. Swerea IVF. Oct. 24, 2013. 1 page.

Maji et al. Finite Element Analysis and Experimental Investigations on Laser Bending of AISI304 Stainless Steel Sheet. Procedia Engineering 64, Dec. 2013, pp. 528-535.

Manfredi, et al. From Powders to Dense Metal Parts: Characterization of a Commercial AlSiMg Alloy Processed through Direct Metal Laser Sintering. Mar. 2013, Materials, vol. 6, pp. 856-869.

Manzhirov, et al. Mathematical Modeling of Additive Manufacturing Technologies. Proc. of the World Congress of Engineering 2014, vol. II. WCE2014, Jul. 2-4, 2014, London, U.K. 6 pages.

3D Printers. 3D Systems, https://www.3dsystems.com/3d-printers. Web page cached Jun. 23, 2013.7 pages.

3D Systems, DMP Factory 350 and DMP Factory 350 Dual, Google shows that this page was cached on Nov. 13, 2018, https://www.3dsystems.com/3d-printers/dmp-factory-350, 13 pages.

Adam, et al. Design for additive manufacturing—element transitions and aggregated structures. CIRP Journal of Manufacturing Science and Technology. Nov. 2014; 7:20-28.

Additive Manufacturing Research Group. Loughborough University. Accessed Jul. 29, 2015. 7 pages. http://www.lboro.ac.uk/research/amrg/about/the7categoriesofadditivemanufacturing/powderbedfusion/.

Anusci, Victor. Aerosint Is Developing the First Commercial 'Multipowder SLS 3d Printer. 3D Printing Media Network. Web. Published Jan. 28, 2018. 4 pages. URL: <https://www.3dprintingmedia.network/aerosint-multi-powder-sls-3d-printer/>.

Arcam AB (ARCM.ST) (AMAVF). Powder Removal from 3D Structures. Posted Thursday, Apr. 23, 2015 11:23:59 AM. 4 pages. http://investorshub.advfn.com/boards/read_msg.aspx?message_id=113029094.

Arcam EBM at Sirris Belgium. Uploaded Jun. 17, 2010. 2 pages. https://www.youtube.com/watch?v=nR7EtduqVYw&list=PLD7ckJoR KR6uaOGOMlyJ1mpCKh3 42il_I.

Arnet et al. Extending Laser Bending for the Generation of Convex Shapes. Proc. Instn. Mech. Engrs., vol. 209, Dec. 1, 1995, pp. 433-442.

Ashby, Mike. Teach Yourself: Phase Diagrams and Phase Transformations. 5th Edition, Mar. 2009, Cambridge. 55 pages.

Bansal et al., "Experimental and Theoretical Analysis of Scanning Laser Epitaxy Applied to Nickel-Based Superalloys", Woodruff School of Mechanical Engineering, Georgia Institute of Technology, (2011), pp. 496-503.

Barriobero-Vila et al. Inducing Stable a + p Microstructures during Selective Laser Melting of Ti—6Al—4V Using Intensified Intrinsic Heat Treatments. Materials (Basel). vol. 10, No. 3, Mar. 2017, 14 pages.

Baufeld et al., "Additive manufacturing of Ti—6Al—4V components by shaped metal deposition: Microstucture and mechanical properties", ScienceDirect, Materials and Design 31, (2010), pp. S106-S111.

Baufeld et al., "Wire based additive layer manufacturing: Comparison of microstructure and mechanical properties of Ti—6Al—4V components fabricated by laser-beam deposition and shaped metal deposition", ScienceDirect, Journal of Materials Processing Technology, (2011), vol. 211, pp. 1146-1158.

Bayerlein et al. Validation of modeling assumptions for the buildup simulation of laser beam melting on the basis of the residual stress distribution. Proceedings of ECCOMAS Congress 2016: VII European Congress on Computational Methods in Applied Sciences and Engineering. Crete Island, Greece, Jun. 5, 2016-Jun. 10, 2016. 11 pages.

Betriebsanleitung (Operating Manual). Selective Laser Melting-Anlage. SLM®125HL. SLM Solutions, pp. 1-6, pp. 43-49, 53, 68, 69, 84-87, and 92 (Jun. 1, 2015). 21 pages total. With English translation.

Bohnet, M. Advances in the Design of Pneumatic Conveyors. International Chemical Engineering, vol. 25, No. 3, Jul. 1985, pp. 387-405.

Bondhus. Crystals, grains, and cooling. Web article. Copyright © 2009 Bondhus Corp. First published Feb. 10, 2005. Accessed Jul. 13, 2016. Printed on Jul. 30, 2018. 1 page. URL:< http://bondhus.com/metallurgy/body-3.htm>.

Bremen et al. Selective Laser Melting. Laser Technik Journal 9(2); Apr. 2012. 6 pages.

(56) References Cited

OTHER PUBLICATIONS

Brenne et al., Additively manufactured cellular structures: Impact of mircrosturcture and local strains on the monotonic and cyclic behavior under uniaxial and bending load, Journal of Materials Processing Technology, 2013, 213, 1558-1564.
Calvert, Jack G. Glossary of Atmospheric Chemistry Terms (Recommendations 1990). Pure &Appl. Chem., vol. 62, No. 11, Jan. 1, 1990, pp. 2167-2219.
Campbell, "Controlled solidification techniques", Complete Casting Handbook, (2011), vol. 2, pp. 1013-1023.
Cheng et al., "Multi-objective opimization of part-building orientation in stereolithography", Rapid Prototyping Journal, (1995), vol. 1, No. 4, pp. 12-23.
Cheng, et al. Thermal Stresses Associated with Part Overhang Geometry in Electron Beam Additive Manufacturing: Process Parameter Effects. 25th Annual International Solid Freeform Fabrication Symposium—An Additive Manufacturing Conference, Austin, TX, USA. Aug. 4-6, 2014. 1076-1087.
Childs, et al. Raster scan of selective laser melting of the surface layer of a tool steel powder bed. Proc. IMechE. Jan. 26, 2005; vol. 219, Part B, pp. 379-384.
Childs, et al. Selective laser sintering (melting) of stainless and tool steel powders: experimental modelling. Proc. IMechE. 2005, Published Oct. 18, 2004; vol. 219 Part B, J. Engineering Manufacture, pp. 338-357.
Chivel, et al. On-line temperature monitoring in selective laser sintering/melting. Physics Procedia. Dec. 31, 2010; (5):515-521.
Cloots, et al. Assessing new support minimizing strategies for the additive manufacturing technology SLM. Aug. 16, 2013. sffsymposium.engr.utexas.edu/Manuscripts/2013/2013-50-Cloots.pdf. 13 pages.
Co-pending U.S. Appl. No. 18/612,540, filed Mar. 21, 2024, Saldivar Valdes.
Craeghs, et al. Feedback control of layerwise laser melting using optical sensors. Physics Procedia. Dec. 2010; 5:505-514.
Criales, et al. Laser material processing methods: micromachining, laser exfoliation and selective laser melting: prediction modeling of temperature field and melt pool size using finite element modeling of selective laser melting for inconel 625. Atilim University. Metal Forming Center of Excellence, Ankara, Turkey. Nov. 14, 2014. 77 pages.
Dahotre et al. Laser Fabrication and Machining of Materials. Springer; 2008 edition (Nov. 26, 2007).561 pages. DOI: 10.1007/978-0-387-72344-0.
Das et al. Producing metal parts with selective laser sintering/hot isostatic pressing. JOM; Dec. 1998, vol. 50, Issue 12, pp. 17-20.
David et al. Welding: Solidification and microstructure. The Journal of The Minerals, Metals & Materials Society (TMS). Jun. 2003, vol. 55, Issue 6, pp. 14-20.

De Dietrich Process Systems, Inc. Powder Pump™. Product Brochure. Created Jul. 3, 2012. 2 pages.
Direct Manufacturing: ARCAM. Uploaded on Jun. 6, 2011. 2 pages, https://www.youtube.com/watch?v=M_qSnjKN7f8.
Doxygen. CGAL 4.11.1—Kinetic Data Structures. User Manual. Web. Published Apr. 8, 2006. 4 pages. URL:<https://doc.cgal.org/latest/Manual/how_to_cite_cgal.html>.
EOS. Direct Metal Laser Sintering Published Aug. 22, 2012. https://www.youtube.com/watch?v=cRE-Pzl6uZA. 3 pages.
European Boards of Appeal, Grounds of Appeal against the Decision of the Opposition Division dated Mar. 25, 2022 in Opposition Proceedings concerning EP3263316, dated Aug. 9, 2022.
European Boards of Appeal, Response to Opposition against EP3263316, dated Dec. 13, 2022.
European Boards of Appeal, Response to Opposition against EP3263316, dated Jan. 4, 2023.
European Opposition response by Concept Laser GmbH against EP 3263316, dated Jun. 16, 2021.
European Opposition response by SLM Solutions GmbH, EP 3263316, dated Apr. 30, 2021.
Everton et al., "Review of in-situ process monitoring and in-situ metrology for metal additive manufacturing", ScienceDirect, Materials and Design 95, (2016), pp. 431-445.
Extended European Search Report, EP 13194232.8, SLM Solutions GmbH, dated Mar. 17, 2014.
FIT AG & SLM Solutions (German)—YouTube, published Nov. 16, 2016, URL: https://www.youtube.com/watch?v=xOoRL_IHfcg.
Flashforge Adventurer 3C FDM 3D Printer, https://www.flashforgeshop.com/product/flashforge-adventurer-3c-3d-printer?cID=31. Webpage https://www.flashforgeshop.com/product/flashforge-adventurer-3c-3d-printer?cID=31 cached Nov. 8, 2019. 13 pages.
*Formlabs* v. *DWS*. Civil Action filed on Jun. 29, 2018 in the United States Court for the Eastern District of Virginia. Case No. 1:18-cv-00810-CMH-IDD. 13 pages.
Gaudin, Sharon. Researcher works to make 3D-printed metals stronger, customizable. Oct. 2014. Accessed online on Mar. 22, 2018. 4 pages. URL:<https://www.computerworld.com/article/2838780/researcher-works-to-make-3d-printed-materials-stronger-customizable.html>.
GE Additive, Concept Laser M2 Series 5, According to the wayback machine, this page was first crawled May 29, 2020; the related press release was on Nov. 19, 2019: https://www.ge.com/additive/press-releases/ge-additive-unveils-new-concept-laser-m2-series-5; https://www.ge.com/additive/additive-manufacturing/machines/m2series5.
Gebhardt. Generative Fertigungsverfahren: Rapid Prototyping—Rapid Tooling—Rapid Manufacturing. Carl Hanser Verlag, Munchen, cover page, inside cover page, and p. 121 (2007). With English translation of p. 121. 5 pages total.

\* cited by examiner

THREE-DIMENSIONAL OBJECTS AND THEIR FORMATION

CROSS REFERENCE TO RELATED APPLICATIONS

This application is a continuation of U.S. patent application Ser. No. 18/108,069 filed Feb. 10, 2023, which is a continuation of U.S. patent application Ser. No. 17/972,641 filed Oct. 25, 2022, which is a continuation of U.S. patent application Ser. No. 17/858,209 filed Jul. 6, 2022, which is a continuation of U.S. patent application Ser. No. 17/708,397 filed Mar. 30, 2022, which is a continuation of U.S. patent application Ser. No. 17/552,788 filed Dec. 16, 2021, which is a continuation of U.S. patent application Ser. No. 17/466,158 filed Sep. 3, 2021, which is a continuation of U.S. patent application Ser. No. 17/322,142 filed May 17, 2021, which is a continuation of U.S. patent application Ser. No. 17/165,289 filed Feb. 2, 2021, which is a continuation of U.S. patent application Ser. No. 17/071,082 filed Oct. 15, 2020, which is a continuation of U.S. patent application Ser. No. 16/917,933 filed Jul. 1, 2020, which is a continuation of U.S. patent application Ser. No. 16/825,696 filed Mar. 20, 2020, which is a continuation of U.S. patent application Ser. No. 16/686,045 filed Nov. 15, 2019, which is a continuation of U.S. patent application Ser. No. 15/719,229 filed Sep. 28, 2017, which claims priority to U.S. Patent Application Ser. No. 62/402,634, filed on Sep. 30, 2016, titled "IN SITU THREE-DIMENSIONAL OBJECT MARKERS," each of which is entirely incorporated herein by reference.

BACKGROUND

Three-dimensional objects can be made using manufacturing processes. The manufacturing processes can affect the shape of the three-dimensional objects in unintended ways. Examples of manufacturing processes for forming three-dimensional objects include three-dimensional (3D) printing.

Three-dimensional (3D) printing (e.g., additive manufacturing) is a process for making a three-dimensional object (e.g., of any shape) from a design. The design may be in the form of a data source such as an electronic data source, or may be in the form of a hard copy. The hard copy may be a two-dimensional representation of a 3D object. The data source may be an electronic 3D model. 3D printing may be accomplished through, for example, an additive process in which successive layers of material are laid down one on top of another. This process may be controlled (e.g., computer controlled, manually controlled, or both). A 3D printer can be an industrial robot.

3D printing can generate custom parts. A variety of materials can be used in a 3D printing process including elemental metal, metal alloy, ceramic, elemental carbon, or polymeric material. In some 3D printing processes (e.g., additive manufacturing), a first layer of hardened material is formed (e.g., by welding powder), and thereafter successive layers of hardened material are added one by one, wherein each new layer of hardened material is added on a pre-formed layer of hardened material, until the entire designed three-dimensional structure (3D object) is layer-wise materialized.

3D models may be created with a computer aided design package, via 3D scanner, or manually. The manual modeling process of preparing geometric data for 3D computer graphics may be similar to plastic arts, such as sculpting or animating. 3D scanning is a process of analyzing and collecting digital data on the shape and appearance of a real object (e.g., real-life object). Based on this data, 3D models of the scanned object can be produced.

A number of 3D printing processes are currently available. They may differ in the manner layers are deposited to create the materialized 3D structure (e.g., hardened 3D structure). They may vary in the material or materials that are used to materialize the designed 3D object. Some methods melt, sinter, or soften material to produce the layers that form the 3D object. Examples for 3D printing methods include selective laser melting (SLM), selective laser sintering (SLS), direct metal laser sintering (DMLS) or fused deposition modeling (FDM). Other methods cure liquid materials using different technologies such as stereo lithography (SLA). In the method of laminated object manufacturing (LOM), thin layers (made inter alia of paper, polymer, or metal) are cut to shape and joined together.

Due to the manufacturing (e.g., printing) procedures and/or materials chosen, some 3D objects may deform during and/or after their generation. At times it is desirable to print a 3D object that has a reduced level of deformation. It may be desirable to form (e.g., print) a 3D object that is substantially similar to the requested 3D object (e.g., by a client). It may be desirable to develop a methodology to monitor the forming (e.g., printing) of the 3D objects.

SUMMARY

In some embodiments, the present disclosure delineates methods, systems, apparatuses, and software that allow modeling and forming of 3D objects with a reduced amount of design constraints (e.g., no design constraints). The present disclosure delineates methods, systems, apparatuses, and software that allow materialization of 3D object and models thereof. Described herein is also a way of tracking of 3D object formation (e.g., 3D printing) that may be of assistance in reducing and/or controlling deformation that occur during formation of a (physical) 3D object.

In an aspect is a method for monitoring a three-dimensional (3D) printing process that comprises (a) generating a prior marked model (e.g., first marked model) of a requested 3D object by inserting one or more markers in a model design of the requested 3D object; (b) forming a prior marked 3D object based on the prior marked model of the requested 3D object; (c) calculating a deviation by comparing between: the one or more markers in the prior marked model of the requested 3D object in (a), and the prior marked 3D object in (b); and (d) monitoring the 3D printing process based on the calculating, which one or more markers are structural.

In some embodiments, the one or more markers that are structural comprise depression, protrusion, or deletion as compared to the requested 3D object. In some embodiments, the deletion is a hole. In some embodiments, forming comprises using a printing instruction to form the prior marked 3D object (e.g., first marked 3D object). In some embodiments, the one or more markers are small such that the printing instruction to form the prior marked 3D object is substantially similar to a printing instruction to form the requested 3D object. In some embodiments, substantially is relative to the intended purpose of the 3D object. In some embodiments, monitoring comprises adjusting the 3D printing process based on the calculating. In some embodiments, adjusting comprises: (i) generating a subsequent marked model (e.g., second marked model) of a requested 3D object by adjusting the prior marked model based on the calculating in operation (c); (ii) forming a subsequent marked 3D object (e.g., second marked 3D object) based on the subsequent marked model of the requested 3D object; (iii) calculating a deviation by comparing between: the one or more markers of the subsequent marked model of the requested 3D object in (i), and the subsequent marked 3D object in (ii); or (iv) repeating steps (i) to (iii) based on a deviation value. In some embodiments, adjusting in (i) is relative to the intended purpose of the requested 3D object. In some embodiments, adjusting in (i) comprises corrective adjustment. In some embodiments, adjusting in (i) comprises geometric adjustment. In some embodiments, adjusting in (i) comprises structural adjustment. In some embodiments, adjusting in (i) results in reducing the deviation value. In some embodiments, the deviation value is (e.g., substantially) based on the intended purpose of the requested 3D object, and the repeating in (iv) occurs. In some embodiments, the deviation value is insubstantial and the repeating in (iv) does not occur. In some embodiments, the method further comprises forming the requested 3D object based on the subsequent marked model of the requested 3D object. Insubstantial can be relative to the intended purpose of the requested 3D object. In some embodiments, the deviation value is insubstantial. In some embodiments, the method further comprises forming the requested 3D object based on the prior marked model of the requested 3D object. In some embodiments, adjusting results in a subsequent marked 3D object comprises less auxiliary support as compared to the prior marked 3D object. In some embodiments, less is a fewer number of auxiliary support structures. In some embodiments, less is smaller contact area between the auxiliary support and the subsequent marked 3D object. In some embodiments, the method further comprises using the calculating in a simulation. In some embodiments, the simulation comprises a simulation of the 3D printing process. In some embodiments, the simulation comprises a simulation of the requested 3D object. In some embodiments, the simulation comprises a simulation of the marked model of the requested 3D object. In some embodiments, the simulation comprises the 3D printing directions. In some embodiments, the simulation comprises the requested 3D object. In some embodiments, the simulation comprises the marked model of the requested 3D object. In some embodiments, the simulation comprises a learning algorithm. In some embodiments, comparing comprises measuring a fundamental length scale, shape, or volume of at least one of the one or more markers of the prior marked 3D object. In some embodiments, comparing comprises measuring a fundamental length scale, shape, or volume of at least one of the one or more markers of the prior marked 3D object and/or of a subsequent marked 3D object (e.g., subsequent to the prior marked 3D object). In some embodiments, comparing comprises metrologically measuring the one or more markers of the prior marked 3D object. In some embodiments, comparing comprises metrologically measuring the one or more markers of the prior marked 3D object and/or of the subsequent marked 3D object. In some embodiments, metrologically comprises measuring a distance between at least two markers. In some embodiments, measuring a distance between at least two markers comprises measuring a distance between the center of the at least two markers. In some embodiments, measuring a distance between at least two markers comprises measuring a distance between the circumference of the at least two markers. The prior can be relative to the subsequent. The prior can be first. The subsequent can be second, third, fourth, etc.

Another aspect of the present disclosure provides a computer system comprising one or more computer processors and a non-transitory computer-readable medium coupled thereto. The non-transitory computer-readable medium comprises machine-executable code that, upon execution by the one or more computer processors, implements any of the methods disclosed herein.

In another aspect, a system for monitoring a 3D printing process, comprises: a first processor that is configured to generate a prior marked model of a requested 3D object by inserting one or more markers in a model design of the requested 3D object to form a marked 3D object; a 3D printer that is configured to print a prior marked 3D object based on the prior marked model of the requested 3D object; a second processor that is configured to calculate a deviation by comparing between: (i) the one or more markers in the prior marked model of the requested 3D object, and (ii) the prior marked 3D object; and (d) a third processor that is configured to monitor the 3D printing process based on the deviation, which one or more markers are structural, wherein at least two of the first processor, second processor, third processor, and 3D printer are operatively coupled.

In some embodiments, the at least two of the first processor, second processor, and third processor are the same processor. In some embodiments, the 3D printer comprises an energy beam (e.g., laser or electron-beam). In some embodiments, the 3D printer comprises a layer dispensing mechanism. In some embodiments, the 3D printer is configured to accommodate a material bed. In some embodiments, the 3D printing comprises a platform that is configured to support the 3D object. In some embodiments, the 3D printer is an additive 3D printer. In some embodiments, the system further comprises at least one controller that is operatively coupled to at least one of the 3D printer, first processor, second processor, and third processor are the same processor. In some embodiments, the system further comprises a sensor that senses at least one characteristic of the one or more markers. In some embodiments, the sensor comprises a temperature or metrology (e.g., height) sensor. In some embodiments, the characteristic is a metrological characteristic.

In another aspect, an apparatus for printing one or more 3D objects comprises at least one controller that is programmed to direct at least one mechanism used in a 3D printing methodology to implement (e.g., effectuate) any of the method disclosed herein, wherein one or more of the at least one controller is operatively coupled to the mechanism.

In another aspect, at least one controller comprises a plurality of controllers and wherein at least two of operations (e.g., at least two of (a), (b), (c) operations) are directed by the same controller. In some embodiments, at least one controller comprises a plurality of controllers and wherein at least two operations (e.g., at least two of (a), (b), (c) operations) are directed by different controllers. In some embodiments, the at least two operations may be of a method, a software, and/or operations programed in a control scheme.

In another aspect, an apparatus for monitoring a 3D printing process, comprises: (a) a first controller that is programmed to direct generating a prior marked model of a requested 3D object by inserting one or more markers in a model design of the requested 3D object; (b) a second controller that is programmed to direct forming a prior marked 3D object based on the prior marked model of the requested 3D object; (c) a third controller that is programmed to direct calculating a deviation by comparing between: the one or more markers in the prior marked model of the requested 3D object in (a), and the prior marked 3D object in (b); and (d) a fourth controller that is programmed to direct monitoring the 3D printing process based on the deviation, which one or more markers are structural, wherein at least two of the first processor, second processor, third processor, and 3D printer are operatively coupled.

In some embodiments, the at least two of the first controller, second controller, third controller, and fourth controller are the same controller. In some embodiments, the at least two of the first controller, second controller, third controller, and fourth controller are different controllers. In some embodiments, the at least one of the first controller, second controller, third controller, and fourth controller comprises a proportional-integral-derivative (PID) controller. In some embodiments, the at least one of the first controller, second controller, third controller, and fourth controller comprises a feedback loop. In some embodiments, the at least one of the first controller, second controller, third controller, and fourth controller comprises a feed forward loop. In some embodiments, the at least one of the first controller, second controller, third controller, and fourth controller comprises a closed loop control (e.g., based on a sensor signal, e.g., a temperature signal, and/or a power signal). In some embodiments, the at least one of the first controller, second controller, third controller, and fourth controller comprises an open loop control. In some embodiments, the at least one of the first controller, second controller, third controller, and fourth controller comprises a real-time controller. In some embodiments, the at least one of the first controller, second controller, third controller, and fourth controller comprises a temperature controller (e.g., controlling the melt pool temperature, e.g., in real time). In some embodiments, the at least one of the first controller, second controller, third controller, and fourth controller comprises a metrology controller (e.g., mapping the exposed surface of a material bed and/or 3D object, e.g., in real time). In some embodiments, the at least one of the first controller, second controller, third controller, and fourth controller comprises a power controller (e.g., controlling the power of the energy source and/or power density of the energy beam, e.g., in real time).

In another aspect, a computer software product comprises: (a) a first non-transitory computer-readable medium in which program instructions are stored, which instructions, when read by a first computer, cause the first computer to generate a prior marked model of a requested 3D object by inserting one or more markers in a model design of the requested 3D object, wherein the prior marked model of the requested 3D object is utilized to form a prior marked 3D object based on the prior marked model of the requested 3D object; and (b) a second non-transitory computer-readable medium in which program instructions are stored, which instructions, when read by a second computer, cause the second computer to calculate a deviation by comparing between: the one or more markers in the prior marked model of the requested 3D object in (a), and the prior marked 3D object in (b), wherein the deviation is used to control (e.g., adjust) the 3D printing process, and wherein one or more markers are structural.

In some embodiments, the first non-transitory computer-readable medium and the second non-transitory computer-readable medium are the same non-transitory computer-readable medium. In some embodiments, the first non-transitory computer-readable medium and the second non-transitory computer-readable medium are different. In some embodiments, the first computer and the second computer are the same. In some embodiments, the first computer and the second computer are different.

In another aspect, a method for forming a three-dimensional object comprises comparing one or more model markers with one or more physical markers, which one or more model markers are disposed on and/or in a geometric model of the three-dimensional object, wherein the one or more physical markers are disposed on and/or in a test object that is formed by employing the geometric model, which one or more physical markers correspond to the one or more model markers.

In another aspect (e.g., that can be related to the one above), a method for forming a three-dimensional object comprises: (a) (optionally) forming a test object using a geometric model of the three-dimensional object, and one or more model markers disposed on and/or in the geometric model of the three-dimensional object, the test object having one or more physical markers that correspond to the one or more model markers; and (b) comparing (e.g., locations, dimensions, and/or material properties of) the one or more model markers with (e.g., locations, dimensions, and/or material properties of) the one or more physical markers.

In some embodiments, the comparing is of location, shape, volume, fundamental length scale, and/or a material property. In some embodiments, the method further comprises operation (c) generating a corrected geometric model using the comparing in operation (b). In some embodiments, the method further comprises operation (d) forming the three-dimensional object using the corrected geometric model. In some embodiments, the method further comprises repeating operations (a), (b) and (c) using iteratively adjusted geometric models and a plurality of test objects until the locations of the one or more model markers (e.g., substantially) converge with the locations of the one or more physical markers. In some embodiments, a predefined location threshold of the physical markers comprises a vicinity of the one or more physical markers and the location of the one or more physical markers. In some embodiments, the locations of the one or more model markers converge within the predefined location threshold of the one or more physical markers. In some embodiments, the method further comprises generating a physics model that employs an estimated change of at least one characteristic of the three-dimensional object resulting from the forming. In some embodiments, the method further comprises forming a simulated object employing the physics model. In some embodiments, the method further comprises comparing the simulated object with the test object. In some embodiments, comparing the simulated object with the test object comprises comparing one or more dimensions of the simulated object with respective one or more dimensions of the test object. In some embodiments, the method further comprises generating a corrected geometric model employing comparing the simulated object with the test object. In some embodiments, the method further comprises forming the three-dimensional object while employing the corrected geometric model. In some embodiments, the at least one characteristic of the three-dimensional object comprises a material property of the three-dimensional object. In some embodiments, the at least one characteristic of the three-dimensional object comprises a geometry of the three-dimensional object. In some embodiments, the physics model employs an estimated thermally induced change in the three-dimensional object present upon formation of the three-dimensional object. In some embodiments, the estimated thermally induced change comprises an estimated volumetric change in at least a portion of the three-dimensional object. In some embodiments, the estimated thermally induced change comprises an estimated expansion or an estimated contraction in at least a portion of the three-dimensional object. In some embodiments, the estimated thermally induced change comprises an estimated change in a microstructure of at least a portion of the three-dimensional object. In some embodiments, the estimated change in the microstructure comprises an estimated change in a crystal structure. In some embodiments, the estimated change in the microstructure comprises an estimated change in a metallurgical microstructure. In some embodiments, the physics model employs an estimated thermo-mechanical change in the three-dimensional object present upon formation of the three-dimensional object. In some embodiments, the estimated thermo-mechanical change comprises an estimated thermoplastic or thermoelastic change. In some embodiments, the estimated thermo-mechanical change comprises an estimated thermo-mechanical deformation. In some embodiments, the physics model employs an estimated mechanical alteration in the three-dimensional object present upon formation of the three-dimensional object. In some embodiments, the estimated mechanical alteration comprises an estimated inelastic or elastic change. In some embodiments, inelastic change comprises plastic change. In some embodiments, the estimated mechanical alteration comprises mechanical deformation. In some embodiments, the estimated mechanical alteration comprises a set of modes. In some embodiments, the method further comprises generating a physics model employing an estimated alteration in the three-dimensional object present upon formation of the three-dimensional object. In some embodiments, the estimated alteration is a deformation. In some embodiments, the method further comprises comparing a simulated object with the test object. In some embodiments, the simulated object is generated using the physics model. In some embodiments, the method further comprises adding the one or more model markers to the geometric model. In some embodiments, the method further comprises removing the one or more model markers from the geometric model. In some embodiments, the one or more model markers comprises an induced change to the three-dimensional object. In some embodiments, the one or more model markers comprises a protrusion, a depression, or a deletion. In some embodiments, the one or more model markers comprise tessellation borders, or point clouds. In some embodiments, the one or more physical markers comprise a pore, dislocation, crack, microstructure, crystal structure, or a metallurgical morphology. In some embodiments, the one or more model markers are positioned on a surface and/or within a volume of the geometric model. In some embodiments, (b) comprises performing a data analysis. In some embodiments, the data analysis comprises at least one of: linear regression, least squares fit, Gaussian process regression, kernel regression, nonparametric multiplicative regression (NPMR), regression trees, local regression, semiparametric regression, isotonic regression, multivariate adaptive regression splines (MARS), logistic regression, robust regression, polynomial regression, stepwise regression, ridge regression, lasso regression, elasticnet regression, principal component analysis (PCA), singular value decomposition, fuzzy measure theory, Borel measure, Harr measure, risk-neutral measure, Lebesgue measure, group method of data handling (GMDH), Naive Bayes classifiers, k-nearest neighbors algorithm (k-NN), support vector machines (SVMs), neural networks, support vector machines, classification and regression trees (CART), random forest, gradient boosting, or generalized linear model (GLM) technique. In some embodiments, the forming the three-dimensional object comprises printing the three-dimensional object using three-dimensional printing. In some embodiments, the forming the three-dimensional object comprises additively or substantively forming the three-dimensional object. In some embodiments, the forming the three-dimensional object comprises extrusion, molding, or sculpting.

In another aspect, a system for forming a three-dimensional object, the system comprising one or more controllers is/are configured to direct comparing one or more model markers with one or more physical markers, which one or more model markers are disposed on and/or in a geometric model of the three-dimensional object, wherein the one or more physical markers are disposed on and/or in a test object that is formed by employing the geometric model, which one or more physical markers correspond to the one or more model markers.

In another aspect (e.g., that can be related to the one above), a system for forming a three-dimensional object, the system comprising: one or more controllers that are collectively or separately configured to direct: (a) (optionally) forming a test object using a geometric model of the three-dimensional object, and one or more model markers disposed on and/or in the geometric model of the three-dimensional object, the test object having one or more physical markers that correspond to the one or more model markers; and (b) comparing (e.g., locations, dimensions, and/or material properties of) the one or more model markers with (e.g., locations, dimensions, and/or material properties of) the one or more physical markers.

In some embodiments, the comparing is of location, shape, volume, fundamental length scale, and/or a material property. In some embodiments, at least one of the one or more controllers comprises a feed forward and/or feedback control loop. In some embodiments, at least one of the one or more controllers comprises a closed loop and/or open loop control scheme. In some embodiments, forming the three-dimensional object comprises printing the three-dimensional object using three-dimensional printing. In some embodiments, forming the three-dimensional object comprises additively or substantively forming the three-dimensional object. In some embodiments, forming the three-dimensional object comprises extrusion, molding, or sculpting. In some embodiments, the one or more controllers is further configured to direct operation (c) an energy beam to transform a pre-transformed material into a transformed material to form the three-dimensional object. In some embodiments, operation (c) is during (a). In some embodiments, at least two of the one or more controllers directing operation (a) to operation (c) are different controllers. In some embodiments, at least two of the one or more controllers directing operation (a) to operation (c) are the same controller. In some embodiments, the one or more controllers is configured to direct at least one energy source to generate and direct at least one energy beam at a pre-transformed material. In some embodiments, the one or more controllers is further configured to direct operation (d) a platform to vertically translate, which platform is configured to support the three-dimensional object. In some embodiments, operation (d) is during (a). In some embodiments, at least two of the one or more controllers directing operation (a) to operation (d) are different controllers. In some embodiments, at least two of the one or more controllers directing operation (a) to operation (d) are the same controller. In some embodiments, the system further comprises a chamber configured to enclose at least a portion of the three-dimensional object during its formation. In some embodiments, the one or more controllers is configured to monitor and/or control a progress of formation of the three-dimensional object within the chamber. In some embodiments, the system further comprises at least one sensor configured to sense the one or more physical markers. In some embodiments, the one or more controllers is configured to (i) control sensing and/or (ii) use sensing data, of the one or more physical markers. In some embodiments, the one or more controllers is configured to (i) control sensing and/or (ii) use sensing data, of the one or more physical markers during forming of the three-dimensional object. In some embodiments, the one or more controllers is configured to (i) control sensing and/or (ii) use sensing data, of the one or more physical markers after forming of the three-dimensional object. In some embodiments, the system further comprises at least one detector that is operationally coupled to the one or more controllers, the at least one detector configured to detect as least one characteristic of the forming. In some embodiments, the one or more controllers is configured to control the at least one detector and/or control one or more process parameters present upon a detection by the at least one detector. In some embodiments, the at least one detector is configured to detect a temperature during the forming of the three-dimensional object. In some embodiments, the one or more controllers is configured to control (e.g., monitor) detection of the temperature. In some embodiments, the temperature corresponds to a temperature of the three-dimensional object. In some embodiments, the temperature corresponds to a temperature of a vicinity of the three-dimensional object. In some embodiments, the vicinity is in a material bed that is configured to accommodate the three-dimensional object. In some embodiments, the temperature corresponds to a temperature of an atmosphere surrounding the three-dimensional object. In some embodiments, the at least one detector is configured to detect at least one of cleanliness, pressure, humidity, or oxygen level of an atmosphere surrounding the three-dimensional object during the forming. In some embodiments, detecting a cleanliness comprises detecting a number of particles within at least a processing cone of the atmosphere. In some embodiments, the one or more controllers comprise at least two controllers. In some embodiments, the one or more controllers is one controller. In some embodiments, the one or more controllers is configured to direct operation (e) generating a corrected geometric model using the comparing in operation (b). In some embodiments, the one or more controllers is configured to direct operation (f) forming the three-dimensional object using the corrected geometric model. In some embodiments, the one or more controllers is configured to direct repeating operations (a), (b) and (e) using iteratively adjusted geometric models and a plurality of test objects, until locations of the one or more model markers (e.g., substantially) converge with locations of the one or more physical markers. In some embodiments, the one or more controllers is configured to direct generating a physics model that employs an estimated change of at least one characteristic of the three-dimensional object resulting from the forming. In some embodiments, the system further comprises forming a simulated object employing the physics model. In some embodiments, the physics model comprises calculating a plurality of modes, each of the plurality of modes having an associated energy, each of the plurality of modes representing a plausible alteration component of the three-dimensional object during a printing operation.

In another aspect, a computer software product comprising at least one non-transitory computer-readable medium in which program instructions are stored, which program instructions, when read by at least one computer, cause the at least one computer to direct comparing one or more model markers with one or more physical markers, which one or more model markers are disposed on and/or in a geometric model of the three-dimensional object, wherein the one or more physical markers are disposed on and/or in a test object that is formed by employing the geometric model, which one or more physical markers correspond to the one or more model markers.

In another aspect (e.g., that can be related to the one above), a computer software product comprising at least one non-transitory computer-readable medium in which program instructions are stored, which program instructions, when read by at least one computer, cause the at least one computer to direct comparing (i) (e.g., locations, dimensions, and/or material properties of) one or more model markers of a geometric model that is used to form a three-dimensional test object with (ii) (e.g., locations, dimensions, and/or material properties of) one or more physical markers of a formed three-dimensional test object, wherein the one or more model markers are disposed on and/or in the geometric model of the test three-dimensional object; and the one or more physical markers correspond to the one or more model markers.

In some embodiments, the comparing is of location, shape, volume, fundamental length scale, and/or a material property. In some embodiments, the (e.g., successful) test object is a requested three-dimensional object. In some embodiments, the comparing is operation (a), and wherein the program instructions further cause the at least one computer to direct operation (b) forming the three-dimensional test object using the geometric model of the three-dimensional test object. In some embodiments, the forming in (b) further comprises the one or more model markers. In some embodiments, a non-transitory computer-readable medium causes a computer to direct operation (a) and operation (b). In some embodiments, a non-transitory computer-readable medium cause a first computer to direct operation (a) and a second computer to direct operation (b). In some embodiments, a first non-transitory computer-readable medium causes a computer to direct operation (a) and a second non-transitory computer-readable medium cause the computer to direct operation (b). In some embodiments, a first non-transitory computer-readable medium cause a first computer to direct operation (a) and a second non-transitory computer-readable medium cause a second computer to direct operation (b). In some embodiments, the program instructions cause the at least one computer to direct a feed forward and/or feedback control loop. In some embodiments, the program instructions cause the at least one computer to direct a closed loop and/or open loop control scheme. In some embodiments, operation (b) comprises printing the three-dimensional test object. In some embodiments, operation (b) comprises additively or substantively forming the three-dimensional test object. In some embodiments, operation (b) comprises extrusion, molding, or sculpting the three-dimensional test object. In some embodiments, the comparing is operation (a), wherein the program instructions further cause the at least one computer to direct: operation (c) forming a requested object while employing the comparing. In some embodiments, operation (c) comprises directing an energy beam to transform a pre-transformed material into a transformed material. In some embodiments, a non-transitory computer-readable medium cause a computer to direct at least two of operations (a), (b) and (c). In some embodiments, a non-transitory computer-readable medium cause each a different computer to direct at least two of operations (a), (b) and (c). In some embodiments, different non-transitory computer-readable mediums cause each a different computer to direct at least two of operations (a), (b) and (c). In some embodiments, the program instructions cause the at least one computer to direct: monitoring and/or controlling a progress of formation of requested object. In some embodiments, the monitoring and/or controlling comprises directing at least one sensor to (i) control sensing and/or (ii) use sensing data, relating to the one or more physical markers. In some embodiments, the monitoring and/or controlling comprises directing at least one detector to detect as least one characteristic of forming the requested object. In some embodiments, the at least one characteristic of forming the requested object comprises at least one characteristic of an energy beam. In some embodiments, the program instructions cause the at least one computer to direct: repeating operations (a) and (b) using iteratively adjusted geometric models and a plurality of three-dimensional test objects, until locations of the one or more model markers (e.g., substantially) converge with locations of the one or more physical markers. In some embodiments, the program instructions cause the at least one computer to direct: generating a physics model that employs an estimated change of at least one characteristic of the three-dimensional object resulting from forming the three-dimensional test object. In some embodiments, the program instructions cause the at least one computer to direct: forming a simulated object employing the physics model. In some embodiments, the physics model comprises calculating a plurality of modes, each of the plurality of modes having an associated energy, each of the plurality of modes representing a plausible alteration component of the three-dimensional test object during forming of the three-dimensional test object.

In another aspect, a method for generating a three-dimensional object, comprising: (A) generating a physics model that employs a geometric model of the three-dimensional object; (B) computing a plurality of modes using the physics model, each of the plurality of modes having an associated energy, each of the plurality of modes representing a plausible alteration component of the three-dimensional object during the generating; and (C) generating the three-dimensional object while employing a corrected geometric model that is generated using at least a fraction of the plurality of modes.

In another aspect (e.g., that can be related to the one above), a method for generating a three-dimensional object, comprising: (a) generating a physics model that employs a geometric model of the three-dimensional object; (b) computing a plurality of modes using the physics model, each of the plurality of modes having an associated energy, each of the plurality of modes representing a plausible alteration component of the three-dimensional object during the generating; (c) (optionally) identifying one or more prominent modes having associated energies of at most a predetermined threshold; and (d) (optionally) generating the three-dimensional object while employing a corrected geometric model that is generated using at least a fraction of the plurality of modes (e.g., that comprise the one or more prominent modes).

In some embodiments, the generating comprises printing the three-dimensional object using three-dimensional printing. In some embodiments, the generating comprises additively or substantively forming the three-dimensional object. In some embodiments, the generating comprises extrusion, molding, or sculpting. In some embodiments, computing the plurality of modes comprises using one or more singular value decomposition calculations. In some embodiments, the method further comprises generating a virtual image of a test object that is a generated three-dimensional object. In some embodiments, the generated three-dimensional object does not employ the corrected geometric model. In some embodiments, the generated three-dimensional object employs the corrected geometric model that is generated using the at least a fraction of the plurality of modes (e.g., a portion of the plurality of modes). In some embodiments, the geometric model is generated by comparing the at least a fraction of the plurality of modes (e.g., the one or more prominent modes) with the virtual image. In some embodiments, at least a fraction of the plurality of modes correspond to one or more thermomechanical modes. In some embodiments, the plurality of modes are computed employing at least one estimated alteration of the three-dimensional object. In some embodiments, the at least one estimated alteration employs an estimated mechanical alteration in the three-dimensional object. In some embodiments, the estimated mechanical alteration comprises an estimated inelastic or an estimated elastic deformation. In some embodiments, the estimated elastic deformation comprises an estimated nonlinear elastic alteration of the three-dimensional object. In some embodiments, identifying the fraction of the plurality of modes (e.g., the one or more prominent modes) comprises organizing the plurality of modes while employing their associated (e.g., relative) energies. In some embodiments, identifying the fraction of the plurality of modes (e.g., the one or more prominent modes) comprises filtering out modes having associated energies that are higher than the predetermined threshold. In some embodiments, the method further comprises adjusting the physics model employing comparing the at least a fraction of the plurality of modes with the virtual image. In some embodiments, generating the virtual image comprises scanning the test object. In some embodiments, the test object corresponds to a requested three-dimensional object. In some embodiments, the geometric model of the three-dimensional object comprises one or more model markers. In some embodiments, (a), (b), (c), or any combination thereof, occur during a three-dimensional object generation operation. In some embodiments, the three-dimensional object generation operation comprises three-dimensional printing, molding, extruding, sculpting, or carving. In some embodiments, the three-dimensional object generation operation comprises additively or substantively generating the three-dimensional object. In some embodiments, one or more of the modes materialize as a result from an elastic response to inelastic forcing during the generating of the three-dimensional object. In some embodiments, the physics model comprises an inelastic strain or elastic strain component. In some embodiments, the physics model comprises an inelastic stress or elastic stress component. In some embodiments, the physics model comprises a nonlinear stress/strain component. In some embodiments, the physics model comprises calculation of a total stress/strain in the three-dimensional object following the generating of the three-dimensional object. In some embodiments, the physics model comprises calculation of an inelastic stress/strain in the three-dimensional object following the generating of the three-dimensional object. In some embodiments, the test object manifests an inelastic response in the three-dimensional object. In some embodiments, the test object comprises an inelastic response to the generating of the three-dimensional object.

In another aspect, a system for forming a three-dimensional object, the system comprising at least one controller configured to direct: (A) generating a physics model that employs a geometric model of the three-dimensional object; (B) computing a plurality of modes using the physics model, each of the plurality of modes having an associated energy, each of the plurality of modes representing a plausible alteration component of the three-dimensional object during the forming; and (C) generating the three-dimensional object while employing a corrected geometric model that is generated using at least a fraction of the plurality of modes.

In another aspect (e.g., that can be related to the one above), a system for forming a three-dimensional object, the system comprising at least one controller configured to direct: (a) generating a physics model that employs a geometric model of the three-dimensional object; (b) computing a plurality of modes using the physics model, each of the plurality of modes having an associated energy, each of the plurality of modes representing a plausible alteration component of the three-dimensional object during the forming; (c) (optionally) identifying one or more prominent modes having associated energies of at most a predetermined threshold; and (d) (optionally) generating the three-dimensional object while employing a corrected geometric model that is generated using at least a fraction of the plurality of modes (e.g., that comprise the one or more prominent modes).

In some embodiments, at least one of the at least one controller comprises a feed forward and/or feedback control loop. In some embodiments, at least one of the at least one controller comprises a closed loop and/or open loop control scheme. In some embodiments, forming the three-dimensional object comprises printing the three-dimensional object using three-dimensional printing. In some embodiments, forming the three-dimensional object comprises additively or substantively forming the three-dimensional object. In some embodiments, forming the three-dimensional object comprises extrusion, molding, or sculpting. In some embodiments, the at least one controller is configured to direct an energy beam to transform a pre-transformed material into a transformed material to generate the three-dimensional object. In some embodiments, at least two of the at least one controller directing (a), (b), (c) or (d) are different controllers. In some embodiments, at least two of the at least one controller directing (a), (b), (c) or (d) are the same controller. In some embodiments, the at least one controller is configured to direct at least one energy source to generate and direct at least one energy beam at a pre-transformed material. In some embodiments, the at least one controller is further configured to direct (e) a platform to vertically translate, which platform is configured to support the three-dimensional object. In some embodiments, (e) is during (a) and/or (d). In some embodiments, at least two of (a), (b), (c), (d), and (e) are directed by different controllers. In some embodiments, at least two of (a), (b), (c), (d), and (e) are directed by the same controller. In some embodiments, the system further comprises a chamber configured to enclose at least a portion of the three-dimensional object during forming. In some embodiments, the at least one controller is configured to monitor and/or control a progress the forming of the three-dimensional object in the chamber. In some embodiments, the system further comprises at least one sensor configured to sense one or more physical markers of the three-dimensional object. In some embodiments, the at least one controller is configured to (i) control sensing and/or (ii) use a sensing data, of the one or more physical markers, which sensing data is obtained by the at least one sensor. In some embodiments, the at least one controller is configured to (i) control sensing and/or (ii) use a sensing data, of the one or more physical markers during forming of the three-dimensional object. In some embodiments, the at least one controller is configured to (i) control sensing and/or (ii) use a sensing data, of the one or more physical markers after forming of the three-dimensional object. In some embodiments, the system further comprises at least one detector that is operationally coupled to the at least one controller, the at least one detector configured to detect as least one characteristic of the forming. In some embodiments, the at least one controller is configured to control the at least one detector and/or control one or more process parameters present upon a detecting by the at least one detector. In some embodiments, the at least one detector is configured to detect a temperature during forming of the three-dimensional object. In some embodiments, the at least one controller is configured to control the detecting. In some embodiments, the temperature corresponds to a temperature of the three-dimensional object. In some embodiments, the temperature corresponds to a temperature of a vicinity of the three-dimensional object. In some embodiments, the temperature corresponds to a temperature of an atmosphere surrounding the three-dimensional object. In some embodiments, the at least one detector is configured to detect at least one of cleanliness, pressure, humidity, or oxygen level of an atmosphere surrounding the three-dimensional object during a forming operation. In some embodiments, detecting a cleanliness comprises detecting an amount of particles within at least a processing cone of the atmosphere. In some embodiments, the at least one controller comprises at least two controllers. In some embodiments, the at least one controller is one controller. In some embodiments, identifying the fraction of the plurality of modes (e.g., one or more prominent modes) comprises filtering out modes having associated energies that are higher than the predetermined threshold. In some embodiments, employing a corrected geometric model that is generated using the at least a fraction of the plurality of modes comprises adjusting the physics model employing comparing the at least a fraction of the plurality of modes with a virtual image of a test object.

In another aspect, a computer software product comprising at least one non-transitory computer-readable medium in which program instructions are stored, which program instructions, when read by at least one computer, cause the at least one computer to direct: (A) generating a physics model that employs a geometric model of a three-dimensional object; and (B) computing a plurality of modes using the physics model, each of the plurality of modes having an associated energy, each of the plurality of modes representing a plausible alteration component of the three-dimensional object during formation of the three-dimensional object.

In another aspect (e.g., that can be related to the one above), a computer software product comprising at least one non-transitory computer-readable medium in which program instructions are stored, which program instructions, when read by at least one computer, cause the at least one computer to direct: (a) generating a physics model that employs a geometric model of a three-dimensional object; (b) computing a plurality of modes using the physics model, each of the plurality of modes having an associated energy, each of the plurality of modes representing a plausible alteration component of the three-dimensional object during formation of the three-dimensional object; and (c) (optionally) identifying a fraction of the plurality of modes (e.g., comprising one or more prominent modes) having associated energies of at most a predetermined threshold.

In some embodiments, the plurality of modes are computed employing at least one estimated alteration of the three-dimensional object. In some embodiments, the at least a fraction of the plurality of modes correspond to one or more thermo-mechanical modes. In some embodiments, the at least one estimated alteration employs an estimated mechanical alteration in the three-dimensional object. In some embodiments, the estimated mechanical alteration comprises an estimated inelastic or an estimated elastic deformation. In some embodiments, the computer software product of the estimated elastic deformation comprises an estimated nonlinear elastic alteration of the three-dimensional object. In some embodiments, identifying the fraction of the plurality of modes (e.g., comprising the one or more prominent modes) comprises organizing the plurality of modes while employing their associated (e.g., relative and/or normalized) energies. In some embodiments, identifying the fraction of the plurality of modes (e.g., including the one or more prominent modes) comprises filtering out modes having associated energies that are higher than the predetermined threshold. In some embodiments, the computer software product further comprises adjusting the physics model employing comparing the at least a fraction of the plurality of modes (e.g., comprising the one or more prominent modes) with a virtual image of a test object. In some embodiments, the test object corresponds to a requested three-dimensional object. In some embodiments, one or more of the modes materialize as a result from an elastic response to inelastic forcing during forming of the three-dimensional object. In some embodiments, the physics model comprises an inelastic strain or elastic strain component. In some embodiments, the physics model comprises an inelastic stress or elastic stress component. In some embodiments, the physics model comprises a nonlinear stress/strain component. In some embodiments, the physics model comprises calculation of a total stress/strain in the three-dimensional object following forming of the three-dimensional object. In some embodiments, the physics model comprises calculation of an inelastic stress/strain in the three-dimensional object following forming of the three-dimensional object. In some embodiments, the geometric model of the three-dimensional object comprises one or more model markers. In some embodiments, a non-transitory computer-readable medium cause a computer to direct operations (a), (b) and (c). In some embodiments, a non-transitory computer-readable medium cause a plurality of computers to direct operations (a), (b) and (c). In some embodiments, a plurality of non-transitory computer-readable mediums cause a computer to direct operations (a), (b) and (c). In some embodiments, a plurality of non-transitory computer-readable medium cause a plurality of computers to direct operations (a), (b) and operation (c). In some embodiments, the program instructions further cause the at least one computer to direct operation (d) forming the three-dimensional object. In some embodiments, operation (d) comprises printing the three-dimensional object using three-dimensional printing. In some embodiments, operation (d) comprises additively or substantively forming the three-dimensional object. In some embodiments, operation (d) comprises extrusion, molding, or sculpting the three-dimensional object. In some embodiments, operation (d) comprises directing an energy beam to transform a pre-transformed material into a transformed material. In some embodiments, forming the three-dimensional object is while employing a corrected geometric model that is generated using at least a fraction of the plurality of modes. In some embodiments, a non-transitory computer-readable medium cause a computer to direct at least two of operations (a), (b), (c) and (d). In some embodiments, different non-transitory computer-readable mediums cause a computer to direct at least two of operations (a), (b), (c) and (d). In some embodiments, different non-transitory computer-readable mediums cause different computers to direct at least two of operations (a), (b), (c) and (d). In some embodiments, different non-transitory computer-readable mediums cause a computer to direct at least three of operations (a), (b), (c) and (d). In some embodiments, the program instructions cause the at least one computer to direct a feed forward and/or feedback control loop. In some embodiments, the program instructions cause the at least one computer to direct a closed loop and/or open loop control scheme. In some embodiments, the program instructions cause the at least one computer to direct: monitoring and/or controlling a progress of forming the three-dimensional object. In some embodiments, the monitoring and/or controlling comprises directing at least one sensor to (i) control sensing and/or (ii) use sensing data, of one or more physical markers of the three-dimensional object. In some embodiments, the monitoring and/or controlling comprises directing at least one detector to detect as least one characteristic of forming a requested object.

In another aspect, a method for forming a three-dimensional object, comprises adjusting a physics model to form an adjusted physics model, which physical model employs an estimated alteration in the three-dimensional object present upon formation of the three-dimensional object, which adjusting is while employing a comparison between (i) a simulated object and (ii) an image of a test object that is formed using programmed (e.g., computer) instructions, which programmed instructions employ (I) a geometric model of the three-dimensional object, (II) a material property of the three-dimensional object, or (Ill) any combination thereof, wherein the simulated object is generated using the physics model, wherein (1) the test object comprises one or more markers, (2) the physics model comprises a plurality of modes each of which represents a plausible alteration component of the three-dimensional object present upon formation of the three-dimensional object, or (3) any combination of (1) and (2).

In another aspect (e.g., that can be related to the one above), a method for forming a three-dimensional object, comprises: (a) generating a simulated object using a physics model that employs an estimated alteration in the three-dimensional object present upon formation of the three-dimensional object; (b) forming a test object while employing the physics model, wherein (1) the test object comprises one or more markers, (2) the physics model comprises a plurality of modes each of which represents a plausible alteration component of the three-dimensional object present upon formation of the three-dimensional object, or (3) any combination of (1) and (2); and (c) adjusting the physics model to form an adjusted physics model, which adjusting is while employing a comparison between (i) the simulated object and (ii) an image of the test object that is formed using programmed (e.g., computer) instructions, which programmed instructions employ (I) a geometric model of the three-dimensional object, (II) a material property of the three-dimensional object, or (Ill) any combination thereof.

In some embodiments, the forming comprises printing (e.g., the three-dimensional object) using three-dimensional printing. In some embodiments, the forming comprises additively or substantively forming the three-dimensional object. In some embodiments, the forming comprises extrusion, molding, or sculpting. In some embodiments, adjusting the physics model is continuous. In some embodiments, the adjusting in operation (c) is a learning module. In some embodiments, the learning module comprises an inelastic response to generating the three-dimensional object. In some embodiments, the learning module comprises a learning algorithm. In some embodiments, the method further comprises operation (d) generating the three-dimensional object using program (e.g., computer) instruction employing the adjusted physics model. In some embodiments, the generated three-dimensional object is a requested three-dimensional object. In some embodiments, the comparison employs comparing at least one predicted deformation of the simulated object with at least one deformation of the test object. In some embodiments, adjusting the physics model is iterative. In some embodiments, the method further comprises iteratively repeating operations (a), (b) and (c). In some embodiments, the method further comprises iteratively repeating operations (a), (b) and (c) until one or more dimensions of the test object corresponds to an acceptable dimensional accuracy range relating to a requested three-dimensional object. In some embodiments, the method that is acceptable is determined by industrial standard. In some embodiments, the industrial standard relates to the three-dimensional object. In some embodiments, the industrial standard relates to an industry in which the three-dimensional object is to be used. In some embodiments, the industrial standard relates to an intended use of the three-dimensional object. In some embodiments, the acceptable dimensional accuracy range corresponds to a predetermined threshold range. In some embodiments, the comparison employs performing at least one of: linear regression, least squares fit, Gaussian process regression, kernel regression, nonparametric multiplicative regression (NPMR), regression trees, local regression, semiparametric regression, isotonic regression, multivariate adaptive regression splines (MARS), logistic regression, robust regression, polynomial regression, stepwise regression, ridge regression, lasso regression, elasticnet regression, principal component analysis (PCA), singular value decomposition, fuzzy measure theory, Borel measure, Harr measure, risk-neutral measure, Lebesgue measure, group method of data handling (GMDH), Naive Bayes classifiers, k-nearest neighbors algorithm (k-NN), support vector machines (SVMs), neural networks, support vector machines, classification and regression trees (CART), random forest, gradient boosting, or generalized linear model (GLM) technique. In some embodiments, the comparison comprises performing a regression analysis. In some embodiments, the regression analysis comprises a least squares fit analysis. In some embodiments, the image of the test object is a virtual three-dimensional image. In some embodiments, the image of the test object is a computer generated three-dimensional image. In some embodiments, the test object is formed using a three-dimensional printing operation. In some embodiments, the test object is generated using a molding operation. In some embodiments, the test object is generated using a machining operation. In some embodiments, the test object is generated using a sculpting. In some embodiments, the test object comprises additive generation. In some embodiments, the test object comprises subtractive generation. In some embodiments, the image of the test object comprises image markers corresponding to physical markers of the test object. In some embodiments, the estimated alteration employs a predicted change of at least one characteristic of the three-dimensional object. In some embodiments, the estimated alteration employs at least one physics-based calculation. In some embodiments, the estimated alteration employs a thermo-mechanical analysis, the material property of the three-dimensional object, continuum mechanics, at least one characteristic of an energy beam, the geometric model of the three-dimensional object, or any suitable combination thereof. In some embodiments, the physics model includes modes. In some embodiments, the modes correspond to predicted elastic deformation modes of the three-dimensional object. In some embodiments, the physics model is a reduced physics model. In some embodiments, the physics model is an expanded physics model. In some embodiments, at least one of operations (a), (b) and (c) occurs during the forming. In some embodiments, at least two of operations (a), (b) and (c) occur during the forming. In some embodiments, operations (a), (b) and (c) occur during the forming.

In another aspect, a system for forming a three-dimensional object, the system comprising at least one controller configured to direct adjusting a physics model to form an adjusted physics model, which physical model employs an estimated alteration in the three-dimensional object present upon formation of the three-dimensional object, which adjusting is while employing a comparison between (i) the simulated object and (ii) an image of the test object that is formed using instructions, which instructions employ (I) a geometric model of the three-dimensional object, (II) a material property of the three-dimensional object, or (Ill) any combination thereof, wherein the simulated object is generated using the physics model, wherein (1) the test object comprises one or more markers, (2) the physics model comprises a plurality of modes each of which represents a plausible alteration component of the three-dimensional object present upon formation of the three-dimensional object, or (3) any combination of (1) and (2).

In another aspect (e.g., that can be related to the one above), a system for forming a three-dimensional object, the system comprising at least one controller configured to direct: (a) generating a simulated object using a physics model employing an estimated alteration in the three-dimensional object present upon formation of the three-dimensional object; (b) generating a test object while employing the physics model, wherein (1) the test object comprises one or more markers, (2) the physics model comprises a plurality of modes each of which representing a plausible alteration component of the three-dimensional object during the forming, or (3) any combination of (1) and (2); and (c) adjusting the physics model to form an adjusted physics model, which adjusting is while employing a comparison between (i) the simulated object and (ii) an image of the test object that is formed using instructions, which instructions employ (1) a geometric model of the three-dimensional object, (II) a material property of the three-dimensional object, or (Ill) any combination thereof.

In some embodiments, at least one of the at least one controller comprises a feed forward and/or feedback control loop. In some embodiments, at least one of the at least one controller comprises a closed loop and/or open loop control scheme. In some embodiments, forming the three-dimensional object comprises printing the three-dimensional object using three-dimensional printing. In some embodiments, forming the three-dimensional object comprises additively or substantively forming the three-dimensional object. In some embodiments, forming the three-dimensional object comprises extrusion, molding, or sculpting. In some embodiments, the at least one controller is configured to direct an energy beam to transform a pre-transformed material into a transformed material to generate the three-dimensional object. In some embodiments, at least two of operations (a), (b) and (c) are controlled by at least two different controllers. In some embodiments, at least two of operations (a), (b) and (c) are controlled by one controller. In some embodiments, the at least one controller is configured to direct at least one energy source to generate and direct at least one energy beam at a pre-transformed material. In some embodiments, the at least one controller is further configured to direct a platform to vertically translate, which platform is configured to support the three-dimensional object. In some embodiments, directing the platform is during forming of the three-dimensional object. In some embodiments, the system further comprises a chamber configured to enclose at least a portion of the three-dimensional object during forming. In some embodiments, the at least one controller is configured to monitor and/or control a progress of the forming within the chamber. In some embodiments, the system further comprises at least one sensor configured to sense one or more physical markers of the three-dimensional object. In some embodiments, the at least one controller is configured to (i) control sensing and/or (ii) use sensing data, of the one or more physical markers. In some embodiments, the at least one controller is configured to (i) control sensing and/or (ii) use sensing data, of the one or more physical markers during forming of the three-dimensional object. In some embodiments, the at least one controller is configured to (i) control sensing and/or (ii) use sensing data, of the one or more physical markers after forming of the three-dimensional object. In some embodiments, the system further comprises at least one detector that is operationally coupled to the at least one controller, the at least one detector configured to detect as least one characteristic of the forming. In some embodiments, the at least one controller is configured to control the at least one detector and/or control one or more process parameters present upon detecting by the at least one detector. In some embodiments, the at least one detector is configured to detect a temperature during forming of the three-dimensional object. In some embodiments, the at least one controller is configured to control (e.g., monitor) detection of the temperature. In some embodiments, the temperature corresponds to a temperature of the three-dimensional object. In some embodiments, the temperature corresponds to a temperature of an atmosphere surrounding the three-dimensional object. In some embodiments, the temperature corresponds to a temperature of a vicinity of the three-dimensional object. In some embodiments, the vicinity is in a material bed that is configured to accommodate the three-dimensional object. In some embodiments, the at least one detector is configured to detect at least one of cleanliness, pressure, humidity, or oxygen level of an atmosphere surrounding the three-dimensional object during the forming. In some embodiments, detecting a cleanliness comprises detecting an amount of particles within at least a processing cone of the atmosphere. In some embodiments, the at least one controller comprises at least two controllers. In some embodiments, the at least one controller is one controller. In some embodiments, the at least one controller is configured to direct iteratively repeating operations (a), (b) and (c). In some embodiments, the at least one controller is configured to direct iteratively repeating operations (a), (b) and (c) until one or more dimensions of the test object corresponds to an acceptable dimensional accuracy range relating to a requested three-dimensional object. In some embodiments, the comparison employs performing at least one of: linear regression, least squares fit, Gaussian process regression, kernel regression, nonparametric multiplicative regression (NPMR), regression trees, local regression, semiparametric regression, isotonic regression, multivariate adaptive regression splines (MARS), logistic regression, robust regression, polynomial regression, stepwise regression, ridge regression, lasso regression, elasticnet regression, principal component analysis (PCA), singular value decomposition, fuzzy measure theory, Borel measure, Harr measure, risk-neutral measure, Lebesgue measure, group method of data handling (GMDH), Naive Bayes classifiers, k-nearest neighbors algorithm (k-NN), support vector machines (SVMs), neural networks, support vector machines, classification and regression trees (CART), random forest, gradient boosting, or generalized linear model (GLM) technique.

In another aspect, a computer software product comprising at least one non-transitory computer-readable medium in which program instructions are stored, which program instructions, when read by at least one computer, cause the at least one computer to direct adjusting a physics model to form an adjusted physics model, which physical model employs an estimated alteration in the three-dimensional object present upon formation of the three-dimensional object, which adjusting is while employing a comparison between (i) a simulated object and (ii) an image of a test object that is formed using programmed (e.g., computer) instructions, which programmed instructions employ (I) a geometric model of the three-dimensional object, (II) a material property of the three-dimensional object, or (Ill) any combination thereof, wherein the simulated object is generated using the physics model, wherein (1) the test object comprises one or more markers, (2) the physics model comprises a plurality of modes each of which represents a plausible alteration component of the three-dimensional object present upon formation of the three-dimensional object, or (3) any combination of (1) and (2).

In another aspect (e.g., that can be related to the one above), a computer software product comprising at least one non-transitory computer-readable medium in which program instructions are stored, which program instructions, when read by at least one computer, cause the at least one computer to direct: generating a simulated object using a physics model employing an estimated alteration in a three-dimensional object present upon formation of the three-dimensional object; forming an adjusted physics model by adjusting the physics model, which employs a comparison between (i) the simulated object and (ii) an image of a test object formed using forming instructions, which forming instructions employ (I) a geometric model of the three-dimensional object, (II) a material property of the three-dimensional object, or (Ill) a combination of (I) and (II), wherein (1) the test object comprises one or more markers, (2) the physics model comprises a plurality of modes each of which representing a plausible alteration component of the three-dimensional object during the forming, or (3) a combination of (1) and (2), wherein the forming instructions are programed (e.g., computer) instructions.

In some embodiments, the program instructions further cause the at least one computer to direct: forming the test object while employing the physics model. In some embodiments, generating a simulated object is operation (a), forming an adjusted physics model is operation (b), and forming the test object is operation (c), wherein the program instructions further cause the at least one computer to direct: iteratively repeating operations (a), (b) and (c) until one or more dimensions of the test object corresponds to an acceptable dimensional accuracy range relating to a requested three-dimensional object. In some embodiments, forming the test object comprises printing the three-dimensional object using three-dimensional printing. In some embodiments, forming the test object comprises additively or substantively forming the three-dimensional object. In some embodiments, forming the test object comprises extrusion, molding, or sculpting the three-dimensional object. In some embodiments, the program instructions cause the at least one computer to direct a feed forward and/or feedback control loop. In some embodiments, the program instructions cause the at least one computer to direct a closed loop and/or open loop control scheme. In some embodiments, adjusting the physics model is continuous. In some embodiments, the computer software product is continuous in real time and occurs during at least a fraction of the formation of the test object (e.g., is continuous in at least a fraction of the formation). In some embodiments, the printing comprises using an energy beam. In some embodiments, the program instructions cause the at least one computer to direct an energy beam to transform a pre-transformed material into a transformed material to generate the three-dimensional object and/or the test object. In some embodiments, generating a simulated object is operation (a), and forming an adjusted physics model is operation (b). In some embodiments, the at least one non-transitory computer-readable medium causes at least computer to direct operations (a) and (b) individually or collectively. In some embodiments, a non-transitory computer-readable medium causes a computer to direct operations (a) and (b). In some embodiments, a non-transitory computer-readable medium causes a first computer to direct operation (a) and a second computer to direct operation (b), wherein the first computer is different from the second computer. In some embodiments, a first non-transitory computer-readable medium cause a computer to direct operation (a) and a second non-transitory computer-readable medium cause the computer to direct operation (b), wherein the first non-transitory computer-readable medium is different from the second non-transitory computer-readable medium. In some embodiments, a first non-transitory computer-readable medium cause a first computer to direct operation (a) and a second non-transitory computer-readable medium cause a second computer to direct operation (b), wherein the first non-transitory computer-readable medium is different from the second non-transitory computer-readable medium, and wherein the first computer is different from the second computer. In some embodiments, the program instructions further cause the at least one computer to direct: iteratively repeating operations (a) and (b). In some embodiments, the comparison employs performing at least one of: linear regression, least squares fit, Gaussian process regression, kernel regression, nonparametric multiplicative regression (NPMR), regression trees, local regression, semiparametric regression, isotonic regression, multivariate adaptive regression splines (MARS), logistic regression, robust regression, polynomial regression, stepwise regression, ridge regression, lasso regression, elasticnet regression, principal component analysis (PCA), singular value decomposition, fuzzy measure theory, Borel measure, Harr measure, risk-neutral measure, Lebesgue measure, group method of data handling (GMDH), Naive Bayes classifiers, k-nearest neighbors algorithm (k-NN), support vector machines (SVMs), neural networks, support vector machines, classification and regression trees (CART), random forest, gradient boosting, or generalized linear model (GLM) technique. In some embodiments, the estimated alteration employs a thermo-mechanical analysis, a material property of the three-dimensional object, continuum mechanics, at least one characteristic of an energy beam used to form the three-dimensional object, the geometric model of the three-dimensional object, or any suitable combination thereof.

In another aspect, a method for determining a strain and/or a stress in a three-dimensional object, comprising: (A) computing a plurality of modes employing a geometric model of a requested three-dimensional object, the plurality of modes employing an estimated mechanical alteration of the geometric model generated during formation of the three-dimensional object, each of the plurality of modes representing a plausible alteration component of the three-dimensional object during a forming of the three-dimensional object; (B) generating image data from the three-dimensional object; and (C) calculating the strain and/or the stress in the three-dimensional object by comparing the plurality of modes with the image data, wherein the three-dimensional object is formed while employing the geometric model.

In another aspect (e.g., relating to the above aspect), a method for determining a strain and/or a stress in a three-dimensional object, comprising: (a) computing a plurality of modes employing a geometric model of a requested three-dimensional object, the plurality of modes employing an estimated mechanical alteration of the geometric model generated during formation of the three-dimensional object, each of the plurality of modes representing a plausible alteration component of the three-dimensional object during a forming of the three-dimensional object; (b) (optionally) forming the three-dimensional object while employing the geometric model; (c) generating image data from the three-dimensional object; and (d) calculating the strain and/or the stress in the three-dimensional object by comparing the plurality of modes with the image data.

In some embodiments, each of the plurality of modes is associated with an energy, the method further comprises identifying a fraction of the plurality of modes (e.g., one or more prominent modes) from the plurality of modes. In some embodiments, identifying comprises employing the associated energy of each of the plurality of modes. In some embodiments, the fraction of the plurality of modes (e.g., one or more prominent modes) have associated energies of at most a predetermined threshold. In some embodiments, the forming comprises printing (e.g., the three-dimensional object) using three-dimensional printing. In some embodiments, the forming comprises additively or substantively forming the three-dimensional object. In some embodiments, the forming comprises extrusion, molding, or sculpting. In some embodiments, the estimated mechanical alteration is predicted by one or more nonlinear mechanical strain modes. In some embodiments, the one or more nonlinear mechanical strain modes comprise elastic or inelastic strain modes. In some embodiments, alteration comprises deformation. In some embodiments, the method further comprises identifying a fraction of the plurality of modes (e.g., one or more prominent modes) from the plurality of modes. In some embodiments, the fraction of the plurality of modes have associated energies of at most a predetermined threshold. In some embodiments, the method further comprises calculating a strain by comparing at least a fraction of the plurality of modes with image data. In some embodiments, the image data corresponds to a virtual image. In some embodiments, the method further comprises forming a requested three-dimensional object while employing a corrected geometric model that is generated using the at least a fraction of the plurality of modes. In some embodiments, computing the plurality of modes comprises using one or more calculations using at least one of singular value decomposition, Kosambi-Karhunen-Loève transform (KLT), Hotelling transform, proper orthogonal decomposition (POD), eigenvalue decomposition (EVD), factor analysis, Eckart-Young theorem, Schmidt-Mirsky theorem, empirical orthogonal functions (EOF), empirical eigenfunction decomposition, empirical component analysis, quasiharmonic modes, spectral decomposition, or empirical modal analysis. In some embodiments, comparing the at least a fraction of the plurality of modes with the image data comprises comparing at least one type of characteristic of the one or more image markers of the image data with corresponding at least one type of characteristic (e.g., location, shape, volume, microstructure, or FLS) of the at least a fraction of the plurality of modes. In some embodiments, comparing the at least a fraction of the plurality of modes with the image data comprises comparing locations of one or more image markers of the image data with corresponding locations of the at least a fraction of the plurality of modes. In some embodiments, the method further comprises obtaining the image data by scanning the three-dimensional object using a scanner. In some embodiments, calculating the strain comprises calculating an inelastic strain, an elastic strain, or a total strain. In some embodiments, the calculating comprises using a distribution of the plurality of modes. In some embodiments, calculating the strain comprises calculating the inelastic strain. In some embodiments, calculating the stress comprises calculating an inelastic stress, an elastic stress, or a total stress. In some embodiments, the calculating the stress comprises using a distribution of the plurality of modes. In some embodiments, calculating the stress comprises calculating the inelastic stress.

In another aspect, a system for forming a three-dimensional object, the system comprising at least one controller configured to direct: (A) computing a plurality of modes employing a geometric model of a requested three-dimensional object, the plurality of modes employing estimated mechanical alteration of the geometric model generated during formation of the three-dimensional object, each of the plurality of modes representing a plausible alteration component of the three-dimensional object during a forming operation; (B) generating image data from the three-dimensional object; and (C) calculating a strain and/or a stress in the three-dimensional object by comparing the plurality of modes with the image data, wherein the three-dimensional object is formed while employing the geometric model.

In another aspect (e.g., that can be related to the above aspect), a system for forming a three-dimensional object, the system comprising at least one controller configured to direct: (a) computing a plurality of modes employing a geometric model of a requested three-dimensional object, the plurality of modes employing estimated mechanical alteration of the geometric model generated during formation of the three-dimensional object, each of the plurality of modes representing a plausible alteration component of the three-dimensional object during a forming operation; (b) (optionally) forming the three-dimensional object while employing the geometric model; (c) generating image data from the three-dimensional object; and (d) calculating a strain and/or a stress in the three-dimensional object by comparing the plurality of modes with the image data.

In some embodiments, at least one of the at least one controller comprises a feed forward and/or feedback control loop. In some embodiments, at least one of the at least one controller comprises a closed loop and/or open loop control scheme. In some embodiments, forming the three-dimensional object comprises printing the three-dimensional object using three-dimensional printing. In some embodiments, forming the three-dimensional object comprises additively or substantively forming the three-dimensional object. In some embodiments, forming the three-dimensional object comprises extrusion, molding, or sculpting. In some embodiments, the at least one controller is configured to direct an energy beam to transform a pre-transformed material into a transformed material to generate the three-dimensional object. In some embodiments, at least two of operations (a), (b), (c) and (d) are controlled by at least two different controllers. In some embodiments, at least two of operations (a), (b), (c) and (d) are controlled by one controller. In some embodiments, the at least one controller is configured to direct at least one energy source to generate and direct at least one energy beam at a pre-transformed material. In some embodiments, the at least one controller is further configured to direct operation (k) a platform to vertically translate, which platform is configured to support the three-dimensional object. In some embodiments, operation (k) is during forming of the three-dimensional object. In some embodiments, the system further comprises a chamber configured to enclose at least a portion of the three-dimensional object during forming. In some embodiments, the at least one controller is configured to monitor and/or control a progress of the forming within the chamber. In some embodiments, the system further comprises at least one sensor configured to sense one or more physical markers of the three-dimensional object. In some embodiments, the at least one controller is configured to (i) control sensing and/or (ii) use sensing data, of the one or more physical markers. In some embodiments, the at least one controller is configured to (i) control sensing and/or (ii) use sensing data, of the one or more physical markers during forming of the three-dimensional object. In some embodiments, the at least one controller is configured to (i) control sensing and/or (ii) use sensing data, of the one or more physical markers after forming of the three-dimensional object. In some embodiments, the system further comprises at least one detector that is operationally coupled to the at least one controller, the at least one detector configured to detect as least one characteristic of the forming. In some embodiments, the at least one controller is configured to control the at least one detector and/or control one or more process parameters present upon detecting by the at least one detector. In some embodiments, the at least one detector is configured to detect a temperature during forming of the three-dimensional object. In some embodiments, the at least one controller is configured to control (e.g., monitor) detection of the temperature. In some embodiments, the temperature corresponds to a temperature of the three-dimensional object. In some embodiments, the temperature corresponds to a temperature of a vicinity of the three-dimensional object. In some embodiments, the vicinity is in a material bed that is configured to accommodate the three-dimensional object. In some embodiments, the temperature corresponds to a temperature of an atmosphere surrounding the three-dimensional object. In some embodiments, the at least one detector is configured to detect at least one of cleanliness, pressure, humidity, or oxygen level of an atmosphere surrounding the three-dimensional object during forming. In some embodiments, detecting a cleanliness comprises detecting an amount of particles within at least a processing cone of the atmosphere. In some embodiments, the at least one controller comprises at least two controllers. In some embodiments, the at least one controller is one controller. In some embodiments, each of the plurality of modes is associated with an energy, the method further comprises identifying a fraction of the plurality of modes (e.g., comprising one or more prominent modes) from the plurality of modes. In some embodiments, identifying comprises employing the associated energy of each of the plurality of modes. In some embodiments, the at least a fraction of the plurality of modes (e.g., comprising the one or more prominent modes) have associated energies. In some embodiments, the fraction of the plurality of modes have associated energies of at most a predetermined threshold. In some embodiments, computing the plurality of modes comprises using one or more calculations using at least one of singular value decomposition, Kosambi-Karhunen-Loève transform (KLT), Hotelling transform, proper orthogonal decomposition (POD), eigenvalue decomposition (EVD), factor analysis, Eckart-Young theorem, Schmidt-Mirsky theorem, empirical orthogonal functions (EOF), empirical eigenfunction decomposition, empirical component analysis, quasiharmonic modes, spectral decomposition, or empirical modal analysis. In some embodiments, calculating the strain comprises calculating an inelastic strain, an elastic strain, or a total strain. In some embodiments, calculating the strain comprises calculating the inelastic strain. In some embodiments, calculating the stress comprises calculating an inelastic stress, an elastic stress, or a total stress. In some embodiments, calculating the stress comprises calculating the inelastic stress.

In another aspect, a computer software product comprising at least one non-transitory computer-readable medium in which program instructions are stored, which program instructions, when read by at least one computer, cause the at least one computer to direct: computing a plurality of modes employing a geometric model of a requested three-dimensional object, the plurality of modes employing an estimated mechanical alteration of the geometric model generated during formation of a three-dimensional object, each of the plurality of modes representing a plausible alteration component of the three-dimensional object during a forming operation; and calculating a strain and/or a stress in a three-dimensional object formed while employing the geometric model of the requested three-dimensional object, wherein the calculating comprises comparing the plurality of modes with image data associated with the three-dimensional object.

In some embodiments, computing the plurality of modes is operation (a) and calculating the strain and/or the stress is operation (b). In some embodiments, a non-transitory computer-readable medium cause a computer to direct (a) and (b). In some embodiments, a non-transitory computer-readable medium cause a computer to direct (a) and (b). In some embodiments, a non-transitory computer-readable medium cause a first computer to direct (a) and a second computer to direct (b). In some embodiments, a first non-transitory computer-readable medium causes a computer to direct (a) and a second non-transitory computer-readable medium causes the computer to direct (b). In some embodiments, a first non-transitory computer-readable medium causes a first computer to direct (a) and a second non-transitory computer-readable medium causes a second computer to direct (b), wherein the first computer is different from the second computer, wherein the first non-transitory computer-readable medium is different from the second non-transitory computer-readable medium. In some embodiments, the program instructions further cause the at least one computer to direct forming the three-dimensional object while employing the geometric model. In some embodiments, computing the plurality of modes is operation (a), and calculating the strain and/or the stress is (b), and forming the three-dimensional object is operation (c). In some embodiments, a non-transitory computer-readable medium causes a computer to direct at least two of (a), (b) and (c). In some embodiments, a non-transitory computer-readable medium causes different computers to direct at least two of (a), (b) and (c). In some embodiments, a plurality of non-transitory computer-readable mediums cause a computer to direct at least two of (a), (b) and (c). In some embodiments, a plurality of non-transitory computer-readable medium cause a plurality of computers, respectively, to direct at least two of (a), (b) and (c). In some embodiments, the first computer is different from the second computer, wherein the first non-transitory computer-readable medium is different from the second non-transitory computer-readable medium. In some embodiments, the program instructions further cause the at least one computer to direct generating the image data from the three-dimensional object. In some embodiments, the program instructions further cause the at least one computer to direct a feed forward and/or feedback control loop. In some embodiments, the program instructions further cause the at least one computer to direct a closed loop and/or open loop control scheme. In some embodiments, forming the three-dimensional object comprises printing the three-dimensional object using three-dimensional printing. In some embodiments, forming the three-dimensional object comprises additively or substantively forming the three-dimensional object. In some embodiments, forming the three-dimensional object comprises extrusion, molding, or sculpting. In some embodiments, the estimated mechanical alteration is predicted by one or more nonlinear mechanical strain modes. In some embodiments, the one or more nonlinear mechanical strain modes comprise elastic or inelastic strain modes. In some embodiments, alteration comprises deformation. In some embodiments, the computer software product further comprises identifying a fraction of the plurality of modes (e.g., one or more prominent modes) from the plurality of modes. In some embodiments, the fraction of the plurality of modes have associated energies of at most a predetermined threshold. In some embodiments, computing the plurality of modes comprises using one or more calculations using at least one of singular value decomposition, Kosambi-Karhunen-Loève transform (KLT), Hotelling transform, proper orthogonal decomposition (POD), eigenvalue decomposition (EVD), factor analysis, Eckart-Young theorem, Schmidt-Mirsky theorem, empirical orthogonal functions (EOF), empirical eigenfunction decomposition, empirical component analysis, quasiharmonic modes, spectral decomposition, or empirical modal analysis. In some embodiments, calculating the strain comprises calculating an inelastic strain, an elastic strain, or a total strain. In some embodiments, calculating the strain comprises calculating the inelastic strain. In some embodiments, calculating the stress comprises calculating an inelastic stress, an elastic stress, or a total stress. In some embodiments, calculating the stress comprises calculating the inelastic stress.

In another aspect, a method for calibrating a system for forming a three-dimensional object, comprising: (A) comparing one or more dimensions of a first three-dimensional object with one or more dimensions of a second three-dimensional object respectively, wherein the first three-dimensional object is formed using a first system by employing a first set of forming instructions comprising a first physics model, and a first geometric model, wherein the second three-dimensional object is formed employing a second set of forming instructions comprising a second physics model, and a second geometric model, wherein the first geometric model is similar to the second geometric model; and (B) based on the comparing, (i) adjusting the second physics model to differentiate the second set of forming instructions from the first set of forming instructions, (ii) adjusting the second geometric model to differentiate the second set of forming instructions from the first set of forming instructions, (iii) adjusting at least one hardware component of a system that forming the second three-dimensional object, or any combination of (i), (ii), and (iii), such that the first three-dimensional object is (e.g., substantially) identical to the second three-dimensional object, wherein the first and/or second set of forming instructions are programmed (e.g., computer) instructions.

In another aspect (e.g., that can be related to the one above), a method for calibrating a system for forming a three-dimensional object, comprising: (a) (optionally) using a first system for forming a first three-dimensional object using a first set of forming instructions comprising a first physics model, and a first geometric model; (b) (optionally) forming a second three-dimensional object using a second set of forming instructions comprising a second physics model, and a second geometric model, wherein the first geometric model is equal to the second geometric model; (c) comparing one or more dimensions of the first three-dimensional object with the second three-dimensional object respectively; and (d) based on the comparing, (i) adjusting the second physics model to differentiate the second set of forming instructions from the first set of forming instructions, (ii) adjusting the second geometric model to differentiate the second set of forming instructions from the first set of forming instructions, (iii) adjusting at least one hardware component of a system that forming the second three-dimensional object, or any combination of (i), (ii), and (iii), such that the first three-dimensional object is (e.g., substantially) identical to the second three-dimensional object, wherein the first and/or second set of forming instructions are programmed (e.g., computer) instructions.

In some embodiments, the first and/or second physics model includes physics-based calculations related to a plurality of modes. In some embodiments, the plurality of modes correspond to estimated mechanical alteration in the first and/or the second three-dimensional object that are brought about during their respective forming. In some embodiments, the plurality of modes correspond to an estimated elastic alteration, an inelastic alteration, or an elastic and an inelastic alteration in the first and/or the second three-dimensional object brought about during their respective forming. In some embodiments, at least one of the plurality of modes corresponds to Eigenstrain modes. In some embodiments, at least one of the plurality of modes corresponds to at least one prominent modes. In some embodiments, the first set of forming instructions comprise a first set of non-transitory computer readable instructions, and wherein the second set of forming instruction comprise a second set of non-transitory computer readable instructions. In some embodiments, the method further comprises adjusting the second non-transitory computer readable instructions to differentiate the second set from the first set of forming instructions. In some embodiments, adjusting the second physics model comprises adjusting one or more parameters of a physics-based calculation. In some embodiments, the physics-based calculation comprises thermo-mechanical related calculations. In some embodiments, the physics-based calculation comprises thermo-elastic, thermo-plastic, or flow-dynamics related calculations. In some embodiments, the first set of forming instructions comprises a first corrected geometric model. In some embodiments, the first geometric model is a first corrected geometric model with respect to a requested three-dimensional object; and wherein the first three-dimensional object is (e.g., substantially) similar to the requested three-dimensional object. In some embodiments, the second set of forming instructions comprises a second corrected geometric model. In some embodiments, the second geometric model is a second corrected geometric model with respect to a requested three-dimensional object; and wherein the second three-dimensional object is (e.g., substantially) similar to the requested three-dimensional object. In some embodiments, comparing one or more dimensions of the first three-dimensional object with respective one or more dimensions of the second three-dimensional object comprises comparing a first image of the first three-dimensional object with a second image of the second three-dimensional object. In some embodiments, the first image and/or second image is a virtual image. In some embodiments, the forming comprises printing (e.g., the first and/or second three-dimensional object) using three-dimensional printing. In some embodiments, the forming comprises additively or substantively forming the three-dimensional object. In some embodiments, the forming comprises extrusion, molding, or sculpting.

In another aspect, a system for forming a three-dimensional object, the system comprising at least one controller configured to collectively or separately direct: (a) comparing one or more dimensions of a first three-dimensional object with respective ones of a second three-dimensional object; and wherein the first three-dimensional object is formed using a first set of forming instructions comprising a first physics model, and a first geometric model; wherein the second three-dimensional object is formed using a second set of forming instructions comprising a second physics model, and a second geometric model, wherein the first geometric model is equal to the second geometric model; (b) based on the comparing, (i) adjusting the second physics model to differentiate the second set of forming instructions from the first set of forming instructions, (ii) adjusting the second geometric model to differentiate the second set of forming instructions from the first set of forming instructions, (iii) adjusting at least one hardware component of a system that forms the second three-dimensional object, or any combination of (i), (ii), and (iii), such that the first three-dimensional object is (e.g., substantially) identical to the second three-dimensional object, wherein the first and/or second set of forming instructions are programmed (e.g., computer) instructions.

In some embodiments, at least one of the at least one controller comprises a feed forward and/or feedback control loop. In some embodiments, at least one of the at least one controller comprises a closed loop and/or open loop control scheme. In some embodiments, the first set of forming instructions comprise a first set of non-transitory computer readable instructions, and wherein the second set of forming instruction comprise a second set of non-transitory computer readable instructions. In some embodiments, the system further comprises adjusting the second non-transitory computer readable instructions to differentiate the second set from the first set of forming instructions. In some embodiments, the first three-dimensional object and the second three-dimensional object are formed using three-dimensional printing at least in part. In some embodiments, the first three-dimensional object and the second three-dimensional object are formed using additive and/or substantive formation of the three-dimensional object. In some embodiments, the first three-dimensional object and the second three-dimensional object are formed using extrusion, molding, and/or sculpting. In some embodiments, the at least one controller is configured to direct an energy beam to transform a pre-transformed material into a transformed material to generate the three-dimensional object. In some embodiments, operations (a), and (b) are controlled by at least two different controllers. In some embodiments, operations (a), and (b) are controlled by one controller. In some embodiments, the at least one controller is configured to direct at least one energy source to generate and direct at least one energy beam at a pre-transformed material. In some embodiments, the at least one controller is configured to direct a first platform to vertically translate, which first platform is configured to support the first three-dimensional object. In some embodiments, directing the first platform is during formation of the first three-dimensional object. In some embodiments, the at least one controller is further configured to direct a second platform to vertically translate, which second platform is configured to support the second three-dimensional object. In some embodiments, directing the second platform is during formation of the second three-dimensional object. In some embodiments, the system further comprises a chamber configured to enclose at least a portion of the first and/or second three-dimensional object during its formation. In some embodiments, the at least one controller is configured to monitor and/or control a progress of the forming within the chamber. In some embodiments, the system further comprises at least one sensor configured to sense one or more physical markers of the first and/or second three-dimensional object. In some embodiments, the at least one controller is configured to (i) control sensing and/or (ii) use sensing data, of the one or more physical markers. In some embodiments, the at least one controller is configured to (i) control sensing and/or (ii) use sensing data, of one or more physical markers of the first and/or second three-dimensional object during formation of the first and/or second three-dimensional object respectively. In some embodiments, the at least one controller is configured to (i) control sensing and/or (ii) use sensing data, of one or more physical markers of the first and/or second three-dimensional object after forming of the first and/or second three-dimensional object, respectively. In some embodiments, the system further comprises at least one detector that is operationally coupled to the at least one controller, the at least one detector configured to detect as least one characteristic of the formation of the first and/or second three-dimensional object. In some embodiments, the at least one controller is configured to control the at least one detector and/or control one or more process parameters present upon detecting by the at least one detector. In some embodiments, the at least one detector is configured to detect a temperature during forming of the first and/or second three-dimensional object. In some embodiments, the at least one controller is configured to control (e.g., monitor) the detecting. In some embodiments, the temperature corresponds to a temperature of the first and/or second three-dimensional object. In some embodiments, the temperature corresponds to a temperature of a vicinity of the first and/or second three-dimensional object. In some embodiments, the vicinity is in a material bed that is configured to accommodate the first and/or second three-dimensional object. In some embodiments, the temperature corresponds to a temperature of an atmosphere surrounding the first and/or second three-dimensional object. In some embodiments, the at least one detector is configured to detect at least one of cleanliness, pressure, humidity, or oxygen level of an atmosphere surrounding the first and/or second three-dimensional object during a forming operation. In some embodiments, detecting a cleanliness comprises detecting a number and/or density of particles within at least a processing cone of the atmosphere. In some embodiments, the at least one controller comprises at least two controllers. In some embodiments, the at least one controller is one controller. In some embodiments, the physics model includes physics-based calculations related to a plurality of modes. In some embodiments, the plurality of modes correspond to estimated mechanical alteration in the first and/or the second three-dimensional object that are brought about during formation of the first and/or second three-dimensional object. In some embodiments, the plurality of modes correspond to estimated elastic alteration, inelastic alteration, or elastic and inelastic alteration in the first and/or the second three-dimensional object brought about during formation of the first and/or second three-dimensional object.

In another aspect, a computer software product comprising at least one non-transitory computer-readable medium in which program instructions are stored, which program instructions, when read by at least one computer, cause the at least one computer to direct: (a) comparing dimensions of a first three-dimensional object with dimensions of a second three-dimensional object, the first and second three-dimensional objects formed using a first and second set of forming instructions respectively while employing a first and a second physics model respectively, and a first and a second geometric model respectively; and (b) using results from the comparing, (i) adjusting the second physics model to differentiate the second set of forming instructions from the first set of forming instructions, (ii) adjusting the second geometric model to differentiate the second set of forming instructions from the first set of forming instructions, (iii) adjusting at least one hardware component of a system that forms the second three-dimensional object, or any combination of (i), (ii), and (iii), such that the dimensions of the first three-dimensional object is (e.g., substantially) identical to the dimensions of the second three-dimensional object, wherein the first and/or second set of forming instructions are programmed (e.g., computer) instructions.

In some embodiments, the at least one non-transitory computer-readable medium causes the at least one computer to direct operations (a) and (b) collectively or separately. In some embodiments, a non-transitory computer-readable medium cause a computer to direct operations (a) and (b). In some embodiments, a non-transitory computer-readable medium cause a first computer to direct operation (a) and a second computer to direct operation (b). In some embodiments, a first non-transitory computer-readable medium causes a computer to direct operation (a) and a second non-transitory computer-readable medium causes the computer to direct operation (b). In some embodiments, a first non-transitory computer-readable medium causes a first computer to direct operation (a) and a second non-transitory computer-readable medium causes a second computer to direct operation (b). In some embodiments, the first set of forming instructions comprise a first set of non-transitory computer readable instructions, and wherein the second set of forming instruction comprise a second set of non-transitory computer readable instructions. In some embodiments, further comprises adjusting the second non-transitory computer readable instructions to differentiate the second set from the first set of forming instructions. In some embodiments, the system comprises a three-dimensional printer. In some embodiments, the system is configured to additively, substantively, or both additively and substantively, form the first and second three-dimensional objects. In some embodiments, the system is configured to perform extrusion, molding, sculpting, or any combination thereof. In some embodiments, (I) the first set of non-transitory computer readable instructions cause a first computer to direct forming the first three-dimensional objects, and (II) the second set of non-transitory computer readable instructions cause a second computer to direct forming the second three-dimensional objects. In some embodiments, the first computer is different from the second computer. In some embodiments, the first computer and the second computer are the same computer. In some embodiments, the computer software product further comprises operation (c) forming the first and second three-dimensional object. In some embodiments, forming the first and second three-dimensional objects comprises printing the first and second three-dimensional objects using at least one three-dimensional printing methodology. In some embodiments, forming the first and second three-dimensional objects comprises additively or substantively forming the first and second three-dimensional objects. In some embodiments, forming the first and second three-dimensional objects comprises extrusion, molding, or sculpting the first and second three-dimensional objects. In some embodiments, the program instructions cause the at least one computer to direct a feed forward and/or feedback control loop. In some embodiments, the program instructions cause the at least one computer to direct a closed loop and/or open loop control scheme. In some embodiments, the physics model includes physics-based calculations related to a plurality of modes. In some embodiments, the computer software product further comprises identifying a fraction of the plurality of modes (e.g., one or more prominent modes) from the plurality of modes. In some embodiments, the fraction of the plurality of modes have associated energies of at most a predetermined threshold. In some embodiments, the physics-based calculations comprise using at least one of singular value decomposition, Kosambi-Karhunen-Loève transform (KLT), Hotelling transform, proper orthogonal decomposition (POD), eigenvalue decomposition (EVD), factor analysis, Eckart-Young theorem, Schmidt-Mirsky theorem, empirical orthogonal functions (EOF), empirical eigenfunction decomposition, empirical component analysis, quasiharmonic modes, spectral decomposition, or empirical modal analysis. In some embodiments, the plurality of modes correspond to estimated mechanical alterations in the first and/or second three-dimensional objects that are brought about during forming of the first and/or second three-dimensional objects. In some embodiments, the plurality of modes correspond to an estimated elastic alteration, an inelastic alteration, or an elastic and an inelastic alteration in the first and/or second three-dimensional objects brought about during forming of the first and/or second three-dimensional objects. In some embodiments, at least one of the plurality of modes corresponds to Eigenstrain modes. In some embodiments, at least one of the plurality of modes corresponds to at least one prominent mode. In some embodiments, adjusting the physics model comprises adjusting one or more parameters of a physics-based calculation. In some embodiments, the physics-based calculation comprises thermo-mechanical related calculations. In some embodiments, the physics-based calculation comprises thermo-elastic, thermo-plastic, or flow-dynamics related calculations. In some embodiments, the physics-based calculation comprises thermo-mechanics, continuum mechanics, material properties, geometric dimensions of the first and/or second three-dimensional object, or at least one characteristic of an energy beam.

In another aspect, a method for determining a strain and/or a stress in a three-dimensional object, comprising: (A) generating a simulated object of the three-dimensional object using a physics model that employs an estimated thermally induced change in a geometric model of a requested three-dimensional object present upon formation of the three-dimensional object; and (B) calculating the strain and/or the stress in the three-dimensional object by comparing the simulated object with image data that is generated from a three-dimensional object, the three-dimensional object formed using the geometric model of the requested three-dimensional object.

In another aspect (e.g., that can be related to the above aspect), a method for determining a strain and/or a stress in a three-dimensional object, comprising: (a) generating a simulated object of the three-dimensional object using a physics model that employs an estimated thermally induced change in a geometric model of a requested three-dimensional object present upon formation of the three-dimensional object; (b) (optionally) forming the three-dimensional object using the geometric model of the requested three-dimensional object; (c) (optionally) generating image data from the three-dimensional object; and (d) calculating the strain and/or the stress in the three-dimensional object by comparing the simulated object with the image data.

In some embodiments, the physics model employs a plurality of modes, each of the plurality of modes representing a plausible alteration component of the three-dimensional object as the present upon formation of the three-dimensional object. In some embodiments, each of the plurality of modes employs estimated mechanical alterations of the geometric model. In some embodiments, calculating the strain comprises: calculating an inelastic strain using the image data of the three-dimensional object; and calculating a total strain using the simulated object. In some embodiments, the method further comprises calculating an elastic strain using the inelastic strain and the total strain. In some embodiments, the physics model employs a thermo-mechanical analysis, a material property of the three-dimensional object, continuum mechanics, at least one characteristic of an energy beam, geometric dimensions of the three-dimensional object, or any suitable combination thereof. In some embodiments, the thermo-mechanical analysis comprises at least one of a thermal expansion of the three-dimensional object, a thermal conductivity of the three-dimensional object, an estimated thermo-plastic deformation of the three-dimensional object, an estimated inelastic deformation of the three-dimensional object, an estimated plastic deformation of the three-dimensional object, an estimated elastic deformation of the three-dimensional object, an estimated thermal deformation of the three-dimensional object, or pressure gradients related to the stress of the three-dimensional object. In some embodiments, the material property of the three-dimensional object comprises at least one of a type of material of the three-dimensional object, a state of the material of the three-dimensional object, a phase of the material of the three-dimensional object, a density of the three-dimensional object, or a surface tension of the material of the three-dimensional object. In some embodiments, the continuum mechanics comprises at least one of fluid dynamics during the forming process, or stacking characteristics of the forming process. In some embodiments, at least one characteristic of the energy beam comprises at least one of a type of the energy beam, a power density of the energy beam, a path of the energy beam, a pulse width of the energy beam, or a dwell time of the energy beam. In some embodiments, the geometric dimensions comprise at least one of an overall shape of the three-dimensional object, or geometric features of the three-dimensional object.

In another aspect, a system for forming a three-dimensional object, the system comprising at least one controller configured to direct: (A) generating a simulated object of the three-dimensional object using a physics model that employs an estimated thermally induced change in a geometric model of a requested three-dimensional object present upon formation of the three-dimensional object; and (B) calculating a strain and/or a stress in the three-dimensional object by comparing the simulated object with the image data that is generated from a three-dimensional object, the three-dimensional object formed using the geometric model of the requested three-dimensional object.

In another aspect (e.g., that can be related to the one above), a system for forming a three-dimensional object, the system comprising at least one controller configured to direct: (a) generating a simulated object of the three-dimensional object using a physics model that employs an estimated thermally induced change in a geometric model of a requested three-dimensional object present upon formation of the three-dimensional object; (b) (optionally) forming the three-dimensional object using the geometric model of the requested three-dimensional object; (c) (optionally) generating image data from the three-dimensional object; and (d) calculating a strain and/or a stress in the three-dimensional object by comparing the simulated object with the image data.

In some embodiments, at least one of the at least one controller comprises a feed forward and/or feedback control loop. In some embodiments, at least one of the at least one controller comprises a closed loop and/or open loop control scheme. In some embodiments, forming the three-dimensional object comprises printing the three-dimensional object using three-dimensional printing. In some embodiments, forming the three-dimensional object comprises additively or substantively forming the three-dimensional object. In some embodiments, forming the three-dimensional object comprises extrusion, molding, or sculpting. In some embodiments, the at least one controller is configured to direct an energy beam to transform a pre-transformed material into a transformed material to generate the three-dimensional object. In some embodiments, at least two of operations (a), (b), (c) and (d) are controlled by at least two different controllers. In some embodiments, at least two of operations (a), (b), (c) and (d) are controlled by one controller. In some embodiments, the at least one controller is configured to direct at least one energy source to generate and direct at least one energy beam at a pre-transformed material. In some embodiments, the at least one controller is further configured to direct operation (m) a platform to vertically translate, which platform is configured to support the three-dimensional object. In some embodiments, operation (m) is during forming of the three-dimensional object. In some embodiments, the system further comprises a chamber configured to enclose at least a portion of the three-dimensional object during forming. In some embodiments, the at least one controller is configured to monitor and/or control a progress of the forming within the chamber. In some embodiments, the system further comprises at least one sensor configured to sense one or more physical markers of the three-dimensional object. In some embodiments, the at least one controller is configured to (i) control sensing and/or (ii) use sensing data, of the one or more physical markers. In some embodiments, the at least one controller is configured to (i) control sensing and/or (ii) use sensing data, of one or more physical markers of the three-dimensional object during forming of the three-dimensional object. In some embodiments, the at least one controller is configured to (i) control sensing and/or (ii) use sensing data, of one or more physical markers of the three-dimensional object after forming of the three-dimensional object. In some embodiments, the system further comprises at least one detector that is operationally coupled to the at least one controller, the at least one detector configured to detect as least one characteristic of the forming. In some embodiments, the at least one controller is configured to control the at least one detector and/or control one or more process parameters present upon detecting by the at least one detector. In some embodiments, the at least one detector is configured to detect a temperature during forming of the three-dimensional object. In some embodiments, the at least one controller is configured to control (e.g., monitor) detection of the temperature. In some embodiments, the temperature corresponds to a temperature of the three-dimensional object. In some embodiments, the temperature corresponds to a temperature of a vicinity of the three-dimensional object. In some embodiments, the vicinity is in a material bed that is configured to accommodate the three-dimensional object. In some embodiments, the temperature corresponds to a temperature of an atmosphere surrounding the three-dimensional object. In some embodiments, the at least one detector is configured to detect at least one of cleanliness, pressure, humidity, or oxygen level of an atmosphere surrounding the three-dimensional object during the forming. In some embodiments, detecting a cleanliness comprises detecting an amount of particles within at least a processing cone of the atmosphere. In some embodiments, the at least one controller comprises at least two controllers. In some embodiments, the at least one controller is one controller. In some embodiments, the physics model employs a thermo-mechanical analysis, a material property of the three-dimensional object, continuum mechanics, at least one characteristic of an energy beam, geometric dimensions of the three-dimensional object, or any suitable combination thereof. In some embodiments, the thermo-mechanical analysis comprises at least one of a thermal expansion of the three-dimensional object, a thermal conductivity of the three-dimensional object, an estimated thermo-plastic deformation of the three-dimensional object, an estimated inelastic deformation of the three-dimensional object, an estimated plastic deformation of the three-dimensional object, an estimated elastic deformation of the three-dimensional object, an estimated thermal deformation of the three-dimensional object, or pressure gradients related to the stress of the three-dimensional object. In some embodiments, the material property of the three-dimensional object comprises at least one of a type of material of the three-dimensional object, a state of a material of the three-dimensional object, a phase of the material of the three-dimensional object, a density of the three-dimensional object, or a surface tension of the material of the three-dimensional object. In some embodiments, the continuum mechanics comprises at least one of fluid dynamics during the forming process, or stacking characteristics of the forming process. In some embodiments, the at least one characteristic of the energy beam comprises at least one of a type of the energy beam, a power density of the energy beam, a path of the energy beam, a pulse width of the energy beam, or a dwell time of the energy beam. In some embodiments, geometric dimensions comprise at least one of an overall shape of the three-dimensional object, or geometric features of the three-dimensional object.

In another aspect, A computer software product comprising at least one non-transitory computer-readable medium in which program instructions are stored, which program instructions, when read by at least one computer, cause the at least one computer to direct: (a) generating a simulated object using a physics model that employs an estimated thermally induced change of a requested three-dimensional object present upon formation of the three-dimensional object; and (b) calculating a strain and/or a stress in the three-dimensional object formed by using a geometric model of the requested three-dimensional object, wherein calculating the strain and/or stress comprises comparing the simulated object with the three-dimensional object that is formed.

In some embodiments, the estimated thermally induced change comprises an estimated thermo-mechanically induced change. In some embodiments, comparing the simulated object with the three-dimensional object comprises comparing the simulated object with image data associated with the three-dimensional object. In some embodiments, the physics model employs a plurality of modes, each of the plurality of modes representing a plausible alteration component of the three-dimensional object present upon formation of the three-dimensional object. In some embodiments, each of the plurality of modes employs estimated mechanical alterations of the geometric model. In some embodiments, the computer software product further comprises identifying a fraction of the plurality of modes (e.g., comprising one or more prominent modes) from the plurality of modes. In some embodiments, the fraction of the plurality of modes (e.g., the one or more prominent modes) have associated energies of at most a predetermined threshold. In some embodiments, calculating the strain comprises (i) calculating an inelastic strain using image data of the three-dimensional object; and (ii) calculating a total strain using the simulated object. In some embodiments, the computer software product further comprises calculating an elastic strain using the inelastic strain and the total strain. In some embodiments, the physics model employs a thermo-mechanical analysis, a material property of the three-dimensional object, continuum mechanics, at least one characteristic of the energy beam, geometric dimensions of the three-dimensional object, or any suitable combination thereof. In some embodiments, the thermo-mechanical analysis comprises at least one of a thermal expansion of the three-dimensional object, a thermal conductivity of the three-dimensional object, an estimated thermo-plastic deformation of the three-dimensional object, an estimated inelastic deformation of the three-dimensional object, an estimated plastic deformation of the three-dimensional object, an estimated elastic deformation of the three-dimensional object, an estimated thermal deformation of the three-dimensional object, or pressure gradients related to stress of the three-dimensional object. In some embodiments, the material property of the three-dimensional object comprises at least one of a type of material of the three-dimensional object, a state of a material of the three-dimensional object, a phase of the material of the three-dimensional object, a density of the three-dimensional object, or a surface tension of the material of the three-dimensional object. In some embodiments, the continuum mechanics comprises at least one of fluid dynamics during the forming process, or stacking characteristics of the forming process. In some embodiments, the at least one characteristic of the energy beam comprises at least one of a type of the energy beam, a power density of the energy beam, a path of the energy beam, a pulse width of the energy beam, or a dwell time of the energy beam. In some embodiments, the geometric dimensions comprises at least one of an overall shape of the three-dimensional object, or geometric features of the three-dimensional object. In some embodiments, the physics model employs physics-based calculations using at least one of singular value decomposition, Kosambi-Karhunen-Loève transform (KLT), Hotelling transform, proper orthogonal decomposition (POD), eigenvalue decomposition (EVD), factor analysis, Eckart-Young theorem, Schmidt-Mirsky theorem, empirical orthogonal functions (EOF), empirical eigenfunction decomposition, empirical component analysis, quasiharmonic modes, spectral decomposition, or empirical modal analysis. In some embodiments, the at least one non-transitory computer-readable medium, cause the at least one computer to direct (a) and (b) separately or collectively. In some embodiments, the program instructions cause the at least one computer to direct (a) and (b). In some embodiments, the program instructions cause a first computer to direct (a) and a second computer to direct (b). In some embodiments, a first non-transitory computer-readable medium causes a computer to direct (a) and a second non-transitory computer-readable medium causes the computer to direct (b). In some embodiments, a first non-transitory computer-readable medium causes a first computer to direct (a) and a second non-transitory computer-readable medium causes a second computer to direct (b). In some embodiments, the program instructions further cause the at least one computer to direct (c) forming the first and/or second three-dimensional object using the geometric model of the requested three-dimensional object. In some embodiments, (c) is before (b). In some embodiments, (c) is before (a). In some embodiments, a non-transitory computer-readable medium causes a computer to direct at least two of (a), (b) and (c). In some embodiments, plurality of non-transitory computer-readable medium cause a computer to direct at least two of (a), (b) and (c). In some embodiments, a non-transitory computer-readable medium causes a plurality computer to direct at least two of (a), (b) and (c). In some embodiments, a plurality of non-transitory computer-readable medium cause a plurality computers to direct at least two of (a), (b) and (c), respectively. In some embodiments, forming the three-dimensional object comprises printing the three-dimensional object using three-dimensional printing. In some embodiments, forming the three-dimensional object comprises additively or substantively forming the three-dimensional object. In some embodiments, forming the three-dimensional object comprises extrusion, molding, or sculpting. In some embodiments, the program instructions further cause the at least one computer to direct a feed forward and/or feedback control loop. In some embodiments, the program instructions further cause the at least one computer to direct a closed loop and/or open loop control scheme. Another aspect of the present disclosure provides systems, apparatuses, controllers, and/or non-transitory computer-readable media (e.g., software) that implement any of the methods disclosed herein.

In another aspect, a system used in forming (e.g., printing, molding, welding, machining, casting) at least one 3D object comprises any combination of the apparatuses disclosed herein.

In another aspect, a system used in forming of at least one 3D object comprises any combination of the apparatuses and the computer software disclosed herein.

In another aspect, a computer software product for forming at least one 3D object, comprising at least one non-transitory computer-readable medium in which program instructions are stored, which instructions, when read by at least one computer, cause the at least one computer to perform any of the methods disclosed herein.

In another aspect, a computer software product, comprising at least one non-transitory computer-readable medium in which program instructions are stored, which instructions, when read by at least one computer, cause the computer to direct a mechanism used in the forming processes to implement (e.g., effectuate) any of the method disclosed herein, wherein the at least one non-transitory computer-readable medium is operatively coupled to the mechanism.

Another aspect of the present disclosure provides systems, apparatuses, controllers, and/or non-transitory computer-readable medium (e.g., software) that implement any of the methods disclosed herein.

In another aspect, an apparatus for forming one or more 3D objects comprises one or more controllers that is programmed to direct a mechanism used in a forming methodology to implement (e.g., effectuate) any of the method disclosed herein, wherein the one or more controllers is operatively coupled to the mechanism.

In another aspect, the one or more controllers disclosed herein comprise a computer software product, e.g., as disclosed herein.

Another aspect of the present disclosure provides a computer system comprising one or more computer processors and a non-transitory computer-readable medium coupled thereto. The non-transitory computer-readable medium comprises machine-executable code that, upon execution by the one or more computer processors, implements any of the methods and/or controller directions disclosed herein.

In another aspect, a computer software product comprises a non-transitory computer-readable medium that causes a computer to direct one or more of the methods described herein.

In another aspect, a computer software product comprises a non-transitory computer-readable medium that causes a first computer to direct one or more methods described herein and a second computer to direct another one or more methods described herein.

In another aspect, a computer software product comprises a first non-transitory computer-readable medium that causes a computer to direct one or more methods described herein and a second non-transitory computer-readable medium that cause the computer to direct another one or more methods described herein.

In another aspect, a computer software product comprises a first non-transitory computer-readable medium cause a first computer to direct one or more methods described herein and a second non-transitory computer-readable medium cause a second computer to direct another one or more methods described herein.

In another aspect, a computer software product comprises a non-transitory computer-readable medium that causes a plurality of computers to direct one or more methods described herein.

In another aspect, a computer software product comprises a plurality of non-transitory computer-readable mediums cause a computer to direct one or more methods described herein.

In another aspect, a computer software product comprises a plurality of non-transitory computer-readable medium cause a plurality of computers to direct one or more methods described herein.

In some embodiments, the term "3D object" may refer to one or more 3D objects.

Another aspect of the present disclosure provides a non-transitory computer-readable medium comprising machine-executable code that, upon execution by one or more computer processors, implements any of the methods disclosed herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "Fig." and "Figs." herein), of which:

Figure 1:
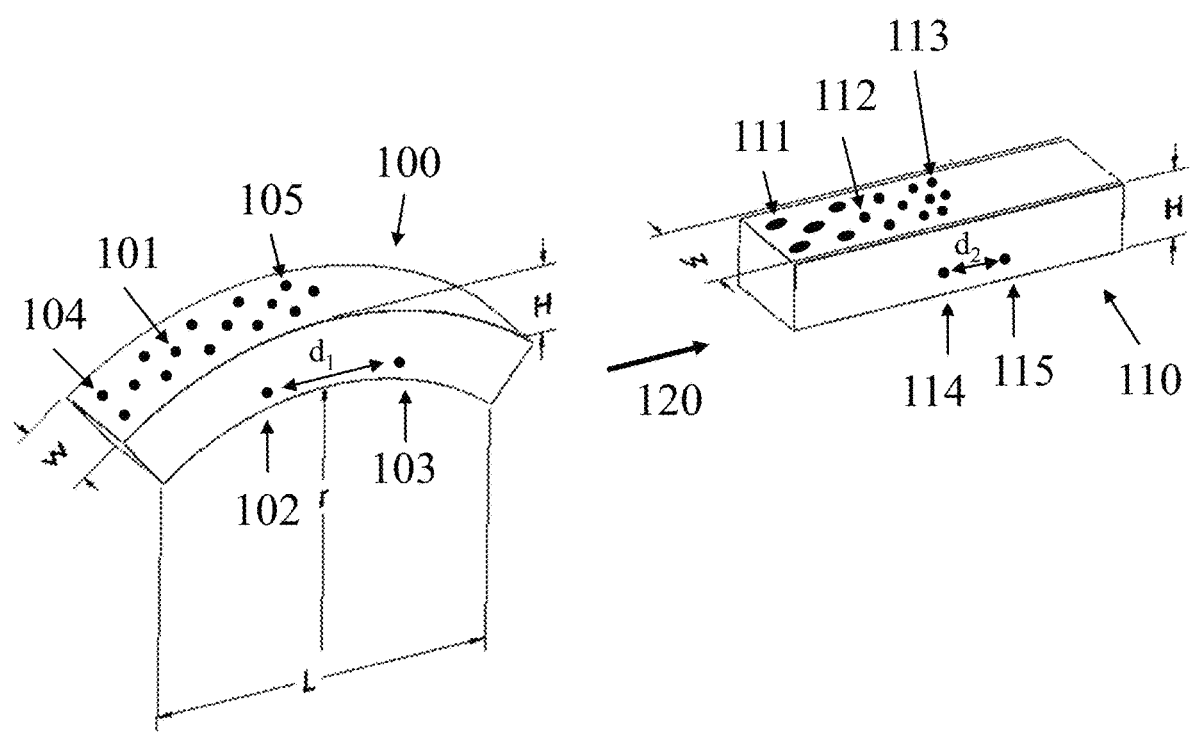
FIG. 1 schematically illustrates a model of a three-dimensional (3D) object and a respective 3D object.

The figures and components therein may not be drawn to scale. Various components of the figures described herein may not be drawn to scale.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein might be employed.

The process of generating a three-dimensional object (e.g., three-dimensional printing processes) may cause certain alterations (e.g., deformations) to occur in the three-dimensional (3D) object. The alterations may be structural alterations in the overall shape of at least a portion of the 3D object and/or in the microstructure of at least a portion of the 3D object. For example, the alterations can cause geometric dimensions (shape) of the 3D object to vary from a requested geometric dimension (e.g., and shape). An alteration can occur due to, warping (e.g., bending or twisting) of the 3D object. An alteration can occur due to thermal expansion of the 3D object, issues related to tool offset, and other mechanisms related to the generation process. The tool can be a 3D printer, a mold, an extrusion mechanism, a welding mechanism, or any other tool related to the process of generating the 3D object. Methods, software, apparatus, and systems described herein can be used to quantify an alteration caused by the generating process, predict the alteration induced by the generating process, create one or more computer-based models that compensate for the alteration (e.g., deformation), generate 3D objects having improved dimensional accuracy, or any combination thereof.

Terms such as "a", "an" and "the" are not intended to refer to only a singular entity, but include the general class of which a specific example may be used for illustration. The terminology herein is used to describe specific embodiments of the invention(s), but their usage does not delimit the invention(s).

When ranges are mentioned, the ranges are meant to be inclusive, unless otherwise specified. For example, a range between value 1 and value 2 is meant to be inclusive and include value 1 and value 2. The inclusive range will span any value from about value 1 to about value 2. The term "adjacent" or "adjacent to," as used herein, includes 'next to', 'adjoining', 'in contact with', and 'in proximity to.' When "and/or" is used in a sentence such as X and/or Y, the phrase means: X, Y, or any combination thereof.

As used herein, the term "operatively coupled" or "operatively connected" refers to a first mechanism that is coupled (or connected) to a second mechanism to allow the intended operation of the second and/or first mechanism.

As used herein, the terms "object", "3D part", and "3D object" may be used interchangeably, unless otherwise indicated.

Fundamental length scale (abbreviated herein as "FLS") can be refer herein as to any suitable scale (e.g., dimension) of an object. For example, a FLS of an object may comprise a length, a width, a height, a diameter, a spherical equivalent diameter, or a diameter of a bounding sphere. In some cases, FLS may refer to an area, a volume, a shape, or a density.

As used herein, the term "based on" is not meant to be restrictive. That is, "based on" does not necessarily mean "exclusively based on" or "primarily based on". For example, "based on" can be synonymous to "using" or "considering."

In some embodiments, a 3D object is marked with one or more markers. A marked three-dimensional (3D) object may comprise the one or more markers. The markers can be embedded on at least one surface and/or interior portion of a desired 3D object. The markers may comprise a depression (e.g., embossing, degradation, or intrusion), protrusion (e.g., extrusion, swelling, elevation, or projection), or deletion (e.g., omission, or hole) in at least one portion of the desired 3D object. The marker can correspond to a feature (e.g., two dimensional and/or three dimensional) that is located in pre-determined locations of a 3D object. In some embodiments, the markers reside on a surface of the 3D object. In some embodiments, the markers reside within a volume of the 3D object. In some embodiments, the markers are discrete features. The markers may decorate the 3D object. The markers may be a part of the 3D object geometry (e.g., a tessellation border, or an edge of the 3D object). The markers may be geometrical markers. The marker may be a physical (e.g., comprising material) addition and/or omission to the 3D object. The markers may be metrological markers. The marker may be a material property of the 3D object (e.g., a mark within the material which the 3D object consists of, e.g., a microstructure). The marker may be a pore, dislocation, or crack. The marker may comprise a metallurgical or crystalline feature. FIG. 1 shows an example of a model of a 3D object 100 that comprises markers (e.g., 101) in the form of (e.g., substantially) circular holes.

The position, and/or geometry (e.g., shape and/or size) of the markers may be chosen such the markers may be monitored during and/or after a forming process (e.g., 3D printing) of a 3D object. The position, and/or geometry (e.g., shape and/or size) of the markers may be chosen such that two subsequent markers may not merge during and/or after the forming process (e.g., 3D printing) (e.g., based on an estimated deformation maximum). The position and/or geometry of the markers may be chosen such that two subsequent markers may not cause alteration (e.g., deformation) in the 3D object that will prevent the forming process (e.g., printing in the 3D printer). Prevent the forming process may be due to hardware constraints. The estimate may be a crude estimate. The position, and/or geometry (e.g., shape and/or size) of the markers may be chosen such that the markers will not (e.g., substantially) affect the overall behavior of the 3D object during and/or after the forming process (e.g., 3D printing).

The one or more markers may serve as a tracking device of the forming process (e.g., 3D printing process). FIG. 1 shows an example of a model of a 3D object that comprises markers (e.g., 101, 102, 103, 104 and 105); and a 3D object 110 that was formed (e.g., printed) 120 based on the model 100, which formed (e.g., printed) 3D object comprises respective markers (e.g., 111, 112, 113, 114 and 115), wherein respective is to the model 100. The tracking may be of (i) the entire 3D object after its formation, (ii) various stages of the 3D object during its formation (e.g., 3D printing) process and/or (iii) of various portions of the formed (e.g., printed) 3D object.

In the forming process (e.g., 3D printing), a requested 3D object can be formed (e.g., printed) according to (e.g., printing) instructions, which are based at least in part on a model of a desired 3D object. The model may comprise a computer model, geometric model, corrected geometric model, test model, marked model, or a marked geometric model. The geometric model may comprise a CAD model. The geometric model may be a virtual model, e.g., a computer-generated model (of the 3D object). The geometric model may be a virtual representation of the geometry of the 3D object, e.g., in the form of 3D imagery. In some cases, a geometric model corresponds to an image (e.g., scan) of an object (e.g., a test object). The model of the desired 3D object can be manipulated to incorporate the one or more model markers to form a model of the marked 3D object (also referred herein as a "test model"). The model of the marked 3D object (i.e., the "test model") may be incorporated in (e.g., printing) instruction to generated a physically (e.g., structurally) marked 3D object (also referred herein as the "test 3D object", "test object" or "test part") that incorporates physical one or more markers (also referred to herein as a "physical markers", "structural markers" or "test markers", e.g., depending on the type of object). The structural marker may be a geometric marker. A model of the object can have one or more markers (also referred to herein as "model markers", "image markers", "virtual markers" or "test markers", depending on the type of model) corresponding to the one or more physical markers.

The one or more model markers (also referred to herein as "test markers") that are embedded in the model of the 3D object, may be embedded at one or more positions respectively. FIG. 1 shows an example of two markers 102 and 103 that are embedded in the model 100 of the 3D object, which markers are separated by a distance $d_1$. Model 100 also comprises model markers (e.g., 101, 104 and 105). The one or more positions of the markers (e.g., 101, 102, 103, 104 and 105) may comprise random, or specific positions. The one or more positions can form an array. The array may be an organized array. The one or more positions may be predetermined positions (e.g., on the model of the 3D object). For example, the one or more positions may be on a portion of the requested 3D object that is susceptible to alteration (e.g., deformation). The alteration (e.g., deformation) may comprise warping, buckling, bending, balling, or twisting. The alteration (e.g., deformation) may comprise squeezing and/or stretching the material of the 3D object. The deformation may be due to material stress and/or strain. The deformation may occur during and/or after forming the 3D object, e.g., during and/or after the formation of a hardened material. The deformation may occur due to the forming (e.g., 3D printing) process and/or properties of the particular material(s) used in the forming (e.g., 3D printing).

In some embodiments, the 3D object(s) is/are formed using one or more 3D printing processes. In one embodiment, the process of 3D printing comprises additive manufacturing. Three-dimensional printing may comprise depositing a first (e.g., substantially planar (e.g., planar)) layer of pre-transformed material to form a material bed; directing an energy beam towards a first portion of the first layer of pre-transformed material to form a first transformed material according to a first slice in a model (e.g., a computer model (e.g., geometric model)) of a three-dimensional object. In some embodiments, the three-dimensional printing comprises using one or more laser engineered net shaping, direct metal deposition, and laser consolidation techniques. The transformed material may be a portion of the 3D object. The transformed material may be hardened into a hardened (e.g., substantially solid (e.g., solid)) material as part of the 3D object. Optionally, this process may be repeated layer by layer. For example, by adding a second (e.g., substantially planar (e.g., planar)) layer of pre-transformed material, directing the energy beam towards a second portion of the second layer of pre-transformed material to form a second transformed material according to a second slice in a (geometric) model of a 3D object. In some embodiments, the 3D object is formed using a material bed. The material bed may be at a (e.g., substantially) constant pressure during the forming process. For example, the material bed may be devoid of a pressure gradient during the forming process. The material bed (e.g., powder bed) may comprise flowable material (e.g., powder) during the forming process. In some example, the 3D object (or a portion thereof) may be formed in the material bed without being anchored (e.g., to the platform). For example, the 3D object may be formed without auxiliary supports. The 3D object may be formed without any externally applied pressure gradient(s). For example, the material bed can be under (e.g., substantially) constant pressure (e.g., having (e.g., substantially) no pressure gradients). For example, the material bed can remain in a flowable (e.g., not fixed) state during a transformation process. 3D printing processes; various materials; and 3D printing methods, systems, apparatuses, controller (e.g., including the processor) and software (e.g., including energy beams), are described in PCT Patent Applications serial numbers PCT/US2015/065297, PCT/US16/34857, and PCT/US17/18191; European patent application serial number EP17156707.6; U.S. patent application Ser. No. 15/435,065; and in U.S. provisional patent application Ser. No. 62/401,534, each of which is incorporated herein in its entirety.

Figure 2:
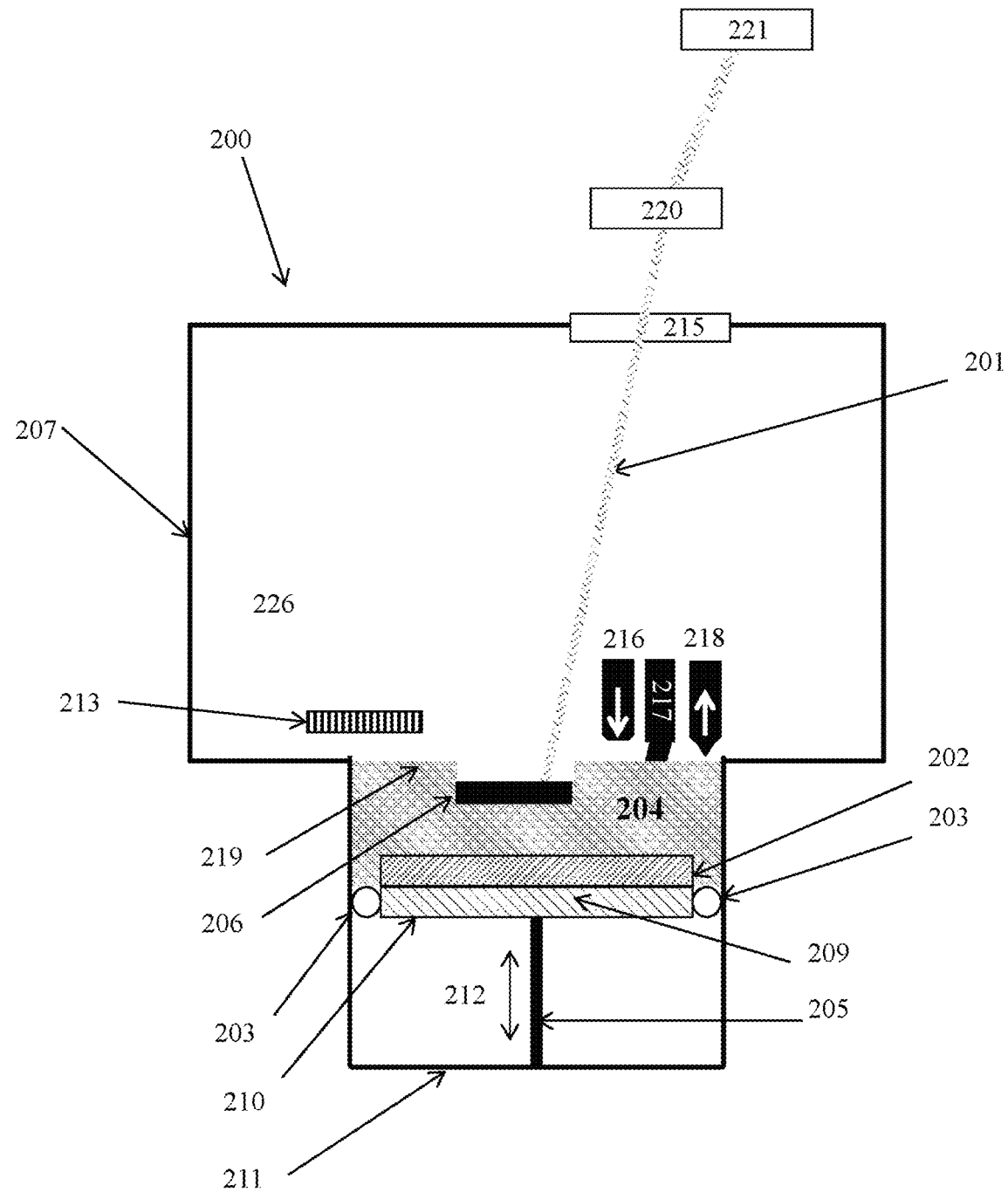
FIG. 2 schematically illustrates a vertical cross section of a 3D printing system and its components.

FIG. 2 shows an example of a 3D printer 200 comprising a chamber 207 (also referred to herein as processing chamber) having an inner atmosphere 226 enclosed in an inner volume, which atmosphere comprises one or more gasses; an energy source 221 generating an energy beam 201; a scanner 220 that aids in translation of the energy beam (e.g., according to a pattern); an optical window 215; a material dispenser 216; a material leveling member 217; a material removal member 218; an optional cooling member (e.g., heat sink) 213; a material bed 204 comprising an exposed surface 219, a (e.g., forming) 3D object 206; a platform comprising a base 202 and a substrate 209, which platform is configured to support the 3D object, which platform is separated from the enclosure by a barrier (e.g., 203), which platform is disposed on an actuator (e.g., elevator) 205 that is vertically translatable 212, which chamber has a bottom portion 211, which platform has a bottom portion 210, which scanner and energy source are disposed outside of the enclosure 207. The processing chamber can enclose at least a portion of the 3D object during its formation. The energy beam can translate (e.g., travel) through a region (sometime referred to as a processing cone) within the processing chamber during the 3D printing. Sometimes it is desirable for the processing cone to be (e.g., substantially) free of particles (e.g., debris) during the 3D printing. One or more controller can be configured to vertically translate the platform. In some embodiments, at least one of the material removal member, the material leveling member, the cooling member, the base, and the optical window are optional components. At times, the energy source and/or the scanner 220 are disposed within the enclosure. The enclosure may be open or closed to the ambient environment. The enclosure may comprise one or more openings (e.g., doors and/or windows). The enclosure may comprise a load lock. The actuator and/or the building platform may be an integral part of the enclosure, or separate part of the enclosure that may be reversibly connected to the enclosure.

At times, a formed (e.g., printed) portion of the 3D object may (e.g., substantially) deviate from the model of the 3D object during and/or after the forming (e.g., 3D printing), e.g., during and/or after the formation of the hardened material. Substantially deviate may be in relation to the intended purpose of the 3D object. For example, manufacturing requirements may dictate that particular dimensions of the 3D object are within a specified threshold (e.g., tolerance). Such deviation may comprise deformation. FIG. 1 shows an example of a structural deviation in a general sense. FIG. 1 shows an example of a model of a 3D object comprising a bent structure 100, and its respective formed (e.g., printed) 3D object comprising a planar structure 110 that deviates from the bent structure 100. Inclusion of one or more markers in the model of the 3D object, and subsequently in the generated 3D object, may provide information on the extent, location, and/or type of alteration (e.g., deformation) that results from forming the 3D object. At times, the inclusion of the one or more markers may shed light on the process that leads to the alteration (e.g., deformation). The markers may be structural (e.g., geometrical) markers. The markers may be physical markers (e.g., structural markers). The markers may be metrological markers. The markers may provide metrological information (measurable information) regarding the generation process of the 3D object. The markers may be material markers.

In some embodiments, the positions (also referred to herein as "locations", "physical positions" or "physical locations") and/or form of the one or more markers of the test 3D object (also herein "physical positions") and the position of the one or more markers of the test model (also herein "locations", "model positions" or "model locations") may be compared. In some embodiments, (i) the positions and/or form (e.g., structure) of the one or more markers (that are physically marked (e.g., structurally marked)) of the 3D object, and (ii) the position of the one or more markers of the model of the marked 3D object, may be compared. At times the physical marker positions may deviate from the model marker positions. At times, the physical marker positions may (e.g., substantially) coincide with the model marker positions. At times the physical marker shape may deviate from the model marker shape. At times, the physical marker shape may (e.g., substantially) coincide with the model marker shape. The physical markers may be referred herein as "test markers." In some embodiments, substantially coincide is in relation to (e.g., within) a predetermined threshold or limit. In some embodiments, comparing locations of markers (e.g., model markers and test markers) and/or determining whether they substantially coincide, involves performing one or more data analysis techniques. In some embodiments, data analysis techniques described herein involves one or more regression analys(es) and/or calculation(s). The regression analysis and/or calculation may comprise linear regression, least squares fit, Gaussian process regression, kernel regression, nonparametric multiplicative regression (NPMR), regression trees, local regression, semiparametric regression, isotonic regression, multivariate adaptive regression splines (MARS), logistic regression, robust regression, polynomial regression, stepwise regression, ridge regression, lasso regression, elasticnet regression, principal component analysis (PCA), singular value decomposition (SVD)), probability measure techniques (e.g., fuzzy measure theory, Borel measure, Harr measure, risk-neutral measure, Lebesgue measure), predictive modeling techniques (e.g., group method of data handling (GMDH), Naive Bayes classifiers, k-nearest neighbors algorithm (k-NN), support vector machines (SVMs), neural networks, support vector machines, classification and regression trees (CART), random forest, gradient boosting, generalized linear model (GLM)), or any other suitable probability and/or statistical analys(es). In some cases, the comparison involves comparing relative locations of the markers (e.g., model markers) with respect to each other and/or to markers on another object (e.g., a test object). In some cases, some of the markers are removed (redacted). The markers may include edges, kinks, or rims of an object. The markers may comprise borders of geometric model components that are manifested on the physical 3D object. For example, the markers may comprise tessellation borders of the geometric model that are manifested on the physical 3D object. In some cases, certain portions of the object will experience more alteration (e.g., deformation) as a result of the forming process, as compared to other portions of the object. The portions that experience more alteration may result in more deviation between physical positions and model positions of the markers. The portions of the (physical) 3D object and/or (virtual) model of the 3D object at which deviation is detected, may be positions susceptible to alteration (e.g., deformation). The portions of the 3D object and/or model at which deviation is not detected, may be positions (e.g., substantially) free of alteration (e.g., deformation). FIG. 1 shows an example where the markers 114 and 115 in the formed (e.g., printed) 3D object 110 moved as compared to their respective positions of markers 102 and 103 in the model 100 of that 3D object, as can be detected inter alia from the difference in their respective distances $d_2$ as compared to $d_1$. FIG. 1 shows an example where the markers 111 and 113 in the formed (e.g., printed) 3D object changed in shape and density as compared to their respective markers 104 and 105 in the model of that 3D object: round marker 104 of the model, became elongated marker 111, markers in the area of 105 of the test model became denser in the test 3D object in the respective area of 113. These types of shape changes of the markers may or may not be of significance. For example, in some embodiments, such shape changes are treated as permissible variation (e.g., within a tolerance). In some embodiments, the shape changes are measurable and included within the data analys(es). In some embodiments, the shape of the markers does not (e.g., substantially) change as a result of the forming process. For example, FIG. 1 shows model marker 101 having a symmetrically round cross-section shape, resulting in physical marker 112 having a corresponding symmetrically round cross-section shape.

Figure 10:
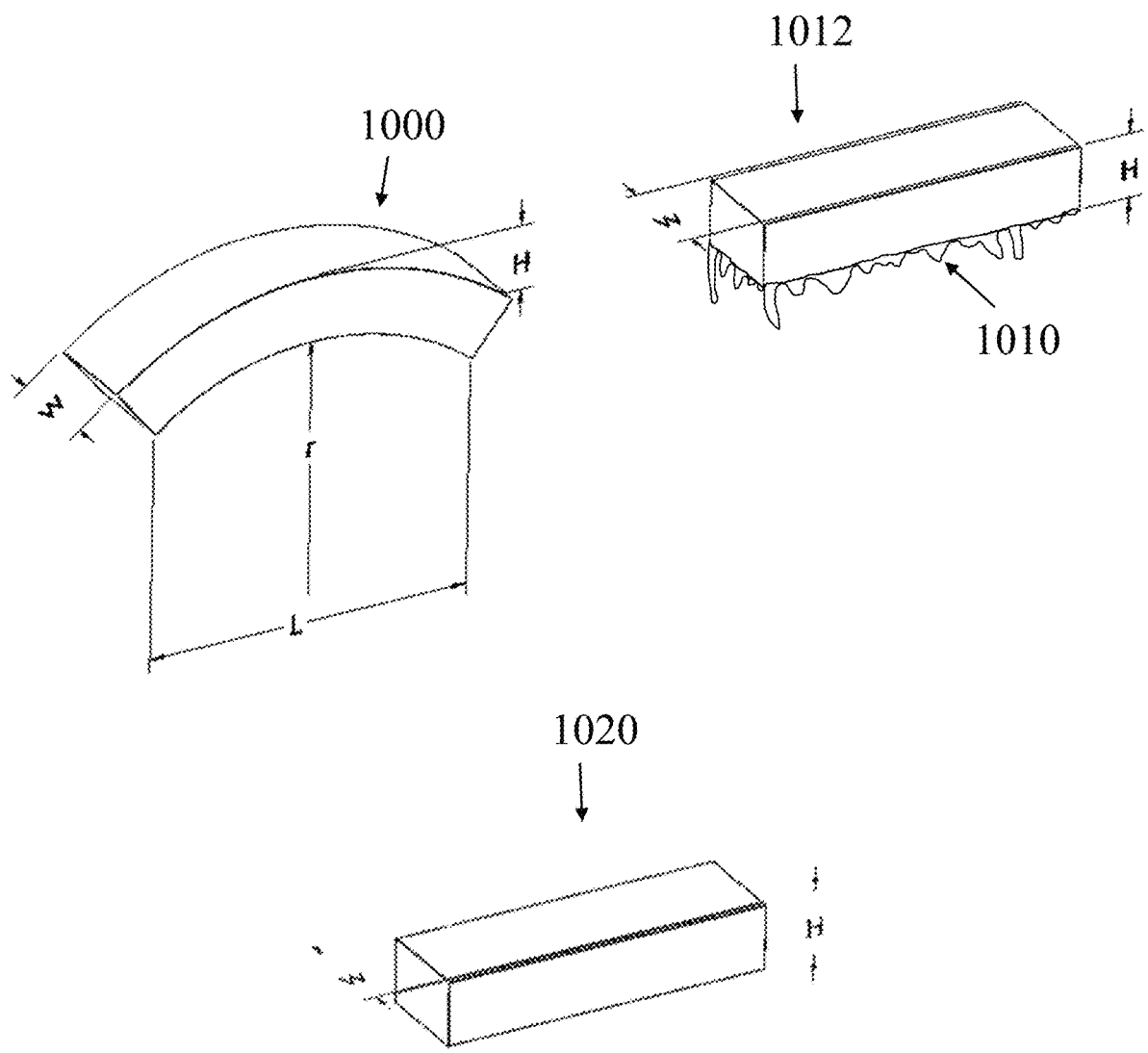
FIG. 10 schematically illustrates various 3D objects.

The comparison between the test model (e.g., 100) and the test object (e.g., test 3D object, 110) may allow for empirical estimation and/or (simulated) prediction of deformation. An estimated alteration (e.g., deformation) based on empirical evidence (referred to herein as "empirical process", "empirical method" or "empirical estimation") can involve deriving results from one or more formed (e.g., printed) objects. For example, dimensions of one or more formed objects can be measured (using any suitable technique) and compared to corresponding dimensions of a geometric model (from which the forming (e.g., printing) instructions are derived). Differences between the dimensions can then be used to predict what portions of an object are most likely to deform (and/or an overall deformation of the object) due to the forming process. In some cases, the differences can include differences in an expected density (e.g., porosity), material consistency, metallurgical shape (e.g., and their distribution), and/or other aspects of an object. As described above, in some embodiments, the geometric model includes one or more model markers (e.g., protrusions, recesses and/or deletions) that result in corresponding physical markers of the formed object. Spacing (distances) between the physical markers can be compared to respective spacing (distances) between corresponding model markers, to determine regions of the object that experience more deformation than other regions. The comparison between the test model (geometric model) and a test object (e.g., test 3D object) may allow the design of forming (e.g., printing) instructions (e.g., 3D printing instructions) that can result in reduction of deformation. The comparison between the test model and the test object (e.g., test 3D object) may allow the design of forming (e.g., printing) instructions (e.g., 3D printing instructions) that result high fidelity forming (e.g., printing) of the 3D object. The comparison between the (virtual) test model and the (physical) test object may aid an understanding and/or differentiation between various mechanisms that cause alteration (e.g., deformation and/or addition) to at least a portion of the 3D object. For example, differentiation between expansion and extension mechanisms. For example, various mechanisms leading to dimensional inaccuracy. The comparison between the test model (e.g., 100) and the test object (e.g., test 3D object, 110) may comprise comparing their respective markers (e.g., in terms of relative distances, FLS, volume, and/or shape). The result may aid in experimental calculation of (internal) stresses and/or strains of at least a portion of the 3D object. The experimental calculation(s) may allow for an understanding of the material behavior during the forming process (e.g., the material from which the 3D object is built, or the desired material for the 3D object). In some embodiments, the comparison and/or strategic placement of the one or more markers may facilitate formation of functionally graded materials (e.g., comprising various microstructures at different portions of the 3D object). FIG. 10 shows an example of a requested 3D object 1020, deformed 3D object 1000 respective to the requested 3D object 1020, and a 3D object 1012 that comprises additions 1010 (e.g., in the form of stalactites, which can extend beyond height H of the requested object 1020) with respect to the requested 3D object 1020.

High fidelity forming (e.g., printing) may refer to the degree of deviation of the formed (e.g., printed) 3D object from a model of that 3D object. The 3D object (e.g., solidified material) that is generated (e.g., for a customer) can have an average deviation value from its intended dimensions (e.g., as specified by its respective 3D model) of at most about 0.5 microns (μm), 1 μm, 3 μm, 10 μm, 30 μm, 100 μm, 300 μm afore-mentioned values (e.g., from about 0.5 μm to about 300 μm, from about 10 μm to about 50 μm, from about 15 μm to about 85 μm, from about 5 μm to about 45 μm, or from about 15 μm to about 35 μm). The 3D object can have a deviation from the intended dimensions (e.g., model dimensions) in at least one specific direction. The deviation in at least one specific direction can follow the formula $Dv+L/K_{dv}$, wherein Dv is a deviation value, L is the length of the 3D object in a specific direction, and $K_{dv}$ is a constant. Dv can have a value of at most about 300 μm, 200 μm, 100 μm, 50 μm, 40 μm, 30 μm, 20 μm, 10 μm, 5 μm, 1 μm, or 0.5 μm. Dv can have any value between the afore-mentioned values (e.g., from about 0.5 μm to about 300 μm, from about 10 μm to about 50 μm, from about 15 μm to about 85 μm, from about 5 μm to about 45 μm, or from about 15 μm to about 35 μm). $K_{dv}$ can have a value of at most about 3000, 2500, 2000, 1500, 1000, or 500. $K_{dv}$ can have a value of at least about 500, 1000, 1500, 2000, 2500, or 3000. $K_{dv}$ can have any value between the afore-mentioned values. $K_{dv}$ can have a value that is from about 3000 to about 500, from about 1000 to about 2500, from about 500 to about 2000, from about 1000 to about 3000, or from about 1000 to about 2500. For example, the generated 3D object may deviate from the requested 3D object by at most about the sum of 100 micrometers and 1/1000 times the fundamental length scale of the requested 3D object. The generated 3D object may deviate from the requested 3D object by at most about the sum of 25 micrometers and 1/2500 times the fundamental length scale of the requested 3D object.

Figure 3:
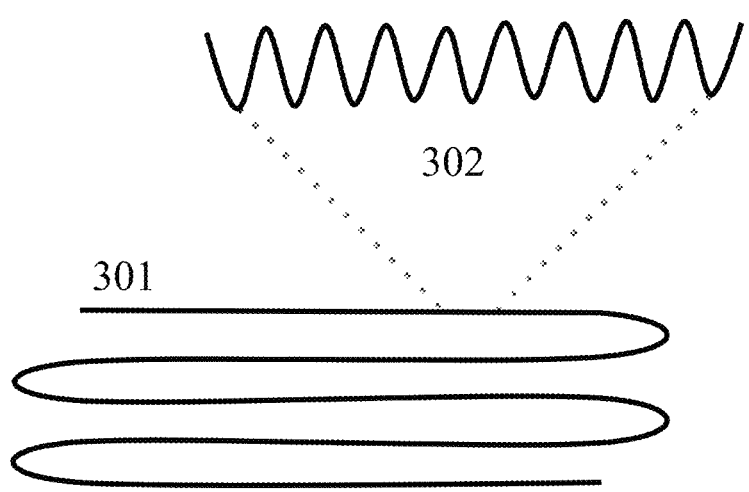
FIG. 3 schematically illustrates energy beam path.
Figure 4:
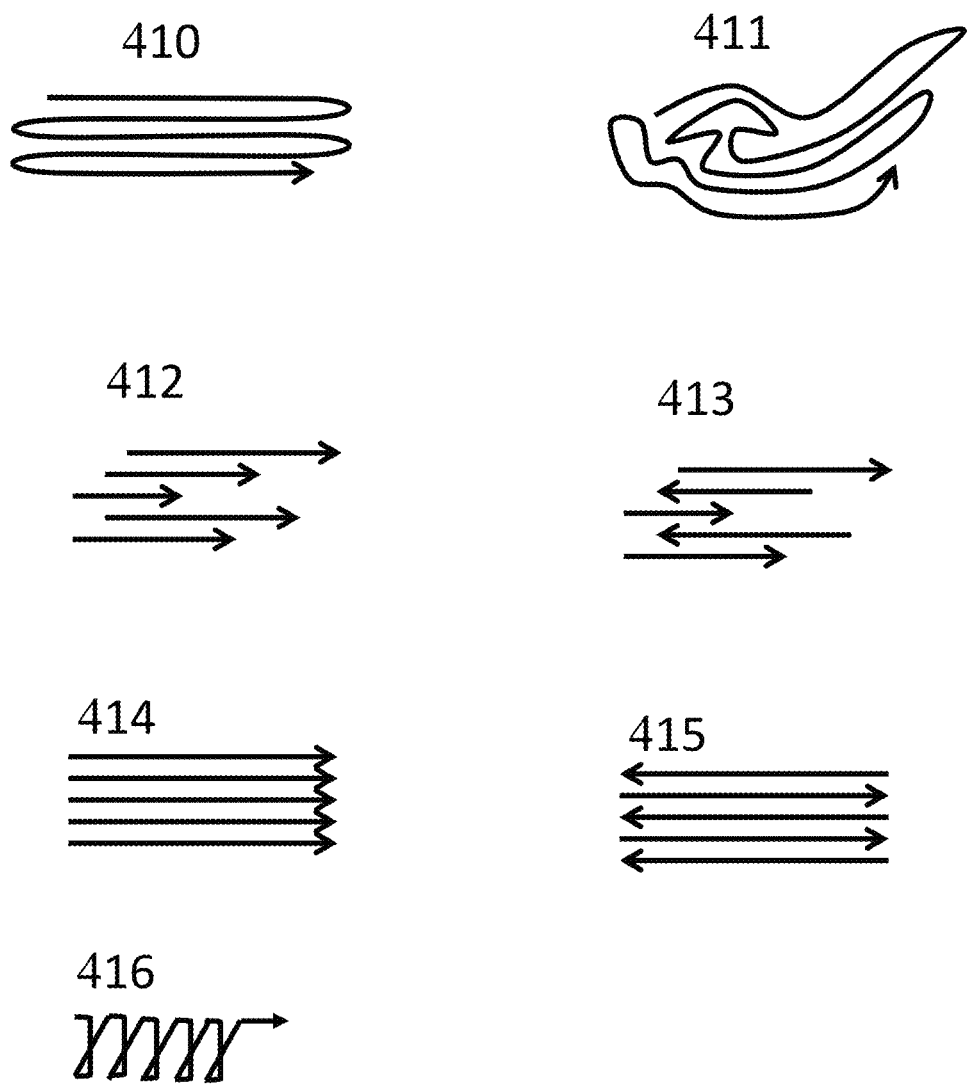
FIG. 4 schematically illustrates various energy beam paths.

The result may aid in generating and/or alter 3D forming (e.g., printing) instructions. The forming (e.g., printing) instructions may comprise the geometry of a desired 3D object and optionally an alteration (e.g., a change) thereof. The alteration may be a geometric alteration. The alteration may comprise a corrective alteration (e.g., corrective deviation, corrective deformation, or object pre-correction). The forming (e.g., printing) instructions may comprise altering one or more process parameters of the 3D printing. For example, the forming (e.g., printing) instructions may comprise controlling one or more energy beam characteristics (e.g., power density, path, and/or hatching), which can individually or collectively be altered. In some embodiments, the energy beam path used during one or more forming operations for forming an object is adjusted. In some embodiments, the speed of the energy beam is varied depending on whether is transforming a region (e.g., critical regions versus non-critical regions) of the 3D object. A critical region can be one that is prone to deformation (e.g., during and/or after the forming process). For example, the energy beam may be at a first speed when transforming a first region of the object, and at a second speed (e.g., slower or faster than the first speed) when transforming a second region of the object. In some cases, this varied speed can be used to adjust (e.g., optimize or increase) throughput while maintaining quality of certain regions of the object. FIG. 3 shows an example of an energy beam path 301. The path may comprise an oscillating sub-path shown as a magnified path example 302. FIG. 4 shows various examples of energy beam paths and/or hatchings; for example, paths 410, 411, and 416 comprise continuous paths; paths 412, 413, 414, and 415 comprise discontinuous paths comprising a plurality of sub paths (e.g., hatchings); and the arrows designate the direction at which the energy beam travels along the paths or sub-paths. The energy beam can be a scanning energy beam, tiling energy beam, or a combination of both. Examples of scanning and tiling energy beams are described in U.S. patent application Ser. No. 15/435,065, filed on Feb. 16, 2017, which is incorporated by reference herein in its entirety. In some embodiments, the one or more processing parameters may be altered based on empirical data collected during and/or after a forming process. For example, comparison of a geometric model and a corresponding object (e.g., test object) can be used to determine regions of the object that experienced more deformations than other regions. This information can be used to modify the forming instructions (e.g., in these regions) to at least partially compensate for such deformations. For instance, a power density of the energy beam (e.g., laser beam) can be modified (e.g., decreased or increased) as the energy beam transforms a pre-transformed material of a region to a transformed material. In some cases, the energy beam is modified from a scanning energy beam to a tiling energy beam (or vice versa). In some cases, the footprint of the energy beam on the exposed surface of the material bed is modified. In some cases, the path of the energy beam is modified. The comparison between the geometric model (e.g., (virtual) model markers) and the object (e.g., physical markers) can be performed in real time (e.g., during the forming of the object), such that the one or more process modifications can occur in situ. In this way, the one or more markers may serve as a tracking device of a forming (e.g., printing) process. Real time may be during forming of the 3D object, a plurality of layers of the 3D object, a layer of the 3D object, a hatch line as part of a layer of a 3D object, a plurality of hatch lines, a melt pool, or a plurality of melt pools. A plurality may be any integer number from 2 to 10. A plurality may be any integer number of at least 2, or of at least 10.

The comparison between the test model and the test object (e.g., test 3D object) may give a result. The comparison of a metrological characteristics (e.g., distance and/or shape) between at least two markers in test model and the respective at least two markers of the test object (e.g., test 3D object) may give a result. The comparison of a metrological characteristics of at least one marker in test model and the respective at least one marker of the test object (e.g., test 3D object) may give a result. The metrological characteristics of a marker may comprise its FSL, shape, or volume.

In some embodiments, the test 3D object is different from the 3D object at least due to the presence of one or more markers in the test 3D object. The one or more markers may be chosen such that the difference between the test 3D object and the requested (e.g., desired) 3D object is insubstantial. Insubstantial change may be relative to a mechanical variation and/or deformation (e.g., of the portion where the one or more markers reside). For example, when the metrological characteristics measured is a distance between the (e.g., center) of two markers, and the comparison of this respective distance between the test model and the test 3D object, a small change is one that is at most B according to the following metric: (a measured distance between a first marker and a second marker in the test 3D object), divided by (a measured distance between the respective first marker and a second marker in the test model)=1+B. B can be at most about 0.001, 0.005, 0.01, 0.02, 0.03, 0.04, 0.05, 0.06, 0.07, 0.08, 0.09, 0.1, or 0.2. B can be between any of the afore-mentioned values (e.g., from about 0.001 to about 0.2, from about 0.001 to about 0.05, from about 0.01 to about 0.06, from about 0.04 to about 0.07, or from about 0.06 to about 0.2). B may be specific to a material (e.g., material type). The result may allow empirical estimation and/or prediction of a deformation of at least one portion of the 3D object (e.g., adjacent to the marker and/or including the marker). The result may allow the design of forming (e.g., printing) instructions (e.g., 3D printing instructions) that result in reduction of deformation in at least a portion of the 3D object. The result may allow the design of forming (e.g., printing) instructions (e.g., 3D printing instructions) that result high fidelity forming (e.g., printing). The result may aid in understanding and/or differentiating between various mechanisms that cause deformation and/or addition to at least a portion of the 3D object. The result may aid in predicting various mechanism that cause deformation and/or addition to at least a portion of the 3D object. For example, differentiation between expansion and extension mechanisms. For example, various mechanisms leading to dimensional inaccuracy.

In some embodiments, empirical methods without the use of markers are used to estimate an amount of expected deformation. For example, a registration process involving applying a rigid-body transformation from coordinates of a point cloud to a CAD coordinate system can be used. In some cases, using markers (whether they are added or are pre-existing features) can provide improved results over registration processes. For example, in some cases, a forming process (or other suitable transformation process) can result in a large degree of deformation when compared to an original geometric model having a requested geometry. Using markers at different regions of the object can reduce errors related to registration.

The one or more markers can have any suitable size(s). The marker may be small. Small may be relative to the 3D object, portion of the 3D object on which the marker is located. Small may be relative to a different between a presence or absence of the marker on the model of the 3D object, as measured by a (e.g., small, inconsequential, or negligent) difference in the physical 3D object formed based on the model of the 3D object. For example, if a non-marked 3D object is formed (e.g., printed) based on a non-marked model, and a marked 3D object is formed (e.g., printed) based on a marked model, and both marked 3D object and non-marked 3D object are substantially identical, then the mark size may be referred to as small. Substantial can be relative to the intended purpose of the 3D object.

In some embodiments, the sizes of the markers can depend on the forming process (e.g., thickness of each layer) and/or an imaging process (e.g., resolution of the imaging process). For example, in some cases the markers are insignificant enough (e.g., small enough) to have a (e.g., substantially) negligible effect on the forming operation. In some cases, the markers are significant enough (e.g., large and/or dense enough) to be detectable using an imaging system (e.g., using light, x-ray, or other electromagnetic radiation), such as a scanner (e.g., a 3D Computerized Tomography (CT) scanner). In some embodiments, the one or more markers have FLS (e.g., diameters or lengths) of at most about 0.01 mm, 0.05 mm, 0.1 mm, 0.25 mm, 0.30 mm, 0.50 mm, 0.75 mm, 0.8 mm, 1.0 mm, 1.25 mm, 1.3 mm, 1.5 mm, 1.75 mm, 1.8 mm, 2.0 mm, 2.5 mm, 3.0 mm, 4.0 mm, 4.5 mm, 5.0 mm, 10.0 mm, 20.0 mm, 50 mm, or 100 mm. In some embodiments, the one or more markers have FLS (e.g., diameters or lengths) of any value between the afore-mentioned values (e.g., from about 0.01 mm to about 100 mm, from about 0.01 mm to about 5.0 mm, or from about 1.5 mm to about 5.0 mm). The locations of the one or more markers may be assessed using metrological measurements. The location may include the center(s) and/or edge(s) of the marker, an FLS of the marker(s) (e.g., diameter(s), spherical equivalent diameter(s), diameter(s) of a bounding circle, or largest of height(s), width(s) and length(s)), and/or volume (s), and/or shape(s) of the marker(s).

The one or more markers can have any suitable shape(s). In some embodiments, the one or more markers have a 3D shape, such as one or more of a spherical, hemispherical, ellipsoid, cone, or polyhedron shape. In some embodiments, the one or more markers are conducive to dense packing (e.g., spherical close packing, e.g., body centered cubic (BCC), face centered cubic (FCC), or hexagonal close-packed (HCP) arrangement). In some embodiments, the one or more markers have a 2D shape, such as one or more of a circular, elliptical, or polygonal shape. In some embodiments, at least two of the one or more markers of a 3D object have (e.g., substantially) the same shapes. In some embodiments, at least two of the one or more markers of a 3D object have different shapes, or different sets of shapes. In some embodiments, at least one of the one or more markers of a 3D object is composed of the same material as a rest of the 3D object that excludes the markers. In some embodiments, at least one of the one or more markers of a 3D object is composed of a different material than the rest of the 3D object that excludes the markers. In some embodiments, at least one of the markers has a different material density than the rest of the 3D object that excludes the markers. In some embodiments, the one or more markers correspond to defects (e.g., material inconsistencies, or pores) of the 3D object. In some cases, the one or more markers are lines (e.g., 2D lines, or 3D raised or recessed lines, e.g., tessellation borders). In some cases, the one or more markers are ridges, edges, borders, rims and/or boundaries along a surface of the 3D object. In some embodiments, the one or more markers include a number of lines (e.g., raised lines), and/or ridges. The lines and/or ridges may be organized in a pattern (e.g., mesh pattern, tessellations, or grid). In some embodiments, the one or more markers include (or be transformed into) one or more point-clouds. The point clouds may correspond to data points in X, Y, Z coordinate system. In some embodiments, the point cloud represents an external surface (or part of an external surface) of an object. The point clouds may be generated from an image of a 3D object (e.g., using any suitable 2D and/or 3D scanning technology and methodology). In some embodiments, the one or more markers correspond to features (e.g., mesh lines, tessellations, grid lines) of one or more models (e.g., polygon mesh, triangle mesh, non-uniform rational basis spline (NURBS), and/or computer-aided design (CAD)) generated from one or more point clouds. In some embodiments, the one or more markers correspond to augmented reality (AR) code (e.g., embossed AR code).

The locations of the physical (e.g., structural) one or more markers may be assessed using metrological measurements. The location may comprise the center and/or edge of the mark, its FLS (e.g., the diameter, spherical equivalent diameter, diameter of a bounding circle, or largest of height, width and length) its volume, and/or its overall shape. Examples of metrological measurements can be found in PCT application PCT/US2015/065297; U.S. patent application Ser. No. 15/435,090; PCT patent application serial number PCT/US17/18191; European patent application serial number EP17156707.6; U.S. patent application Ser. No. 15/435,065; and in U.S. provisional patent application Ser. No. 62/401,534, each of which is incorporated by reference in its entirety.

According to one or more deviations of the actual marked 3D object from its respective position on the marked model of the 3D object, the forming (e.g., printing) instructions for the desired 3D object may be varied. The variation may comprise a geometric variation. The variation may comprise object pre correction (also referred to as "object pre-forming corrections," or "object pre-print correction", abbreviated as "OPC"). The OPC may comprise geometric corrections of a model of the 3D object, for example, as part of a print preparation procedure of the 3D object (e.g., preparing the printing instructions). Variation of the printing instructions may comprise a variation of the model of the 3D object that will result in printing a 3D object comprising a lower degree of deformation as compared to the originally printed 3D object that is printed with the non-varied printing instructions. The creation of the printing instructions (e.g., comprising OPC) may comprise using simulations. The simulations may utilize the variations between the test model (i.e., model of the marked 3D object), and the test object (i.e., the printed marked 3D object).

A corrective modification can include an alteration (e.g., a geometrical alteration) of a model of a desired 3D object. The altered model of the 3D object may result (e.g., through using respective forming (e.g., printing) instructions) in a 3D object that is substantially similar to the desired 3D object (e.g., to the non-altered model of the 3D object). Corrective modification may be any corrective deformation disclosed in: Patent Applications serial number PCT/US16/34857 that was filed on May 27, 2016, titled "THREE-DIMENSIONAL PRINTING AND THREE-DIMENSIONAL OBJECTS THREE-DIMENSIONAL PRINTING AND THREE-DIMENSIONAL OBJECTS FORMED USING THE SAME;" Provisional Patent Application Ser. No. 62/401,534, PCT patent application serial number PCT/US17/18191; European patent application serial number EP17156707.6; and in U.S. patent application Ser. No. 15/435,065, each of which is entirely incorporated herein by reference. The corrective modification of the intended 3D structure may be termed herein as "geometric modification."

Figure 5:
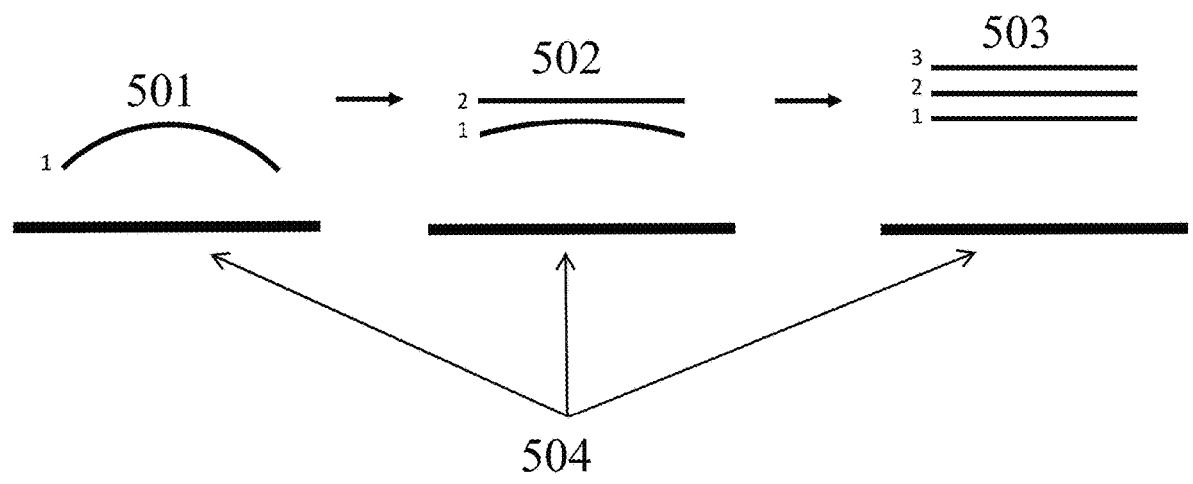
FIG. 5 schematically illustrates a vertical cross section 3D objects.
Figure 6:
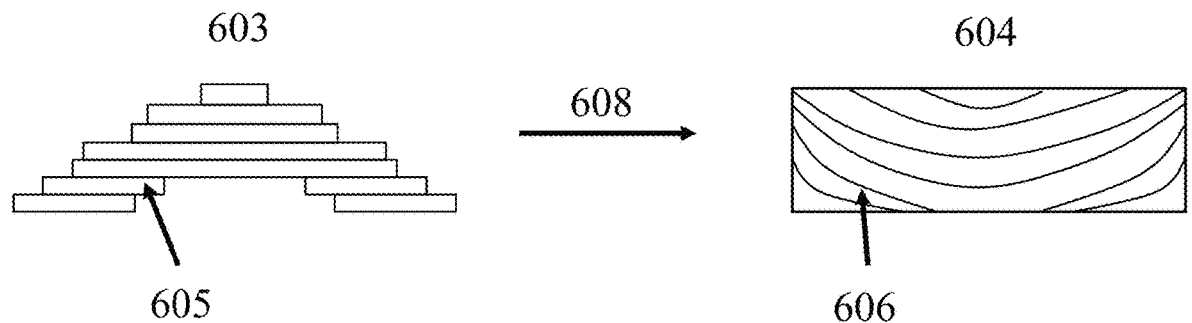
FIG. 6 schematically illustrates vertical cross sections of a model of a 3D object and a respective 3D object.
Figure 7:
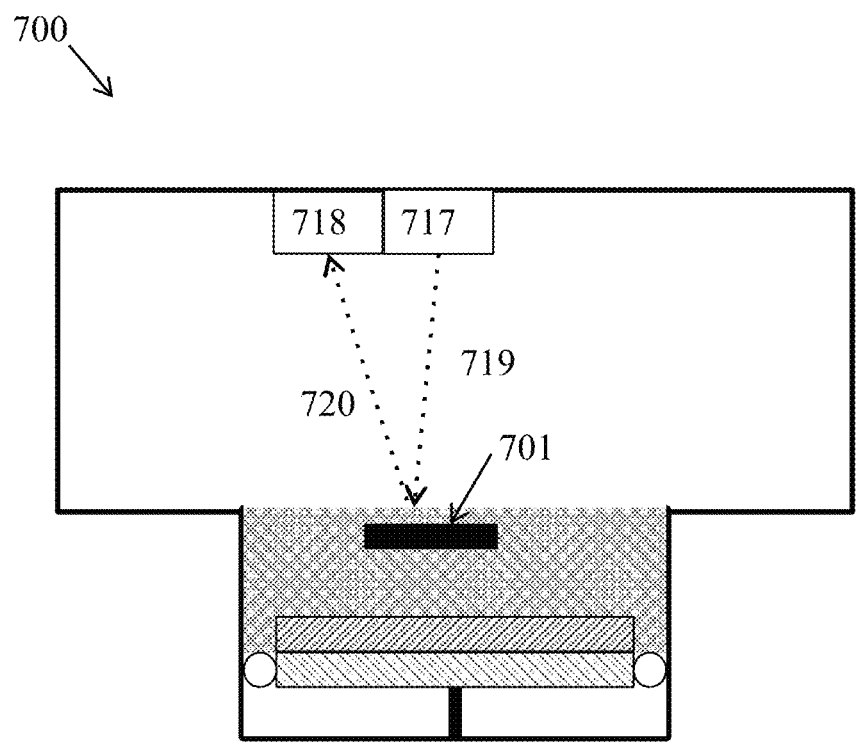
FIG. 7 schematically illustrates a vertical cross section of a 3D printing system and its components.

FIG. 5 shows examples of stages in formation of a 3D object 503 represented as three layers (e.g., numbered 1-3 in object 503), which is shown as a vertical cross section, and is situated on a platform 504. The first formed layer is formed as a negatively curved layer #1 of object 501. Once the second layer (#2 of object 502) is formed, the first layer #1 may flatten out (e.g., its radius of curvature is increased, its curvature approaches zero). Once the third layer (#3 of object 503) is formed, the layers of the 3D object become (e.g., substantially) flat (e.g., planar). Layer #1 may be said to be formed as a correctively modified (e.g., deformed) layer. The corrective modification may enable a formation of a substantially non-deformed 3D object. FIG. 6 shows an example of a 3D object 604 that was formed (e.g., printed) according to a model 603, which model slices (e.g., 605) were deformed during and/or after the 3D forming (e.g., printing) 608 resulting in the desired 3D object 604 comprising the respective layer 606. FIG. 6 shows an example of a corrective modification, depicted as a vertical cross section of the model (603) and its respective formed (e.g., printed) (604) 3D object. The manner of forming (e.g., printing) one or more subsequent layers to the correctively modified layers may take into account (e.g., in situ and/or real time) measurements from one or more sensors of the system (e.g., 3D printer). The corrective modification may comprise a model of a layer of hardened material as part of the 3D object, or a portion of that layer (e.g., as represented in the model of the 3D object). The corrective modification may be of the model of a requested 3D object. The corrective modification may be corrective deviation and/or deformation. FIG. 7 shows an example of a forming (e.g., 3D printing) system comprising a 3D object 701, a sensor 718 which senses the returning beam 720 that was emitted 719 by an emitter 717 (e.g., energy source 717).

Figure 8:
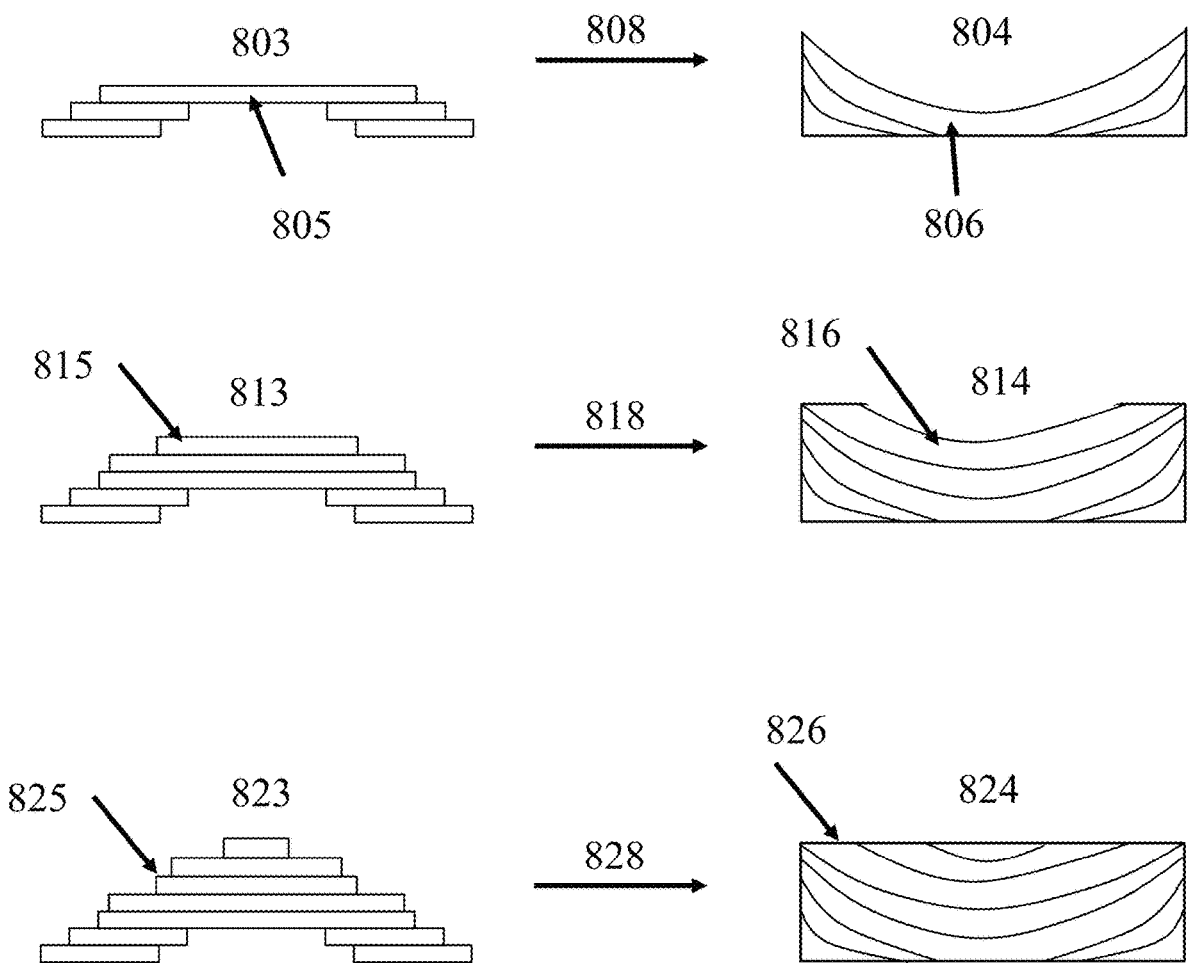
FIG. 8 schematically illustrates models of 3D objects and respective 3D objects.

In some embodiments, the requested 3D object and/or test 3D object may be formed (e.g., printed) to completion. In some instances, a portion of the requested 3D object and/or test 3D object may be formed (e.g., printed). For example, different stages in the forming (e.g., printing) of the 3D object and/or test 3D object may be formed (e.g., printed). FIG. 8 shows an example of a model of a 3D object 823 that is used in the forming (e.g., printing) instructions for a formed (e.g., printed) 3D object 824. The 3D forming (e.g., printing) instructions comprise forming (e.g., printing) the 3D object layer-wise. FIG. 8 shows an example of a model comprising a multiplicity (e.g., plurality) of slices (e.g., 805, 815, 825) each of which corresponds to a respective layer (e.g., of hardened material) in the 3D object (e.g., 806, 816, 826, respectively). An example of various stages of the forming (e.g., printing) can be depicted in the 3D objects 804, 814, and 824. For example, at a first stage: a first portion 803 (including slice 805) is formed (e.g., printed) 808 to form object 804 having layer 806 (corresponding to slice 805); at a second stage: a second portion 813 (including slice 815) is formed (e.g., printed 818) to form object 814 having layer 816 (corresponding to slice 815); and at a third stage: a third portion 823 (including slice 825) is formed (e.g., printed) 828 to form object 824 having layer 826 (corresponding to slice 825). The different stages (e.g., 804, 814, and 824) can be each formed (e.g., printed) in a separate material bed (e.g., during separate 3D forming (e.g., printing) processes, in which case the forming (e.g., printing) processes 808, 818, 828 in the example in FIG. 8 are separate). The different stages can be formed (e.g., printed) simultaneously in a material bed (e.g., during one 3D forming (e.g., printing) process, in which case the forming (e.g., printing) processes 808, 818, 828 in the example in FIG. 8 are the same forming (e.g., printing) process). In some instances, more than one stage may be formed (e.g., printed) together in one material bed. Forming (e.g., printing) of several stages of the test 3D object, and a comparison to its test model, may allow monitoring (e.g., through inspection of the markers) of the development of deformation in the test object. The comparison may highlight varied degrees of deformation in different portions of the 3D object. Subsequently design alteration of the model of the 3D object and/or the 3D object may take place. In some instances, the design alterations may substantially not alter the formed (e.g., printed) 3D object. Substantially may be relative to the intended purpose of the 3D object.

It should be noted that embodiments described herein are not limited to a printing processes. The embodiments may be used during any suitable forming process, or combination of forming processes. The embodiments described herein can be used to generate a corrected geometric model independent of the process(es) used to form an object. The embodiments can be applied to any suitable process that involves deformation of an object (e.g., dimensional changes). The embodiments can be applied to any suitable process that involves transformation of a state of material (e.g., solid to liquid, liquid to solid.). The embodiments can be applied to any suitable process that involves transformation of the distribution of the material (e.g., powder to bulk). The embodiments can be applied to any suitable process that involves transformation of the microstructure of the material (e.g., solid-solid transformation, transformation in metallurgical and/or crystal structure). For example, the embodiments may be used in molding (e.g., injection molding), casting, extruding, welding (e.g., laser welding), cladding, machining, polishing, buffing, or any suitable combination thereof, e.g., including in combination with any suitable printing (e.g., 3D printing) processes. The embodiments described herein may not be limited to any type of printing process. For example, the printing process can include one or more selective of: laser melting (SLM), selective laser sintering (SLS), direct metal laser sintering (DMLS), shape deposition manufacturing (SDM), green body techniques, and fused deposition modeling (FDM) processes. Other methods can include those that involve curing liquid materials, such as stereo lithography (SLA) processes. Other methods can include laminated object manufacturing (LOM) processes.

A result of the comparison between a model of an object and an object may allow for performing a weighted deformation of various portions of an adjusted geometric model for forming (e.g., printing) a subsequent 3D object. The result may afford a metric for the estimation of the forming (e.g., printing) fidelity of various portion of the 3D object. In this manner, a designer may include its intent (e.g., as design constrains) into the forming (e.g., printing) instructions, which may allow an intent based variation of the forming (e.g., printing) instructions (e.g., and the model of the 3D object). A result may aid in formation of a success metric for the formed (e.g., printed) 3D object (e.g., based on design intent).

The one or more markers may be placed (e.g., substantially) homogenously across a model of the 3D object. The one or more markers may be (e.g., strategically) placed in certain locations (e.g., portions) of the model of the 3D object. The type and/or positions of the markers may be chosen by a customer (e.g., a client). In some embodiments, the location of the markers can be chosen based on a geometry of the 3D object. For example, in some cases more markers may be positioned on/in portions of a 3D object that are expected to experience more deformation relative to other portions of the 3D object (which can have less markers or no markers). In some embodiments, the positions of the markers are chosen based on mathematical calculation (e.g., Poisson disk sampling or minimum marker-to-marker and marker-to edge Euclidean distance matrix).

Systems, apparatus, software and methods presented herein can facilitate formation of custom or stock 3D objects for a customer. A customer can be an individual, a corporation, organization, government, non-profit organization, company, hospital, medical practitioner, engineer, retailer, any other entity, or individual. The customer may be one that is interested in receiving the 3D object and/or that ordered the 3D object. A customer can submit a request for formation of a 3D object. The customer can provide an item of value in exchange for the 3D object. The customer can provide a design or a model for the 3D object. The customer can provide the design in the form of a stereo lithography (STL) file. The customer can provide a design where the design can be a definition of the shape and dimensions of the 3D object in any other numerical or physical form (e.g., structure). In some cases, the customer can provide a 3D model, sketch, or image as a design of an object to be generated. The design can be transformed in to instructions usable by the forming (e.g., printing) system to additively generate the 3D object. The customer can provide a request to form the 3D object from a specific material or group of materials (e.g., a material as described herein). In some cases, the design (e.g., model of the 3D object) may not contain auxiliary features or marks of any past presence of auxiliary support features.

In response to the customer request the 3D object can be formed or generated with the forming (e.g., printing) method, system, software and/or apparatus (e.g., embodiments) as described herein. In some cases, the 3D object can be formed by an additive 3D printing process. Additively generating the 3D object can comprise successively depositing and transforming a pre-transformed material comprising one or more material types (e.g., as specified by the customer). The 3D object can subsequently be delivered to the customer. The 3D object can be formed with or without the generation or removal of auxiliary features (e.g., that is indicative of a presence or removal of the auxiliary support feature). Auxiliary features can be support features that prevent a 3D object from shifting, deforming and/or moving during the 3D forming (e.g., printing).

Figure 20A:
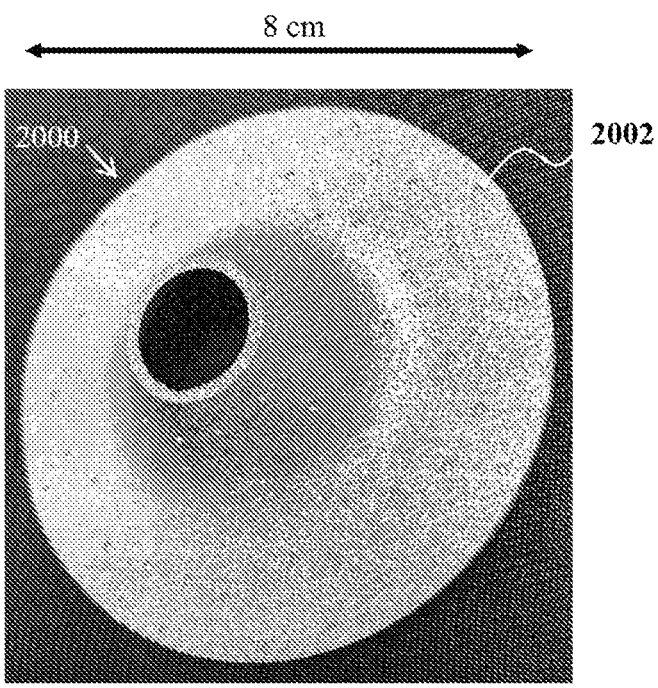
FIG. 20A shows a 3D object.
Figure 20B:
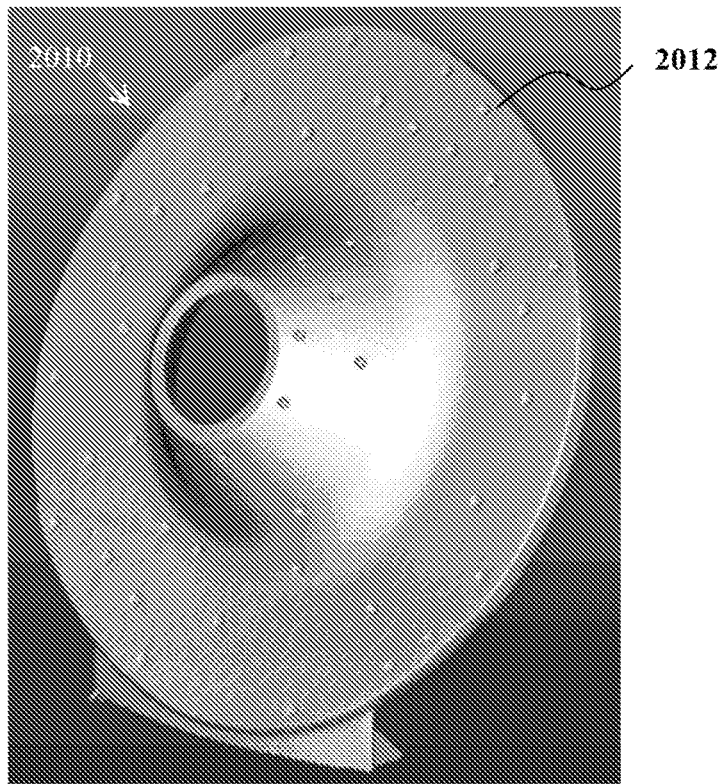
FIG. 20B illustrates a model of a 3D object.

The one or more markers may be detected via an analytical method (e.g., as shown in FIG. 7). The analytical method may comprise using a metrology detector (e.g., metrological mapping). The analytical method may comprise using temperature mapping. The analytical method may comprise using optical surface scanning technology as a method to detect the surface markers. The optical surface scanning may comprise three-dimensional optical surface scanning. For example, Computerized Tomography (i.e., CT) scan can be used to view the markers (e.g., interior markers). In some embodiments, structured light 3D scanning is used. The CT scan may be performed after and/or during the forming (e.g., 3D printing) process. In some embodiments, the imaging is performed by an imaging system, such as a sensing (e.g., imaging) system 1200 shown in FIG. 12, which will be described in detail herein. In some embodiments, the imaging is performed in the system for forming the object (e.g., 3D printing system). FIG. 7 shows an example of a 3D printing system 700 comprising sensing (e.g., imaging) capability, which will be described in detail herein. Various analytical methods, systems, software, and apparatuses (e.g., as mentioned herein) are disclosed in Patent Application serial number PCT/US2015/065297 that was filed on Dec. 11, 2015, titled "FEEDBACK CONTROL SYSTEMS FOR THREE-DIMENSIONAL PRINTING;" U.S. patent application Ser. No. 15/435,090, filed on Feb. 16, 2017, titled "ACCURATE THREE-DIMENSIONAL PRINTING;" PCT patent application serial number PCT/US17/18191 filed on Feb. 16, 2017, titled "ACCURATE THREE-DIMENSIONAL PRINTING;" European patent application serial number EP17156707.6 filed on Feb. 16, 2017, titled "ACCURATE THREE-DIMENSIONAL PRINTING;" U.S. patent application Ser. No. 15/435,065 filed Feb. 16, 2017, titled "ACCURATE THREE-DIMENSIONAL PRINTING;" and in U.S. provisional patent application Ser. No. 62/401,534 filed on Sep. 29, 2016, titled "ACCURATE THREE-DIMENSIONAL PRINTING;" each of which is incorporated herein by reference in its entirety. The sensing (e.g., 3D imaging/scanning) can be used to create corresponding representative data (sometimes represented in image form) of an object (also referred to herein as "sensor data," "image data," "image," "scan," "scan data," "scanned image," or "virtual data"). The image can be rendered on a computer as a reconstruction (e.g., 3D reconstruction) of the object. It should be noted that in some cases image data corresponds to a geometric model, as described herein. If the object has markers (physical markers), the image of the object can have markers (also referred to herein as "image markers") corresponding to the physical markers of the object (and/or model markers of a geometric model). FIG. 20A shows a perspective view (photograph) of an example 3D object 2000 having a disc cone shape (e.g., having a diameter of about 8 cm) and having physical markers 2002. FIG. 20B shows a perspective view of an example image 2010 of a 3D object (e.g., 2000) having image markers 2012 corresponding to physical markers (e.g., 2002). The scanned image (and associated data) can include information regarding the location of the images markers (marker point clouds) on a surface of the object and/or an interior volume of the object. In some cases, the imaging technique is chosen based on an accuracy (e.g., resolution) of the marker point clouds. In some embodiments, the size (e.g., diameters or lengths) of the markers (e.g., physical markers) is based on the accuracy (e.g., resolution) of the imaging technique(s). In some embodiments, the one or more markers (e.g., each of the markers) have FLS (e.g., diameters or lengths) of at least about 0.1 µm, 0.50 µm, 1.0 µm, 2.0 µm, 3.0 µm, 4.0 µm, 5.0 µm, 10.0 µm, 20.0 µm, 50 µm, or 100 µm. In some embodiments, the one or more markers have a FLS (e.g., diameters or lengths) of any value between the afore-mentioned values (e.g., from about 0.1 µm to about 100 µm, from about 5.0 µm to about 50 µm, or from about 5.0 µm to about 100 µm).

Figure 12:
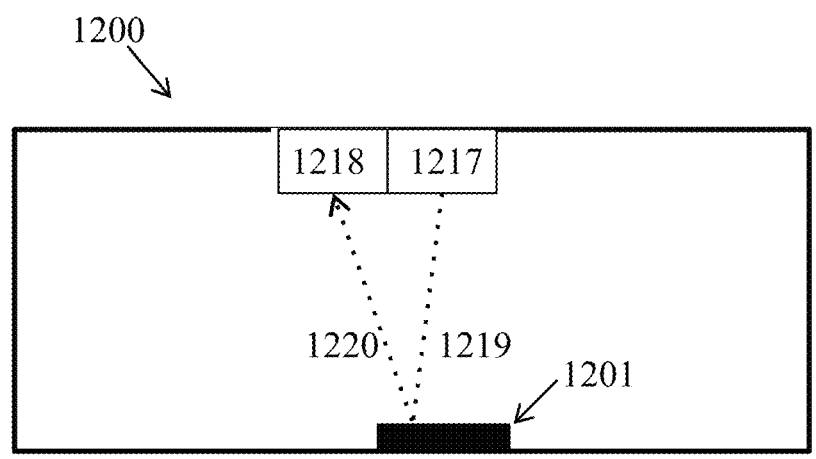
FIG. 12 schematically illustrates a vertical cross section of a detection system.

As described herein, in some embodiments, a 3D printing system (e.g., 700 of FIG. 7) can be configured to print a 3D object (e.g., 701), as well as detect markers on and/or in the 3D object. In some embodiments, the detection is performed in a 3D printing system in situ and/or in real time during a 3D printing process (e.g., as described herein). In some embodiments, the detection is performed in a forming system in which the 3D object is formed, during, before and/or after the forming process. For example, in some embodiments, the detection is performed in a 3D printing system during, before and/or after a 3D printing process. In some embodiments, the detection is performed using a sensing (e.g., an imaging) system (which can also be referred to as a scanning system or detection system). The sensing system can include one or more sensors and/or detectors. The one or more sensors and/or detectors can be operationally coupled to one or more controllers. The sensing system can be separate from the forming (e.g., 3D printing) system used to form (e.g., print) the 3D object. For example, an sensing system can be stand-alone sensing system (e.g., dedicated to imaging one or more 3D objects) or be part of system for forming the 3D object (e.g., a machining system (e.g., a computer numerical control (CNC) machine), molding system, laminating system, or other system described herein). In some embodiments, the sensing system is part of a 3D printing system (e.g., that is the same or different from the 3D printing system used to print the 3D object). The sensing system can include an emitter, which can include one or more energy sources (e.g., light source(s), X-ray source(s) and/or electron beam(s)). The emitter can be configured to emit and direct one or more energy beams toward the 3D object (e.g., toward a surface of the 3D object). The one or more energy beams can interact with the 3D object. For example, the one or more energy beams can reflect (e.g., regularly reflect and/or irregularly reflect) off of a surface of the 3D object, diffract off the 3D object, refract as it passes through the 3D object, and/or otherwise be affected by the 3D object. A sensor can be used to detect a returning beam after interacting (e.g., impinging on) with the 3D object. The imaging system can include any suitable type of imaging and imaging/scanning mechanism. In some embodiments, the imaging system includes one or more of X-ray detectors (e.g., CT scanner). The imaging system may scan the 3D object in two dimensions and/or three dimensions. FIG. 12 shows an example sensing system 1200 that includes an emitter 1217, which is configured to emit energy beam 1219, and sensor 1218, which is configured to detect returning beam 1220 that is reflected off 3D object 1201. In some embodiments, at least one sensor is configured to sense one or more markers of a 3D object. One or more controllers can be configured to (i) control sensing and/or (ii) use sensing data, of the one or more markers of the 3D object. One or more controllers can be configured to (i) control sensing and/or (ii) use sensing data, of the one or more physical markers during forming of the 3D object. One or more controllers can be configured to (i) control sensing and/or (ii) use sensing data, of the one or more physical markers, e.g., after forming of the 3D object. In some embodiments, at least one detector can be configured to detect as least one characteristic of the forming of the 3D object. The at least one characteristic of the forming of the 3D object can comprise a process parameter, the material used for the forming, the geometric model, the physical model, and the alteration of forming 3D object. One or more controllers can be configured to control the at least one detector and/or control one or more process parameters as a result of a detection by the at least one detector. The one or more detectors can be configured to detect a temperature during the forming of the 3D object. One or more controllers can be configured to control (e.g., monitor) detection of the temperature. The temperature can correspond to a temperature of the 3D object and/or a vicinity of the 3D object. Vicinity can be in a material bed that is configured to accommodate the 3D object. Vicinity can be in a material bed that is configured to accommodate the 3D object. The temperature can correspond to a temperature of a melt pool and/or a vicinity of the melt pool (e.g., up to 2, 3, 4, 5, 6, or 7 diameters of a FLS of a melt pool generated during the forming, which diameters are centered at the melt pool). The temperature can correspond to a temperature of an atmosphere surrounding the 3D object. The one or more detectors can be configured to detect at least one of cleanliness, pressure, humidity, or oxygen level of an atmosphere surrounding the three-dimensional object during the forming of the 3D object. detecting a cleanliness can include detecting a number (e.g., amount or concentration) of particles within at least the processing cone of the atmosphere within the processing chamber.

The shape and/or size of the markers may allow variation in density from an analytical standpoint. For example, holes of difference density and/or size may allow several levels of markers geometry that may be revealed in a CT scan. For example, Various CT scan methodologies are disclosed in patent application PCT/US2015/065297 which is incorporated herein by reference in its entirety.

Figure 19A:
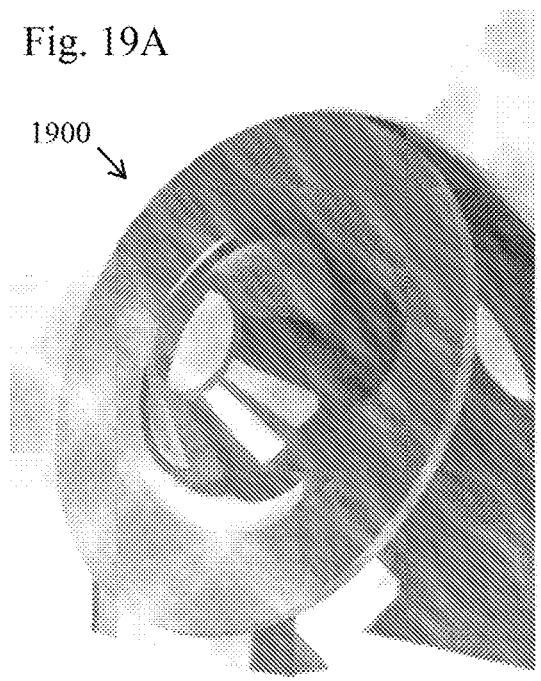
FIGS. 19A-19C illustrate models of a 3D object.
Figure 19B:
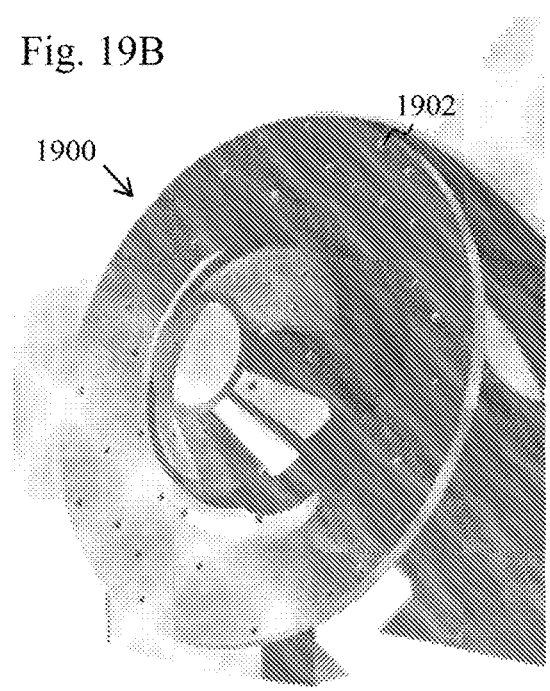
Figure 19C:
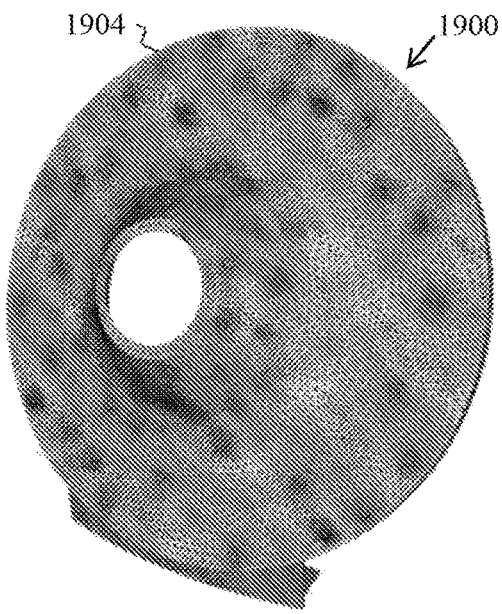

In some embodiments, the positions/locations of the markers are chosen based on the geometry and expected alteration (e.g., deformation) of the object that result from its formation. For example, in some embodiments, marker locations are chosen based on portions of a surface (or volume) of the geometric model with tessellations (mesh) densities that are greater than a predetermined density. In some embodiments, the orientation of the markers with respect to a surface (or volume) of the geometric model is controlled. For example, in some embodiments, a marker is oriented (e.g., substantially) normal with respect to surface location of the geometric model. In some embodiment, the geometric model with the model markers, is further processed by altering the geometric model to a tessellated version (i.e., having tessellations (e.g., surface mesh)). FIGS. 19A-19C show perspective views of an example geometric model of the requested object 1900 (e.g., computer aided design (CAD) drawing) and associated model markers. FIG. 19A shows geometric model 1900 having a requested geometry. FIG. 19B shows the geometric model after model markers 1902 (e.g., hemispherical recesses) are added to surfaces of the geometric model. FIG. 19C shows the geometric model with markers converted to tessellated versions 1904 (a surface mesh). An object can be formed (e.g., printed) using instructions (e.g., printing instructions) that consider (e.g., based on) the geometric model. Any suitable system and associated forming process(es) can be used to form the object, such as described herein. The instructions (e.g., printing instructions) can include specifics related to the forming process, e.g., including instructions for the forming of multiple layers during the forming process, as described herein.

Once an object (e.g., test object) is formed, the object can be analyzed to determine the locations of the physical markers in/on the object. The analytical methods may comprise using any suitable sensing (e.g., imaging) apparatus. The analytical method may monitor the markers statically and/or dynamically (e.g., in real time during forming process (e.g., 3D printing)). At times, the dynamic monitoring can take place when the analytical system and/or apparatus is integrated within the system used to form the object (e.g., 3D printer). Dynamic monitoring may refer to on-line monitoring during the forming process (e.g., 3D printing). In some embodiments, static monitoring refers to inspection of the partial and/or complete marked 3D object subsequent to the forming (e.g., printing) operation. In some embodiments, static monitoring refers to inspection of the partial and/or complete marked 3D object off line. Real time may be during formation of, for example, at least one of: 3D object, layer within the 3D object, dwell time of an energy beam along a path, and dwell time of an energy beam along a hatch line dwell time of an energy beam forming a melt pool. Real time may be during the forming (e.g., 3D printing) process or any portion thereof. For example, real time may be during the operation of an energy beam. For example, real time may be during the formation of the 3D object or any portion thereof. Real time analysis may be effectuated when the analytical tool resides in the system used to form the object (e.g., 3D printing chamber) (e.g., as shown in FIG. 7).

The forming (e.g., printing) of a test 3D object and comparison to its respective test model may aid in the detection of various problems, concerns and/or troubleshooting during a forming (e.g., 3D printing) process. The test object may be formed (e.g., printed) along with a 3D object, for example, as an alignment mechanism of the forming system (e.g., 3D printer), its setup and/or its parameters.

Figure 9:
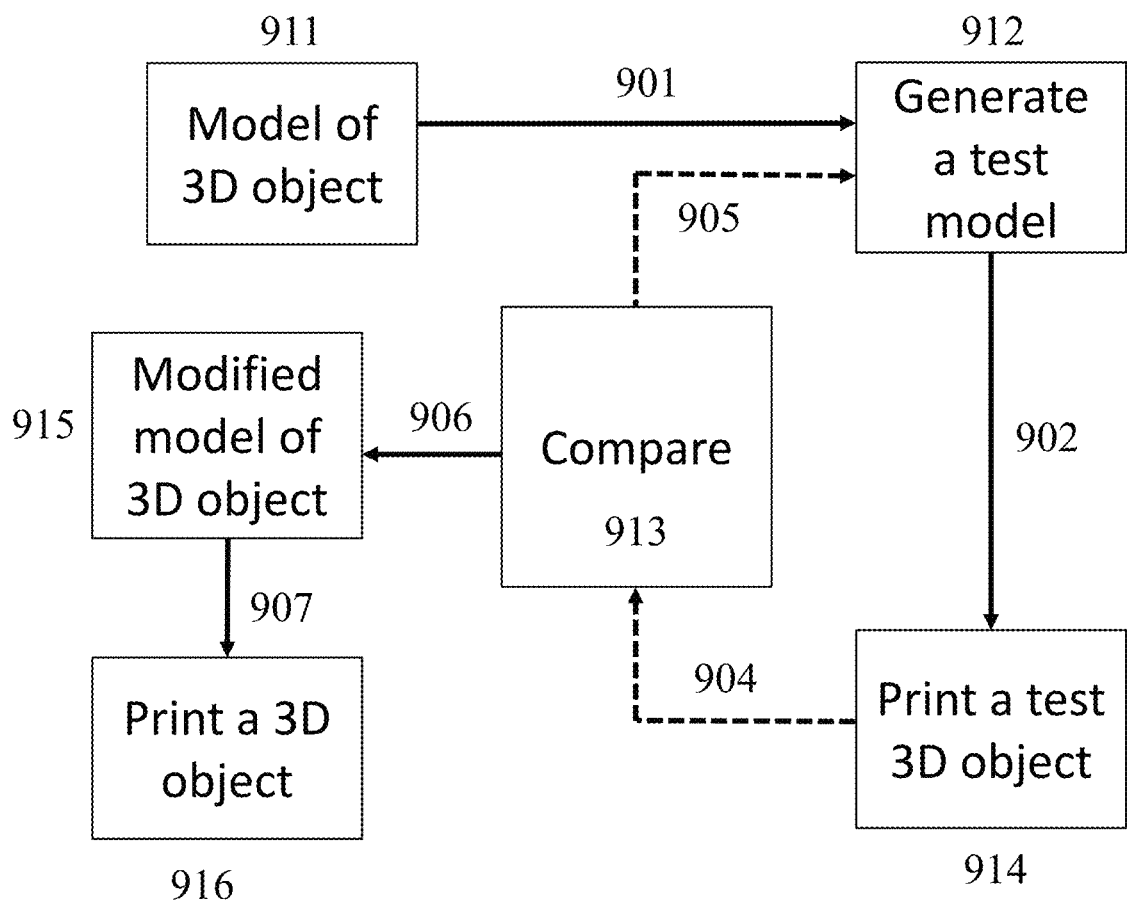
FIG. 9 schematically illustrates a flow diagram used in the printing of one or more 3D objects.

An iterative forming (e.g., printing) process using a marked 3D object (e.g., empirical process) is shown as an example in FIG. 9. The process of developing forming (e.g., printing) instructions for a requested (e.g., desired) 3D object may comprise: (i) generating (e.g., 901) a test model (marked geometric model) (e.g., 912) from a model (geometric model) of a requested 3D object (e.g., 911) by inserting one or more markers (model markers), (ii) generating a test object (e.g., 914) through a 3D forming (e.g., printing) process (e.g., 902), and (iii) measuring and analyzing the test object (e.g., 904), and comparing (e.g., 913) between the test model (marked geometric model) and the test object. The creation of the forming (e.g., printing) instructions for a requested (e.g., desired) 3D object may further comprise (iv) altering the test model (e.g., geometric alteration) to generate a subsequent test model (adjusted geometric model) (e.g., 905) in returning to operation (i) and forming (e.g., printing) a respective subsequent test 3D object. The development of the forming (e.g., printing) instructions for a requested (e.g., desired) 3D object may comprise an iterative process (e.g., comprising 904, 905, and 902) until a satisfactory test 3D object is reached. The test model of the satisfactory test 3D object may serve as a basis for modification (e.g., 906) of the model of the 3D object (e.g., 911) to form a modified model of the 3D object (e.g., 915), which in turn is used to form, e.g., print (e.g., 907) the requested (e.g., desired) 3D object 916. The forming (e.g., printing) instructions for the 3D object (e.g., 916) may use the modified model of the 3D object (e.g., 915). The iterative process (e.g., comprising 904, 905, and 902) may comprise geometrical calibration. The development of forming (e.g., printing) instruction may (e.g., further) comprise simulations (e.g., simulated and/or semi-simulated). Semi-simulated may consider (e.g., take into account) empirical measurements (e.g., of the test 3D object).

Figure 13:
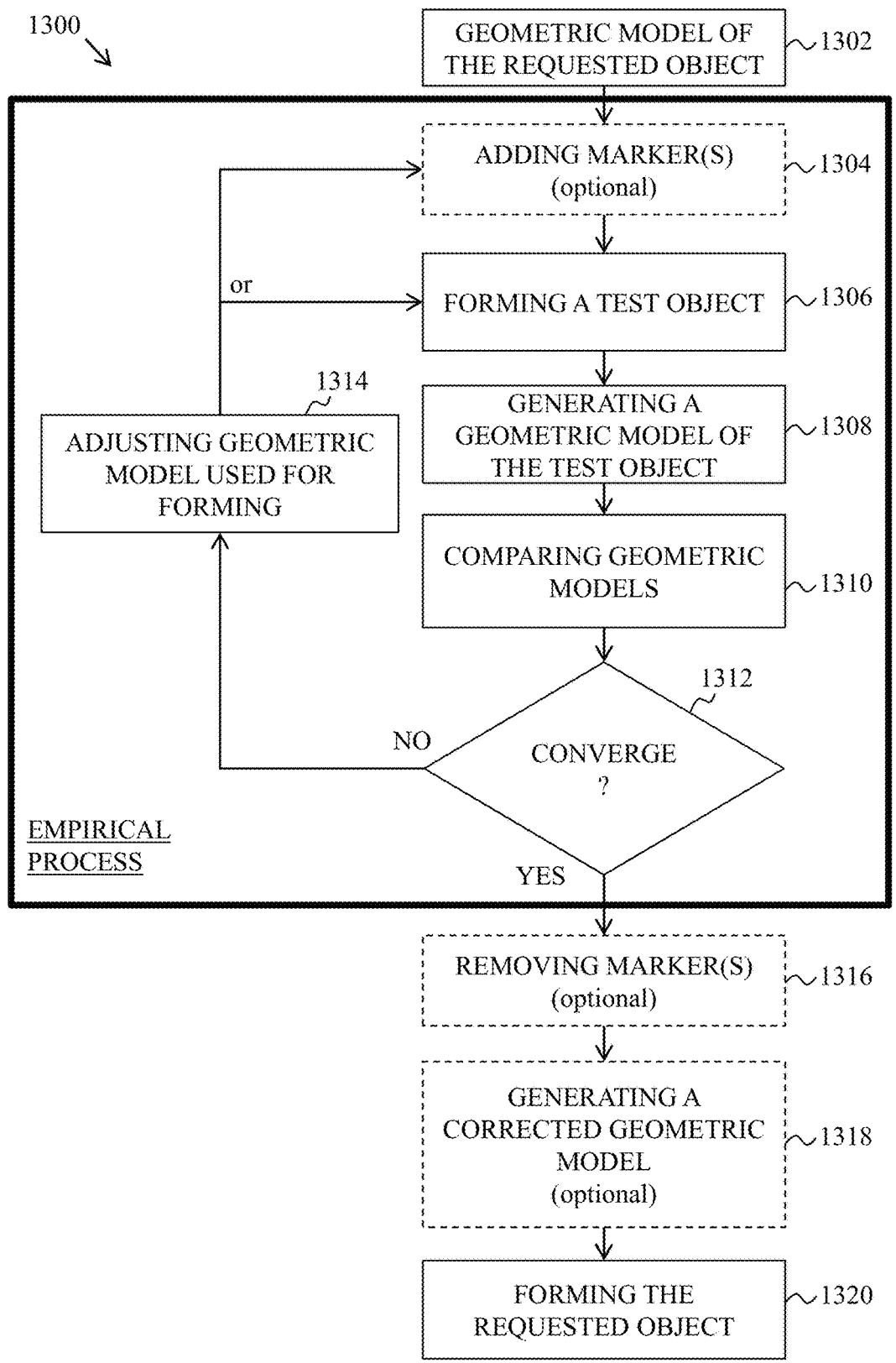
FIG. 13 schematically illustrates a flow diagram used in the forming of one or more 3D objects.

FIG. 13 shows flowchart 1300 indicating an example empirical process for forming an object, in accordance with some embodiments. A geometric model of the requested object (e.g., 1302) can be obtained. A geometric model of the requested object can correspond to a computer representation of the requested object (e.g., having desired geometric dimensions), e.g., a virtual object. In some cases, the geometric model of the requested object is provided, for example, by a customer. In some cases, the geometric model of the requested object is obtained or generated (e.g., using any suitable 3D rendering technique). In some embodiments, this involves creating a NURBS and/or CAD drawing of the requested object having desired geometric dimensions and/or other properties (e.g., density). In some embodiments, the geometric model of the requested object is obtained by imaging an existing 3D object (e.g., composed of a different material than that of a requested object). Imaging can be performed using any suitable imaging/scanning technology/instrumentation (e.g., CT scanning). One or more model markers (virtual markers, e.g., image markers) can optionally be added to the geometric model of the requested object (e.g., 1304). The markers can be any markers, e.g., as described herein. In some embodiments, the marker(s) are added by storing positions of the nominal marker locations in the coordinate system of the geometric model (e.g., CAD coordinate system). In some cases, the markers are already included in the geometric model of the requested object. The markers can include mesh lines, tessellation borders, tile borders, grid lines, or other point cloud features of the geometric model of the requested object. Point cloud features can be a set of data points in a coordinate system. A test object can then be formed (e.g., 1306) using instructions that consider (e.g., are based on) the geometric model of the requested object. In some embodiments, the forming process comprises a 3D printing process. In some embodiments, the forming process comprises molding, casting, extruding, or machining. The forming process can comprise additive or subtractive processing. The forming process can comprise chemical or physical layer deposition. The forming process can comprise powder deposition. The forming process can comprise layer-wise manufacturing. In some embodiments, a combination of forming techniques are used, as suitable. The test object can include one or more physical markers corresponding to the one or more image makers of the geometric model of the requested object. A geometric model of the test object can be generated (e.g., 1308) based on the test object. For example, the geometric model of the test object can correspond to an image of the test object generated by using one or more sensing (e.g., imaging, (e.g., scanning)) techniques. The image of the test object can be used to determine the image marker locations in an imaging system coordinate system (e.g., scanner coordinates system). The geometric model of the test object (e.g., aspects of the geometric model of the test object) can then be compared to the geometric model of the requested object (e.g., aspects of the geometric model of the requested object) (e.g., 1310). In some embodiments, comparing comprises comparing (i) positions of the model markers of the geometric model of the requested object with (ii) positions of the model markers of the geometric model of the test object. In some embodiments, comparing comprises comparing at least one characteristic of the model marker(s). The at least one characteristic of the model markers may comprise location (e.g., relative location), shape, volume, cross section, and/or sizes of the model markers. Comparing can comprise performing one or more regression analyses. Comparing can comprise determining whether data (e.g., location of model markers) associated with the geometric model of the test object (e.g., substantially) converges with data (e.g., location of the model markers) associated with the geometric model of the test object (e.g., 1312). Comparing can comprise determining a correspondence between the model markers (e.g., locations of the model markers) and the image markers (e.g., locations of the image markers). In some embodiments, the comparing is of location, shape, volume, fundamental length scale, and/or a material property. The data may comprise the at least one characteristic of the model marker(s). Determining convergence can involve determining whether an amount of deviation (if any) between the at least one characteristic of the model marker(s) of the geometric model of the test object and the respective at least one characteristic of the model marker(s) of the geometric model of the requested object, are within a threshold range. For example, the threshold range can correspond to a statistically calculated acceptable deviation using any suitable calculation techniques, such as those described herein. In some embodiments, the comparing involves using distance matrices, regression analyses and/or displacement vectors as described herein. If it is determined that data associated with the geometric model of the test object does not (e.g., substantially) converge with data associated with the geometric model of the test object, a geometric model for forming the test object (initially, the geometric model of the requested object) can be adjusted (e.g., corrected) (e.g., 1314). In some embodiments, the geometric model used for the forming process is adjusted (e.g., corrected) using one or more optimization calculations. In some cases, the optimization involves adjusting the locations (e.g., virtually adjusting) the model markers of the geometric model by a function of a computed displacement vector (e.g., as discussed below). For example, in some embodiments, the locations are adjusted by the computed displacement vector multiplied by negative one. A geometric deformer (e.g., b-spline free form deformer) can be used to extend the adjusted model marker locations of the (e.g., entire) geometric model. This process can be iteratively repeated until, for example, (e.g., substantial) convergence (e.g., 1312).

In some embodiment, markers (e.g., model markers) are optionally added to the adjusted geometric model used for the forming process (e.g., repeating 1304). In some embodiments, markers (e.g., model markers) are not added to the adjusted geometric model. Another (e.g., second) test object can be formed (e.g., repeating 1306), another e.g., second) geometric model of the test object can be generated (e.g., repeating 1308), which can be compared to the geometric model of the requested object (e.g., repeating 1310) to determine (e.g., substantial) convergence (e.g., 1312). In some embodiments, the cycle of adjusting (e.g., 1314), optional adding markers (e.g., 1304), forming (e.g., 1306), generating (e.g., 1308), comparing (e.g., 1310), and convergence determining (e.g., 1312), can be repeated until data associated with the geometric model of the test object (e.g., substantially) converges with data associated with the geometric model of the requested object. If it is determined that data associated to the geometric model of the test object (e.g., substantially) converge with data associated with the geometric model of the requested object, the markers (if used) can optionally be removed from the geometric model considered in (e.g., used for) the forming process (e.g., 1316) and a corrected geometric model can be generated (e.g., 1318). In some embodiments, the corrected geometric model corresponds to the last adjusted geometric model that is used in the forming process. The corrected geometric model can then be used to form the requested object (e.g., 1320). The corrected geometric model (or finally adjusted geometric model used for forming) can be used to form (e.g., print) multiple requested objects. In some embodiments, the markers used are inherent object markers (e.g., tessellation borders), and the operation of adding marker(s) (e.g., 1304) is not exercised.

At times, it is desirable to monitor deformation in primitive portions of a 3D object. A primitive portion may be a (e.g., characteristic) portion of one or more 3D objects. The process of developing forming (e.g., printing) instructions for a 3D object primitive portion may comprise: (i) generating a test model of the primitive portion, (ii) generating a test object, and (iii) comparison between the two. The creation of the forming (e.g., printing) instructions for a desired 3D object may further comprise (iv) altering the test model of the primitive portion (e.g., geometric alteration), and returning to operation (i). The development of the forming (e.g., printing) instructions for a desired 3D object primitive portion may further comprise an iterative process until a satisfactory 3D object may be generated using the forming (e.g., printing) instructions. The iterative process may comprise geometrical calibration. The development of forming (e.g., printing) instruction may (e.g., further) comprise simulations.

The result and/or iterative process may comprise using a learning algorithm. The learning algorithm may comprise neural networks, or machine learning. The learning algorithm may comprise pattern recognition. The learning algorithm may comprise artificial intelligence, data miming, computational statistics, mathematical optimization, predictive analytics, discrete calculus, or differential geometry. The learning algorithms may comprise supervised learning, reinforcement learning, unsupervised learning, semi-supervised learning. The learning algorithm may comprise bias-variance decomposition. The learning algorithm may comprise decision tree learning, associated rule learning, artificial neural networks, deep learning, inductive logic programming, support vector machines, clustering, Bayesian networks, reinforcement learning, representation learning, similarity and metric learning, sparse dictionary learning, or genetic algorithms (e.g., evolutionary algorithm). The non-transitory computer media may comprise any of the algorithms disclosed herein. The controller and/or processor may comprise the non-transitory computer media. The software may comprise any of the algorithms disclosed herein. The controller and/or processor may comprise the software.

The forming (e.g., printing) instructions of the 3D object may comprise one or more auxiliary supports. The use of the test model and test object comparison (e.g., comparison of their respective one or more markers) may allow estimating the deformation(s) associated with removal of the formed (e.g., printed) 3D object from the platform (e.g., build plate) by severing the supports. This may lead to better understanding of residual stress and/or deformation imparted on the 3D object by the forming (e.g., printing) process due to the presence of auxiliary support structures. This may lead to methodologies for forming (e.g., printing) 3D objects with minimal number of auxiliary supports, minimal stress, and/or minimal deformation. For example, this may allow strategic removal of one or more auxiliary supports from a model of the 3D object (e.g., that is used for forming (e.g., printing) instruction for the 3D object). Consequently, this may allow forming (e.g., printing) a 3D object with minimal number of auxiliary supports. The removal of the one or more auxiliary supports from a model of the 3D object may allow generation of a 3D object with minimal auxiliary support. At times, forming (e.g., printing) a 3D object with a reduced number of auxiliary supports (e.g., elimination thereof) may ease post processing of the generated 3D object to form the requested 3D object. In some embodiments, post processing refers to a procedure performed on the 3D object after its forming (e.g., printing) process (e.g., utilizing the energy beam) has been completed.

Post processing (e.g., further processing) may comprise trimming (e.g., ablating). Further processing (e.g., also referred to herein as "post processing") may comprise polishing (e.g., sanding). The 3D object can be devoid of surface features that are indicative of the use of a trimming process during or after the formation of the three-dimensional object. The trimming process may be an operation conducted after the completion of the forming (e.g., 3D printing) process. The trimming process may be a separate operation from the forming (e.g., 3D printing) process. The trimming may comprise cutting (e.g., using a piercing saw). The trimming can comprise polishing or blasting. The blasting can comprise solid blasting, gas blasting or liquid blasting. The solid blasting can comprise sand blasting. The gas blasting can comprise air blasting. The liquid blasting can comprise water blasting. The blasting can comprise mechanical blasting. The trimming may comprise mechanical trimming or optical trimming (e.g., annealing using an energy beam). In some cases, the generated 3D object can be retrieved from the system used to form the 3D object, (e.g., 3D printer) and delivered to the customer without removal of transformed material and/or auxiliary features. The 3D object can be retrieved when the 3D part, composed of hardened (e.g., solidified) material, is at a handling temperature that is suitable to permit the removal of the 3D object from the material bed without substantial deformation.

In some instances, the 3D object may require post processing (e.g., heat treatment such as, for example, annealing). Some post processing procedures may impart deformation on the processed 3D object after its forming (e.g., 3D printing). The use of the test model and test object comparison (e.g., comparison of their respective one or more markers) after the test object has been post processed, may allow understanding of the nature and/or extend of imparting the deformation.

The term "auxiliary features," as used herein, generally refers to features that are part of a formed (e.g., printed) 3D object, but are not part of the requested (e.g., desired, intended, designed, ordered, modeled, or final) 3D object. Auxiliary features (e.g., auxiliary supports) may provide structural support during and/or subsequent to the formation of the 3D object. Auxiliary features may enable the removal or energy from the 3D object that is being formed. Auxiliary features may enable reduction of deformations of at least a portion of a generated 3D object, which would otherwise manifest themselves. Examples of auxiliary features comprise heat fins, wires, anchors, handles, supports, pillars, columns, frame, footing, scaffold, flange, projection, protrusion, mold (a.k.a. mould), building platform (e.g., base), or other stabilization features. In some instances, the auxiliary support is a scaffold that encloses the 3D object or part thereof. The scaffold may comprise lightly sintered or lightly fused powder material. The 3D object can have auxiliary features that can be supported by the material bed (e.g., powder bed) and not touch the platform (e.g., base, substrate, container accommodating the material bed, or the bottom of the enclosure). The 3D part (3D object) in a complete or partially formed state can be completely supported by the material bed (e.g., without touching the substrate, base, container accommodating the material bed, or enclosure). The material bed may comprise a flowable (e.g., not fixed) material during the forming (e.g., 3D printing) process. The 3D object in a complete or partially formed state can be completely supported by the material bed (e.g., without touching anything except the material bed). The 3D object in a complete or partially formed state can be suspended in the material bed without resting on any additional support structures. In some cases, the 3D object in a complete or partially formed (i.e., nascent) state can freely float (e.g., anchorless) in the material bed.

In some embodiments, the present disclosure relates to 3D printing apparatuses, systems, software, and methods for forming a 3D object. For example, a 3D object may be formed by sequential addition of material or joining of pre-transformed material to form a structure in a controlled manner (e.g., under manual or automated control). Pre-transformed material, as understood herein, is a material before it has been transformed during the 3D printing process. The transformation can be effectuated by utilizing an energy beam. The pre-transformed material may be a material that was, or was not, transformed prior to its use in a 3D printing process. The pre-transformed material may be a starting material for the 3D printing process.

In a 3D printing process, the deposited pre-transformed material may be fused, (e.g., sintered or melted), bound or otherwise connected to form at least a portion of the desired 3D object. Fusing, binding or otherwise connecting the material is collectively referred to herein as "transforming" the material. Fusing the material may refer to melting, smelting, or sintering a pre-transformed material. Melting may comprise liquefying the material (i.e., transforming to a liquefied state). A liquefied state refers to a state in which at least a portion of a transformed material is in a liquid state. Melting may comprise liquidizing the material (i.e., transforming to a liquidus state). A liquidus state refers to a state in which an entire transformed material is in a liquid state. The embodiments (e.g., apparatuses, methods, software, and/or systems) provided herein are not limited to the generation of a single 3D object, but but may be utilized to generate one or more 3D objects simultaneously (e.g., in parallel) or separately (e.g., sequentially). The multiplicity of 3D objects may be formed in one or more material beds (e.g., powder bed), and/or adjacent to one or more platforms. In some embodiments, a plurality of 3D objects is formed in one material bed and/or adjacent to one platform.

3D printing methodologies can comprise extrusion, wire, granular, laminated, light polymerization, or powder bed and inkjet head 3D printing. Extrusion 3D printing can comprise robo-casting, fused deposition modeling (FDM) or fused filament fabrication (FFF). Wire 3D printing can comprise electron beam freeform fabrication (EBF3). Granular 3D printing can comprise direct metal laser sintering (DMLS), electron beam melting (EBM), selective laser melting (SLM), selective heat sintering (SHS), or selective laser sintering (SLS). Powder bed and inkjet head 3D printing can comprise plaster-based 3D printing (PP). Laminated 3D printing can comprise laminated object manufacturing (LOM). Light polymerized 3D printing can comprise stereolithography (SLA), digital light processing (DLP), or laminated object manufacturing (LOM). 3D printing methodologies can comprise Direct Material Deposition (DMD). The Direct Material Deposition may comprise, Laser Metal Deposition (LMD, also known as, Laser deposition welding). 3D printing methodologies can comprise powder feed, or wire deposition. 3D printing may comprise Laser Engineered Net Shaping (LENS).

3D printing methodologies may differ from methods traditionally used in semiconductor device fabrication (e.g., vapor deposition, etching, annealing, masking, or molecular beam epitaxy). In some instances, the forming process (e.g., 3D printing) may further comprise one or more (printing) methodologies that are traditionally used in semiconductor device fabrication. 3D printing methodologies can differ from vapor deposition methods such as chemical vapor deposition, physical vapor deposition, or electrochemical deposition. In some instances, the forming process (e.g., 3D printing) may further include vapor deposition methods.

The deposited pre-transformed material within the enclosure can be a liquid material, semi-solid material (e.g., gel), or a solid material (e.g., powder). The deposited pre-transformed material within the enclosure can be in the form of a powder, wires, sheets, or droplets. The material (e.g., pre-transformed, transformed, and/or hardened) may comprise elemental metal, metal alloy, ceramics, or an allotrope of elemental carbon. The allotrope of elemental carbon may comprise amorphous carbon, graphite, graphene, diamond, or fullerene. The fullerene may be selected from the group consisting of a spherical, elliptical, linear, and tubular fullerene. The fullerene may comprise a buckyball, or a carbon nanotube. The ceramic material may comprise cement. The ceramic material may comprise alumina, zirconia, or carbide (e.g., silicon carbide, or tungsten carbide). The ceramic material may include high performance material (HPM). The ceramic material may include a nitride (e.g., boron nitride or aluminum nitride). The material may comprise sand, glass, or stone. In some embodiments, the material may comprise an organic material, for example, a polymer or a resin (e.g., 114 W resin). The organic material may comprise a hydrocarbon. The polymer may comprise styrene or nylon (e.g., nylon 11). The polymer may comprise a thermoplast. The organic material may comprise carbon and hydrogen atoms. The organic material may comprise carbon and oxygen atoms. The organic material may comprise carbon and nitrogen atoms. The organic material may comprise carbon and sulfur atoms. In some embodiments, the material may exclude an organic material. The material may comprise a solid or a liquid. In some embodiments, the material may comprise a silicon-based material, for example, silicon based polymer or a resin. The material may comprise an organosilicon-based material. The material may comprise silicon and hydrogen atoms. The material may comprise silicon and carbon atoms. In some embodiments, the material may exclude a silicon-based material. The powder material may be coated by a coating (e.g., organic coating such as the organic material (e.g., plastic coating)). The material may be devoid of organic material. The liquid material may be compartmentalized into reactors, vesicles, or droplets. The compartmentalized material may be compartmentalized in one or more layers. The material may be a composite material comprising a secondary material. The secondary material can be a reinforcing material (e.g., a material that forms a fiber). The reinforcing material may comprise a carbon fiber, Kevlar®, Twaron®, ultra-high-molecular-weight polyethylene, or glass fiber. The material can comprise powder (e.g., granular material) and/or wires. The bound material can comprise chemical bonding. Transforming can comprise chemical bonding. Chemical bonding can comprise covalent bonding. The pre-transformed material may be pulverous. The printed 3D object can be made of a single material (e.g., single material type) or multiple materials (e.g., multiple material types). Sometimes one portion of the 3D object and/or of the material bed may comprise one material, and another portion may comprise a second material different from the first material. The material may be a single material type (e.g., a single alloy or a single elemental metal). The material may comprise one or more material types. For example, the material may comprise two alloys, an alloy and an elemental metal, an alloy and a ceramic, or an alloy and an elemental carbon. The material may comprise an alloy and alloying elements (e.g., for inoculation). The material may comprise blends of material types. The material may comprise blends with elemental metal or with metal alloy. The material may comprise blends excluding (e.g., without) elemental metal or including (e.g., with) metal alloy. The material may comprise a stainless steel. The material may comprise a titanium alloy, aluminum alloy, and/or nickel alloy.

In some cases, a layer within the 3D object comprises a single type of material. In some examples, a layer of the 3D object may comprise a single elemental metal type, or a single alloy type. In some examples, a layer within the 3D object may comprise several types of material (e.g., an elemental metal and an alloy, an alloy and a ceramic, an alloy and an elemental carbon). In certain embodiments, each type of material comprises only a single member of that type. For example: a single member of elemental metal (e.g., iron), a single member of metal alloy (e.g., stainless steel), a single member of ceramic material (e.g., silicon carbide or tungsten carbide), or a single member of elemental carbon (e.g., graphite). In some cases, a layer of the 3D object comprises more than one type of material. In some cases, a layer of the 3D object comprises more than member of a type of material.

In some examples the material bed, platform, or both material bed and platform comprise a material type which constituents (e.g., atoms) readily lose their outer shell electrons, resulting in a free flowing cloud of electrons within their otherwise solid arrangement. In some examples, the material (e.g., pre-transformed, transformed, and/or hardened), the base, or both the material and the base comprise a material type characterized in having high electrical conductivity, low electrical resistivity, high thermal conductivity, or high density. The high electrical conductivity can be at least about $1*10^5$ Siemens per meter (S/m), $5*10^5$ S/m, $1*10^6$ S/m, $5*10^6$ S/m, $1*10^7$ S/m, $5*10^7$ S/m, or $1*10^8$ S/m. The symbol "*" designates the mathematical operation "times." The high electrical conductivity can be between any of the aforementioned electrical conductivity values (e.g., from about $1*10^5$ S/m to about $1*10^8$ S/m). The thermal conductivity, electrical resistivity, electrical conductivity, electrical resistivity, and/or density can be measured at ambient temperature (e.g., at R.T., or 20° C.). The low electrical resistivity may be at most about $1*10^{-5}$ ohm times meter ($\Omega*m$), $5*10^{-6}$ $\Omega*m$, $1*10^{-6}$ $\Omega*m$, $5*10^{-7}$ $\Omega*m$, $1*10^{-7}$ $\Omega*m$, $5*10^{-8}$ or $1*10^{-8}$ $\Omega*m$. The low electrical resistivity can be between any of the aforementioned values (e.g., from about $1\times10^{-5}$ $\Omega*m$ to about $1\times10^{-8}$ $\Omega*m$). The high thermal conductivity may be at least about 10 Watts per meter times Kelvin (W/mK), 15 W/mK, 20 W/mK, 35 W/mK, 50 W/mK, 100 W/mK, 150 W/mK, 200 W/mK, 205 W/mK, 300 W/mK, 350 W/mK, 400 W/mK, 450 W/mK, 500 W/mK, 550 W/mK, 600 W/mK, 700 W/mK, 800 W/mK, 900 W/mK, or 1000 W/mK. The high thermal conductivity can be between any of the aforementioned thermal conductivity values (e.g., from about 20 W/mK to about 1000 W/mK). The high density may be at least about 1.5 grams per cubic centimeter (g/cm³), 1.7 g/cm³, 2 g/cm³, 2.5 g/cm³, 2.7 g/cm³, 3 g/cm³, 4 g/cm³, 5 g/cm³, 6 g/cm³, 7 g/cm³, 8 g/cm³, 9 g/cm³, 10 g/cm³, 11 g/cm³, 12 g/cm³, 13 g/cm³, 14 g/cm³, 15 g/cm³, 16 g/cm³, 17 g/cm³, 18 g/cm³, 19 g/cm³, 20 g/cm³, or 25 g/cm³. The high density can be any value between the afore mentioned values (e.g., from about 1 g/cm³ to about 25 g/cm³).

The elemental metal can be an alkali metal, an alkaline earth metal, a transition metal, a rare earth element metal, or another metal. The alkali metal can be Lithium, Sodium, Potassium, Rubidium, Cesium, or Francium. The alkali earth metal can be Beryllium, Magnesium, Calcium, Strontium, Barium, or Radium. The transition metal can be Scandium, Titanium, Vanadium, Chromium, Manganese, Iron, Cobalt, Nickel, Copper, Zinc, Yttrium, Zirconium, Platinum, Gold, Rutherfordium, Dubnium, Seaborgium, Bohrium, Hassium, Meitnerium, Ununbium, Niobium, Iridium, Molybdenum, Technetium, Ruthenium, Rhodium, Palladium, Silver, Cadmium, Hafnium, Tantalum, Tungsten, Rhenium or Osmium. The transition metal can be mercury. The rare earth metal can be a lanthanide or an actinide. The antinode metal can be Lanthanum, Cerium, Praseodymium, Neodymium, Promethium, Samarium, Europium, Gadolinium, Terbium, Dysprosium, Holmium, Erbium, Thulium, Ytterbium, or Lutetium. The actinide metal can be Actinium, Thorium, Protactinium, Uranium, Neptunium, Plutonium, Americium, Curium, Berkelium, Californium, Einsteinium, Fermium, Mendelevium, Nobelium, or Lawrencium. The other metal can be Aluminum, Gallium, Indium, Tin, Thallium, Lead, or Bismuth. The material may comprise a precious metal. The precious metal may comprise gold, silver, palladium, ruthenium, rhodium, osmium, iridium, or platinum. The material may comprise at least about 40%, 50%, 60%, 70%, 80%, 90%, 95%, 97%, 98%, 99%, 99.5% or more precious metal. The pre-transformed (or transformed) material may comprise at most about 40%, 50%, 60%, 70%, 80%, 90%, 95%, 97%, 98%, 99%, 99.5% or less precious metal. The material may comprise precious metal with any value in between the afore-mentioned values. The material may comprise at least a minimal percentage of precious metal according to the laws in the particular jurisdiction.

The metal alloy can comprise iron based alloy, nickel based alloy, cobalt based alloy, chrome based alloy, cobalt chrome based alloy, titanium based alloy, magnesium based alloy, or copper based alloy. The alloy may comprise an oxidation or corrosion resistant alloy. The alloy may comprise a super alloy (e.g., Inconel). The super alloy may comprise Inconel 600, 617, 625, 690, 718 or X-750. The alloy may comprise an alloy used for aerospace applications, automotive application, surgical application, or implant applications. The metal may include a metal used for aerospace applications, automotive application, surgical application, or implant applications. The super alloy may comprise IN 738 LC, IN 939, Rene 80, IN 6203 (e.g., IN 6203 DS), PWA 1483 (e.g., PWA 1483 SX), or Alloy 247.

The material (e.g., alloy or elemental) may comprise a material used for applications in industries comprising aerospace (e.g., aerospace super alloys), jet engine, missile, automotive, marine, locomotive, satellite, defense, oil & gas, energy generation, semiconductor, fashion, construction, agriculture, printing, or medical. The material may comprise an alloy used for products comprising, devices, medical devices (human & veterinary), machinery, cell phones, semiconductor equipment, generators, engines, pistons, electronics (e.g., circuits), electronic equipment, agriculture equipment, motor, gear, transmission, communication equipment, computing equipment (e.g., laptop, cell phone, ipad), air conditioning, generators, furniture, musical equipment, art, jewelry, cooking equipment, or sport gear. The material may comprise an alloy used for products for human or veterinary applications comprising implants, or prosthetics. The metal alloy may comprise an alloy used for applications in the fields comprising human or veterinary surgery, implants (e.g., dental), or prosthetics.

The alloy may include a high-performance alloy. The alloy may include an alloy exhibiting at least one of excellent mechanical strength, resistance to thermal creep deformation, good surface stability, resistance to corrosion, and resistance to oxidation. The alloy may include a face-centered cubic austenitic crystal structure. The alloy may comprise Hastelloy, Inconel, Waspaloy, Rene alloy (e.g., Rene-80, Rene-77, Rene-220, or Rene-41), Haynes alloy, Incoloy, MP98T, TMS alloy, MTEK (e.g., MTEK grade MAR-M-247, MAR-M-509, MAR-M-R41, or MAR-M-X-45), or CMSX (e.g., CMSX-3, or CMSX-4). The alloy can be a single crystal alloy.

In some instances, the iron-based alloy can comprise Elinvar, Fernico, Ferroalloys, Invar, Iron hydride, Kovar, Spiegeleisen, Staballoy (stainless steel), or Steel. In some instances, the metal alloy is steel. The Ferroalloy may comprise Ferroboron, Ferrocerium, Ferrochrome, Ferromagnesium, Ferromanganese, Ferromolybdenum, Ferronickel, Ferrophosphorus, Ferrosilicon, Ferrotitanium, Ferrouranium, or Ferrovanadium. The iron-based alloy may include cast iron or pig iron. The steel may include Bulat steel, Chromoly, Crucible steel, Damascus steel, Hadfield steel, High speed steel, HSLA steel, Maraging steel, Reynolds 531, Silicon steel, Spring steel, Stainless steel, Tool steel, Weathering steel, or Wootz steel. The high-speed steel may include Mushet steel. The stainless steel may include AL-6XN, Alloy 20, celestrium, marine grade stainless, Martensitic stainless steel, surgical stainless steel, or Zeron 100. The tool steel may include Silver steel. The steel may comprise stainless steel, Nickel steel, Nickel-chromium steel, Molybdenum steel, Chromium steel, Chromium-vanadium steel, Tungsten steel, Nickel-chromium-molybdenum steel or Silicon-manganese steel. The steel may be comprised of any Society of Automotive Engineers (SAE) grade such as 440F, 410, 312, 430, 440A, 440B, 440C, 304, 305, 304L, 304L, 301, 304LN, 301LN, 2304, 316, 316L, 316LN, 316, 316LN, 316L, 316L, 316, 317L, 2205, 409, 904L, 321, 254SMO, 316Ti, 321H or 304H. The steel may comprise stainless steel of at least one crystalline structure selected from the group consisting of austenitic, superaustenitic, ferritic, martensitic, duplex and precipitation-hardening martensitic. Duplex stainless steel may be lean duplex, standard duplex, super duplex or hyper duplex. The stainless steel may comprise surgical grade stainless steel (e.g., austenitic 316, martensitic 420 or martensitic 440). The austenitic 316 stainless steel may include 316L or 316LVM. The steel may include 17-4 Precipitation Hardening steel (also known as type 630 is a chromium-copper precipitation hardening stainless steel; 17-4PH steel). The stainless steel may comprise 360L stainless steel.

The titanium-based alloys may include alpha alloys, near alpha alloys, alpha and beta alloys, or beta alloys. The titanium alloy may comprise grade 1, 2, 2H, 3, 4, 5, 6, 7, 7H, 8, 9, 10, 11, 12, 13, 14, 15, 16, 16H, 17, 18, 19, 20, 21, 2, 23, 24, 25, 26, 26H, 27, 28, 29, 30, 31, 32, 33, 34, 35, 36, 37, 38 or higher. In some instances the titanium base alloy includes $TiAl_6V_4$ or $TiAl_6Nb_7$.

The Nickel based alloy may include Alnico, Alumel, Chromel, Cupronickel, Ferronickel, German silver, Hastelloy, Inconel, Monel metal, Nichrome, Nickel-carbon, Nicrosil, Nisil, Nitinol, or Magnetically "soft" alloys. The magnetically "soft" alloys may comprise Mu-metal, Permalloy, Supermalloy, or Brass. The Brass may include nickel hydride, stainless or coin silver. The cobalt alloy may include Megallium, Stellite (e. g. Talonite), Ultimet, or Vitallium. The chromium alloy may include chromium hydroxide, or Nichrome.

The aluminum-based alloy may include AA-8000, Al—Li (aluminum-lithium), Alnico, Duralumin, Hiduminium, Kryron Magnalium, Nambe, Scandium-aluminum, or, Y alloy. The magnesium alloy may be Elektron, Magnox or T—Mg—Al—Zn (Bergman phase) alloy. At times, the material excludes at least one aluminum-based alloy (e.g., $AlSi_{10}Mg$).

The copper based alloy may comprise Arsenical copper, Beryllium copper, Billon, Brass, Bronze, Constantan, Copper hydride, Copper-tungsten, Corinthian bronze, Cunife, Cupronickel, Cymbal alloys, Devarda's alloy, Electrum, Hepatizon, Heusler alloy, Manganin, Molybdochalkos, Nickel silver, Nordic gold, Shakudo or Tumbaga. The Brass may include Calamine brass, Chinese silver, Dutch metal, Gilding metal, Muntz metal, Pinchbeck, Prince's metal, or Tombac. The Bronze may include Aluminum bronze, Arsenical bronze, Bell metal, Florentine bronze, Guanin, Gunmetal, Glucydur, Phosphor bronze, Ormolu or Speculum metal. The elemental carbon may comprise graphite, Graphene, diamond, amorphous carbon, carbon fiber, carbon nanotube, or fullerene.

The powder material (also referred to herein as a "pulverous material") may comprise a solid comprising fine particles. The powder may be a granular material. The powder can be composed of individual particles. At least some of the particles can be spherical, oval, prismatic, cubic, or irregularly shaped. At least some of the particles can have a FLS (e.g., diameter, spherical equivalent diameter, length, width, or diameter of a bounding sphere). The FLS of at least some of the particles can be from about 1 nanometers (nm) to about 1000 micrometers (microns), 500 microns, 400 microns, 300 microns, 200 microns, 100 microns, 50 microns, 40 microns, 30 microns, 20 microns, 10 microns, 1 micron, 500 nm, 400 nm, 300 nm, 200 nm, 100 nm, 50 nm, 40 nm, 30 nm, 20 nm, 10 nm, or 5 nm. At least some of the particles can have a FLS of at least about 1000 micrometers (microns), 500 microns, 400 microns, 300 microns, 200 microns, 100 microns, 50 microns, 40 microns, 30 microns, 20 microns, 10 microns, 1 micron, 500 nm, 400 nm, 300 nm, 200 nm, 100 nm, 50 nm, 40 nm, 30 nm, 20 nm, 10 nm, 5 nanometers (nm) or more. At least some of the particles can have a FLS of at most about 1000 micrometers (microns), 500 microns, 400 microns, 300 microns, 200 microns, 100 microns, 50 microns, 40 microns, 30 microns, 20 microns, 10 microns, 1 micron, 500 nm, 400 nm, 300 nm, 200 nm, 100 nm, 50 nm, 40 nm, 30 nm, 20 nm, 10 nm, 5 nm or less. In some cases, at least some of the powder particles may have a FLS in between any of the afore-mentioned FLSs.

The powder can be composed of a homogenously shaped particle mixture such that all of the particles have substantially the same shape and FLS magnitude within at most about 1%, 5%, 8%, 10%, 15%, 20%, 25%, 30%, 35%, 40%, 50%, 60%, 70%, or less distribution of FLS. In some cases, the powder can be a heterogeneous mixture such that the particles have variable shape and/or FLS magnitude. In some examples, at least about 30%, 40%, 50%, 60%, or 70% (by weight) of the particles within the powder material have a largest FLS that is smaller than the median largest FLS of the powder material. In some examples, at least about 30%, 40%, 50%, 60%, or 70% (by weight) of the particles within the powder material have a largest FLS that is smaller than the mean largest FLS of the powder material.

In some examples, the size of the largest FLS of the transformed material (e.g., height) is greater than the average largest FLS of the powder material by at least about 1.1 times, 1.2 times, 1.4 times, 1.6 times, 1.8 times, 2 times, 4 times, 6 times, 8 times, or 10 times. In some examples, the size of the largest FLS of the transformed material is greater than the median largest FLS of the powder material by at most about 1.1 times, 1.2 times, 1.4 times, 1.6 times, 1.8 times, 2 times, 4 times, 6 times, 8 times, or 10 times. The powder material can have a median largest FLS that is at least about 1 µm, 5 µm, 10 µm, 20 µm, 30 µm, 40 µm, 50 µm, 100 µm, or 200 µm. The powder material can have a median largest FLS that is at most about 11 µm, 5 µm, 10 µm, 20 µm, 30 µm, 40 µm, 50 µm, 100 µm, or 200 µm. In some cases, the powder particles may have a FLS in between any of the FLS listed above (e.g., from about 1 µm to about 200 µm, from about 1 µm to about 50 µm, or from about 5 µm to about 40 µm).

In another aspect provided herein is a method for generating a 3D object comprising: (a) depositing a layer of pre-transformed material in an enclosure (e.g., to form a material bed such as a powder bed); (b) providing energy (e.g., using an energy beam) to at least a portion of the layer of pre-transformed material according to a path for transforming the at least a portion of the layer of pre-transformed material to form a transformed material as at least a portion of the 3D object; and (c) optionally repeating operations (a) to (b) to generate the 3D object. The method may further comprise after operation (b) and before operation (c): allowing the transformed material to harden into a hardened material that forms at least a portion of the 3D object. The enclosure may comprise at least one chamber. The enclosure (e.g., the chamber) may comprise a building platform (e.g., a substrate and/or base). The 3D object may be printed adjacent to (e.g., above) the building platform.

The controller may monitor and/or direct (e.g., physical) alteration of the operating conditions of the apparatuses, software, and/or methods described herein. Control may comprise regulate, manipulate, restrict, direct, monitor, adjust, modulate, vary, alter, restrain, check, guide, or manage. The control may comprise controlling a control variable (e.g. temperature, power, power per unit area, and/or profile). The control can comprise real time or off-line control. A calculation can be done in real time, and/or off line. The power may be of the energy source. The power per unit are may be of the energy beam. The profile may be an energy beam profile. The temperature may be of the irradiated area and/or an area at the immediate vicinity of the irradiated area (e.g., up to five or six diameters of a FLS of the irradiated area). The controller may be a manual or a non-manual controller. The controller may be an automatic controller. The controller may operate upon request. The controller may be a programmable controller. The controller may be programed. The controller may comprise a processing unit (e.g., CPU or GPU). The controller may receive an input (e.g., from a sensor). The controller may deliver an output. The controller may comprise multiple (e.g., sub-) controllers. The controller may receive multiple inputs. The controller may generate multiple outputs. The controller may be a single input single output controller (SISO) or a multiple input multiple output controller (MIMO). The controller may interpret the input signal received. The controller may acquire data from the one or more sensors. Acquire may comprise receive or extract. The data may comprise measurement, estimation, determination, generation, or any combination thereof. The controller may comprise feedback control. The controller may comprise feedforward control. The control may comprise on-off control, proportional control, proportional-integral (PI) control, or proportional-integral-derivative (PID) control. The control may comprise open loop control, or closed loop control. The controller may comprise closed loop control. The controller may comprise open loop control. The controller may comprise a user interface. The user interface may comprise a keyboard, keypad, mouse, touch screen, microphone, speech recognition package, camera, imaging system, or any combination thereof. The outputs may include a display (e.g., screen), speaker, or printer.

The methods, systems and/or the apparatus described herein may further comprise a control system. The control system can be in communication with one or more energy sources and/or energy (e.g., energy beams). The energy sources may be of the same type or of different types, e.g., as described herein. For example, the energy sources can be both lasers, or a laser and an electron beam. For example, the control system may be in communication with the first energy and/or with the second energy. The control system may regulate the one or more energies (e.g., energy beams). The controller may regulate at least one characteristic of the energy beam. The control system may regulate the energy supplied by the one or more energy sources. For example, the control system may regulate the energy supplied by a first energy beam and by a second energy beam, to the pre-transformed material within the material bed. The control system may regulate the position of the one or more energy beams (e.g., along their respective trajectories). For example, the control system may regulate the position of the first energy beam and/or the position of the second energy beam.

Figure 11:
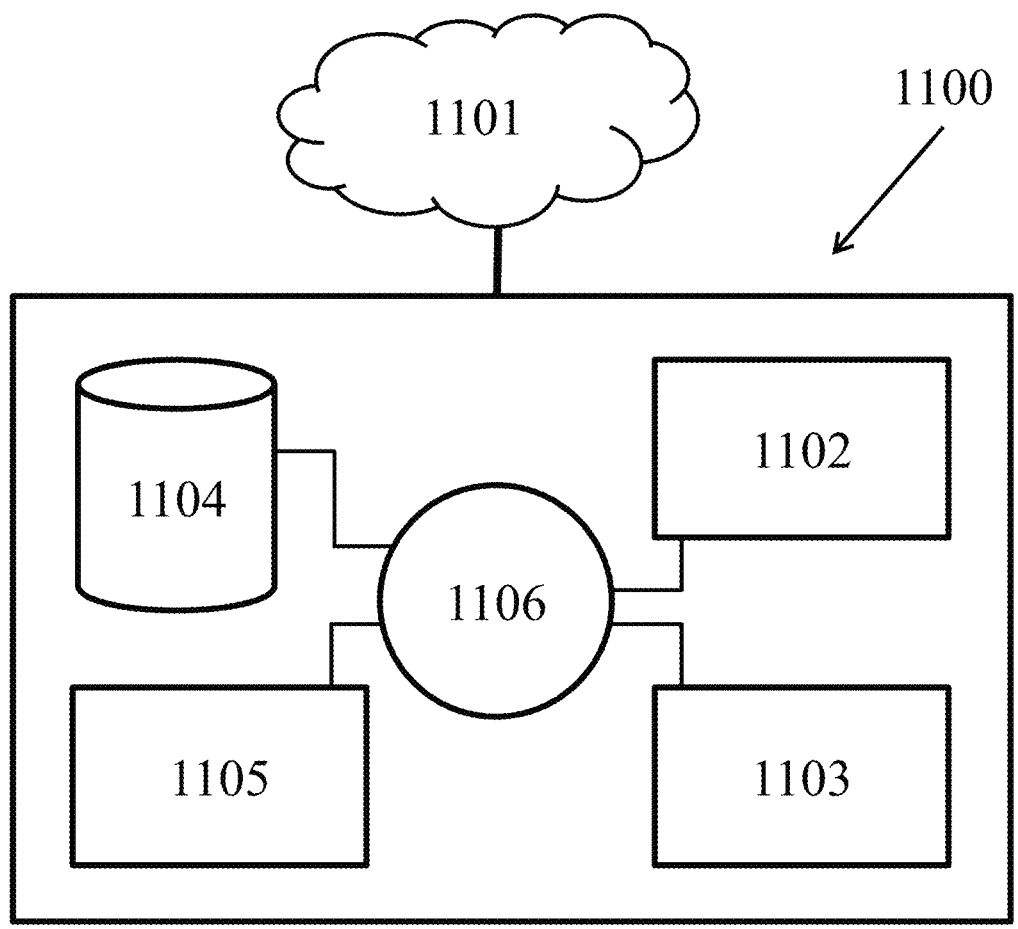
FIG. 11 schematically illustrates a processing (e.g., computer) system.

The 3D printing system may comprise a processor. The processor may be a processing unit. The controller may comprise a processing unit. The processing unit may be central. The processing unit may comprise a central processing unit (herein "CPU"). The controllers or control mechanisms (e.g., comprising a computer system) may be programmed to implement methods of the disclosure. The processor (e.g., 3D printer processor) may be programmed to implement methods of the disclosure. The controller may control at least one component of the forming systems and/or apparatuses disclosed herein. FIG. 11 is a schematic example of a computer system 1100 that is programmed or otherwise configured to facilitate the formation of a 3D object according to the methods provided herein. The computer system 1100 can control (e.g., direct, monitor, and/or regulate) various features of printing methods, apparatuses and systems of the present disclosure, such as, for example, control force, translation, heating, cooling and/or maintaining the temperature of a material bed, process parameters (e.g., chamber pressure), scanning rate (e.g., of the energy beam and/or the platform), scanning route of the energy source, position and/or temperature of the cooling member(s), application of the amount of energy emitted to a selected location, or any combination thereof. The computer system 1100 can be part of, or be in communication with, a 3D printing system or apparatus. The computer may be coupled to one or more mechanisms disclosed herein, and/or any parts thereof. For example, the computer may be coupled to one or more sensors, valves, switches, motors, pumps, scanners, optical components, or any combination thereof.

The computer system 1100 can include a processing unit 1106 (also "processor," "computer" and "computer processor" used herein). The computer system may include memory or memory location 1102 (e.g., random-access memory, read-only memory, flash memory), electronic storage unit 1104 (e.g., hard disk), communication interface 1103 (e.g., network adapter) for communicating with one or more other systems, and peripheral devices 1105, such as cache, other memory, data storage and/or electronic display adapters. The memory 1102, storage unit 1104, interface 1103, and peripheral devices 1105 are in communication with the processing unit 1106 through a communication bus (solid lines), such as a motherboard. The storage unit can be a data storage unit (or data repository) for storing data. The computer system can be operatively coupled to a computer network ("network") 1101 with the aid of the communication interface. The network can be the Internet, an internet and/or extranet, or an intranet and/or extranet that is in communication with the Internet. In some cases, the network is a telecommunication and/or data network. The network can include one or more computer servers, which can enable distributed computing, such as cloud computing. The network, in some cases with the aid of the computer system, can implement a peer-to-peer network, which may enable devices coupled to the computer system to behave as a client or a server.

The processing unit can execute a sequence of machine-readable instructions, which can be embodied in a program or software. The instructions may be stored in a memory location, such as the memory 1102. The instructions can be directed to the processing unit, which can subsequently program or otherwise configure the processing unit to implement methods of the present disclosure. Examples of operations performed by the processing unit can include fetch, decode, execute, and write back. The processing unit may interpret and/or execute instructions. The processor may include a microprocessor, a data processor, a central processing unit (CPU), a graphical processing unit (GPU), a system-on-chip (SOC), a co-processor, a network processor, an application specific integrated circuit (ASIC), an application specific instruction-set processor (ASIPs), a controller, a programmable logic device (PLD), a chipset, a field programmable gate array (FPGA), or any combination thereof. The processing unit can be part of a circuit, such as an integrated circuit. One or more other components of the system 1100 can be included in the circuit.

The storage unit 1104 can store files, such as drivers, libraries and saved programs. The storage unit can store user data (e.g., user preferences and user programs). In some cases, the computer system can include one or more additional data storage units that are external to the computer system, such as located on a remote server that is in communication with the computer system through an intranet or the Internet.

The computer system can communicate with one or more remote computer systems through a network. For instance, the computer system can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. A user (e.g., client) can access the computer system via the network.

Methods as described herein can be implemented by way of machine (e.g., computer processor) executable code stored on an electronic storage location of the computer system, such as, for example, on the memory 1102 or electronic storage unit 1104. The machine executable or machine-readable code can be provided in the form of software. During use, the processor 1106 can execute the code. In some cases, the code can be retrieved from the storage unit and stored on the memory for ready access by the processor. In some situations, the electronic storage unit can be precluded, and machine-executable instructions are stored on memory.

The code can be pre-compiled and configured for use with a machine have a processer adapted to execute the code, or can be compiled during runtime. The code can be supplied in a programming language that can be selected to enable the code to execute in a pre-compiled or as-compiled fashion.

The processing unit may include one or more cores. The computer system may comprise a single core processor, multi core processor, or a plurality of processors for parallel processing. The processing unit may comprise one or more central processing unit (CPU) and/or a graphic processing unit (GPU). The multiple cores may be disposed in a physical unit (e.g., Central Processing Unit, or Graphic Processing Unit). The processing unit may include one or more processing units. The physical unit may be a single physical unit. The physical unit may be a die. The physical unit may comprise cache coherency circuitry. The multiple cores may be disposed in close proximity. The physical unit may comprise an integrated circuit chip. The integrated circuit chip may comprise one or more transistors. The integrated circuit chip may comprise at least about 0.2 billion transistors (BT), 0.5 BT, 1 BT, 2 BT, 3 BT, 5 BT, 6 BT, 7 BT, 8 BT, 9 BT, 10 BT, 15 BT, 20 BT, 25 BT, 30 BT, 40 BT, or 50 BT. The integrated circuit chip may comprise at most about 7 BT, 8 BT, 9 BT, 10 BT, 15 BT, 20 BT, 25 BT, 30 BT, 40 BT, 50 BT, 70 BT, or 100 BT. The integrated circuit chip may comprise any number of transistors between the afore-mentioned numbers (e.g., from about 0.2 BT to about 100 BT, from about 1 BT to about 8 BT, from about 8 BT to about 40 BT, or from about 40 BT to about 100 BT). The integrated circuit chip may have an area of at least about 50 mm$^2$, 60 mm$^2$, 70 mm$^2$, 80 mm$^2$, 90 mm$^2$, 100 mm$^2$, 200 mm$^2$, 300 mm$^2$, 400 mm$^2$, 500 mm$^2$, 600 mm$^2$, 700 mm$^2$, or 800 mm$^2$. The integrated circuit chip may have an area of at most about 50 mm$^2$, 60 mm$^2$, 70 mm$^2$, 80 mm$^2$, 90 mm$^2$, 100 mm$^2$, 200 mm$^2$, 300 mm$^2$, 400 mm$^2$, 500 mm$^2$, 600 mm$^2$, 700 mm$^2$, or 800 mm$^2$. The integrated circuit chip may have an area of any value between the afore-mentioned values (e.g., from about 50 mm$^2$ to about 800 mm$^2$, from about 50 mm$^2$ to about 500 mm$^2$, or from about 500 mm$^2$ to about 800 mm$^2$). The close proximity may allow substantial preservation of communication signals that travel between the cores. The close proximity may diminish communication signal degradation. A core as understood herein is a computing component having independent central processing capabilities. The computing system may comprise a multiplicity of cores, which are disposed on a single computing component. The multiplicity of cores may include two or more independent central processing units. The independent central processing units may constitute a unit that read and execute program instructions. The independent central processing units may constitute parallel processing units. The parallel processing units may be cores and/or digital signal processing slices (DSP slices). The multiplicity of cores can be parallel cores. The multiplicity of DSP slices can be parallel DSP slices. The multiplicity of cores and/or DSP slices can function in parallel. The multiplicity of cores may include at least about 2, 10, 40, 100, 400, 1000, 2000, 3000, 4000, 5000, 6000, 7000, 8000, 9000, 10000, 11000, 12000, 13000, 14000 or 15000 cores. The multiplicity of cores may include at most about 1000, 2000, 3000, 4000, 5000, 6000, 7000, 8000, 9000, 10000, 11000, 12000, 13000, 14000, 15000, 20000, 30000, or 40000 cores. The multiplicity of cores may include cores of any number between the aforementioned numbers (e.g., from about 2 to about 40000, from about 2 to about 400, from about 400 to about 4000, from about 2000 to about 4000, from about 4000 to about 10000, from about 4000 to about 15000, or from about 15000 to about 40000 cores). In some processors (e.g., FPGA), the cores may be equivalent to multiple digital signal processor (DSP) slices (e.g., slices). The plurality of DSP slices may be equal to any of plurality core values mentioned herein. The processor may comprise low latency in data transfer (e.g., from one core to another). Latency may refer to the time delay between the cause and the effect of a physical change in the processor (e.g., a signal). Latency may refer to the time elapsed from the source (e.g., first core) sending a packet to the destination (e.g., second core) receiving it (also referred as two-point latency). One-point latency may refer to the time elapsed from the source (e.g., first core) sending a packet (e.g., signal) to the destination (e.g., second core) receiving it, and the designation sending a packet back to the source (e.g., the packet making a round trip). The latency may be sufficiently low to allow a high number of floating point operations per second (FLOPS). The number of FLOPS may be at least about 0.1 Tera FLOPS (T-FLOPS), 0.2 T-FLOPS, 0.25 T-FLOPS, 0.5 T-FLOPS, 0.75 T-FLOPS, 1 T-FLOPS, 2 T-FLOPS, 3 T-FLOPS, 5 T-FLOPS, 6 T-FLOPS, 7 T-FLOPS, 8 T-FLOPS, 9 T-FLOPS, or 10 T-FLOPS. The number of flops may be at most about 0.2 T-FLOPS, 0.25 T-FLOPS, 0.5 T-FLOPS, 0.75 T-FLOPS, 1 T-FLOPS, 2 T-FLOPS, 3 T-FLOPS, 5 T-FLOPS, 6 T-FLOPS, 7 T-FLOPS, 8 T-FLOPS, 9 T-FLOPS, 10 T-FLOPS, 20 T-FLOPS, or 30 T-FLOPS. The number of FLOPS may be any value between the afore-mentioned values (e.g., from about 0.1 T-FLOP to about 30 T-FLOP, from about 0.1 T-FLOPS to about 1 T-FLOPS, from about 1 T-FLOPS to about 4 T-FLOPS, from about 4 T-FLOPS to about 10 T-FLOPS, from about 1 T-FLOPS to about 10 T-FLOPS, or from about 10 T-FLOPS to about 30 T-FLOPS). In some processors (e.g., FPGA), the operations per second may be measured as (e.g., Giga) multiply-accumulate operations per second (e.g., MACs or GMACs). The MACs value can be equal to any of the T-FLOPS values mentioned herein measured as Tera-MACs (T-MACs) instead of T-FLOPS respectively. The FLOPS can be measured according to a benchmark. The benchmark may be a HPC Challenge Benchmark. The benchmark may comprise mathematical operations (e.g., equation calculation such as linear equations), graphical operations (e.g., rendering), or encryption/decryption benchmark. The benchmark may comprise a High Performance LINPACK, matrix multiplication (e.g., DGEMM), sustained memory bandwidth to/from memory (e.g., STREAM), array transposing rate measurement (e.g., PTRANS), Random-access, rate of Fast Fourier Transform (e.g., on a large one-dimensional vector using the generalized Cooley-Tukey algorithm), or Communication Bandwidth and Latency (e.g., MPI-centric performance measurements based on the effective bandwidth/latency benchmark). LINPACK may refer to a software library for performing numerical linear algebra on a digital computer. DGEMM may refer to double precision general matrix multiplication. STREAM benchmark may refer to a synthetic benchmark designed to measure sustainable memory bandwidth (in MB/s) and a corresponding computation rate for four simple vector kernels (Copy, Scale, Add and Triad). PTRANS benchmark may refer to a rate measurement at which the system can transpose a large array (global). MPI refers to Message Passing Interface.

The computer system may include hyper-threading technology. The computer system may include a chip processor with integrated transform, lighting, triangle setup, triangle clipping, rendering engine, or any combination thereof. The rendering engine may be capable of processing at least about 10 million polygons per second. The rendering engines may be capable of processing at least about 10 million calculations per second. As an example, the GPU may include a GPU by Nvidia, ATI Technologies, S3 Graphics, Advanced Micro Devices (AMD), or Matrox. The processing unit may be able to process algorithms comprising a matrix or a vector. The core may comprise a complex instruction set computing core (CISC), or reduced instruction set computing (RISC).

The computer system may include an electronic chip that is reprogrammable (e.g., field programmable gate array (FPGA)). For example, the FPGA may comprise Tabula, Altera, or Xilinx FPGA. The electronic chips may comprise one or more programmable logic blocks (e.g., an array). The logic blocks may compute combinational functions, logic gates, or any combination thereof. The computer system may include custom hardware. The custom hardware may comprise an algorithm.

The computer system may include configurable computing, partially reconfigurable computing, reconfigurable computing, or any combination thereof. The computer system may include a FPGA. The computer system may include an integrated circuit that performs the algorithm. For example, the reconfigurable computing system may comprise FPGA, CPU, GPU, or multi-core microprocessors. The reconfigurable computing system may comprise a High-Performance Reconfigurable Computing architecture (HPRC). The partially reconfigurable computing may include module-based partial reconfiguration, or difference-based partial reconfiguration. The FPGA may comprise configurable FPGA logic, and/or fixed-function hardware comprising multipliers, memories, microprocessor cores, first in-first out (FIFO) and/or error correcting code (ECC) logic, digital signal processing (DSP) blocks, peripheral Component interconnect express (PCI Express) controllers, ethernet media access control (MAC) blocks, or high-speed serial transceivers. DSP blocks can be DSP slices.

The computing system may include an integrated circuit that performs the algorithm (e.g., control algorithm). The physical unit (e.g., the cache coherency circuitry within) may have a clock time of at least about 0.1 Gigabits per second (Gbit/s), 0.5 Gbit/s, 1 Gbit/s, 2 Gbit/s, 5 Gbit/s, 6 Gbit/s, 7 Gbit/s, 8 Gbit/s, 9 Gbit/s, 10 Gbit/s, or 50 Gbit/s. The physical unit may have a clock time of any value between the afore-mentioned values (e.g., from about 0.1 Gbit/s to about 50 Gbit/s, or from about 5 Gbit/s to about 10 Gbit/s). The physical unit may produce the algorithm output in at most about 0.1 microsecond (µs), 1 µs, 10 µs, 100 µs, or 1 millisecond (ms). The physical unit may produce the algorithm output in any time between the above mentioned times (e.g., from about 0.1 µs, to about 1 ms, from about 0.1 µs, to about 100 µs, or from about 0.1 µs to about 10 µs).

In some instances, the controller may use calculations, real time measurements, or any combination thereof to regulate the energy beam(s). The sensor (e.g., temperature and/or positional sensor) may provide a signal (e.g., input for the controller and/or processor) at a rate of at least about 0.1 KHz, 1 KHz, 10 KHz, 100 KHz, 1000 KHz, or 10000 KHz). The sensor may provide a signal at a rate between any of the above-mentioned rates (e.g., from about 0.1 KHz to about 10000 KHz, from about 0.1 KHz to about 1000 KHz, or from about 1000 KHz to about 10000 KHz). The memory bandwidth of the processing unit may be at least about 1 gigabytes per second (Gbytes/s), 10 Gbytes/s, 100 Gbytes/s, 200 Gbytes/s, 300 Gbytes/s, 400 Gbytes/s, 500 Gbytes/s, 600 Gbytes/s, 700 Gbytes/s, 800 Gbytes/s, 900 Gbytes/s, or 1000 Gbytes/s. The memory bandwidth of the processing unit may be at most about 1 gigabyte per second (Gbytes/s), 10 Gbytes/s, 100 Gbytes/s, 200 Gbytes/s, 300 Gbytes/s, 400 Gbytes/s, 500 Gbytes/s, 600 Gbytes/s, 700 Gbytes/s, 800 Gbytes/s, 900 Gbytes/s, or 1000 Gbytes/s. The memory bandwidth of the processing unit may have any value between the aforementioned values (e.g., from about 1 Gbytes/s to about 1000 Gbytes/s, from about 100 Gbytes/s to about 500 Gbytes/s, from about 500 Gbytes/s to about 1000 Gbytes/s, or from about 200 Gbytes/s to about 400 Gbytes/s). The sensor measurements may be real-time measurements. The real time measurements may be conducted during the 3D printing process. The real-time measurements may be in situ measurements in the 3D printing system and/or apparatus. The real time measurements may be during the formation of the 3D object. In some instances, the processing unit may use the signal obtained from the at least one sensor to provide a processing unit output, which output is provided by the processing system at a speed of at most about 100 min, 50 min, 25 min, 15 min, 10 min, 5 min, 1 min, 0.5 min (i.e., 30 sec), 15 sec, 10 sec, 5 sec, 1 sec, 0.5 sec, 0.25 sec, 0.2 sec, 0.1 sec, 80 milliseconds (msec), 50 msec, 10 msec, 5 msec, 1 msec, 80 microseconds (µsec), 50 µsec, 20 µsec, 10 µsec, 5 µsec, or 1 µsec. In some instances, the processing unit may use the signal obtained from the at least one sensor to provide a processing unit output, which output is provided at a speed of any value between the afore-mentioned values (e.g., from about 100 min to about 1 µsec, from about 100 min to about 10 min, from about 10 min to about 1 min, from about 5 min to about 0.5 min, from about 30 sec to about 0.1 sec, from about 0.1 sec to about 1 msec, from about 80 msec to about 10 µsec, from about 50 µsec to about 1 µsec, from about 20 µsec to about 1 µsec, or from about 10 µsec to about 1 µsec).

The processing unit output may comprise an evaluation of the temperature at a location, position at a location (e.g., vertical and/or horizontal), or a map of locations. The location may be on the target surface. The map may comprise a topological or temperature map. The temperature sensor may comprise a temperature imaging device (e.g., IR imaging device).

The processing unit may use the signal obtained from the at least one sensor in an algorithm that is used in controlling the energy beam. The algorithm may comprise the path of the energy beam. In some instances, the algorithm may be used to alter the path of the energy beam on the target surface. The path may deviate from a cross section of a model corresponding to the desired 3D object. The processing unit may use the output in an algorithm that is used in determining the manner in which a model of the desired 3D object may be sliced. The processing unit may use the signal obtained from the at least one sensor in an algorithm that is used to configure one or more parameters and/or apparatuses relating to the 3D printing process. The parameters may comprise a characteristic of the energy beam. The parameters may comprise movement of the platform and/or material bed. The parameters may comprise relative movement of the energy beam and the material bed. In some instances, the energy beam, the platform (e.g., material bed disposed on the platform), or both may translate. Alternatively or additionally, the controller may use historical data for the control. Alternatively or additionally, the processing unit may use historical data in its one or more algorithms. The parameters may comprise the height of the layer of pre-transformed (e.g., powder) material disposed in the enclosure and/or the gap by which the cooling element (e.g., heat sink) is separated from the target surface. The target surface may be the exposed layer of the material bed.

Aspects of the systems, apparatuses, and/or methods provided herein, such as the computer system, can be embodied in programming (e.g., using a software). Various aspects of the technology may be thought of as "product," "object," or "articles of manufacture" typically in the form of machine (or processor) executable code and/or associated data that is carried on or embodied in a type of machine-readable medium. Machine-executable code can be stored on an electronic storage unit, such memory (e.g., read-only memory, random-access memory, flash memory) or a hard disk. The storage may comprise non-volatile storage media. "Storage" type media can include any or all of the tangible memory of the computers, processors or the like, or associated modules thereof, such as various semiconductor memories, tape drives, disk drives, external drives, and the like, which may provide non-transitory storage at any time for the software programming.

The memory may comprise a random access memory (RAM), dynamic random access memory (DRAM), static random access memory (SRAM), synchronous dynamic random access memory (SDRAM), ferroelectric random access memory (FRAM), read only memory (ROM), programmable read only memory (PROM), erasable programmable read only memory (EPROM), electrically erasable programmable read only memory (EEPROM), a flash memory, or any combination thereof. The flash memory may comprise a negative-AND (NAND) or NOR logic gates. A NAND gate (negative-AND) may be a logic gate which produces an output which is false only if all its inputs are true. The output of the NAND gate may be complement to that of the AND gate. The storage may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Hence, a machine-readable medium, such as computer-executable code, may take many forms, including but not limited to, a tangible storage medium, a carrier wave medium, or physical transmission medium. Non-volatile storage media include, for example, optical or magnetic disks, such as any of the storage devices in any computer(s)

or the like, such as may be used to implement the databases. Volatile storage media can include dynamic memory, such as main memory of such a computer platform. Tangible transmission media can include coaxial cables, wire (e.g., copper wire), and/or fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, any other medium from which a computer may read programming code and/or data, or any combination thereof. The memory and/or storage may comprise a storing device external to and/or removable from device, such as a Universal Serial Bus (USB) memory stick, or/and a hard disk. Many of these forms of computer readable media may be involved in carrying one or more sequences of one or more instructions to a processor for execution.

The computer system can include or be in communication with an electronic display that comprises a user interface (UI) for providing, for example, a model design or graphical representation of a 3D object to be printed. Examples of UI's include, without limitation, a graphical user interface (GUI) and web-based user interface. The computer system can monitor and/or control various aspects of the 3D printing system. The control may be manual and/or programmed. The control may rely on feedback mechanisms (e.g., from the one or more sensors). The control may rely on historical data. The feedback mechanism may be pre-programmed. The feedback mechanisms may rely on input from sensors (described herein) that are connected to the control unit (i.e., control system or control mechanism e.g., computer) and/or processing unit. The computer system may store historical data concerning various aspects of the operation of the 3D printing system. The historical data may be retrieved at predetermined times and/or at a whim. The historical data may be accessed by an operator and/or by a user. The historical, sensor, and/or operative data may be provided in an output unit such as a display unit. The output unit (e.g., monitor) may output various parameters of the 3D printing system (as described herein) in real time or in a delayed time. The output unit may output the current 3D printed object, the ordered 3D printed object, or both. The output unit may output the printing progress of the 3D printed object. The output unit may output at least one of the total time, time remaining, and time expanded on printing the 3D object. The output unit may output (e.g., display, voice, and/or print) the status of sensors, their reading, and/or time for their calibration or maintenance. The output unit may output the type of material(s) used and various characteristics of the material(s) such as temperature and flowability of the pre-transformed material. The output unit may output the amount of oxygen, water, and pressure in the printing chamber (i.e., the chamber where the 3D object is being printed). The computer may generate a report comprising various parameters of the 3D printing system, method, and or objects at predetermined time(s), on a request (e.g., from an operator), and/or at a whim. The output unit may comprise a screen, printer, or speaker. The control system may provide a report. The report may comprise any items recited as optionally output by the output unit.

The system and/or apparatus described herein (e.g., controller) and/or any of their components may comprise an output and/or an input device. The input device may comprise a keyboard, touch pad, or microphone. The output device may be a sensory output device. The output device may include a visual, tactile, or audio device. The audio device may include a loudspeaker. The visual output device may include a screen and/or a formed (e.g., printed) hard copy (e.g., paper). The output device may include a printer. The input device may include a camera, a microphone, a keyboard, or a touch screen.

The computer system can include, or be in communication with, an electronic display unit that comprises a user interface (UI) for providing, for example, a model design or graphical representation of an object to be formed (e.g., printed). Examples of UI's include a graphical user interface (GUI) and web-based user interface. The historical and/or operative data may be displayed on a display unit. The computer system may store historical data concerning various aspects of the operation of the cleaning system. The historical data may be retrieved at predetermined times and/or at a whim. The historical data may be accessed by an operator and/or by a user. The display unit (e.g., monitor) may display various parameters of the forming (e.g., printing) system (as described herein) in real time or in a delayed time. The display unit may display the desired formed (e.g., printed) 3D object (e.g., according to a model), the formed (e.g., printed) 3D object, real time display of the 3D object as it is being formed (e.g., printed), or any combination thereof. The display unit may display the cleaning progress of the object, or various aspects thereof. The display unit may display at least one of the total time, time remaining, and time expanded on the cleaned object during the cleaning process. The display unit may display the status of sensors, their reading, and/or time for their calibration or maintenance. The display unit may display the type or types of material used and various characteristics of the material or materials such as temperature and flowability of the pre-transformed material. The particulate material that did not transform to form the 3D object (e.g., the remainder) disposed in the material bed may be flowable (e.g., during the forming (e.g., 3D printing) process). The display unit may display the amount of a certain gas in the chamber. The gas may comprise oxygen, hydrogen, water vapor, or any of the gasses mentioned herein. The display unit may display the pressure in the chamber. The computer may generate a report comprising various parameters of the methods, objects, apparatuses, or systems described herein. The report may be generated at predetermined time(s), on a request (e.g., from an operator) or at a whim.

The one or more controllers can be control any suitable one or more methods used to form 3D objects as described herein. Various suitable control systems are disclosed in PCT patent application serial number PCT/US2015/065297; PCT patent application serial number PCT/US17/18191; European patent application serial number EP17156707.6; U.S. patent application Ser. No. 15/435,065; and U.S. provisional patent application Ser. No. 62/401,534; each of which is incorporated herein by reference in its entirety. The one or more controllers can comprise one or more central processing unit (CPU), input/output (I/O) and/or communications module. The CPU can comprise electronic circuitry that carries out instructions of a computer program by performing basic arithmetic, logical, control and I/O operations specified by the instructions. The controller can comprise a suitable software (e.g., operating system). The control system may optionally include a feedback control loop and/or feed-forward control loop. The control system may be configured to control (e.g. in real time) a power of the energy source, speed of the energy beam, power density of the energy beam, dwell time of the energy beam, energy beam footprint (e.g., on the exposed surface of the material bed), and/or cross-section of the energy beam, to maintain a target parameter of one or more forming 3D objects. The target parameter may comprise a temperature, or power of the energy beam and/or source. In some examples, maintaining a target temperature for maintaining on one or more characteristics of one or more melt pools. The characteristics of the melt pool may comprise its FLS, temperature, fluidity, viscosity, shape (e.g., of a melt pool cross section), volume, or overall shape. The control system may be configured to control (e.g. in real time) a temperature, to maintain a target parameter of one or more forming 3D objects, e.g., a target temperature of one or more positions of the material bed to maintain on one or more melt pools.

The control system can include any suitable number of controllers, and can be used to control any number of suitable (e.g., different) operations. For example, in some embodiments, a controller (e.g., a single controller) is used to control generating one or more computer models (e.g., physics model (e.g., and associated simulation process), geometric model, adjusted geometric model) and to control forming instructions (e.g., printing instructions, molding instructions, machining instructions) for forming of one or more 3D objects. In some embodiments, a number of controllers are used to control (e.g. direct) generating one or more computer models and to control forming instructions for forming of one or more 3D objects. For example, a first controller can be used to control (e.g. direct) generating one or more computer models, and a second controller can be used to control (e.g. direct) forming instructions for forming of one or more 3D objects. In some embodiments, multiple controllers are used to control generating one or more computer models, and multiple controllers are used to control forming instructions for forming of one or more 3D objects. In some embodiments, one controller is used to control generating one or more computer models, and multiple controllers are used to control forming instructions for forming of one or more 3D objects. In some embodiments, multiple controllers are used to control generating one or more computer models, and one controller is used to control forming instructions for forming of one or more 3D objects.

Methods, apparatuses, and/or systems of the present disclosure can be implemented by way of one or more algorithms. An algorithm can be implemented by way of software upon execution by one or more computer processors. For example, the processor can be programmed to calculate the path of the energy beam and/or the power per unit area emitted by the energy source (e.g., that should be provided to the material bed in order to achieve the desired result).

The at least one sensor can be operatively coupled to a control system (e.g., computer control system). The sensor may comprise light sensor, acoustic sensor, vibration sensor, chemical sensor, electrical sensor, magnetic sensor, fluidity sensor, movement sensor, speed sensor, position sensor, pressure sensor, force sensor, density sensor, distance sensor, or proximity sensor. The sensor may include temperature sensor, weight sensor, material (e.g., powder) level sensor, metrology sensor, gas sensor, or humidity sensor. The metrology sensor may comprise measurement sensor (e.g., height, length, width, angle, and/or volume). The metrology sensor may comprise a magnetic, acceleration, orientation, or optical sensor. The sensor may transmit and/or receive sound (e.g., echo), magnetic, electronic, or electromagnetic signal. The electromagnetic signal may comprise a visible, infrared, ultraviolet, ultrasound, radio wave, or microwave signal. The metrology sensor may measure the tile. The metrology sensor may measure the gap. The metrology sensor may measure at least a portion of the layer of material. The layer of material may be a pre-transformed material (e.g., powder), transformed material, or hardened material. The metrology sensor may measure at least a portion of the 3D object. The gas sensor may sense any of the gas delineated herein. The distance sensor can be a type of metrology sensor. The distance sensor may comprise an optical sensor, or capacitance sensor. The temperature sensor can comprise Bolometer, Bimetallic strip, Calorimeter, Exhaust gas temperature gauge, Flame detection, Gardon gauge, Golay cell, Heat flux sensor, Infrared thermometer, Microbolometer, Microwave radiometer, Net radiometer, Quartz thermometer, Resistance temperature detector, Resistance thermometer, Silicon band gap temperature sensor, Special sensor microwave/imager, Temperature gauge, Thermistor, Thermocouple, Thermometer (e.g., resistance thermometer), or Pyrometer. The temperature sensor may comprise an optical sensor. The temperature sensor may comprise image processing. The temperature sensor may comprise a camera (e.g., IR camera, CCD camera). The pressure sensor may comprise Barograph, Barometer, Boost gauge, Bourdon gauge, Hot filament ionization gauge, Ionization gauge, McLeod gauge, Oscillating U-tube, Permanent Downhole Gauge, Piezometer, Pirani gauge, Pressure sensor, Pressure gauge, Tactile sensor, or Time pressure gauge. The position sensor may comprise Auxanometer, Capacitive displacement sensor, Capacitive sensing, Free fall sensor, Gravimeter, Gyroscopic sensor, Impact sensor, Inclinometer, Integrated circuit piezoelectric sensor, Laser rangefinder, Laser surface velocimeter, LIDAR, Linear encoder, Linear variable differential transformer (LVDT), Liquid capacitive inclinometers, Odometer, Photoelectric sensor, Piezoelectric accelerometer, Rate sensor, Rotary encoder, Rotary variable differential transformer, Selsyn, Shock detector, Shock data logger, Tilt sensor, Tachometer, Ultrasonic thickness gauge, Variable reluctance sensor, or Velocity receiver. The optical sensor may comprise a Charge-coupled device, Colorimeter, Contact image sensor, Electro-optical sensor, Infra-red sensor, Kinetic inductance detector, light emitting diode (e.g., light sensor), Light-addressable potentiometric sensor, Nichols radiometer, Fiber optic sensor, Optical position sensor, Photo detector, Photodiode, Photomultiplier tubes, Phototransistor, Photoelectric sensor, Photoionization detector, Photomultiplier, Photo resistor, Photo switch, Phototube, Scintillometer, Shack-Hartmann, Single-photon avalanche diode, Superconducting nanowire single-photon detector, Transition edge sensor, Visible light photon counter, or Wave front sensor. The weight of the material bed can be monitored by one or more weight sensors in, or adjacent to, the material. For example, a weight sensor in the material bed can be at the bottom of the material bed. The weight sensor can be between the bottom of the enclosure (e.g., FIG. 2, 211) and the substrate (e.g., FIG. 2, 209) on which the base (e.g., FIG. 2, 202) or the material bed (e.g., FIG. 2, 204) may be disposed. The weight sensor can be between the bottom of the enclosure and the base on which the material bed may be disposed. The weight sensor can be between the bottom of the enclosure and the material bed. A weight sensor can comprise a pressure sensor. The weight sensor may comprise a spring scale, a hydraulic scale, a pneumatic scale, or a balance. At least a portion of the pressure sensor can be exposed on a bottom surface of the material bed. In some cases, the weight sensor can comprise a button load cell. The button load cell can sense pressure from powder adjacent to the load cell. In another example, one or more sensors (e.g., optical sensors or optical level sensors) can be provided adjacent to the material bed such as above, below, or to the side of the material bed. In some examples, the one or more sensors can sense the powder level. The material (e.g., powder) level sensor can be in communication with a material dispensing mechanism (e.g., powder dispenser). Alternatively, or additionally a sensor can be configured to monitor the weight of the material bed by monitoring a weight of a structure that contains the material bed. One or more position sensors (e.g., height sensors) can measure the height of the material bed relative to the substrate. The position sensor can be optical sensor. The position sensor can determine a distance between one or more energy beams (e.g., a laser or an electron beam.) and a surface of the material (e.g., powder). The one or more sensors may be connected to a control system (e.g., to a processor, to a computer).

In some embodiments, the energy beam includes a radiation comprising an electromagnetic, or charged particle beam. The energy beam may include radiation comprising electromagnetic, electron, positron, proton, plasma, radical or ionic radiation. The electromagnetic beam may comprise microwave, infrared, ultraviolet, or visible radiation. The energy beam may include an electromagnetic energy beam, electron beam, particle beam, or ion beam. An ion beam may include a cation or an anion. A particle beam may include radicals. The electromagnetic beam may comprise a laser beam. The energy beam may comprise plasma. The energy source may include a laser source. The energy source may include an electron gun. The energy source may include an energy source capable of delivering energy to a point or to an area. In some embodiments, the energy source can be a laser source. The laser source may comprise a $CO_2$, Nd:YAG, Neodymium (e.g., neodymium-glass), an Ytterbium, or an excimer laser. The energy source may include an energy source capable of delivering energy to a point or to an area. The energy source (e.g., transforming energy source) can provide an energy beam having an energy density of at least about 50 joules/cm$^2$ (J/cm$^2$), 100 J/cm$^2$, 200 J/cm$^2$, 300 J/cm$^2$, 400 J/cm$^2$, 500 J/cm$^2$, 600 J/cm$^2$, 700 J/cm$^2$, 800 J/cm$^2$, 1000 J/cm$^2$, 1500 J/cm$^2$, 2000 J/cm$^2$, 2500 J/cm$^2$, 3000 J/cm$^2$, 3500 J/cm$^2$, 4000 J/cm$^2$, 4500 J/cm$^2$, or 5000 J/cm$^2$. The energy source can provide an energy beam having an energy density of at most about 50 J/cm$^2$, 100 J/cm$^2$, 200 J/cm$^2$, 300 J/cm$^2$, 400 J/cm$^2$, 500 J/cm$^2$, 600 J/cm$^2$, 700 J/cm$^2$, 800 J/cm$^2$, 1000 J/cm$^2$, 500 J/cm$^2$, 1000 J/cm$^2$, 1500 J/cm$^2$, 2000 J/cm$^2$, 2500 J/cm$^2$, 3000 J/cm$^2$, 3500 J/cm$^2$, 4000 J/cm$^2$, 4500 J/cm$^2$, or 5000 J/cm$^2$. The energy source can provide an energy beam having an energy density of a value between the afore-mentioned values (e.g., from about 50 J/cm$^2$ to about 5000 J/cm$^2$, from about 200 J/cm$^2$ to about 1500 J/cm$^2$, from about 1500 J/cm$^2$ to about 2500 J/cm$^2$, from about 100 J/cm$^2$ to about 3000 J/cm$^2$, or from about 2500 J/cm$^2$ to about 5000 J/cm$^2$). In an example, a laser can provide light energy at a peak wavelength of at least about 100 nanometer (nm), 500 nm, 750 nm, 1000 nm, 1010 nm, 1020 nm, 1030 nm, 1040 nm, 1050 nm, 1060 nm, 1070 nm, 1080 nm, 1090 nm, 1100 nm, 1200 nm, 1500 nm, 1600 nm, 1700 nm, 1800 nm, 1900 nm, or 2000 nm. In an example a laser can provide light energy at a peak wavelength of at most about 2000 nm, 1900 nm, 1800 nm, 1700 nm, 1600 nm, 1500 nm, 1200 nm, 1100 nm, 1090 nm, 1080 nm, 1070 nm, 1060 nm, 1050 nm, 1040 nm, 1030 nm, 1020 nm, 1010 nm, 1000 nm, 750 nm, 500 nm, or 100 nm. The laser can provide light energy at a peak wavelength between any of the afore-mentioned peak wavelength values (e.g., from about 100 nm to about 2000 nm, from about 500 nm to about 1500 nm, or from about 1000 nm to about 1100 nm). The energy beam (e.g., laser) may have a power of at least about 0.5 Watt (W), 1 W, 2 W, 3 W, 4 W, 5 W, 10 W, 20 W, 30 W, 40 W, 50 W, 60 W, 70 W, 80 W, 90 W, 100 W, 120 W, 150 W, 200 W, 250 W, 300 W, 350 W, 400 W, 500 W, 750 W, 800 W, 900 W, 1000 W, 1500 W, 2000 W, 3000 W, or 4000 W. The energy beam may have a power of at most about 0.5 W, 1 W, 2 W, 3 W, 4 W, 5 W, 10 W, 20 W, 30 W, 40 W, 50 W, 60 W, 70 W, 80 W, 90 W, 100 W, 120 W, 150 W, 200 W, 250 W, 300 W, 350 W, 400 W, 500 W, 750 W, 800 W, 900 W, 1000 W, 1500, 2000 W, 3000 W, or 4000 W. The energy beam may have a power between any of the afore-mentioned laser power values (e.g., from about 0.5 W to about 100 W, from about 1 W to about 10 W, from about 100 W to about 1000 W, or from about 1000 W to about 4000 W). The first energy source (e.g., producing the transforming energy beam) may have at least one of the characteristics of the second energy source. The powder density (e.g., power per unit area) of the energy beam may at least about 10000 W/mm$^2$, 20000 W/mm$^2$, 30000 W/mm$^2$, 50000 W/mm$^2$, 60000 W/mm$^2$, 70000 W/mm$^2$, 80000 W/mm$^2$, 90000 W/mm$^2$, or 100000 W/mm$^2$. The powder density of the energy beam may be at most about 10000 W/mm$^2$, 20000 W/mm$^2$, 30000 W/mm$^2$, 50000 W/mm$^2$, 60000 W/mm$^2$, 70000 W/mm$^2$, 80000 W/mm$^2$, 90000 W/mm$^2$, or 100000 W/mm$^2$. The powder density of the energy beam may be any value between the aforementioned values (e.g., from about 10000 W/mm$^2$ to about 100000 W/mm$^2$, from about 10000 W/mm$^2$ to about 50000 W/mm$^2$, or from about 50000 W/mm$^2$ to about 100000 W/mm$^2$). The scanning speed of the energy beam may be at least about 50 millimeters per second (mm/sec), 100 mm/sec, 500 mm/sec, 1000 mm/sec, 2000 mm/sec, 3000 mm/sec, 4000 mm/sec, or 50000 mm/sec. The scanning speed of the energy beam may be at most about 50 mm/sec, 100 mm/sec, 500 mm/sec, 1000 mm/sec, 2000 mm/sec, 3000 mm/sec, 4000 mm/sec, or 50000 mm/sec. The scanning speed of the energy beam may any value between the aforementioned values (e.g., from about 50 mm/sec to about 50000 mm/sec, from about 50 mm/sec to about 3000 mm/sec, or from about 2000 mm/sec to about 50000 mm/sec). The energy beam may be continuous or non-continuous (e.g., pulsing). The energy beam may be modulated before and/or during the formation of a transformed material as part of the 3D object. The energy beam may be modulated before and/or during the 3D printing process (e.g., using one or more controllers).

In some embodiments, two types of energy beams may be employed for the forming process, e.g., a tiling and a hatching energy beam, e.g., type-1 and type-2 energy beams. The hatching energy beam may continuously move along a trajectory (e.g., path). The hatching energy beam may be type-1 or type-2 energy beam. The tiling energy beam may move intermittently along a trajectory. The tiling energy beam may move along a trajectory and (i) transform a pre-transformed material to a transformed material (referred to herein as "dwell time"), and (ii) non transform a pre-transformed material to a transformed material (referred to herein as "intermission time"). At least one characteristic of the energy beam may be controlled during the dwell time and/or intermission time (e.g., in real time and/or in situ during a forming operation).

In some embodiments, the type-2 energy beam comprises (i) an extended exposure area, (ii) extended exposure time, (iii) low power density (e.g., power per unit area) or (iv) an intensity profile that can fill an area with a flat (e.g., top head) energy profile. Extended may be in comparison with the type-1 energy beam. The extended exposure time may be at least about 1 millisecond and at most 100 milliseconds. In some embodiments, an energy profile of the tiling energy source may exclude a Gaussian beam or round top beam. In some embodiments, an energy profile of the tiling energy source may include a Gaussian beam or round top beam. In some embodiments, the 3D printer comprises a type-1 energy beams. In some embodiments, an energy profile of the hatching energy may comprise a Gaussian energy beam. In some embodiments, an energy profile of the type-1 energy beam may exclude a Gaussian energy beam. The type-1 energy beam may have any cross-sectional shape comprising an ellipse (e.g., circle), or a polygon (e.g., as disclosed herein). The type-1 energy beam may have a cross section with a diameter of at least about 25 µm, 50 µm, 100 µm, 150 µm, 200 µm, or 250 µm. The type-1 energy beam may have a cross section with a diameter of at most about 40 micrometers (µm), 50 µm, 60 µm, 70 µm, 80 µm, 100 µm, 150 µm, 200 µm, or 250 µm. The type-1 energy beam may have a cross section with a diameter of any value between the afore-mentioned values (e.g., from about 40 µm to about 240 µm, from about 40 µm to about 100 µm, from about 50 µm to about 150 µm, or from about 150 µm to about 250 µm). The power density (e.g., power per unit area) of the type-1 energy beam may at least about 5000 W/mm$^2$, 10000 W/mm$^2$, 20000 W/mm$^2$, 30000 W/mm$^2$, 50000 W/mm$^2$, 60000 W/mm$^2$, 70000 W/mm$^2$, 80000 W/mm$^2$, 90000 W/mm$^2$, or 100000 W/mm$^2$. The power density of the type-1 energy beam may be at most about 5000 W/mm$^2$, 10000 W/mm$^2$, 20000 W/mm$^2$, 30000 W/mm$^2$, 50000 W/mm$^2$, 60000 W/mm$^2$, 70000 W/mm$^2$, 80000 W/mm$^2$, 90000 W/mm$^2$, or 100000 W/mm$^2$. The power density of the type-1 energy beam may be any value between the afore-mentioned values (e.g., from about 5000 W/mm$^2$ to about 100000 W/mm$^2$, from about 10000 W/mm$^2$ to about 50000 W/mm$^2$, or from about 50000 W/mm$^2$ to about 100000 W/mm$^2$). The hatching speed of the type-1 energy beam may be at least about 50 millimeters per second (mm/sec), 100 mm/sec, 500 mm/sec, 1000 mm/sec, 2000 mm/sec, 3000 mm/sec, 4000 mm/sec, or 50000 mm/sec. The hatching speed of the type-1 energy beam may be at most about 50 mm/sec, 100 mm/sec, 500 mm/sec, 1000 mm/sec, 2000 mm/sec, 3000 mm/sec, 4000 mm/sec, or 50000 mm/sec. The hatching speed of the type-1 energy beam may any value between the afore-mentioned values (e.g., from about 50 mm/sec to about 50000 mm/sec, from about 50 mm/sec to about 3000 mm/sec, or from about 2000 mm/sec to about 50000 mm/sec). The type-1 energy beam may be continuous or non-continuous (e.g., pulsing). In some embodiments, the type-1 energy beam compensates for heat loss at the edges of the target surface after the heat tiling process (e.g., forming the tiles by utilizing the type-2 energy beam). The type-1 energy beam may be continuously moving along the path. The type-2 energy beam may stop and move along the path (e.g., the type-2 energy beam may transform a portion of the material bed along a path of tiles during the "stop" time and cease to transform the material bed along the path of tiles during the "move" time. The target surface may be an exposed surface of the 3D object, of the platform, and/or of the material bed.

The type-2 energy beam may have an extended cross section. For example, the type-2 energy beam has a FLS (e.g., cross sectional diameter) may be larger than the type-1 energy beam. The FLS of a cross section of the type-2 energy beam may be at least about 0.05 millimeters (mm), 0.1 mm, 0.2 mm, 0.3 mm, 0.4 mm, 0.5 mm, 0.8 mm, 1 mm, 1.5 mm, 2 mm, 2.5 mm, 3 mm, 3.5 mm, 4 mm, 4.5 mm, or 5 mm. The FLS of a cross section of the type-2 energy beam may be between any of the afore-mentioned values (e.g., from about 0.05 mm to about 5 mm, from about 0.05 mm to about 0.2 mm from about 0.3 mm to about 2.5 mm, or from about 2.5 mm to about 5 mm). The cross section of the energy beam can be at least about 0.1 millimeter squared (mm$^2$), or 0.2. The diameter of the energy beam can be at least about 50 micrometers (µm), 70 µm, 80 µm, 100 µm, 150 µm, 200 µm, 250 µm, 300 µm, 350 µm, 400 µm, 500 µm, or 600 µm. The distance between the first position and the second position can be at least about 50 micrometers (µm), 70 µm, 80 µm, 100 µm, 200 µm, or 250 µm. The FLS may be measured at full width half maximum intensity of the energy beam. In some embodiments, the type-2 energy beam is a focused energy beam. In some embodiments, the type-2 energy beam is a defocused energy beam. The energy profile of the type-2 energy beam may be (e.g., substantially) uniform (e.g., in the beam cross sectional area that forms the tile). The energy profile of the type-2 energy beam may be (e.g., substantially) uniform during the exposure time (e.g., also referred to herein as tiling time, or dwell time). The exposure time (e.g., at the target surface) of the type-2 energy beam may be at least about 0.1 milliseconds (msec), 0.5 msec, 1 msec, 10 msec, 20 msec, 30 msec, 40 msec, 50 msec, 60 msec, 70 msec, 80 msec, 90 msec, 100 msec, 200 msec, 400 msec, 500 msec, 1000 msec, 2500 msec, or 5000 msec. The exposure time (e.g., at the target surface) of the type-2 energy beam may be at most about 10 msec, 20 msec, 30 msec, 40 msec, 50 msec, 60 msec, 70 msec, 80 msec, 90 msec, 100 msec, 200 msec, 400 msec, 500 msec, 1000 msec, 2500 msec, or 5000 msec. The exposure time may be between any of the above-mentioned exposure times (e.g., from about 0.1 msec to about 5000 msec, from about 0.1 msec to about 1 msec, from about 1 msec to about 50 msec, from about 50 msec to about 100 msec, from about 100 msec to about 1000 msec, from about 20 msec to about 200 msec, or from about 1000 msec to about 5000 msec). The exposure time may be the dwell time. The power per unit area of the type-2 energy beam may be at least about 100 Watts per millimeter square (W/mm$^2$), 200 W/mm$^2$, 300 W/mm$^2$, 400 W/mm$^2$, 500 W/mm$^2$, 600 W/mm$^2$, 700 W/mm$^2$, 800 W/mm$^2$, 900 W/mm$^2$, 1000 W/mm$^2$, 2000 W/mm$^2$, 3000 W/mm$^2$, 5000 W/mm$^2$, or 7000 W/mm$^2$. The power per unit area of the type-2 energy beam may be at most about 100 W/mm$^2$, 200 W/mm$^2$, 300 W/mm$^2$, 400 W/mm$^2$, 500 W/mm$^2$, 600 W/mm$^2$, 700 W/mm$^2$, 800 W/mm$^2$, 900 W/mm$^2$, 1000 W/mm$^2$, 2000 W/mm$^2$, 3000 W/mm$^2$, 5000 W/mm$^2$, 7000 W/mm$^2$, 8000 W/mm$^2$, 9000 W/mm$^2$, or 10000 W/mm$^2$. The power per unit area of the type-2 energy beam may be any value between the afore-mentioned values (e.g., from about 100 W/mm$^2$ to about 3000 W/mm$^2$, from about 100 W/mm$^2$ to about 5000 W/mm$^2$, from about 100 W/mm$^2$ to about 9000 W/mm$^2$, from about 100 W/mm$^2$ to about 500 W/mm$^2$, from about 500 W/mm$^2$ to about 3000 W/mm$^2$, from about 1000 W/mm$^2$ to about 7000 W/mm$^2$, or from about 500 W/mm$^2$ to about 8000 W/mm$^2$). The type-2 energy beam may emit energy stream towards the target surface in a step and repeat sequence.

The FLS (e.g., the diameter, spherical equivalent diameter, diameter of a bounding circle, or largest of height, width and length) of the formed (e.g., printed) 3D object or a portion thereof can be at least about 50 micrometers (µm), 80 µm, 100 µm, 120 µm, 150 µm, 170 µm, 200 µm, 230 µm, 250 µm, 270 µm, 300 µm, 400 µm, 500 µm, 600 µm, 700 µm, 800 µm, 1 mm, 1.5 mm, 2 mm, 3 mm, 5 mm, 1 cm, 1.5 cm, 2 cm, 10 cm, 20 cm, 30 cm, 40 cm, 50 cm, 60 cm, 70 cm, 80 cm, 90 cm, 1 m, 2 m, 3 m, 4 m, 5 m, 10 m, 50 m, 80 m, or 100 m. The FLS of the formed (e.g., printed) 3D object or a portion thereof can be at most about 150 µm, 170 µm, 200 µm, 230 µm, 250 µm, 270 µm, 300 µm, 400 µm, 500 µm, 600 µm, 700 µm, 800 µm, 1 mm, 1.5 mm, 2 mm, 3 mm, 5 mm, 1 cm, 1.5 cm, 2 cm, 10 cm, 20 cm, 30 cm, 40 cm, 50 cm, 60 cm, 70 cm, 80 cm, 90 cm, 1 m, 2 m, 3 m, 4 m, 5 m, 10 m, 50 m, 80 m, 100 m, 500 m, or 1000 m. The FLS of the formed (e.g., printed) 3D object or a portion thereof can any value between the afore-mentioned values (e.g., from about 50 µm to about 1000 m, from about 500 µm to about 100 m, from about 50 µm to about 50 cm, or from about 50 cm to about 1000 m). In some cases, the FLS of the formed (e.g., printed) 3D object or a portion thereof may be in between any of the afore-mentioned FLS values. The portion of the 3D object may be a heated portion or disposed portion (e.g., tile).

The layer of pre-transformed material (e.g., powder) may be of a predetermined height (thickness). The layer of pre-transformed material can comprise the material prior to its transformation in the forming (e.g., 3D printing) process. The layer of pre-transformed material may have an upper surface that is substantially flat, leveled, or smooth. In some instances, the layer of pre-transformed material may have an upper surface that is not flat, leveled, or smooth. The layer of pre-transformed material may have an upper surface that is corrugated or uneven. The layer of pre-transformed material may have an average or mean (e.g., pre-determined) height. The height of the layer of pre-transformed material (e.g., powder) may be at least about 5 micrometers (µm), 10 µm, 20 µm, 30 µm, 40 µm, 50 µm, 60 µm, 70 µm, 80 µm, 90 µm, 100 µm, 200 µm, 300 µm, 400 µm, 500 µm, 600 µm, 700 µm, 800 µm, 900 µm, 1 mm, 2 mm, 3 mm, 4 mm, 5 mm, 6 mm, 7 mm, 8 mm, 9 mm, 10 mm, 20 mm, 30 mm, 40 mm, 50 mm, 60 mm, 70 mm, 80 mm, 90 mm, 100 mm, 200 mm, 300 mm, 400 mm, 500 mm, 600 mm, 700 mm, 800 mm, 900 mm, or 1000 mm. The height of the layer of pre-transformed material may be at most about 5 micrometers (µm), 10 µm, 20 µm, 30 µm, 40 µm, 50 µm, 60 µm, 70 µm, 80 µm, 90 µm, 100 µm, 200 µm, 300 µm, 400 µm, 500 µm, 600 µm, 700 µm, 800 µm, 900 µm, 1 mm, 2 mm, 3 mm, 4 mm, 5 mm, 6 mm, 7 mm, 8 mm, 9 mm, 10 mm, 20 mm, 30 mm, 40 mm, 50 mm, 60 mm, 70 mm, 80 mm, 90 mm, 100 mm, 200 mm, 300 mm, 400 mm, 500 mm, 600 mm, 700 mm, 800 mm, 900 mm, or 1000 mm. The height of the layer of pre-transformed material may be any number between the afore-mentioned heights (e.g., from about 5 µm to about 1000 mm, from about 5 µm to about 1 mm, from about 25 µm to about 1 mm, or from about 1 mm to about 1000 mm). The "height" of the layer of material (e.g., powder) may at times be referred to as the "thickness" of the layer of material. In some instances, the layer of hardened material may be a sheet of metal. The layer of hardened material may be fabricated using a 3D manufacturing methodology. Occasionally, the first layer of hardened material may be thicker than a subsequent layer of hardened material. The first layer of hardened material may be at least about 1.1 times, 1.2 times, 1.4 times, 1.6 times, 1.8 times, 2 times, 4 times, 6 times, 8 times, 10 times, 20 times, 30 times, 50 times, 100 times, 500 times, 1000 times, or thicker (higher) than the average (or mean) thickness of a subsequent layer of hardened material, the average thickens of an average subsequent layer of hardened material, or the average thickness of any of the subsequent layers of hardened material. FIG. 5 shows an example of a schematic cross section in a 3D object 503 comprised of layers of hardened material numbered 1 to 3, with 1 being the first layer (e.g., bottom skin layer). In some instances, layer #1 can be thicker than any of the subsequent layers (e.g., layers #2 to #3). In some instances, layer #1 can be thicker than an average thickens of the subsequent layers (e.g., layers #2 to #3). The very first layer of hardened material formed in the material bed by forming (e.g., 3D printing) may be referred herein as the "bottom skin" layer.

In some instances, one or more intervening layers separate adjacent components from one another. For example, the one or more intervening layers can have a thickness of at most about 10 micrometers ("microns"), 1 micron, 500 nanometers ("nm"), 100 nm, 50 nm, 10 nm, or 1 nm. For example, the one or more intervening layers can have a thickness of at least about 10 micrometers ("microns"), 1 micron, 500 nanometers ("nm"), 100 nm, 50 nm, 10 nm, or 1 nm. In an example, a first layer is adjacent to a second layer when the first layer is in direct contact with the second layer. In another example, a first layer is adjacent to a second layer when the first layer is separated from the second layer by a third layer. In some instances, adjacent to may be 'above' or 'below.' Below can be in the direction of the gravitational force or towards the platform. Above can be in the direction opposite to the gravitational force or away from the platform.

Figure 21:
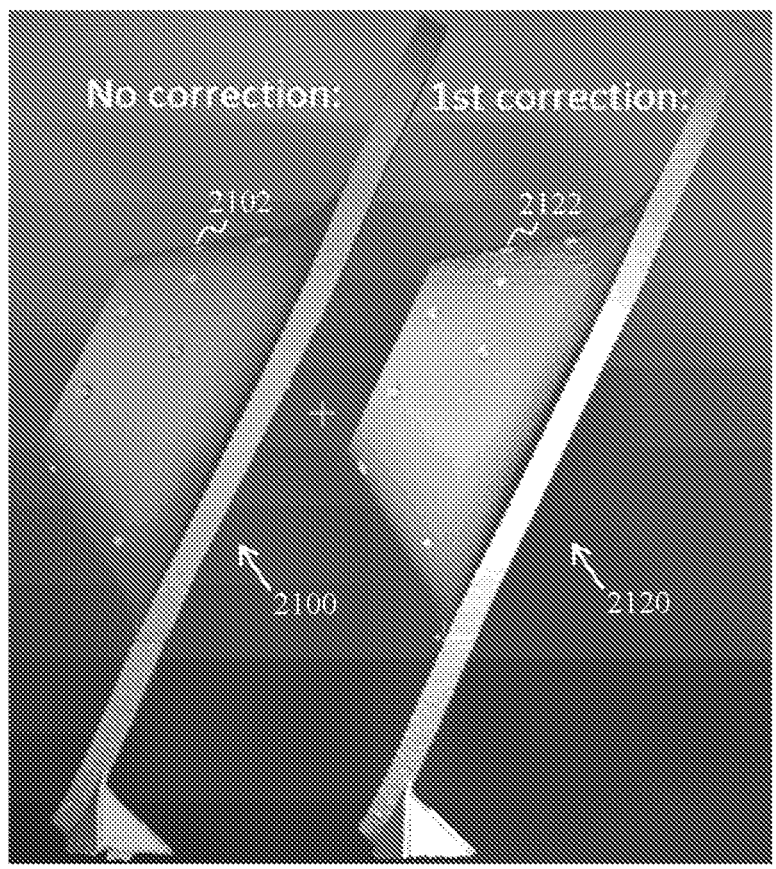
FIG. 21 illustrates models of a 3D object.
Figure 22A:
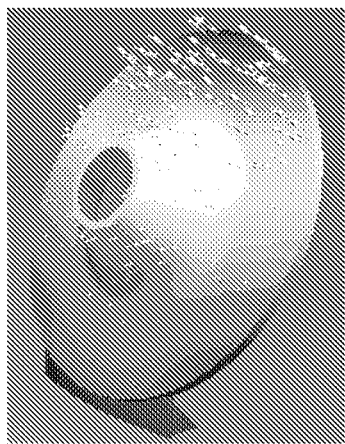
FIGS. 22A-22G illustrate modes for a 3D object.
Figure 22D:
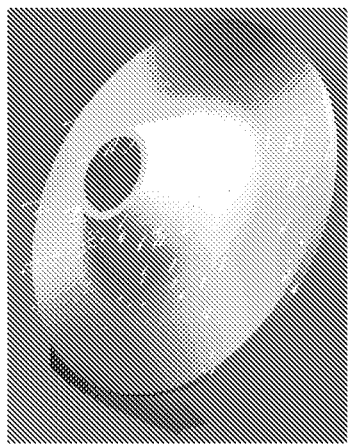
Figure 22F:
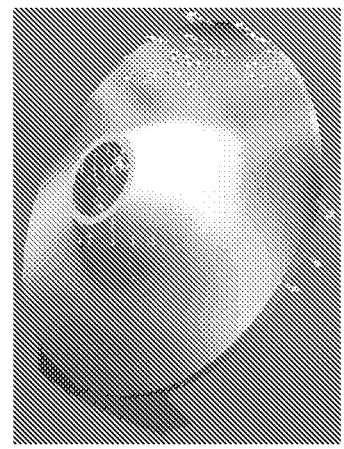
Figure 22B:
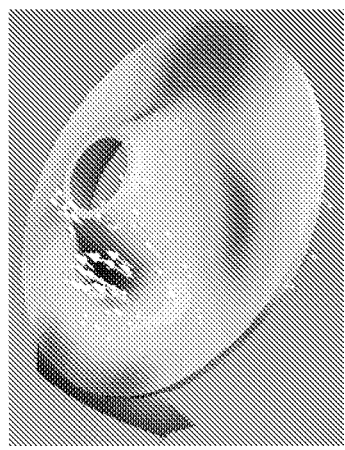
Figure 22E:
Figure 22G:
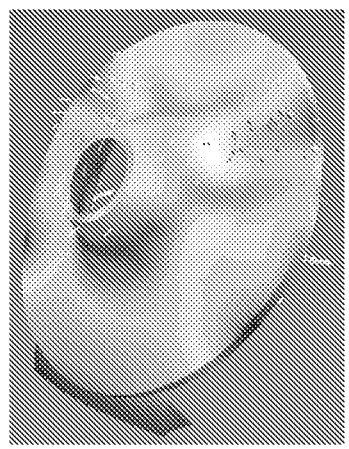
Figure 22C:
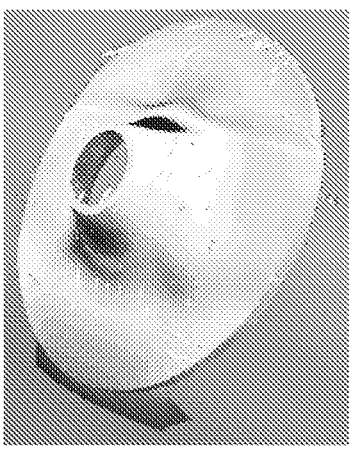

A comparison between a geometric model and a formed object can be done using any suitable technique. In some embodiments, an image (created, for example, from an imaging and/or scanning operation) of an object can be compared to the (virtual) geometric model (e.g., initial/original geometric model) that was used to form the object. For example, the locations of the image markers (representing the physical markers of the 3D object) can be compared to the locations of the model markers of the geometric model of the 3D object. The comparison can comprise performing a data analysis, e.g., as described herein. Data analysis may comprise data mining. For example, the data analysis can comprise a regression (e.g., least squares) analysis. Regression analysis may comprise parametric or non-parametric regression. Parametric regression may comprise linear, or least squares regression. Non-parametric regression may comprise Gaussian process (Kriging), Kernel, or non-parametric multiplicative regression. The regression analysis may comprise a regression tree. If it is determined that the locations of the physical markers are within a predetermined threshold range (e.g., within an acceptable variance, or an acceptable error range) of the locations of the model markers, a corresponding object (also referred to herein as a "requested object", "final object", or "desired object") can be formed (e.g., printed). If it is determined that the locations of the physical markers are not within the predetermined threshold (e.g., outside of an acceptable variance, or error range) of the locations of the model markers, the geometric model can be adjusted (e.g., corrected, improved, updated) to. The adjustment of the geometric model may compensate for the deformation caused by the forming process (e.g., OPC). In some embodiments, mythologies of continuum mechanics are used as tracking methods. Continuum mechanics may comprise fluid mechanics. Fluid mechanics may comprise a Lagrangian or Eulerian frame of reference (e.g., specification of the flow field, e.g., coordinate system). For example, Lagrangian particle tracking method (LPT) may be used. In some embodiments, a Lagrangian tracking method is used: e.g., locations of the model markers can be designated $X'_i$ and locations of the physical markers can be designated $x_i$; with a goal of adjusting the geometric model to satisfy $x_i = X'_i$. In some embodiments, the geometric model is adjusted in accordance with the following Equation 1:

$$X'^{(n+1)}_i = X'^{(n)}_i + g(x_i^{(n)});$$

where $x_i$ is the measured locations of the physical markers (e.g., in scanner coordinate system); $X'_i$ is the locations of the model markers (also referred to as nominal locations); n is the number of iterations; and $g(x_i)$ is an adjustment function (also referred to as an "update function"). An example calculation for an adjustment function $g(x_i)$ is described below with reference to Equation 11. In some embodiments, the geometric model is adjusted considering (e.g., based on) an optimization (e.g. using OPC, e.g., as described herein). In some embodiments, the geometric model is adjusted, e.g., using regression analysis (e.g., a least squares fit). In some embodiments, a nonlinear least squares technique is used. For example, an optimization can be calculated using distances between markers. For example, one or more matrices may be used to represent physical markers and/or model markers, such as in accordance with the following Equation 2:

$$d_{ij} = \|X'_i - x_j\|;$$

where $x_i$ is the measured locations of the physical markers (e.g., in scanner coordinate system), where $X'_i$ is the measured locations of the model markers of the geometric model; and $d_{ij}$ is the distances (e.g., distance matrix). $d_{ij}$ is a symmetric matrix (e.g., m by m matrix, where m is the number of markers) Distance matrices between a multiple number (e.g., n number) of markers ($X'_i$ and $x_j$) can be calculated using Equation 2. An adjusted geometric model can be used to form one or more additional objects (e.g., one or more test objects), which can then be compared to an object (e.g., the comparison may be done with a scanned image of the formed object). For example, the process of adjustment and formation can be repeated until locations of the physical markers and model markers (e.g., substantially) match, e.g., in accordance with one or more of the optimization calculations described herein. The process can be iteratively repeated until an object has dimensions within the predetermined threshold range (e.g., has (e.g., substantially) desirable dimensions). For example, the process can be iteratively repeated until the data sets (e.g., substantially) converge. The data sets may comprise the markers and/or the geometry of the requested 3D object and the geometry of the formed 3D object. When a sufficiently adjusted geometric model is obtained, the adjusted geometric model can be used to form the requested part (e.g., using OPC). FIG. 21 shows perspective views of an example first image 2100 and second image 2120 corresponding to a first (test) object and a second (test) object, respectively. First image 2100 includes first image markers 2102, and a second image 2120 includes second image markers 2122. A first object (e.g., a first object represented by first image 2100) can be formed using instructions considering (e.g., based on) a geometric model without any adjustment (e.g., corrections) (which can be referred to as a "first geometric model," "prior geometric model," "previous geometric model," "initial geometric model," or "original geometric model"). The image markers (e.g., image markers 2102) of the first image can be compared to model markers of the geometric model, and used to adjust the geometric model (which can be referred to as a "second geometric model," "adjusted geometric model," or "subsequent geometric model"). The adjusted geometric model is used to form a second object (e.g., a second object represented by second image 2120 after one adjustment). In some cases, the second image markers of the second image can be used to further adjust the geometric model (which can be referred to as "adjusted geometric model," "subsequent geometric model," or "further adjusted geometric model"). This process can be iteratively repeated until the geometric model is finally adjusted (e.g., when convergence is achieved).

In some embodiments, two vectors or two vector-sets are used (e.g., one for the physical marker (or model markers) and one for the image markers). In some embodiments, two distance matrices are used (e.g., one for the physical marker (or model markers) and one for the image markers). The amount of deformation can be quantified using the distance matrices using any suitable metrics. In some embodiments, an amount of deformation in a formed object (e.g., test object) is quantified by analyzing differences between two distance matrices. In some embodiments, a first distance matrix includes location information for the physical markers of the test object (or corresponding image markers of the corresponding image) and a second distance matrix includes location information for the model markers of the geometric model. An amount of deformation in a formed object (e.g., test object) can be quantified by solving for the displacement vector at each of the model markers locations, e.g., by matching the first distance matrix and a modified second distance matrix, e.g., by matching a first distance vector set and a modified second vector set. The modified second distance matrix can be the distance matrix of the model markers of the geometric model that have been displaced with the computed displacement vectors. This computation can be performed iteratively using a regression analysis (e.g., as disclosed herein), e.g., using a weighted non-linear least squares regression techniques. The vector or vector set may be represented as a matrix.

At times, it can be desirable for a geometric model to include adjustments (if necessary) that take into account empirically collected data from one or more forming process (e.g., one or more printing processes). In this way, the geometric model can be used to reliably form multiple 3D objects with good dimensional precision and repeatability. In some embodiments, a geometric model is adjusted considering (e.g., based on) a simulated process. The simulated process can involve using one or more simulations of predicted deformation of an object, e.g., due to changes in one or more characteristics of the object in the formation process (e.g., printing process, extrusion process, or molding process). The simulation(s) can consider (e.g., be based on) one or more physics-based premises, postulations, and/or calculations that can collectively form a model (also referred to herein as a "physics model" or "simulated model"). The one or more physics-based calculations can consider basic principles (e.g., first physics principals) of physics (e.g., comprising continuum mechanics). A physics model can take into consideration one or more physics-based calculations and/or empirical evidence. The physics model may consider thermo-mechanical behavior, material properties, geometric properties, or any combination thereof, of the (e.g., requested) object. A simulation using a physics model can be applied to the geometric model to simulate a forming process. Thus, a predicted deformation of an object as a result of the forming process can be calculated using a physics model (and sometimes performing an associated simulation) and/or empirical data (e.g., obtained from a test object). The result of the simulation applied to the geometric model can be used to form a (virtual) simulated object. The simulated object can then be compared to the geometric model of the requested part to determine how accurate and/or reliable the physics model (and simulation) are at predicting deformation. The physics model (and simulation) can be used to adjust the geometric model for forming an object (e.g., requested object or simulated object) to compensate for the predicted deformation. The adjusted geometric model can then be used as a corrected geometric model for forming the requested part(s). Conversely, the formed object (e.g., requested 3D object and/or test object) may be used to train the physics model, e.g., to achieve an accurate and/or reliable physics model. The physics model may be optimized to fit a forming process and/or machinery. The physics model may be used to optimize a forming process and/or machinery.

In some embodiments, a predicted change of at least one characteristic of the 3D object resulting from the forming process can be calculated using a physics model, e.g., considering one or more physics-based calculations. The physics model (e.g., considering one or more physics-based calculations) can be used to at least partially resolve temporal and/or spatial scales of interest. For example, when the material of a 3D object is being transformed from a pre-transformed material to a transformed material, the transformed and pre-transformed material may be subjected to a different (e.g., higher or lower) temperature. Different types of material (e.g., metal (including elemental metal or metal alloy), non-metal, plastic, glass, ceramic, an allotrope of elemental carbon, etc.) have different thermo-mechanical characteristics (e.g., expansion and/or contraction). In some embodiments, the physics model (e.g., and associated simulations) includes calculations of estimated deformation (e.g., are based on) that consider the type of material of the 3D object (e.g., comprising thermo-mechanics or fluid dynamics, e.g., comprising thermal expansion, thermal conductivity, or surface tension.). The deformation may involve changes due to thermo-mechanical properties of the object. The thermo-mechanical properties may cause changes in a dimension and/or another mechanical property due to temperature change, e.g., microstructure manifestation that are characteristic of the particular forming process. Thus, in some embodiments, the physics model (and associated simulations) includes calculations of estimated deformation that consider (e.g., are based on) continuum mechanical (e.g., comprising thermo-mechanical and/or fluid dynamic) analyses of the object and/or its forming process. The material of the 3D object may be in partially or fully molten form for at least part of the transformation process. In some embodiments, the physics model (and associated simulations) include calculations of estimated deformation that consider (e.g., are based on) fluid dynamics. In some embodiments, the physics model (and associated simulations) includes calculations of estimated deformation that consider (e.g., are based on) surface tension of a material (e.g., pre-transformed and/or transformed material). The pre-transformed material may be in one form (e.g., powder) and the transformed material may be in another form (e.g., bulk). Thus, in some embodiments, the physics model (and associated simulations) includes calculations of an estimated deformation that consider change in state of the material (e.g., in relation to density and/or surface tension). The 3D object can be characterized as having an overall shape (e.g., cone shape, toroidal shape, disk shape, disc cone shape, spherical shape, wing shape, spiral shape, or bridge shape.) that can cause it to deform in a characteristic way. Thus, in some embodiments, the physics model (and associated simulations) includes calculations that consider estimated deformation which can consider an overall geometry of the object. The estimate deformation may comprise inelastic (e.g., plastic), elastic, thermally induced, or any suitable combination thereof. The 3D object can include a geometric features (e.g., edges, corners, overhangs, or a cavity ceiling) that may deform. The 3D object can comprise a complex 3D object, e.g., having cavities, overhangs). The 3D object may comprise non-supported segments (e.g., cavity ceiling or overhang). The non-supported segment may have shallow angles with respect to the build plane and/or layering plane (of the layers composing the 3D object). The shallow angles may be an angle of at most 45 degrees (°), 40°, 35°, 30°, 25°, 20°, 15°, 10°, 5°, 1°, or 0.5° with respect to the platform and/or the average layering plane. The non-supported segment may be (e.g., substantially) parallel to the platform and/or the average layering plane. The non-supported segment may have a FLS of at least 2 mm, 10 mm, 25 mm, 45 mm, 75 mm, or 100 mm. The average layering plane may be (e.g., substantially) planar. The average layering plane may have a radius of curvature of at least 5 centimeters (cm), 25 cm, 50 cm, 100 cm, 5 meters (m), 10 m, or 100 m. The deformation may be in the same, or in a different manner than other parts of the 3D object. In some embodiments, the physics model (and associated simulations) includes calculations that consider an estimated deformation of a geometric feature of the object. One type, or different types of energy beams (e.g., laser beam, electron beam, or both) may be used to transform the material of the 3D object (e.g., in 3D printing or welding). Thus, in some embodiments, the physics model (and associated simulations) includes calculations of estimated deformation that consider at least one characteristic of the energy beam(s) (e.g., type of energy beam(s)). The energy beam(s) can have different characteristics (e.g., comprising power density, target depth, cross section, footprint, wavelength, velocity, mode, trajectory, dwell time, intermission time, or type.). The mode of the energy beam may comprise continuous, or pulsing. Different types of energy beam scanning (e.g., tiling, hatching) may be used to transform the material of the 3D object. Thus, in some embodiments, the physics model (and associated simulations) includes calculations of estimated deformation that consider the path(s) of the energy beam(s). Different types of energy beam paths and dwell times may be used to transform the material of the 3D object. Thus, in some embodiments, the physics model (e.g., and associated simulations) includes calculations of estimated deformation that consider the dwell times of the energy beam(s). One or more portions of the 3D object may be transformed using one type of energy beam and one or more other portions of the 3D object may be transformed using a different type of energy beam. Thus, in some embodiments, the physics model (and associated simulations) includes calculations of estimated deformation of different portions of the 3D object. For example, a 3D printing operation can involve stacking of multiple layers of material, each of which may experience heating and cooling at different times. The different layers of a printed 3D object may experience (e.g., substantially) the same or different pressure gradients related to stress of the 3D object (e.g., as distinguished from a pressure gradient or lack thereof, within a material bed, such as described herein). Thus, in some embodiments, the physics model (and associated simulations) includes calculations of estimated deformation that consider (e.g., are based on) current and/or previous stacking (e.g., accumulation) of the layers (e.g., considering a strain/stress that arises from stacking of the layers). The stress may be a latent or ancillary stress. The strain may be a latent or ancillary strain. A physics model can include any suitable combination of physics-based calculations and simulations, such as suitable combinations of those described herein.

In some cases, it may be desirable to simplify the physics-based model. In some cases, it may be desirable to limit the number of types of physics-based calculations and/or the number of degrees of freedom of a physics based calculation. The type of physics-based calculation can refer to the type of physics and/or mathematical principals (e.g., inelastic (e.g., plastic) deformation, elastic deformation, etc.) The degrees of freedom of a physics-based calculation(s) can refer to the number of variables (e.g., parameters, data points) used in the calculation(s). The degrees of freedom can refer to a complexity of the physics-based calculation(s), with lower degrees of freedom associated with reduced complexity. In some embodiments, the degrees of freedom refer to a density (coarseness) of the mesh used to model the geometry of an object (e.g., lower density (coarser) mesh associated with less degrees of freedom). In some embodiments, the degrees of freedom are reduced using model reduction techniques (e.g., "model order reduction" techniques). The degrees of freedom may be reduced by implementing assumptions and/or estimations. The assumptions and/or estimations may be based on a formed (e.g., test) object, and its comparison to a model (e.g., requested) object, e.g., that is used to formulate the forming instructions. In some embodiments, the degrees of freedom are reduced by using a training algorithm. In some embodiments, the degrees of freedom are reduced without changing (e.g., reducing) the number of types of physics-based calculations. In some embodiments, the degrees of freedom are reduced in addition to changing (e.g., reducing) the number of types of physics-based calculations. For example, in some cases it may be desirable to reduce the degrees of freedom (e.g., use coarser mesh) and disregard certain physics-based calculations (e.g., disregarding inelastic (e.g., plastic) deformation while regarding elastic deformation).

Reducing the degrees of freedom and/or the number of types of physics-based calculations may reduce a computational cost of, and/or time required for running the simulation (and/or generating the physics model). Reducing the degrees of freedom may facilitate adjusting the geometric model for forming the object within a predetermined time (e.g., in real-time). For example, it may be advantageous to run one or more simulations in real time (e.g., during a forming (e.g., printing) operation, e.g., during a transformation operation of an energy beam). A physics model that considers nine or more types of physics-based calculations and/or degrees of freedom can be referred to herein as an "expanded physics model". A physics model that considers (e.g., is based on) eight or fewer types of physics-based calculations and/or degrees of freedom can be referred to herein as a "reduced physics model", "simplified physic model" or "subset physics model". The four types of physics-based calculations may comprise: thermo-elastic, thermo-inelastic, time dependent (e.g., vs. non-time dependent), phase transformation, chemical reaction, dynamic inertial, boundary conditions, or initial conditions. In some embodiments, a physics model (e.g., reduced physics model) includes physics based components that are expected to dominantly contribute to the deformation of the 3D object (e.g., include dominant modes). For example, in a particular embodiment, a reduced physics model considers the type of material (e.g., type of alloy) of the pre-transformed and/or the transformed material and a number (e.g., below a threshold) of dominant inelastic (e.g., plastic) and/or elastic deformation of the object. As described herein, in some embodiments, the physics model includes calculations that consider an expected thermo-mechanical (e.g., thermo-plastic) deformation of the object. In some cases, an estimated thermo-plastic deformation can be used to at least partially predict deformation of the object (as compared to, for example, the geometric model of the requested object). The deformation may comprise warpage. In some embodiments, an expected thermo-plastic (e.g., thermal component of a thermo-mechanical model) is calculated by computing a thermal balance in the material using the following Equation 3:

$$\rho c_\rho \frac{\partial T}{\partial t} + \nabla_x \cdot q = \rho r;$$

Where t is time, T=T(t, x) is the temperature field, x is a deformation point; $c_\rho = c_\rho(T)$ is the heat capacity of the material as a function of temperature; $\rho = \rho(t,x)$ is the density; r=r (t, x) is the energy source field per unit mass; $q = -\nabla_x T$; and $\nabla_x T$ is the temperature gradient. The heat capacity can include a latent heat of melting for the material and the material properties can be assumed to be temperature dependent. An expected mechanical deformation (e.g., mechanical component of a thermo-mechanical model) can be calculated by finding the function $x = \phi(t, X)$ using the following Equation 4, such that:

$$\nabla_x \cdot P(t,X) = 0;$$

where P=P(t,X) is a stress tensor. The stress tensor can be the first Piola-Kirchhoff stress tensor. Equivalent forms of the above equation can comprise a different stress tensor. The different stress tensor may be a Cauchy, Nominal, Piola, second Piola-Kirchhoff, or Biot stress tensor. Equation 4 can assume inertial terms are negligible (e.g., quasistatic approximation of the momentum equation). The constitutive model for the material can be calculated and using the following Equation 5:

$$S = C : \varepsilon_{el};$$

where $S = F^{-1}P$ is the same or another stress tensor, e.g., the second Piola-Kirchhoff stress tensor; C is the elastic 4-tensor of the material, and $\varepsilon_{el}$ is the elastic strain tensor.

The deformation may be caused by a material reaction to external loads, body forces (e.g., gravity), changes in temperature, chemical content, chemical reaction, or any combination thereof.

In some embodiments, a physics model includes calculations that consider a type of material (e.g., type of alloy) and an expected thermo-mechanical reaction of that material to the forming process, e.g., that causes deformation. In some embodiments, the physics model rely on one or more assumptions. In one example, the physics model relies on the following assumptions: (i) an optimal energy beam process (e.g., is applied maintains a constant peak temperature over a dwell time) (e.g., an optimal tiling process); and (ii) a closed loop control is employed to adjust process parameters in real time. In some embodiments, the reduced set physics model (e.g., also) assumes: (iii) strain/stress related effects. The strain/stress related effects may be applied to a layer, e.g., independent of or dependent on a stress field of any underling structure. It should be noted that these assumptions are used in some examples and are not necessarily used in other physics models. In some embodiments, the physics model can be used to calculate a predicted deformation substantially in real time. The real-time calculations can allow predictions to be provided in real time during a forming operation. The real-time calculations can be used in a feed forward and/or feedback (closed loop) control system(s) that controls the forming process. In some embodiments, a physics model can be used to filter out noise (e.g., using a filter bank).

The physics model can include calculations using any suitable data analysis techniques, e.g., as described herein. The calculations may comprise predictive modeling. The calculations may comprise exploratory data analysis. The calculations may comprise method that facilitate visualization of genetic distance and relatedness between populations. PCA can be done by eigenvalue decomposition of a data covariance (or correlation) matrix or singular value decomposition of a data matrix. The results of a PCA are usually discussed in terms of component scores, sometimes called factor scores (the transformed variable values corresponding to a particular data point), and loadings (the weight by which each standardized original variable should be multiplied to get the component score). The calculation may comprise (e.g., true) eigenvector-based multivariate analyses. The calculations may reveal the internal structure of the data, e.g., in a way that best explains the variance in the data. The calculation may comprise factor analysis. Factor analysis may incorporate domain specific assumptions about the underlying structure. The calculation may comprise a canonical correlation analysis (CCA). The calculation may define a coordinate-systems that optimally describe a cross-covariance between two datasets. The calculation may comprise a new orthogonal coordinate system that optimally describes variance in a single dataset. The data analysis may comprise a statistical procedure. The statistical procedure may use an orthogonal transformation to convert a set of observations (e.g., test object, and/or formed markers) of possibly correlated variables into a set of values of linearly uncorrelated variables (referred to herein as "principal components," "principal modes of variation," or "modes"). In some embodiments, a number of principal components is at most (i) the smaller of the number of original variables, or (ii) the number of observations. The data analysis may comprise a transformation in which the first principal component has the largest possible variance (e.g., accounts for a maximum variability in the data), and each succeeding component in turn has the highest variance possible under the constraint that it is orthogonal to the preceding components. Resulting vectors of the transformation may be an uncorrelated orthogonal basis set. The data analysis can comprise a proper orthogonal decomposition (POD). The data analysis can comprise dynamical mode analysis, or dynamical orthogonal decomposition.

In some cases, the physics model includes calculation using principal component analysis (PCA) techniques. PCA may be sensitive to a relative scaling of the original variables. Results of the PCA (e.g., the modes) may be referred to in terms of component scores (e.g., factor scores), and loadings. The loadings may be the weight by which each standardized original variable should be multiplied to get the component score. Each of the modes has a unique energy, that relates to its loading. The singular values of the decomposition can correlate to inverse-energies of the modes. The factor scores can be a normalization of the modes. The PCA can consider one or more of the physics-based calculations described herein (e.g., material type, estimated elastic and/or inelastic deformation, fluid dynamics, etc.). The PCA can include calculating estimated (e.g., predicted) "modes" (also referred to herein as "components") of the formed object. Each mode can represent a plausible (also referred herein as possible, estimated, or probable) component of the object as a result of and/or during a forming process. In some embodiments, the physics model includes calculations for predicting (or estimating) modes of the object that consider thermo-mechanical properties of the object. In some embodiments, the modes consider elastic deformation (e.g., nonlinear elastic deformation) modes of the object. The modes can represent elastic responses to inelastic forces applied to the object. The modes can correspond to deformation geometries of the object that result from the forming process. In one embodiment, a predicted nonlinear elastic deformation (i) takes plastic strain field as input, (ii) computes displacement that satisfies equilibrium, (iii) enforces conservation of momentum applied to a continuum, or (iv) any combination thereof. The plastic strain field can be modeled using what can be referred to as Eigenstrain modes. The eigenstrain modes may represent geometric states of an object that consider inherent strain (also referred to as Eigenstrain). Each mode (Eigenstrain mode) can have an associated energy (also referred to herein as weight), with lower energy (lower weight) modes associated with higher stability. In some embodiments, a physics model considering modes can take into account a predicted elastic response of the object brought on by any suitable force. In some embodiments, the force is not limited to the forces applied in the course of a particular forming operation (e.g., resulting from the forming operation). The modes can take into consideration: (i) a new layer that adds plastic strain near the top of the object; (ii) a new layer that at least partially cancels out the previously deposited plastic strain, or (iii) any combination thereof. The associated energies for the modes can be represented in graphical form (also referred to herein as a spectrum of the modes). The spectrum can be used to determine those modes that are predicted to be the most prominent of the elastic deformation modes (e.g., modes having a lower energy). The prominent modes can correspond to predicted modes that achieve, or are closest in achieving, thermo-mechanical equilibrium. The prominent modes can correspond to those modes having an associated energy within (e.g., below) a predetermined value (threshold). The modes can be calculated by applying a plastic strain kernel ($\varepsilon_{kernel}$) at different z-layers of a stack (e.g., printed stack). The displacement data from single calculations can be used to populate columns a matrix U. The calculations may comprise factorization of a real or complex matrix. A singular value decomposition (SVD) calculation can be solved according to the following Equation 6:

$$U = V\Lambda Q^T;$$

where V is the left singular vectors; A is singular values corresponding to the spectrum of Eigenstrain modes (in diagonal form); and $Q^T$ is right singular vectors (e.g., conjugate transpose of unitary matrix).

In some examples, an accumulation calculation of the plastic strain field $\varepsilon$ can be performed using the following Equation 7:

$$\varepsilon_{n+1}^P(z) = \varepsilon_n^P W(z_{n+1}-z) + A(z_{n+1}-z)K;$$

where (A(h)) is a plastic strain amplitude according to the following Equation 8:

$$A(h) = c_0 \exp\left(-\frac{h^2}{2c_1^2}\right);$$

where W(h) is an erasure function according to the following Equation 9:

$$W(h) = \frac{0.5}{1 + \exp\left[12\frac{(c_2 - x)}{c_3}\right]} + 0.5;$$

and where K is a plastic strain kernel. In one example implementation, K is calculated according to the following Equation 10:

$K = \text{diag}([-1,-1,2])$.

The plastic strain field ε can be used as input in the calculation (e.g., corresponding to the forcing term) for a predicted nonlinear elastic deformation, as described above.

Figure 15A:
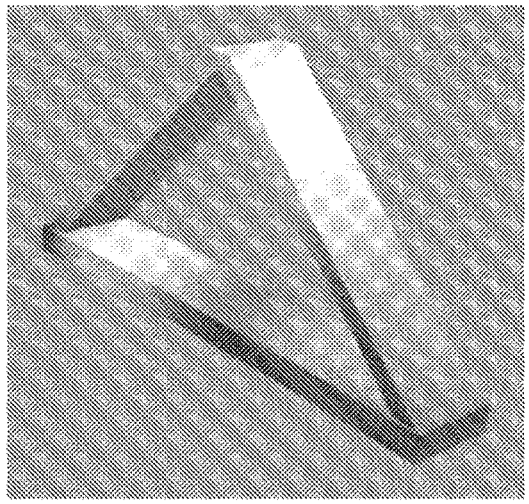
FIGS. 15A-15D illustrate a geometric model and modes for a 3D object.
Figure 15B:
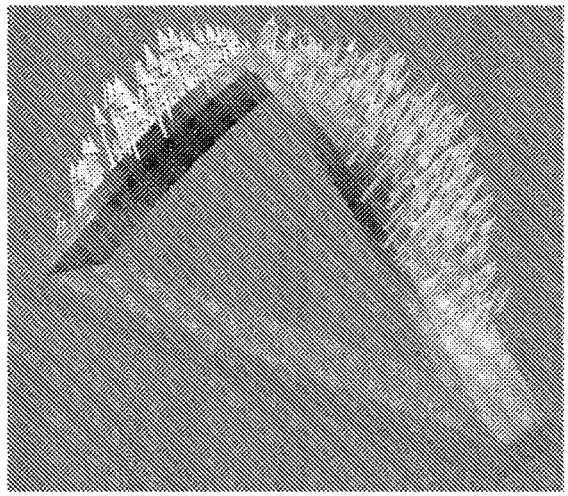
Figure 15C:
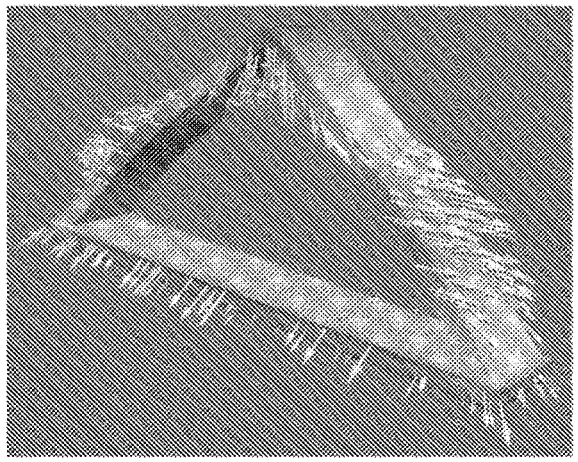
Figure 15D:
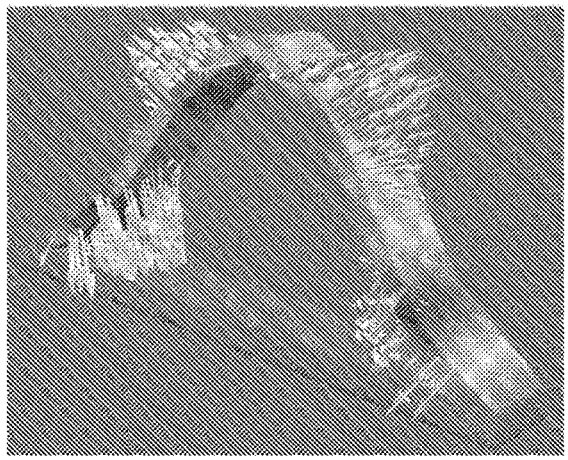
Figure 16:
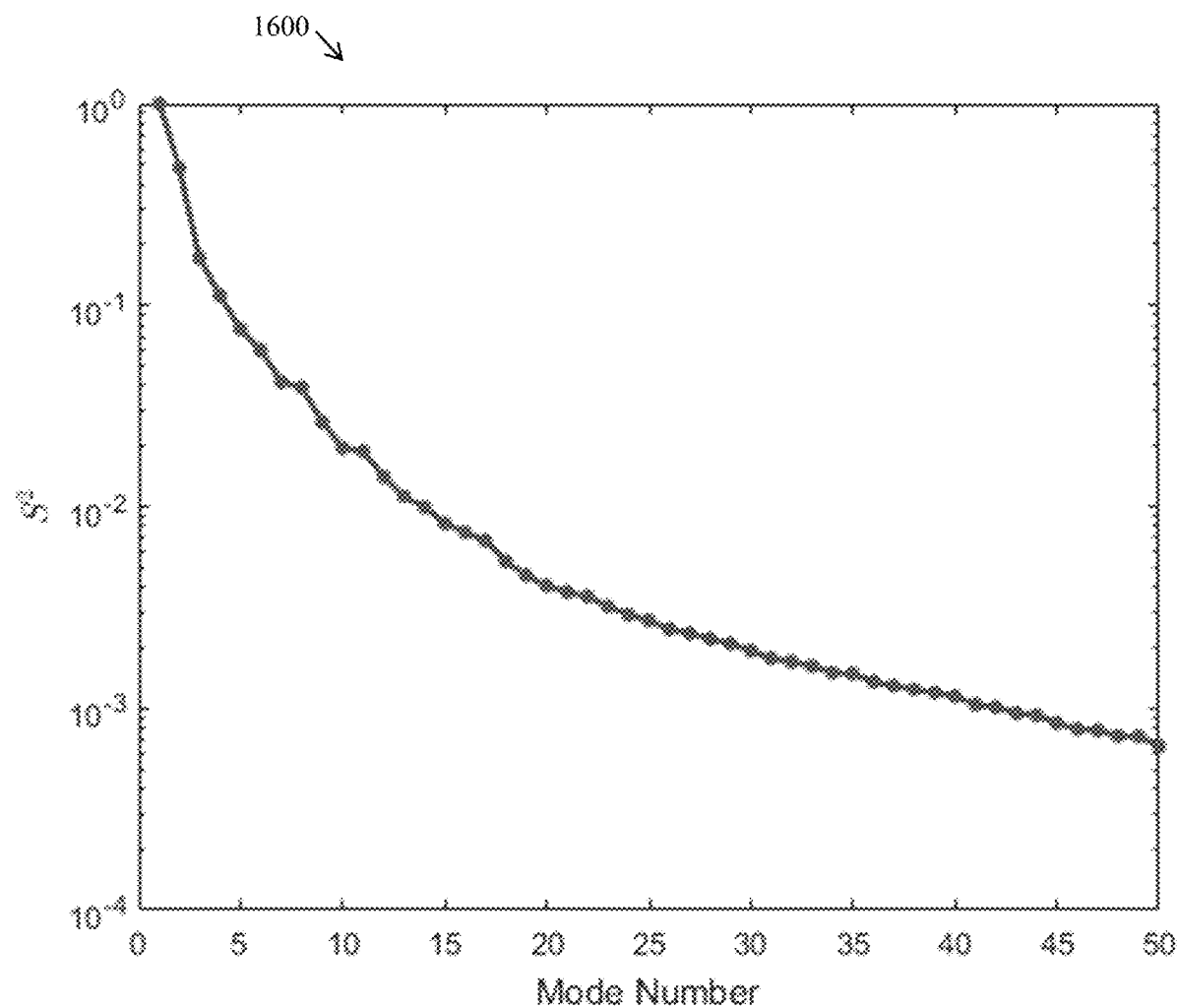
FIG. 16 illustrates a spectrum of modes of a 3D object.

FIG. 15A shows a perspective view of an example geometric model (e.g., computer aided design (CAD) drawing) of a requested object having a requested geometry (triangular shape (also referred to as a tent shape). FIGS. 15B-15D show perspective views of graphical representations of three example modes for the object of FIG. 15A. FIG. 15B shows a first mode of the object, FIG. 15C shows a second mode of the object, and FIG. 15D shows a third mode of the object. The arrows in each of the FIGS. 15B-15D indicate directional forces associated with the respective modes. FIG. 16 shows a spectrum 1600 indicating associated normalized inverse energies ($S^2$) of 50 modes of a tent shape object (such as the modes shown in FIGS. 15B-15D). Spectrum 1600 indicates that those modes having higher normalized inverse energies ($S^2$) are most prominent in the elastic deformation simulation. In some embodiments, those modes having normalized inverse energy ($S_2$) at or above a threshold (e.g., $10^{-1}$ (e.g., corresponding to 1% of the maximum value)) may be considered prominent, while those modes having normalized inverse energy ($S_2$) below the threshold (e.g., $10^{-1}$) may be considered non-prominent. In some embodiments, the threshold corresponds to those modes having associated energies of at least a predetermined energy of a maximum inverse energy mode (e.g., corresponding to a minimum energy mode) (e.g., mode 1).

Figure 23:
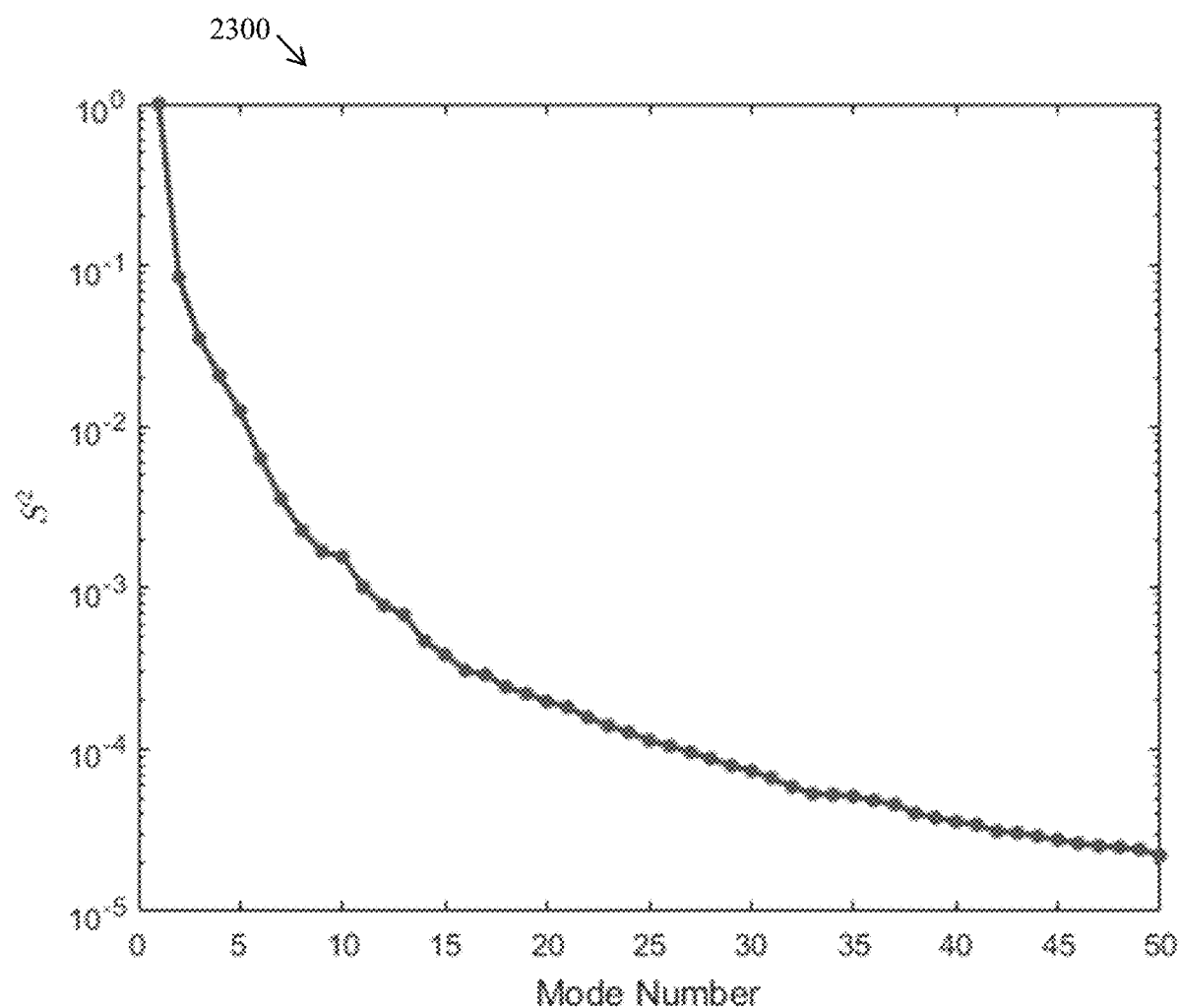
FIG. 23 illustrates a spectrum of modes of a 3D object.

FIGS. 22A-22G show perspective views of graphical representations of seven example modes for a 3D object having a disc cone shape (e.g., considering the geometric model of the requested object shown in FIG. 19A (1900)), with the arrows indicating directional forces. FIG. 23 shows a spectrum 2300 indicating associated normalized inverse energies ($S^2$) of 50 modes of a disc cone shaped object (such as those shown in FIGS. 22A-22G), with modes having higher inverse energies ($S^2$) being most dominant in the elastic deformation simulation. In some embodiments, those modes having normalized inverse energy ($S_2$) at or above a threshold may be considered prominent, while those modes having normalized inverse energy ($S_2$) below the threshold may be considered non-prominent. In some embodiments, the threshold corresponds to those modes having associated energies of at least a predetermined energy of a maximum inverse energy mode (e.g., corresponding to a minimum energy mode) (e.g., mode 1).

Figure 24B:
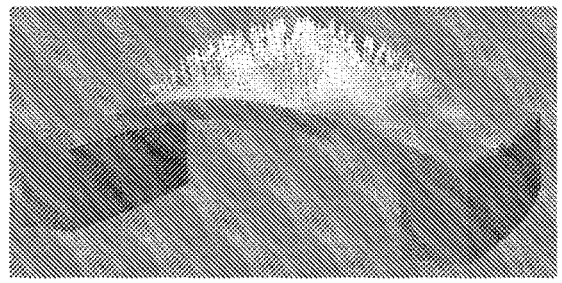
FIGS. 24B-24E illustrate modes for a 3D object.
Figure 24A:
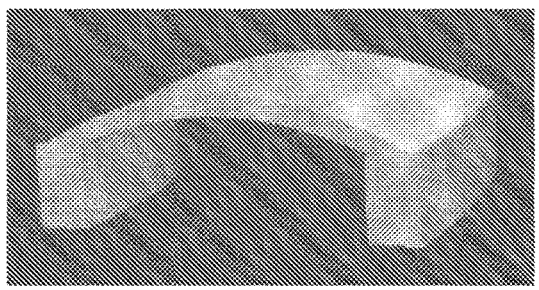
FIG. 24A illustrates a model of a 3D object.
Figure 24C:
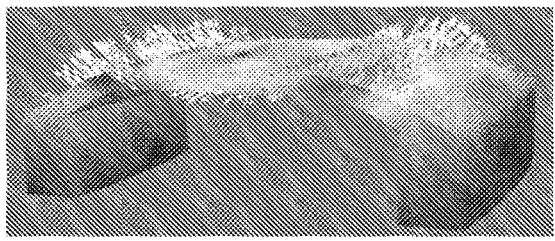
Figure 24D:
Figure 24E:
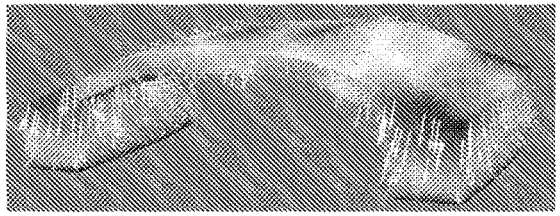
Figure 25:
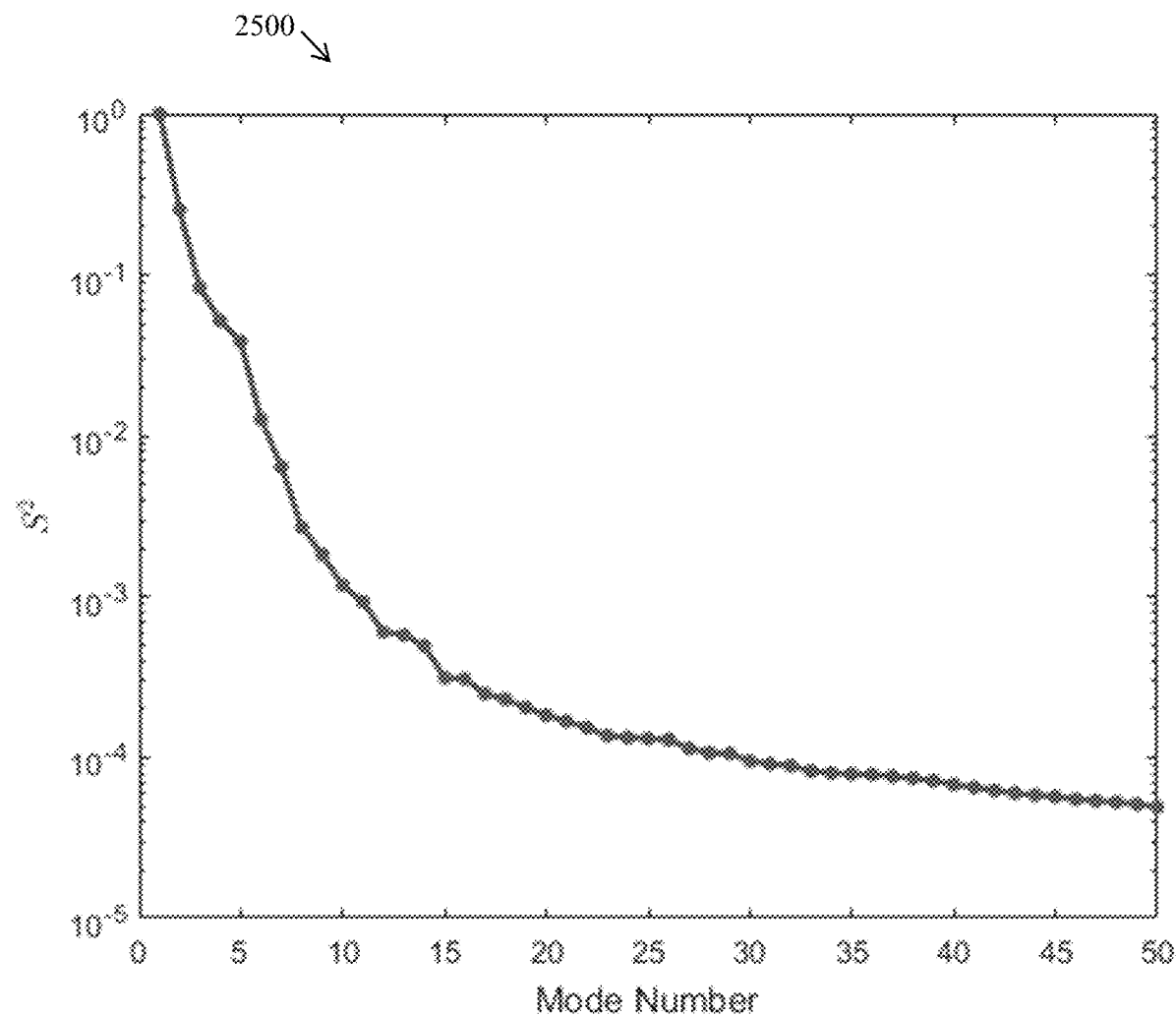
FIG. 25 illustrates a spectrum of modes of a 3D object.
Figure 26A:
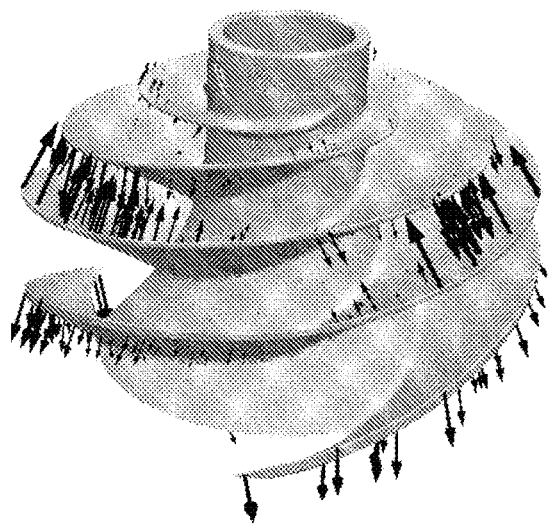
FIGS. 26A-26D illustrate modes for a 3D object.
Figure 26B:
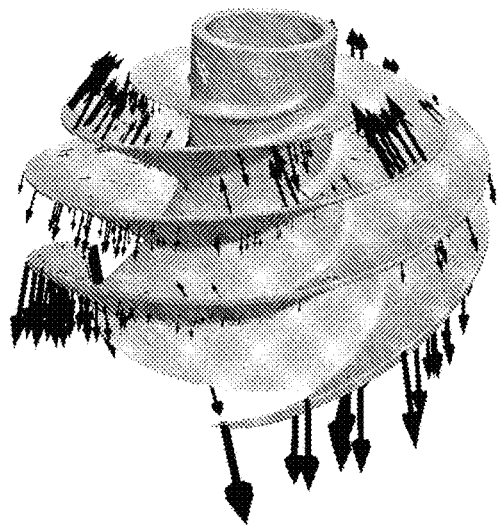
Figure 26C:
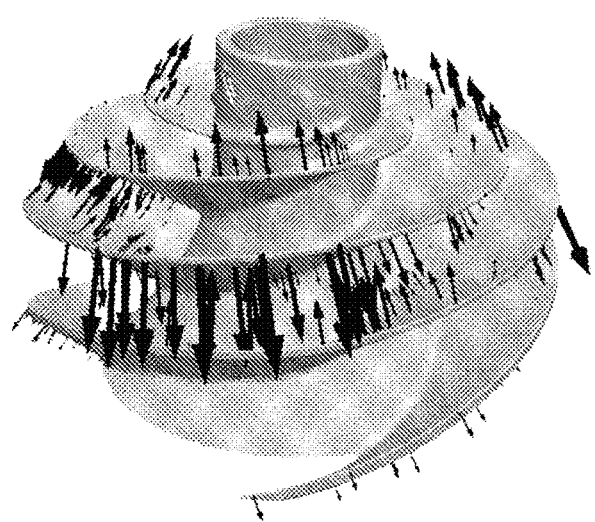
Figure 26D:
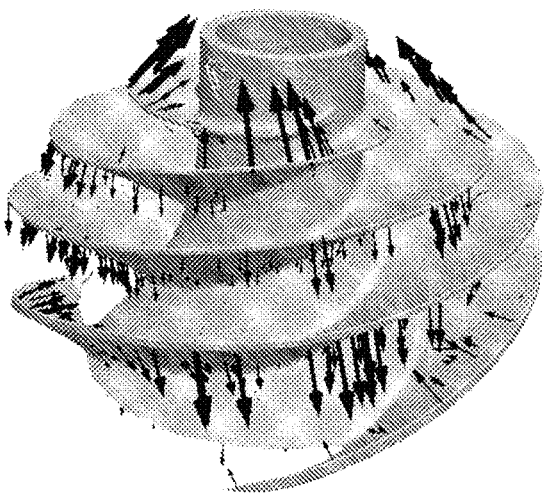

FIG. 24A shows a perspective view of a graphical representation of a geometric model of a requested object having a bridge shape. FIGS. 24B-24E show perspective views of graphical representations of four example modes for a 3D object having a bridge shape (e.g., considering the geometric model of the requested object shown in FIG. 24A), with the arrows indicating directional forces. FIG. 25 shows a spectrum 2500 indicating associated normalized inverse energies ($S^2$) of 50 modes of a bridge shaped object (such as those shown in FIGS. 24B-24E), with modes having higher inverse energies ($S^2$) being most dominant in the elastic deformation simulation. In some embodiments, those modes having normalized inverse energy ($S_2$) at or above a threshold may be considered prominent, while those modes having normalized inverse energy ($S_2$) below the threshold (e.g., $10^{-1}$) may be considered non-prominent. In some embodiments, the threshold corresponds to those modes having associated energies of at least a predetermined energy of a maximum inverse energy mode (e.g., corresponding to a minimum energy mode) (e.g., mode 1).

Figure 27:
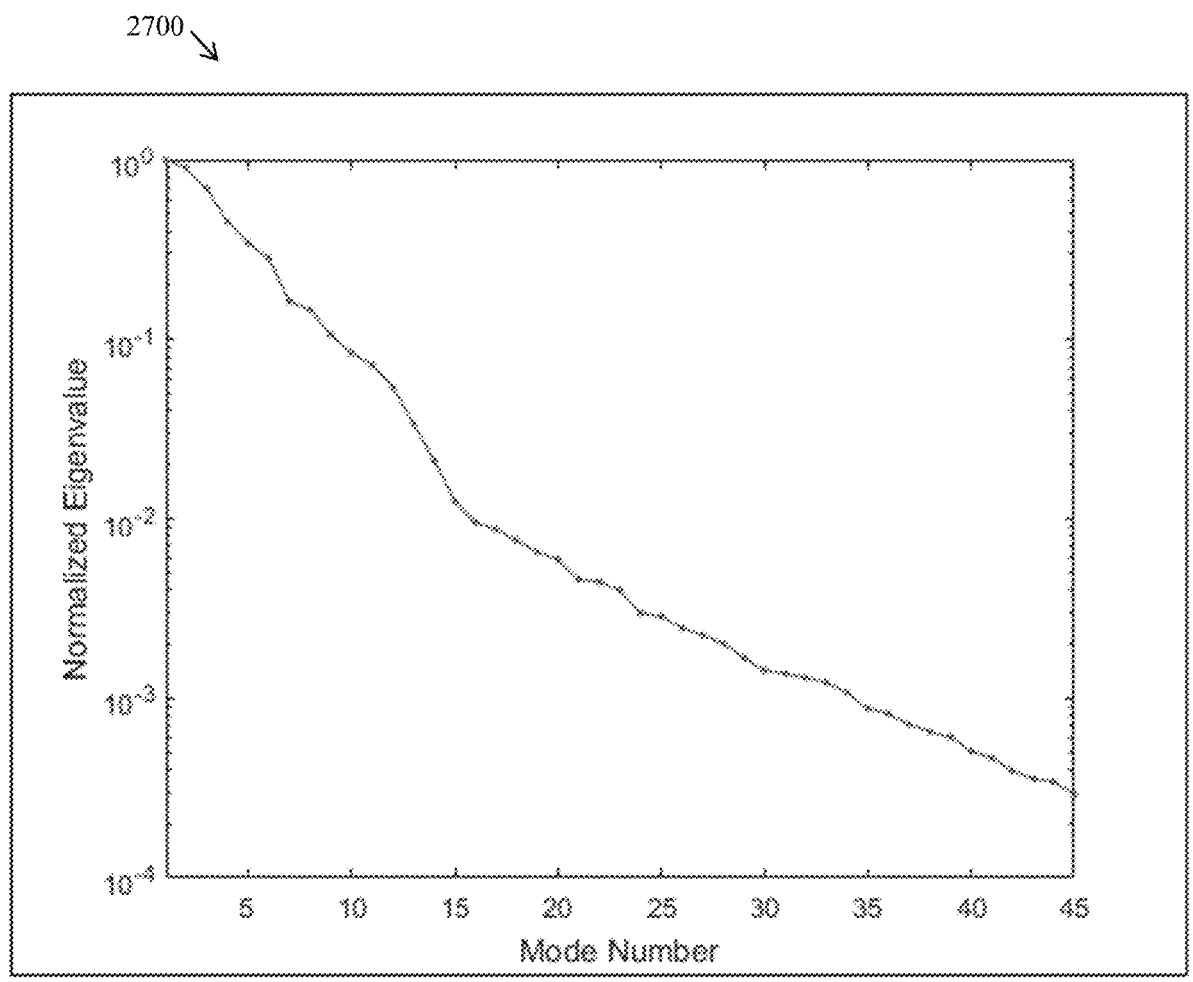
FIG. 27 illustrates a spectrum of modes of a 3D object.
Figure 33A:
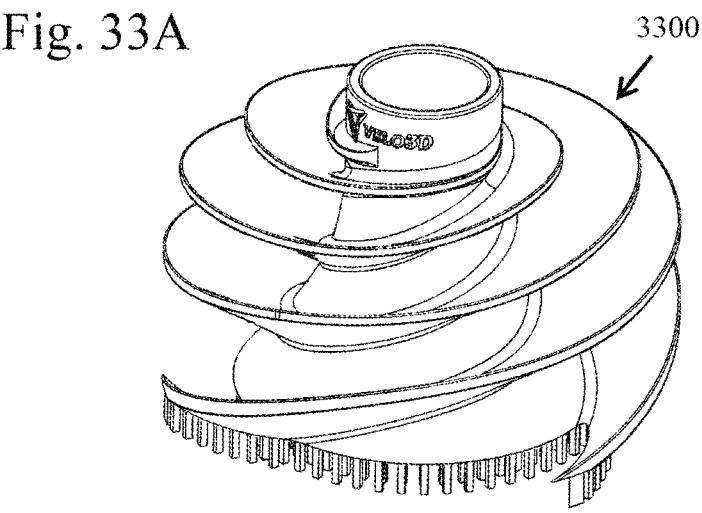
FIG. 33A illustrates a geometric model of a requested 3D object.

FIG. 33A shows a geometric model (e.g., CAD drawing) of a requested 3D object 3300 having a spiral blade shape. FIGS. 26A-26D show perspective views of graphical representations of four example modes for the 3D object having a spiral blade shape (e.g., considering the geometric model of the requested object shown in FIG. 33A), with the arrows indicating directional forces. FIG. 27 shows a spectrum 2700 indicating associated normalized inverse energies ($S^2$) of 50 modes of a spiral blade shaped object (such as those shown in FIGS. 26A-26D), with modes having higher inverse energies ($S^2$) being most dominant in the elastic deformation simulation. In some embodiments, those modes having normalized inverse energy ($S_2$) at or above a threshold may be considered prominent, while those modes having normalized inverse energy ($S_2$) below the threshold may be considered non-prominent. In some embodiments, the threshold corresponds to those modes having associated energies of at least a predetermined energy of a maximum inverse energy mode (e.g., corresponding to a minimum energy mode) (e.g., mode 1).

Energy data associated with each mode (e.g., as represented in a spectrum) can be used to filter out those modes that are, for example, less predominant. Example details regarding using modes as a filtering technique are described herein, for example, with reference to FIG. 18. In some cases, the filtering out of particular modes can be confirmed or contradicted by empirically collected data (e.g., from measurements of formed (e.g., printed) objects). In some embodiments, those modes having normalized inverse energy ($S_2$) at or above a threshold may be considered prominent, while those modes having normalized inverse energy ($S_2$) below the threshold may be considered non-prominent. In some embodiments, the threshold corresponds to those modes having associated energies of at least a predetermined energy of a maximum inverse energy mode (e.g., corresponding to a minimum energy mode) (e.g., mode 1). The threshold may be any threshold disclosed herein.

A displacement calculation can be used to determine measured displacements in each of the prominent modes. For example, a measured displacement (û) of the marker locations (X) can be calculated according to the following Equation 11:

$$\hat{u}(X) = \sum_{i=0}^{N} c_i \tilde{u}_i(X);$$

where N is the number of modes (e.g., predominant modes); $c_i$ is a coefficient determined using, for example, regression analysis (e.g., least squares fit); and $\tilde{u}_i(X)$ is a mode (e.g., predominant mode) shape with marker locations (X). The geometric model can then be corrected to adjust for the calculated displacement. For example, a geometric model can be adjusted by applying a negative displacement to the geometric model. For instance, the negative displacement can correspond to the adjustment function (update function) $g(x_i)$ described above with reference to Equation 1.

Figure 14:
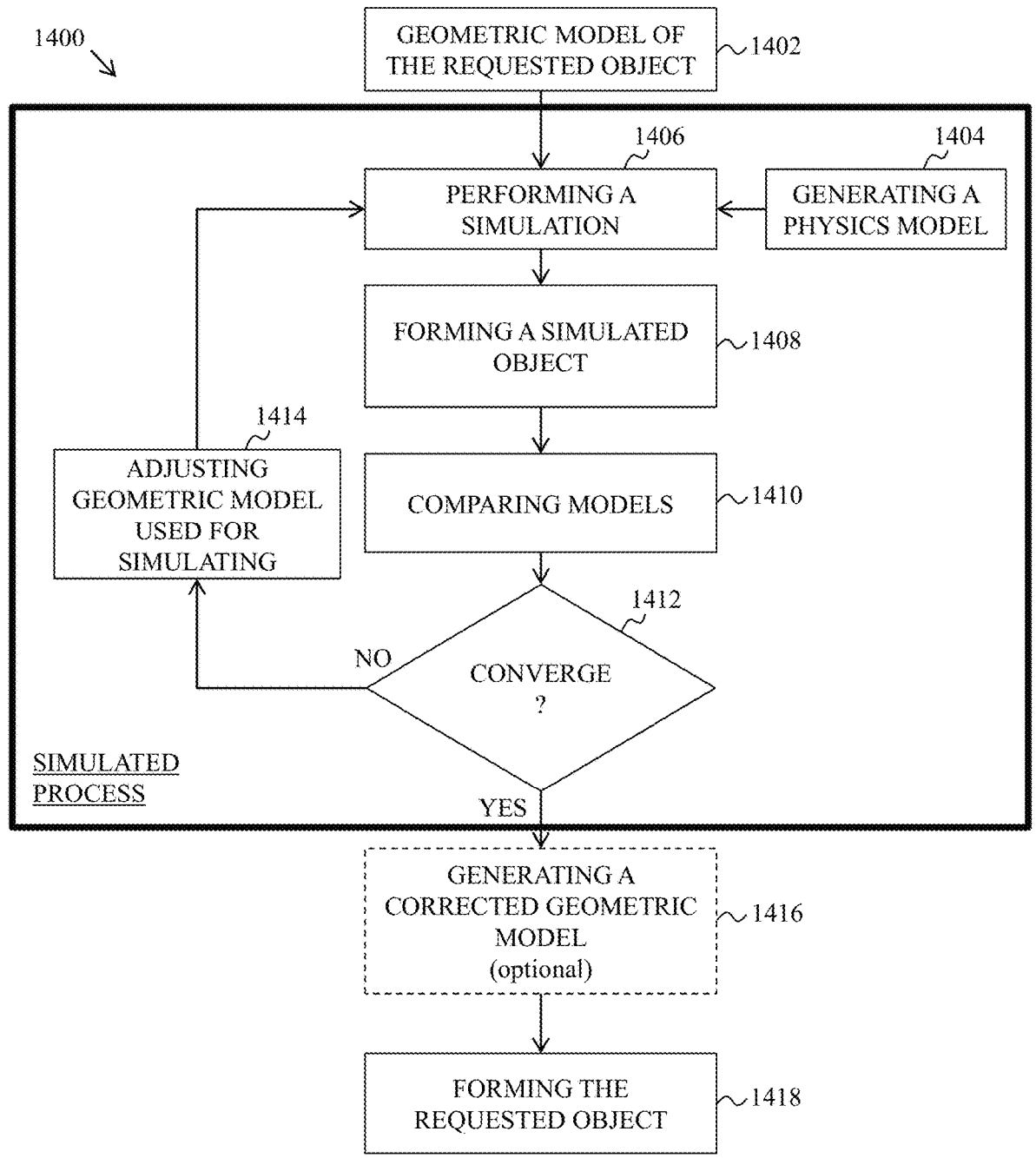
FIG. 14 schematically illustrates a flow diagram used in the forming of one or more 3D objects.

FIG. 14 shows flowchart 1400 indicating an example simulated process for generating a corrected geometric model for forming an object, in accordance with some embodiments. A geometric model of the requested object (e.g., 1402) can be obtained, such as described herein. The geometric model of the requested object can be obtained using any suitable 3D modeling technique (e.g., suitable CAD and/or non-uniform rational basis spline (NURBS)). In some embodiments, the geometric model of the requested object corresponds to an image (e.g., scan) of an object (e.g., a test object) and/or data obtained using any suitable rendering technique. One or more physics models can be generated (e.g., 1404) considering one or more physics-based calculations, e.g., as disclosed herein. In some embodiments, the physics model considers fewer physics-based calculations/simulations and/or degrees of freedom (reduced physics model), e.g., as described herein. One or more simulations can be performed (e.g., 1406). The one or more simulations can consider the physics model and (e.g., applied to) the geometric model of the requested object. A simulated object can be formed (e.g., 1408) considering (e.g., based on) the one or more simulations. The simulated object (e.g., various aspects of the simulated object) can then be compared to the geometric model of the requested part (e.g., various aspects of the geometric model of the requested object) (e.g., 1410). In some embodiments, comparing comprises: (i) comparing dimensions (e.g., shape) of the simulated object with (ii) corresponding dimensions (e.g., shape) of the geometric model of the requested object. In some embodiments, comparing comprises determining an amount of predicted deformation (e.g., warpage) by the simulated object. Comparing can comprise determining whether data associated with the simulated object (e.g., substantially) converges with data associated with the geometric model of the requested object (e.g., 1412). For example, it can be determined whether deformation of one or more dimensions of the simulated object are below or above a predetermined threshold (e.g., value or range). If it is determined that the simulated object does not (e.g., substantially) converge with the geometric model of the requested part, the geometric model (used form forming a simulated object) can be adjusted (e.g., 1414). One or more simulations can be performed (e.g., repeating 1406) with the adjusted geometric model to generate another simulated object (e.g., second geometric model of a simulated object) (e.g., repeating 1408); the simulated object can be compared to the geometric model of the requested object (e.g., repeating 1410); until convergence (e.g., repeating 1412). If it is determined that the simulated object (e.g., substantially) converges with the geometric model of the requested object (e.g., 1412), a corrected geometric model can be generated (e.g., 1416) and a requested object can be formed (e.g., 1418). In some embodiments, the corrected geometric model corresponds to the simulated object. The corrected geometric model (or simulated object) can be used to form (e.g., print) a plurality requested objects (e.g., in a single forming process).

Figure 17:
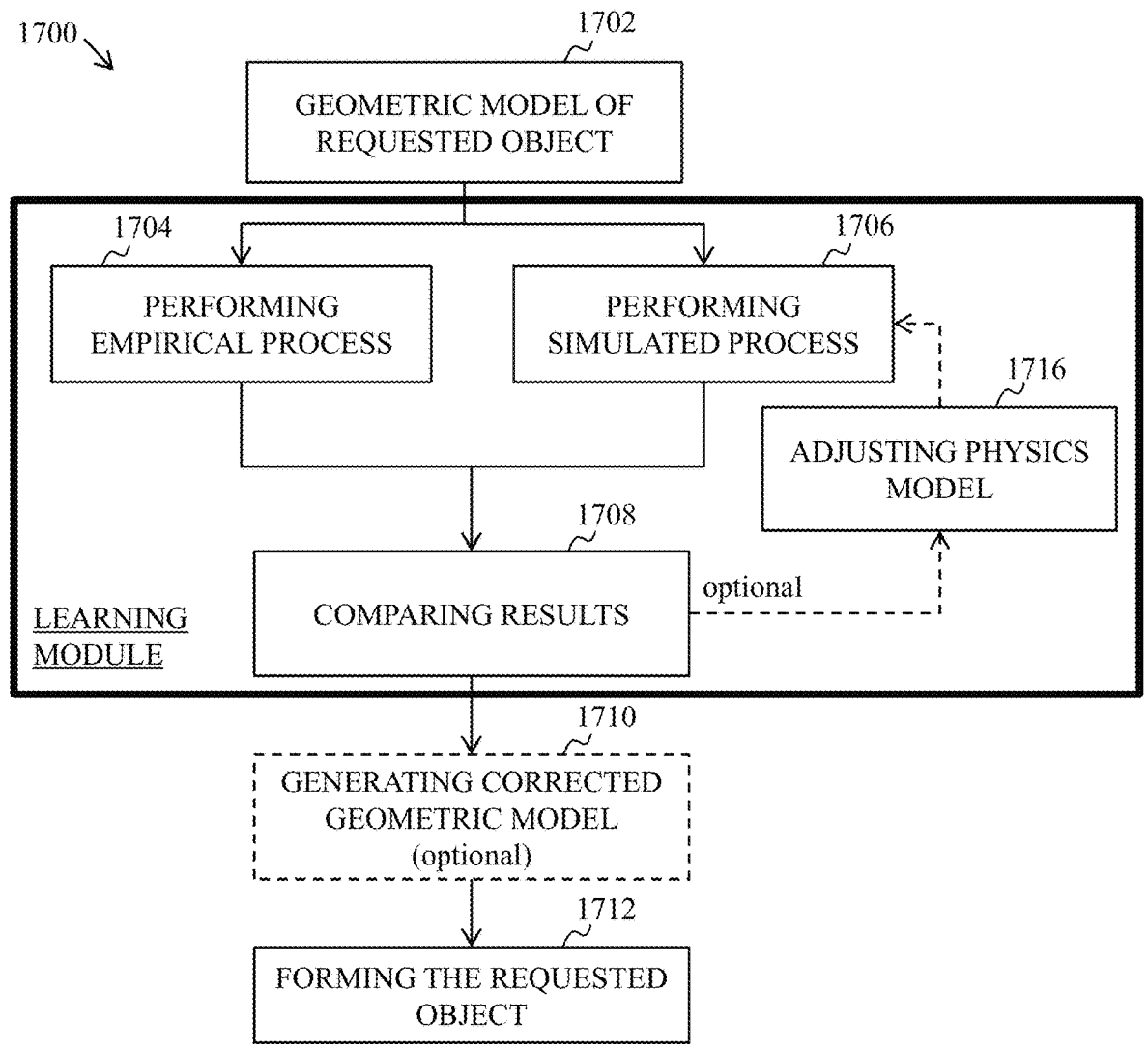
FIG. 17 schematically illustrates a flow diagram used in the forming of one or more 3D objects.

As described herein, a geometric model of an object can be (e.g., iteratively) improved by using a combination of empirically collected data (from an empirical process (e.g., FIG. 13)) and calculated data (from a simulated process (e.g., FIG. 14)). FIG. 17 shows flowchart 1700 indicating an example process based on a combination of an empirical process and a simulated process, in accordance with some embodiments. A geometric model of the requested object (e.g., 1702) (e.g., FIG. 33A, 3300, or FIG. 19A, 1900) can be obtained, using methods such as described herein. Data can be collected using an empirical process (e.g., 1704), e.g., as described herein. In some embodiments, the empirical process involves using markers (model markers (e.g., FIG. 19B, 1902) and/or physical markers (e.g., FIG. 33C, 3322, or FIG. 20A, 2002). Data can also be collected using a simulated process (e.g., 1706), e.g., as described herein. In some embodiments, the simulated process involves using a physics model and performing physics based simulation (e.g., thermo-plastic deformation simulation, elastic deformation simulation). In some embodiments, the simulated process involves using a physics model for calculating modes (e.g., FIGS. 15B-15D, FIGS. 22A-22G, FIGS. 24B-24E, or FIG. 26A-26D). The empirical and simulated processes can be performed in parallel (e.g., simultaneously or overlapping) or sequentially (e.g., empirical process first and simulated process second, or simulated process first and empirical process second). Results of the empirical and simulated processes can be compared (e.g., 1708). For example, if the simulated process involves using a physics model for calculating modes, the modes can be compared to test object (e.g., image of the test object, e.g., FIG. 33B, 3310) (e.g., having image markers 3312), as described herein. If the physics model and/or geometric model (i.e., from the empirical/simulated process) are found to generate a test object having acceptable dimensions and/or qualities (e.g., within a threshold range), the physics model and/or geometric model can be considered a corrected geometric model and be used to form the requested object (e.g., 1712). If the last physics model and/or geometric model is found to have unacceptable dimensions/qualities (e.g., outside of the threshold range), the physical model and/or geometric model may be adjusted, and a corrected geometric model and/or physics model can optionally be generated (e.g., 1710) and used to form the requested object (e.g., 1712) (e.g., FIG. 33C (photograph), 3320, prior to removing markers 3322). When the corrected geometric model is adjusted considering (e.g., based on) empirically and simulation obtained data, the formed requested object may more accurately correspond to the (e.g., geometric model of the) requested object (e.g., at 1702), as compared to using only empirically obtained data or only simulation obtained data.

In some embodiments, results from the empirical process can optionally be used to inform the simulated process. For example, a simulated object formed from the simulated process can be compared with an image (e.g., 3D scan) of a test object formed (e.g., printed) using an empirical process. Data regarding differences in the positions of markers (e.g., model markers of the simulated object compared with image markers of the imaged test object) can be used to determine the accuracy of a physics model. For instance, in some embodiments, empirically collected marker data can used to determine the prevalence (e.g., dominance, or relative weights) of certain modes of a predicted elastic deformation physics model. The physics model can then be adjusted (e.g., 1716) to more accurately simulate the forming (e.g., printing) process. This process can be utilized for a training the physics model. The training may be for a particular forming process and/or for a particular forming system (or configuration thereof). In some cases, the process of informing the simulated process from results of the empirical process, may reduce the number of adjustments to physics model. The simulated process can then be repeated (e.g., repeating 1706) and used to form another test object using an empirical process (e.g., repeating 1704). This process (e.g., 1716, 1706, 1704, 1708) can be iteratively repeated and used to continually adjust (e.g., improve) the physics model (e.g., 1716). This iterative process can be referred to as a "learning module". The learning module can be used to "teach" the physics model. The teaching may comprise an inelastic response of the 3D object to the forming process, as provided by the empirically collected data. The physics model can be said to "learn" from, or be "trained by, the empirically collected data. The learning (e.g., training) can occur with every iteration (e.g., continuously). That is, in some embodiments, the physics model can be adjusted with every iteration. The learning (e.g., training) module can include learning (e.g., training) algorithms as described herein, for example, "neural networks and/or machine learning. The resulting adjusted (e.g., corrected) physics model can be referred to as a "trained physics model" (also referred to herein as an "educated physics model", "learned physics model", "educated model", "learned model" or "trained model").

Figure 30:
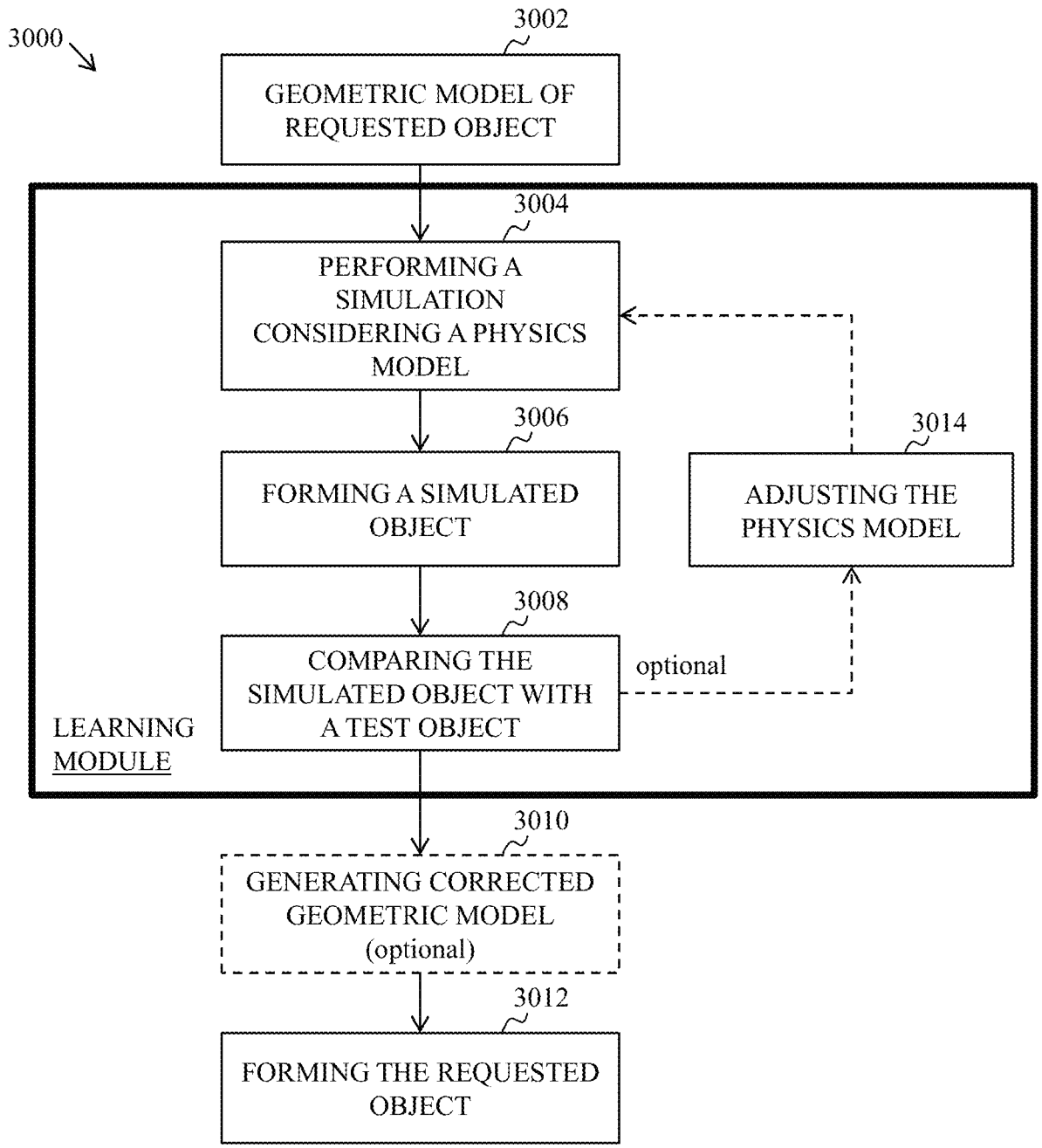
FIG. 30 schematically illustrates a flow diagram used in the forming of one or more 3D objects.

FIG. 30 shows flowchart 3000 indicating an example process considering (e.g., based on) a combination of an empirical process and a simulated process, in accordance with some embodiments. A geometric model of the requested object (e.g., 3002) can be obtained, such as described herein. One or more simulations can be performed using one or more physics models (e.g., 3004). The one or more physics models can consider (e.g., be based on) physics-based calculations, as described herein. A simulated object can be formed (e.g., 3006) from the one or more simulations, as described herein. The simulated object can be compared to a test object (e.g., an image of the test object) (e.g., 3008) formed using methods described herein. In some cases, the comparison determines how accurately the physics model represents deformation of a physical object (e.g., test object) resulting from the forming process. In some embodiments, the physics model is used to adjust the geometric model used to form the test object. In some cases, the adjusted geometric model can be used to generate a corrected geometric model (e.g., 3010), which is used to form the requested object (e.g., 3012). In some cases, the adjusted geometric model corresponds to the corrected geometric model, and utilized in the forming of the requested object (e.g., 3012), e.g., to generate forming instructions (e.g., printing instructions). In some embodiments, comparing the simulated object with a test object (e.g., image of the test object) is used to adjust the physics model (e.g., 3014). For example, one or more parameters of the physics model can be adjusted by taking into account (e.g., based on) the comparing. The comparing and adjustment processes (e.g., comprising 3004, 3006, 3008, or 3014) can be iteratively repeated, and can be referred to as a learning module. For example, a (e.g., second) simulation can be performed (e.g., repeating 3004) considering (e.g., based on) a (e.g., second) physics model, a (e.g., second) simulated object can be formed (e.g., repeating 3006), a (e.g., second) comparison can be performed (e.g., repeating 3008), and a (e.g., second) adjustment can be made to the (e.g., second) physics model (e.g., repeating 3014). The learning model process can be repeated to iteratively adjust (e.g., improve) the physics model (e.g., to form a trained physics model), and/or a corrected geometric model. In some cases, the learning (e.g., training) process is used on some test objects and not on other test objects. For example, in some cases, a number of test objects are formed without being compared to a simulated object, and therefore not used to adjust the physics model.

Figure 31:
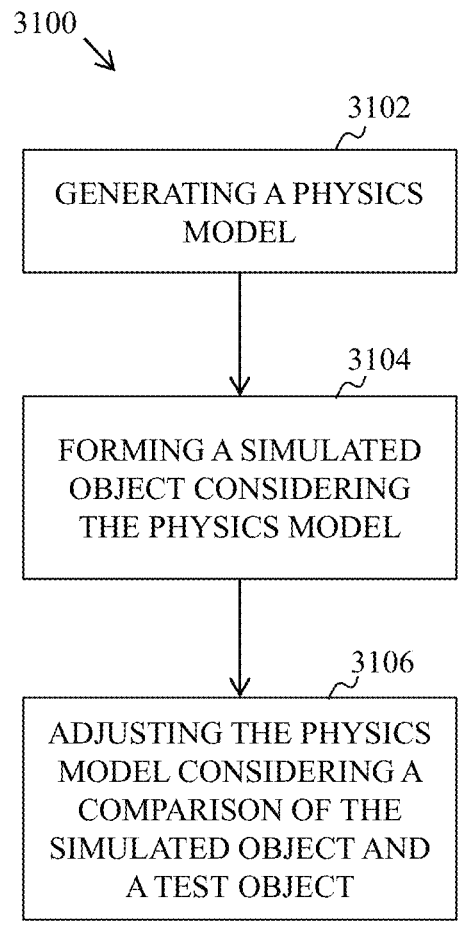
FIG. 31 schematically illustrates a flow diagram used in the forming of one or more 3D objects.

FIG. 31 shows flowchart 3100 indicating an example process considering (e.g., based on) a combination of an empirical process and a simulated process, in accordance with some embodiments. A physics model can be generated (e.g., 3102). The physics model can consider (e.g., be based on) a predicted deformation of the three-dimensional object as a result of a forming (e.g., printing) operation (e.g., forming process). The predicted deformation can consider a requested geometric model of the object. The predicted deformation can consider at least one physics-based calculation. The predicted deformation can consider a thermo-mechanical analysis, a type of material of the three-dimensional object, continuum mechanics (e.g., fluid dynamics), predicted inelastic (e.g., plastic) deformation, predicted elastic deformation, predicted thermally induced deformation, predicted thermo-plastic deformation, at least one characteristic of an energy beam (e.g., as disclosed herein), pressure (e.g., gradient or lack thereof) of multiple layers of the three-dimensional object, heat conductance (e.g., in the previously formed portion of the 3D object), or any suitable combination thereof. The at least one characteristic of the energy beam may comprise, for example, a type of energy beam, an energy beam power density, an energy beam path, or an energy beam dwell time. Other energy beam characteristics are disclosed herein. The physics model can be a reduced physics model or an expanded physics model. In some embodiments, the physics model considers (e.g., comprises) one or more modes. The one or more modes can consider predicted elastic deformation modes. A simulated object can be formed (e.g., printed) based on the physics model (e.g., 3104). The physics model can be adjusted considering a comparison of the simulated object with a test object (e.g., 3106). The comparison can be a comparison of the simulated object with an image of the test object. The test object can correspond to an object formed using any suitable process. The test object can be formed using instructions considering the geometric model and/or physical model. The comparison can consider comparing at least one predicted deformation of the simulated object with at least one deformation of the test object. The image of the test object can include image markers corresponding to physical markers of the test object. The comparison can include a comparison of the one or more markers of the test object (e.g., by converting the physical test object to a model test object) with the one or more markers that are incorporated in and/or on the simulated object (e.g., that is used to print the test object). The comparison can include a comparison of one or more (identifiable) features of the test object (e.g., edges, rims, cavities, and/or kinks) with respective one or more features that of the simulated object (e.g., that is used to print the test object). The comparison can include a comparison of the one or more markers of the test object (e.g., by converting the physical test object to a model test object) with the one or more markers that are incorporated in and/or on the geometric model (e.g., that is used to print the test object). The comparison can include a comparison of one or more (identifiable) features of the test object (e.g., edges, rims, cavities, and/or kinks) with respective one or more features that of the geometric model (e.g., that is used to print the test object). The geometric model may be a model (e.g., virtual representation) of the requested object. The comparison can include a comparison of at least one deformation of the simulated object with at least one deformation of the test object (e.g., image of the test object). The comparison can be obtained by performing a data analysis. The comparison can be obtained by performing a regression analysis (e.g., least squares fit analysis). Generating the physics model (e.g., 3102), forming the simulated object (e.g., 3104) and adjusting the physics model (e.g., 3106) can be iteratively repeated (e.g., creating a learning module). For example, generating the physics model (e.g., 3102), forming the simulated object (e.g., 3104) and adjusting the physics model (e.g., 3106) can be iteratively repeated until a simulated object has dimensions within a predetermined threshold of dimensions of the test object (e.g., image of the test object). In some cases, at least one of (i) generating the physics model (e.g., 3102), (ii) forming the simulated object (e.g., 3104) and (iii) adjusting the physics model (e.g., 3106), can be iteratively repeated (e.g., forming the learning module) and/or can occur during a forming (e.g., printing) operation.

The learning module can optionally be used to adjust the physics model (e.g., and/or the physics simulation, and/or the geometric model) over any suitable time scale. For example, in some embodiments, the learning module is used to adjust the geometric model over a period of forming (e.g., sequentially or in parallel) multiple objects (e.g., test objects or requested objects). The geometric model can be adjusted after forming any suitable number of objects (e.g., 2, 5, 10, 50, 100, 500, 1000, 10,000, 1,000,000, etc.). At least two of the multiple objects can be formed sequentially. At least two of the multiple objects can be formed in parallel. The physics model can be adjusted after forming any number of objects between any of the afore-mentioned values (e.g., from about 2 to about 1,000,000, from about 2 to about 100, etc.). In some embodiments, the learning module is used to adjust the physics model (and/or geometric model) over a period of time (e.g., at least a second, minute, day, week, month, year, or a decade). In some embodiments, the learning module is used to adjust the physics model (or any component thereof, and/or geometric model) over a lifetime of the forming system (e.g., 3D printing system). In some embodiments, the learning module is used to adjust the physics model (or any component thereof, and/or associated corrected geometric model) over a period of a forming operation (e.g., in real time). In some embodiments, adjusting in real time comprises adjusting the physics model (or any component thereof, and/or associated corrected geometric model) during the forming of a single layer (or multiple layers). In some embodiments, the learning module is used as a basis to adjust one or more process parameters of the forming process, such as at least one characteristic of the energy beam, e.g., as described herein.

In some embodiments, the learning module is used to calibrate one or more systems for forming objects. The calibration can be of one or more (i) hardware component, (ii) software component, (iii) forming procedure, or (iv) any combination thereof. For example, the learning module can be used to: (1) identify system mismatches and/or errors and accordingly adjust one or more components of the system (e.g., comprising hardware or software); (2) identify system mismatches and/or errors and adjust the physics model to compensate accordingly for mismatches and/or errors in one or more components of the system; and/or (3) identify, adjust and/or account for differences in forming processes (e.g., comprising a 3D printing, molding, or welding process). System mismatches and/or errors can occur when different systems of one type (e.g., different 3D printers) have different built-in offsets. The build-in offsets may result in objects having different dimensions when using, for example, the same forming (e.g., printing) instructions (e.g., based on the same geometric model). For example, a first forming system (e.g., first 3D printer) using a first geometric model can be used to form a first object, and a second system (e.g., second 3D printer) using the first geometric model can be used to form a second object having dissimilar dimensions as the first object. In (1), the learning module can be used to diagnose problems related to hardware and/or software of the first and/or second system, such that the hardware and/or software can be adjusted or replaced, as applicable. In (2), the learning module can be used to generate an adjusted physics model that compensates for the offsets and/or errors (e.g., in the second object) and provide (i) better consistency between objects and/or (ii) better consistency between the formed object and the requested object. The learning module can be used to as an adjustment mechanism, instead of or in addition to, changing hardware and/or software of a forming (e.g., printing) system. Differences due to different forming processes can arise when, for example, one type of forming system (e.g., a forming system of a first category, of a first brand, or of a first manufacturing batch) is used to form a first object, and another type of forming system (e.g., a forming system of a second category, of a second brand, or of a second manufacturing batch) is used to form a second object having the dissimilar dimensions as compared to the first object (when similar dimensions are desired). The forming system category (e.g., type) can comprise (for example) molding, welding, a type of 3D printing process (e.g., LENS, SLM, SLS, FDM, LOM, or SLA), or a semiconductor device fabrication process (e.g., chemical vapor deposition, or physical vapor deposition). In (3), the learning module can be used to guide adjustment of the forming processes, and provides objects having the (e.g., substantially) satisfactory dimensions. In (3), the learning module can be used to generate an adjusted physics model that accounts for different types of forming processes, and provides objects having the (e.g., substantially) satisfactory dimensions. For instance, the geometric model can be iteratively adjusted to generate a first adjusted physics model (corresponding to a first set of forming instructions) for the first forming system that considers empirical data collected over a plurality of formed objects from the first system. The same physics model can be iteratively adjusted to generate a second adjusted geometric model (corresponding to a second set of forming instructions) for the second forming system that considers empirical data collected over multiple objects formed from the second system. The physics model may be unique to a forming system category, a forming system brand, a forming system manufacturing batch, a forming process, a singular forming system, or any suitable combination thereof. The physical model may be utilized to differentiate between a forming system category, of a forming system brand, a forming system manufacturing batch, a forming process, between singular forming systems, or any suitable combination thereof. The physical model may be utilized to identify and/or calibrate a faulty forming process, a faulty forming systems, or any combination thereof.

The processes described herein (e.g., the empirical process and/or the simulated process) may be utilized to differentiate between a forming system category, a forming system brand, a forming system manufacturing batch, a forming process, between singular forming systems, or any suitable combination thereof. The modules described herein may be utilized to identify and/or calibrate a faulty forming process, a faulty forming systems, or any suitable combination thereof.

In some embodiments, the calibrating comprises using a first system to form a first 3D object using printing instructions (e.g., based on a physics model, on the empirical process, and/or on the simulated process), using a second system to form a second 3D object using the printing instructions, comparing dimensions of the first 3D object with the second 3D object, and (based on the comparing): adjusting the (a) physics model, (b) geometric model (c) hardware of the second system, (d) software of the second system, (e) process of used for the forming process of the second system, or (f) any combination thereof. The first system may comprise an optimized and/or adequate system. The first 3D object may be (e.g., substantially) similar to a requested object.

Figure 18:
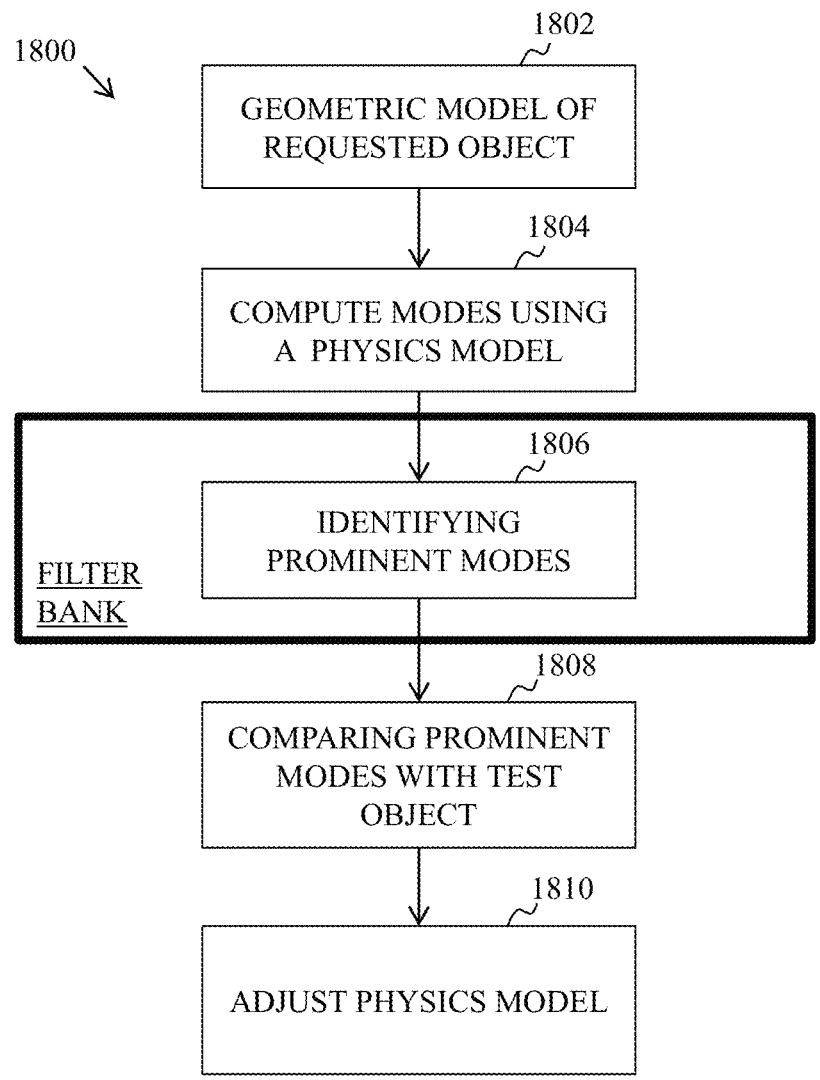
FIG. 18 schematically illustrates a flow diagram used in the forming of one or more 3D objects.

As described herein, a reduced physics model (e.g., having reduced degrees of freedom and/or reduced number of physics-based calculations) can be used to create a filter bank. In some embodiments, this technique involves using a reduced physics model in combination with empirically collected data (e.g., that can be used as part of the empirical process) to filter out data (e.g., form a filter bank). For example, the FIG. 18 shows flowchart 1800 indicating an example process (including a filtering process), in accordance with some embodiments. A geometric model of the requested object (e.g., 1802) can be obtained, such as described herein. A physics model (e.g., reduced physics model) can be used to compute modes (e.g., elastic deformation modes) (e.g., 1802). The physics model can consider a geometric model of a requested object, as described herein. The physics model can be used to perform a simulation considering (e.g., based on) the geometric model. Prominent modes can be identified (e.g., 1806). This can be done using, for example, a spectrum analysis described herein (e.g., with reference to FIGS. 15, 23, 25 and 27). In some embodiments, the modes having associated energies below a threshold value (e.g., predetermined threshold value) may be considered more energetically favorable (which can also referred to as prominent), while those modes having energies above the threshold may be considered less energetically favorable (which can also referred to as non-prominent). In some embodiment, the threshold can correspond to a percentage (e.g., predetermined percentage) of energy. For example, returning to the spectrum 1600 of FIG. 16, in some embodiments, those modes having normalized inverse energy ($S_2$) at or above a threshold (e.g., $10^{-1}$ of the normalized inverse energy, corresponding to 1% of the normalized inverse energy) may be considered prominent, while those modes having normalized inverse energy ($S_2$) below the threshold may be considered non-prominent. In some embodiments, the threshold corresponds to those modes having at least about 0.5%, 1%, 2%, 3%, 4%, 5%, 10%, 15%, 20%, 30%, 40%, or 50% of a maximum normalized inverse energy of the modes. In some embodiments, the threshold corresponds to those modes having percentage of inverse energies between any of the afore-mentioned values (e.g., from about 0.5% to about 50%, from about 5% to about 30%, from about 1% to about 5%, from about 0.5% to about 5%, or from about 0.5% to about 10% of a maximum normalized inverse energy of the modes).

The prominent modes can be compared with a test object (e.g., image of a test object) (e.g., 1808). In some embodiments, the comparison comprises determining (e.g., computing) one or more characteristics of the test object (e.g., image of the test object) considering (e.g., based on) the prominent modes. The test object can be formed using the empirical processes described herein. An image of the test object can be obtained by sensing (e.g., scanning) the test object. The image can include markers (image markers) corresponding to physical makers of the test object. Locations in/on the prominent modes corresponding to the locations of the image markers in/on the image can be identified. The comparison between the prominent modes and the test object can include comparing locations of the identified locations of the prominent modes, with locations of the image markers of the image of the test object. In some embodiments, a mathematical combination of prominent modes is used to provide displacement values associated with the markers (image markers). The mathematical combination may comprise a linear, exponential, or analytical geometric combination. The mathematical combination may comprise linear approximation. The analytical geometric combination may comprise sine, cosine, or logarithmic combination. The image of the test object can be determined to have characteristics of prominent modes at different weights (also referred to as "coefficients"). For example, in one embodiments, a test object may have 40% dimensional characteristics of a first mode (e.g., FIG. 15A), 30% dimensional characteristics of a second mode (e.g., FIG. 15B), and 30% dimensional characteristics of a third mode (e.g., FIG. 15C). Results of the comparison can be used to estimate dimensional accuracy of the physics model and the simulation. In some embodiments, the results of the comparison can be used to adjust the physics model (e.g., 1810), as described herein. The process (e.g., 1800) can be iteratively repeated during the formation of multiple objects (e.g., test objects and/or requested objects). In some embodiments, identified prominent modes (e.g., 1806) are reduce the number of iterations in which the physics model (e.g., 1810) is being adjusted. For example, identifying prominent modes can filter out less prominent modes (which can be referred to as "noise"). Identifying the prominent modes (e.g., 1806) can be referred to as a filter bank (e.g., database of most prominent modes).

Figure 28:
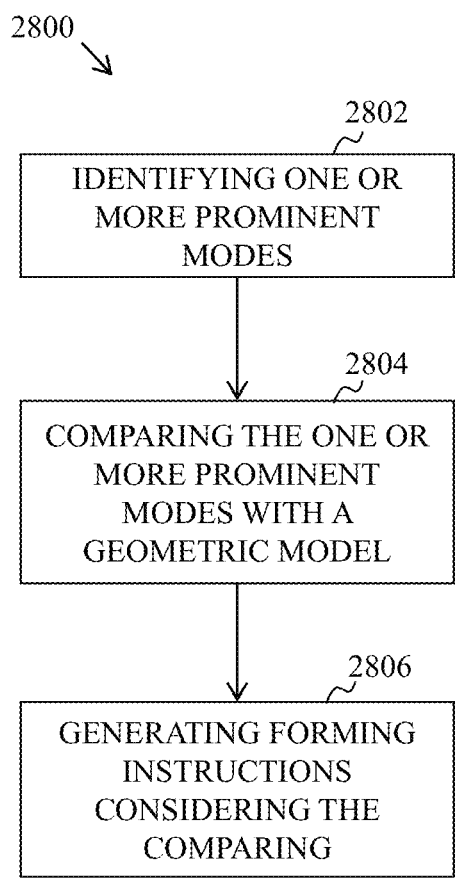
FIG. 28 schematically illustrates a flow diagram used in the forming of one or more 3D objects.

FIG. 28 shows flowchart 2800 indicating an example process for generating instructions for forming an object, in accordance with some embodiments. One or more prominent modes of the object can be identified (e.g., 2802) considering (e.g., based on) a geometric model of the object. In some embodiments, the one or more prominent modes can be identified (e.g., 2804) during a forming operation (e.g., in real time and/or in situ). The geometric model can be generated using any suitable method (e.g., CAD rendered, imaging of a test object, etc.). The one or more prominent modes can correspond to one or more thermo-mechanical prominent modes. The one or more prominent modes can be chosen from a number of modes (e.g., thermo-mechanical modes), each having an associated energy. The modes can be organized considering (e.g., based on) their associated energies (e.g., spectrum of energies). In some embodiments, the prominent modes correspond to modes that achieve thermo-mechanical equilibrium within a predetermined threshold. In some embodiments, the prominent modes correspond to modes having an associated energy within a predetermined threshold. In some embodiments, the modes (and prominent modes) correspond to predicted mechanical deformation of the object. In some embodiments, the modes (and prominent modes) correspond to predicted elastic deformation (e.g., nonlinear elastic deformation) of the object. In some embodiments, the modes (and prominent modes) correspond to predicted inelastic deformation (e.g., plastic deformation) of the object. In some embodiments, the one or more prominent modes can constitute a filter bank. The one or more prominent modes can be compared to the object (or geometric model of the object) (e.g., 2804). Comparing can include performing a regression analysis, e.g., as described herein. In some embodiments, comparing the one or more prominent modes with the object (or geometric model of the object) (e.g., 2804) is done during a forming operation (e.g., in real time and/or in situ). The geometric model can be adjusted considering (e.g., based on) the comparing (e.g. using suitable techniques described herein). Forming instructions can then be generated (e.g., 2806) considering (e.g., based on) the comparing. In some embodiments, the forming instructions can be generated (e.g., 2806) during a forming operation (e.g., in real time and/or in situ).

Figure 29:
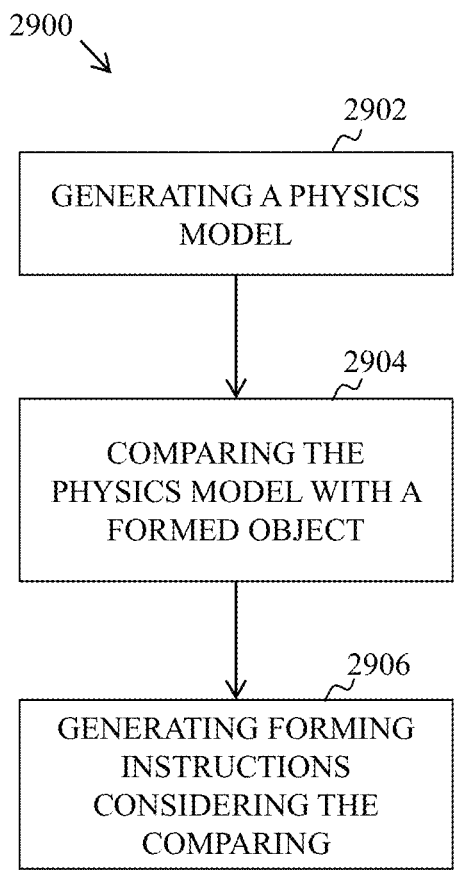
FIG. 29 schematically illustrates a flow diagram used in the forming of one or more 3D objects.

FIG. 29 shows flowchart 2900 indicating an example process for generating instructions for forming an object, in accordance with some embodiments. A physics model can be generated (e.g., 2902). The physics model can consider (e.g., be based on) a predicted deformation of the object as a result of a forming operation (e.g., process). The physics model can be a reduced physics model. The physics model can be an expanded physics model. The estimated (e.g., predicted) deformation can consider (e.g., be based on) a thermo-mechanical analysis, a type of material of the 3D object, at least one characteristic of the energy beam, or any suitable combination thereof. The thermo-mechanical analysis may comprise continuum mechanics (e.g., fluid dynamics), mechanical deformation (e.g., inelastic (e.g., plastic) deformation, and/or elastic deformation), estimated thermal deformation, estimated thermo-mechanical deformation, or pressure and/or temperature (e.g., gradient) along the multiple layers of the 3D object (e.g., previously formed layers). The estimated deformation can consider a predicted change of at least one characteristic of the 3D object. The predicted deformation can consider at least one physics-based calculation. The physics model can be compared with a formed (e.g., printed) object (e.g., 2904). The formed object can correspond to a test object or a requested object. In some cases, the physics model is compared with an image of the object (e.g., as a proxy for the object). The image can be generated by scanning the object using any suitable technique, e.g., as described herein. The image can include image markers corresponding to physical markers of the object. The object and/or image can include at least one deformation as a result of a forming operation. The comparing operation can include comparing the predicted deformation with the at least one deformation. Comparing the physics model with the object (and/or image of the object) can include performing a data analysis. The data analysis can include a regression analysis, e.g., as described herein. Generating a physics model (e.g., 2902) and comparing the physics model with a formed object (or image of the object) (e.g., 2904) can be iteratively repeated. In some cases, the iterative repetition is until an adjusted geometric model has dimensions within a predetermined threshold range of dimensions of a geometric model (of the requested object). Instructions for forming the object can be generated (e.g., 2906). Generating the instructions can include generating a corrected geometric model (e.g., OPC). In some cases, at least one of generating the physics model (e.g., 2902), comparing the physics model with a formed object (and/or image of an object) (e.g., 2904), and generating forming instructions (e.g., 2906) occur during a forming operation (e.g., in real time and/or in situ). In some cases, at least two of generating the physics model (e.g., 2902), comparing the physics model with a formed object (and/or image of an object) (e.g., 2904), and generating forming instructions (e.g., 2906) occur during a forming operation (e.g., in real time and/or in situ). In some cases, generating the physics model (e.g., 2902), comparing the physics model with a formed object (and/or image of an object) (e.g., 2904), and generating forming instructions (e.g., 2906) occur during a forming operation (e.g., in real time and/or in situ).

In some embodiments, the process of forming an object applies external forces to the object. These external forces result in stress (e.g., due to the object's internal resisting forces) and strain in the object. The strain of an object can be measured, for example, using a strain gage. Strain can be defined as an amount of deformation per unit length of an object when a load is applied. The strain E can be defined as variance (due to deformation) of an original length by the original length (L), according to Equation 12:

$$\text{Strain}(\varepsilon) = (\Delta L)/L$$

Strain $\varepsilon$ in accordance with Equation 12 can be referred to as a total strain $\varepsilon_{total}$, and include both inelastic strain $\varepsilon_{inelastic}$ and elastic strain $\varepsilon_{elastic}$. Note that inelastic strain $\varepsilon_{inelastic}$ can include any type of inelastic strain. For example, in some embodiments, the inelastic strain $\varepsilon_{inelastic}$ comprises plastic strain, viscoplastic strain, creep, or inelastic thermal strain. The plastic strain may comprise small strain plasticity, finite strain plasticity, or plasticity with hardening. The viscoplastic strain may be in accordance with Norton-Hoff model, Bingham-Norton, Perzyna models, Johnson-Cook flow stress models, Steinberg-Cochran-Guinan-Lund (SCGL) flow stress models, Zerilli-Armstrong flow stress models, Preston-Tonks-Wallace flow stress models, or any suitable combination thereof. The creep may comprise Nabarro-Herring creep, Coble creep, Harper-Dorn creep, or solute drag creep. Methods described herein can be used to determine the total strain $\varepsilon_{total}$ and inelastic strain $\varepsilon_{inelastic}$, which can in turn, be used to determine elastic strain $\varepsilon_{elastic}$, on an object as a result of a forming (e.g., printing) operation. For example, a formed object may have deformations compared to a geometric model of the requested object. That is, the forming instructions (e.g., printing instructions) can consider a geometric model of the requested object (e.g., having a requested geometry), which can result in a deformed object (e.g., have deformed geometry). The empirical methods described herein can be used to determine the inelastic (e.g., plastic) strain $\varepsilon_{inelastic}$ on the deformed object induced by the forming process (e.g., the inelastic response). The simulated process described herein can include elastic and/or inelastic strain/stress (e.g., non-linear elastic strain/stress). The simulated process can be used to estimate the total strain $\varepsilon_{total}$ (e.g., using the mode analysis described herein) and the inelastic strain $\varepsilon_{inelastic}$ of the deformed object, which are induced by the forming process. This can then be used to deduce the elastic strain $\varepsilon_{elastic}$ on the deformed object. The stress can be determined from the calculated strain.

Figure 32:
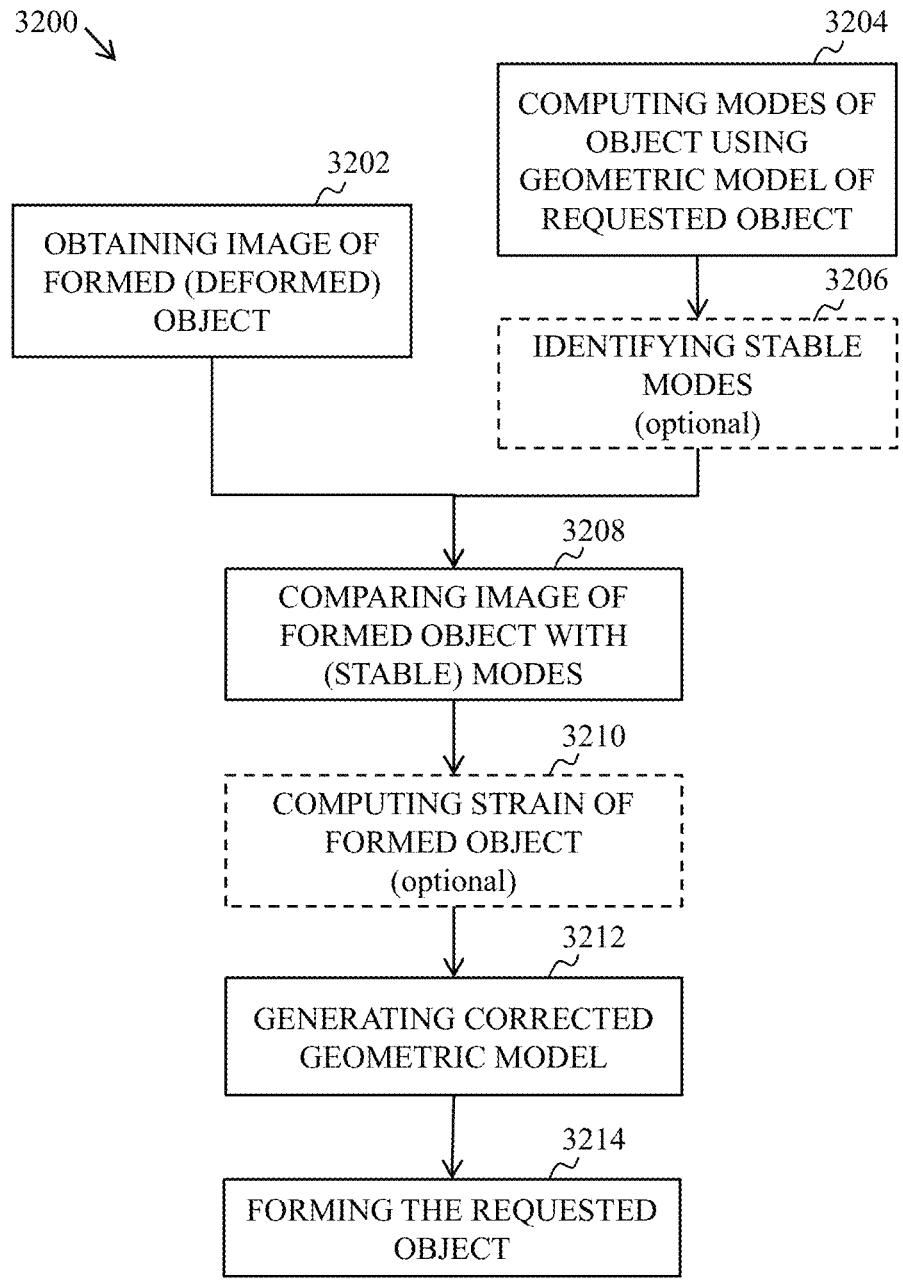
FIG. 32 schematically illustrates a flow diagram used in the forming of one or more 3D objects.

FIG. 32 shows flowchart 3200 indicating an example process for generating instructions for forming (e.g., printing) an object (including optionally determining strain on the object), in accordance with some embodiments. An object can be formed using instructions considering a geometric model of the requested object. An image (e.g., 3D scan) of the formed object can be obtained (e.g., 3202), e.g., as described herein. The formed object may be deformed (relative to the geometric model of the requested part) as a result of the forming process. Modes of the object can be computed by considering (also) the geometric model of the requested part (e.g., 3204). The modes can be computed using any suitable data analysis techniques, e.g., as described herein. For example, the modes can be determined using calculations comprising: singular value decomposition (SVD), Kosambi-Karhunen-Loève transform (KLT), the Hotelling transform, proper orthogonal decomposition (POD), eigenvalue decomposition (EVD), factor analysis, Eckart-Young theorem, Schmidt-Mirsky theorem, empirical orthogonal functions (EOF), empirical eigenfunction decomposition, empirical component analysis, quasiharmonic modes spectral decomposition, or empirical modal analysis. In some embodiments, the modes correspond to mechanical (e.g., elastic and/or inelastic) deformation modes, as described herein. For calculating the modes, non-linear elastic simulation may be performed. The non-linear elastic simulation can consider the plastic strain field imposed on the object (e.g., during its formation). From the modes, prominent modes can optionally be identified (e.g., 3206). The prominent modes can be identified using methods described herein. The image of the formed object can be compared with the modes (e.g., prominent modes) (e.g., 3208). The comparing operation can be performed using any suitable method, e.g., as described herein. In some embodiments, the comparing is used to calculating inelastic (e.g., plastic) strain on the formed object (e.g., 3210) induced by the forming process(es). The strain on the object can be determined independent of the forming process for the object. The strain can be induced by suitable process(es) (e.g., one or more printing processes, molding processes, and/or machining processes). In some embodiments, the strain is calculated by determining one or more deformations variances ($\Delta L$) and one or more corresponding original lengths (L), e.g., using methods described herein. In some embodiments, the strain is calculated using the comparison of the image of the formed object and the modes (e.g., prominent modes). In some embodiments, the calculating operation includes performing a data analysis. The data analysis can include a regression analysis, e.g., as described herein (e.g., a least squares fit analysis). One or more markers may be constructed on the modes. In some embodiments, image markers (e.g., locations, consistency, and/or shape of the image markers) of the formed object are compared to model markers (e.g., locations of the model markers) of the geometric model or of the modes (e.g., prominent modes). In some embodiments, the formed object can be considered not (e.g., substantially) deformed, if its calculated strain is at or below a predetermined strain threshold. In some embodiments, the strain threshold is at most about 0.001, 0.005, 0.008, 0.01, 0.05, 0.08, 0.1, 0.5, 0.8, or 0.9. In some embodiments, the strain threshold has any value between the afore-mentioned values (e.g., from about 0.001 to about 0.9, from about 0.001 to about 0.1, from about 0.005 to about 0.08, from about 0.005 to about 0.05, or from about 0.1 to about 0.9). A corrected geometric model can be generated (e.g., 3212) using, e.g., methods described herein. In some embodiments, the corrected geometric model corresponds to the geometric model of the requested object, iteratively adjusted geometric model, physics model, or iteratively adjusted physics model. The corrected geometric model can be used to form the last formed object. The requested object can be formed using the corrected geometric model (e.g., 3214). In some embodiments, the corrected geometric model is used to form the object, e.g., if the strain is at least (or between) the strain threshold(s).

Methods described herein can be used to form objects with increased dimensional accuracy. The dimensional accuracy can be compared to dimensions (e.g., desired dimensions) of a requested object (e.g., as requested by a customer). In some embodiments, the dimensional accuracy can be to within a predetermined dimensional value. In some embodiments, the dimensional accuracy is determined using statistical analysis (e.g., regression analysis), matrix analysis (e.g., distance matrix), and/or other suitable mathematical analyses, e.g., such as described herein. In some embodiments, the dimensional accuracy considers (e.g., is based on) a surface quality of an object. For example, the predetermined dimensional value may correspond to a surface roughness. The surface roughness can be associated with a surface reflectance (e.g., shininess). The surface roughness may be measured as the arithmetic average of the roughness profile (hereinafter "Ra"). The 3D object can have a Ra value of at most about 300 µm, 200 µm, 100 µm, 75 µm, 50 µm, 45 µm, 40 µm, 35 µm, 30 µm, 25 µm, 20 µm, 15 µm, 10 µm, 7 µm, 5 µm, 3 µm, 1 µm, 500 nm, 400 nm, 300 nm, 200 nm, 100 nm, 50 nm, 40 nm, or 30 nm. The 3D object can have a Ra value between any of the afore-mentioned Ra values (e.g., from about 300 µm to about 50 µm, from about 50 µm to about 5 µm, from about 300 nm to about 30 nm, or from about 30 µm to about 3 nm). The Ra values may be measured by a roughness tester and/or by a microscopy method (e.g., any microscopy method described herein). The measurements may be conducted at ambient temperatures (e.g., R.T.), melting point temperature (e.g., of the pre-transformed material) or cryogenic temperatures. The roughness (e.g., Ra value) may be measured by a contact or by a non-contact method. The roughness measurement apparatus may comprise one or more sensors (e.g., optical sensors). The roughness measurement may include using a metrological measurement device (e.g., using metrological sensor(s)). The roughness may be measured using an electromagnetic beam (e.g., visible or IR).

Example 1—Printing an Object Using Markers

A CAD drawing (an example of a geometric model) of a requested object was obtained (e.g., FIG. 19A, 1900). Markers (model markers) (e.g., FIG. 19B, 1902) were added to specified locations on the surface of the CAD drawing. A deformed object was printed using a 3D printing system and instructions that consider (e.g., based on) dimensions of the CAD drawing. The deformed object had markers (physical markers) corresponding to the model markers on the CAD drawing. An image of the deformed object was obtained by scanning the deformed object using a 3D scanner. The image had markers (image markers) corresponding to the physical markers of the deformed object and the model markers of the CAD drawing. A least squares fit analysis was performed to determine deviations between locations of the image markers of the image of the test object with locations of the model markers of the CAD drawing. The CAD drawing (geometric model) was corrected to adjust for the deviations using a distance matrices and displacement vector calculations. The corrected geometric model was used to generate print instructions. The print instructions were used to form the requested Inconel 3D object having a desired geometry. FIG. 20A, 2000 shows a request 3D object made of Inconel according to Example 6, which markers incorporated, and FIG. 20B shows its corresponding scanned image.

Example 2—Printing an Object Using Mode Analysis

Figure 33B:
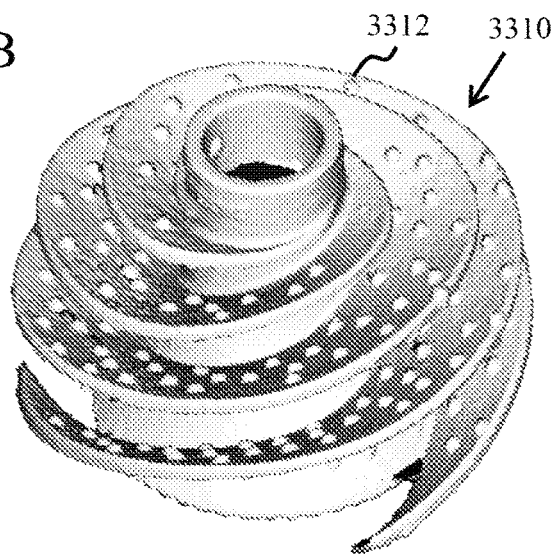
FIG. 33B illustrates an image of a 3D object.
Figure 33C:
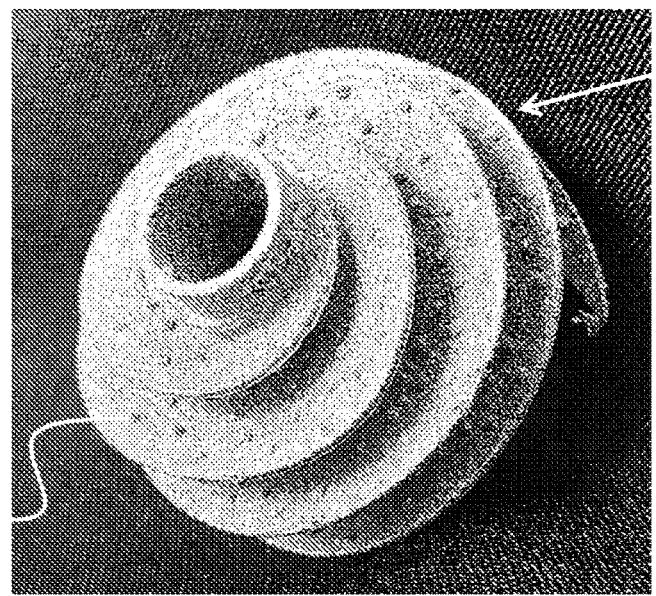
FIG. 33C shows a 3D object.

A CAD drawing (an example of a geometric model) (e.g., FIG. 33A, 3300) of a requested object was obtained. Markers (model markers) were added to specified locations on the surface of the CAD drawing. An Inconel test object was printed (e.g., FIG. 33), according to Example 6, using a 3D printing system and instructions that consider (e.g., based on) dimensions of the CAD drawing. The test object was scanned to generate an image (e.g., FIG. 33B, 3310) having image markers (e.g., FIG. 33B, 3310). An SVD calculation was used to compute modes (geometric models of simulated objects) considering (e.g., based on) predicted elastic deformations (physics model) of the geometric model (e.g., FIG. 26A-26D). A spectrum of normalized inverse energy ($S_2$) of the modes (e.g., FIG. 27) was generated. Prominent modes (e.g., 4 prominent modes) were identified as having normalized inverse energy ($S_2$) at or above a certain threshold percentage (%) of a maximum inverse energy mode (e.g., minimum energy mode). A least squares fit analysis (using distance matrices) was performed to determine geometric deviations between the prominent modes (determined using simulated process) and the image of the deformed object (determined using empirical process) were above a predetermined threshold. A displacement calculation was used to determine measured displacements in each of the prominent modes. The CAD drawing (geometric model) was corrected to adjust for the calculated displacement. The corrected geometric model was used to generate print instructions. The print instructions were used to print the requested object having a requested geometry according to the procedure delineated in Example 6. FIG. 33C, 3320 shows the request 3D object made of Inconel with markers incorporated, and FIG. 33B shows its corresponding scanned image.

Example 3—Printing an Object Using a Learning Module

A first image of a first deformed object having image markers was obtained, as described in Example 2. A first set of prominent modes (e.g., 4 prominent modes) of predicted elastic deformations (physics model) were identified, as described in Example 2. A least squares fit analysis (using distance matrix) was performed to determine geometric deviations between the first set of prominent modes (determined using simulated process) and the first image of the deformed object (determined using empirical process) were above a predetermined threshold. A displacement calculation was used to determine measured displacements in each of the first set of prominent modes. The CAD drawing (geometric model) was first corrected to adjust for the calculated displacement, and a second deformed object was printed, according to Example 6, considering (e.g., based on) the first corrected CAD drawing. The physics model was adjusted to account for the calculated displacement. The adjusted physics model was used as a basis for generating a second set of prominent modes. A least squares fit analysis (using distance matrix) was performed to determine geometric deviations between the second set of prominent modes and a second image of the second deformed object are above the predetermined threshold. Subsequent (e.g., third, fourth and fifth) deformed objects and sets of prominent modes were iteratively generated and compared until geometric deviations between a final set of prominent modes and a final image of a final deformed object were determined to be within the predetermined threshold. The CAD drawing was corrected to adjust for the last calculated displacement and used to generate print instructions. The print instructions were used to print the requested object having a desired geometry.

Example 4—Calibrating a Printer Using a Learning Module

A first geometric model (e.g., corrected geometric model) can be determined to print objects with desired geometries using a first printing system. The first geometric model can be used to print deformed objects (e.g., do not have geometric dimensions within a predetermined threshold) using a second printing system. Deformed objects and sets of prominent modes can be iteratively generated and compared until geometric deviations between a final set of prominent modes and a final image of a final deformed object are determined to be within the predetermined threshold. The CAD drawing can be corrected to adjust for the last calculated displacement and used to generate print instructions. The print instructions can be used by the second printing system to print one or more requested objects having a desired geometry.

Example 5—Determining Strain on an Object

A deformed object was printed using a system according to Example 6. Geometric deviations between an image of the deformed object and prominent modes (generated using a simulated process) were determined, as described in Example 2. Strain ($\varepsilon$) on the deformed object from the forming process was calculated, including the total strain and the inelastic (e.g., plastic) strain. From this the elastic strain was deduced. The type of forming process (e.g., printing, molding, machining, etc.) was not necessary to determine the strain ($\varepsilon$).

Example 6-3D Printing and Scanning

In a 28 cm by 28 cm by 30 cm container at ambient temperature and pressure, Inconel 718 powder of average particle size 35 µm was deposited in a container to form a powder bed. The container was disposed in an enclosure to separate the powder bed from the ambient environment. The enclosure was purged with Argon gas for 30 minutes. A 500 W fiber laser beam was used to melt a portion of the powder bed. The resulting 3D object was scanned using COMET L3D compact 3D sensor scanner, manufactured by Carl Zeiss Optotechnik GmbH, Germany.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein might be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. An apparatus for printing a three-dimensional (3D) object, the apparatus comprising at least one controller configured to:
   (a) couple to a power source and operatively couple to a 3D printer;
   (b) direct the 3D printer to print a test object using a first set of printing instructions generated at least in part by employing a simulation of a physics model simulating the printing of the 3D object by the 3D printer, the physics model employing a first mode estimating alteration in the 3D object printed as a result of the printing, the first mode being of a plurality of modes, each of the plurality of modes representing a plausible alteration of the 3D object (A) during the printing and/or (B) as a result of the printing, the physics model further employing (I) a geometric model of the 3D object and (II) a material property of the 3D object;
(c) compare, or direct comparison, between (i) a simulated test object generated at least in part by using the physics model and (ii) an image of the test object printed using the printing instructions, to generate a comparison;
(d) use, or direct use of, the comparison to adjust the physics model at least in part by choosing a second mode of the plurality of modes that best fits the test object printed, to generate an adjusted physics model; and
(e) direct the 3D printer to print the 3D object using a second set of printing instructions generated at least in part by employing the adjusted physics model.

2. The apparatus of claim 1, wherein the at least one controller is configured to direct iteratively repeating (b), (c), (d) and (e), until one or more dimensions of the test object corresponds to an acceptable dimensional accuracy range relating to a requested 3D object.

3. The apparatus of claim 1, wherein the test object comprises markers, wherein the at least one controller is configured to (i) operatively couple with at least one sensor, (ii) direct the at least one sensor to sense one or more physical markers and generate sensing data, and (iii) use, or direct usage of, the sensing data to choose the second mode that best fits the test object printed.

4. The apparatus of claim 3, wherein the at least one controller is configured to, during the printing, (ii) direct the at least one sensor to sense one or more physical markers and generate sensing data, and (iii) use, or direct usage of, the sensing data to choose the second mode that best fits the test object printed.

5. The apparatus of claim 1, wherein the at least one controller is configured to use, or directing use of, the comparison to adjust the physics model at least in part by employing the first mode corresponding to a predicted deformation mode of the 3D object.

6. The apparatus of claim 5, wherein the at least one controller is configured to use, or directing use of, the comparison to adjust the physics model at least in part by employing the first mode corresponding to a predicted elastic deformation mode of the 3D object.

7. The apparatus of claim 1, wherein the at least one controller is configured to use, or directing use of, the comparison to adjust the physics model at least in part by using a computational learning scheme.

8. The apparatus of claim 5, wherein the at least one controller is configured to use, or directing use of, the comparison to adjust the physics model at least in part by using a computational learning scheme comprising an inelastic response manifested in the 3D object.

9. The apparatus of claim 1, wherein the at least one controller is configured to print the 3D object such that the 3D object deviates from a requested 3D object by (a) at most 100 micrometers and (b) a fundamental length scale of the 3D object divided by 2500.

10. The apparatus of claim 1, wherein the at least one controller is configured to adjust, or direct adjustment, of the physics model iteratively.

11. The apparatus of claim 1, wherein the at least one controller is configured to repeat (a), (b) and (c) iteratively.

12. The apparatus of claim 11, wherein the at least one controller is configured to repeat (a), (b) and (c) iteratively until one or more dimensions of the test object corresponds to an acceptable dimensional accuracy range relating to the 3D object requested, the acceptable dimensional accuracy range being according to (i) an intended purpose of the 3D object and/or (ii) an industrial standard.

13. The apparatus of claim 1, wherein the at least one controller is configured to direct the 3D printer to print the test object using a first set of printing instructions generated at least in part by employing the physics model comprising (a) a thermo-mechanical analysis, (b) the material property of the 3D object, and (c) at least one characteristic of an energy beam used for the printing.

14. The apparatus of claim 1, wherein the at least one controller is configured to direct the 3D printer to print the test object using a first set of printing instructions generated at least in part by employing the physics model comprising continuum mechanics.

15. The apparatus of claim 1, wherein the at least one controller is configured to direct the 3D printer to (a) print the test object from a powder bed and (b) print the 3D object from the powder bed.

16. The apparatus of claim 1, wherein the at least one controller is configured to direct the 3D printer to (a) print the test object using an energy beam and (b) print the 3D object using the energy beam.

17. The apparatus of claim 1, wherein the at least one controller is configured to direct the 3D printer to (a) print the test object from a material and (b) print the 3D object from the material comprising elemental metal, metal alloy, ceramic, or an allotrope of elemental carbon.

18. The apparatus of claim 17, wherein the at least one controller is configured to direct the 3D printer to (a) print the test object at an atmosphere and (b) print the 3D object at the atmosphere comprising (i) oxygen or (ii) water vapor.

19. Non-transitory computer readable program instructions that, when read by one or more processors operatively coupled to the 3D printer configured for the printing, cause the one or more processors to execute one or more operations comprising executing the printing to print the 3D object of claim 1, the program instructions being stored on at least one non-transitory computer readable medium.

20. A method of printing the 3D object, the method comprising (a) providing the apparatus of claim 1, and (b) using the apparatus to print the 3D object.

* * * * *